(12) United States Patent
Ogasahara

(10) Patent No.: US 11,460,712 B2
(45) Date of Patent: Oct. 4, 2022

(54) CAMERA MODULE, METHOD OF MANUFACTURING THE SAME, AND ELECTRONIC APPARATUS

(71) Applicant: SONY SEMICONDUCTOR SOLUTIONS CORPORATION, Kanagawa (JP)

(72) Inventor: Takayuki Ogasahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 247 days.

(21) Appl. No.: 16/478,336

(22) PCT Filed: Jan. 17, 2018

(86) PCT No.: PCT/JP2018/001089
§ 371 (c)(1),
(2) Date: Jul. 16, 2019

(87) PCT Pub. No.: WO2018/139280
PCT Pub. Date: Aug. 2, 2018

(65) Prior Publication Data
US 2020/0004039 A1    Jan. 2, 2020

(30) Foreign Application Priority Data

Jan. 30, 2017    (JP) .............................. JP2017-014313

(51) Int. Cl.
*G02B 27/58*    (2006.01)
*G02B 3/00*    (2006.01)
(Continued)

(52) U.S. Cl.
CPC ........... *G02B 27/58* (2013.01); *G02B 3/0062* (2013.01); *G02B 5/208* (2013.01); *G02B 7/09* (2013.01); *H04N 5/3572* (2013.01)

(58) Field of Classification Search
CPC ........ G02B 27/58; G02B 3/0062; G02B 3/02; G02B 9/08; G02B 5/208; G02B 7/09;
(Continued)

(56) References Cited

U.S. PATENT DOCUMENTS 6,738,199 B2 *  5/2004  Nishioka .................. G02B 3/14
                                                              359/726
7,929,220 B2 *  4/2011  Sayag .................... G02B 27/58
                                                              359/738

(Continued)

FOREIGN PATENT DOCUMENTS

CN    103988115 A    8/2014
CN    105934478 A    9/2016
(Continued)

OTHER PUBLICATIONS

International Search Report and Written Opinion of PCT Application No. PCT/JP2018/001089, dated Apr. 17, 2018, 10 pages of ISRWO.

*Primary Examiner* — Jie Lei
(74) *Attorney, Agent, or Firm* — Chip Law Group

(57) ABSTRACT

The present technology relates to a camera module, a method of manufacturing the same, and an electronic apparatus capable of suppressing generation of a ghost or a flare. The camera module includes an image sensor, a lens unit that is provided on a light receiving surface of the image sensor, and at least one refractive index adjustment layer that is formed between the image sensor and the lens unit. The present technology can be applied to, for example, a camera module including a complementary metal oxide semiconductor (CMOS) image sensor.

20 Claims, 97 Drawing Sheets

(51) Int. Cl.
*G02B 5/20* (2006.01)
*G02B 7/09* (2021.01)
*H04N 5/357* (2011.01)

(58) Field of Classification Search
CPC ............ G02F 1/15; G02F 1/157; G02F 1/163;
H04N 5/3572
USPC ....... 359/601, 738, 241, 683–685, 716, 740,
359/827
See application file for complete search history.

(56) References Cited

U.S. PATENT DOCUMENTS

| | | | |
|---|---|---|---|
| 8,749,893 B2 * | 6/2014 | Imaoka | G02B 13/02 |
| | | | 359/684 |
| 2010/0224760 A1 | 9/2010 | Konno et al. | |
| 2014/0340537 A1 | 11/2014 | Eromaki | |
| 2015/0070568 A1 | 3/2015 | Kim et al. | |
| 2016/0340561 A1 | 11/2016 | Ikeda et al. | |
| 2017/0219901 A1 | 8/2017 | Kumai et al. | |

FOREIGN PATENT DOCUMENTS

| | | |
|---|---|---|
| EP | 2783254 A1 | 10/2014 |
| JP | 2006-309011 A | 11/2006 |
| JP | 2009-141406 A | 6/2009 |
| JP | 2010-206009 A | 9/2010 |
| JP | 2015-125405 A | 7/2015 |
| JP | 2016-025334 A | 2/2016 |
| KR | 10-2015-0029330 A | 3/2015 |
| KR | 10-2016-0113584 A | 9/2016 |
| TW | 201538655 A | 10/2015 |
| WO | 2013/076350 A1 | 5/2013 |
| WO | 2015/115553 A1 | 8/2015 |
| WO | 2016/063849 A1 | 4/2016 |

* cited by examiner

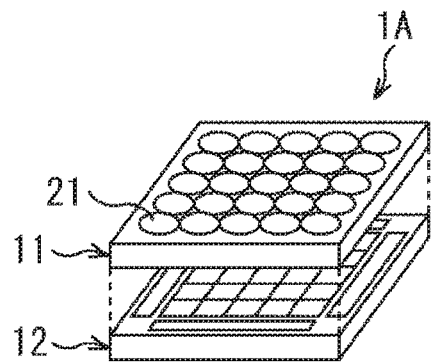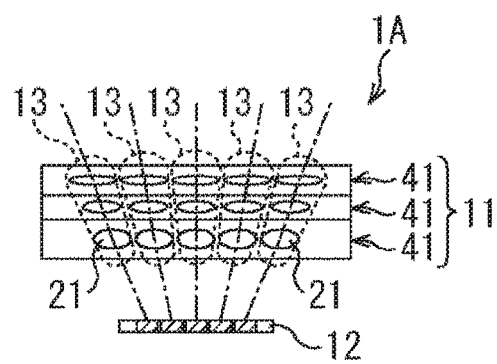
FIG. 8A  FIG. 8B
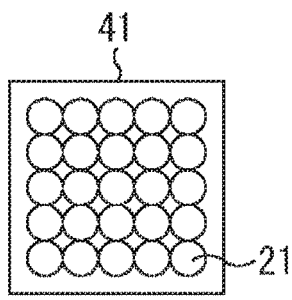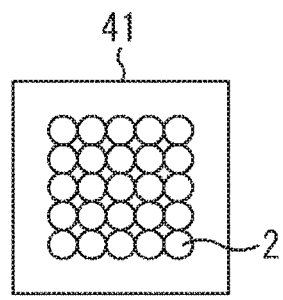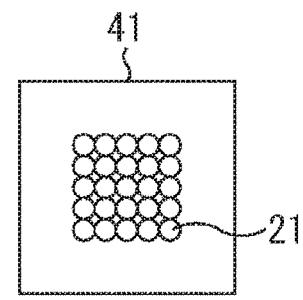
FIG. 8C  FIG. 8D  FIG. 8E
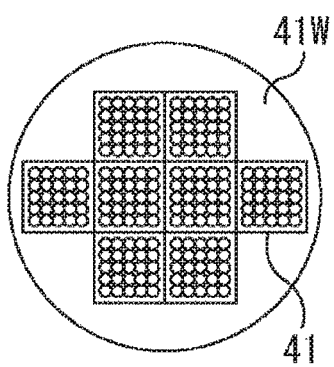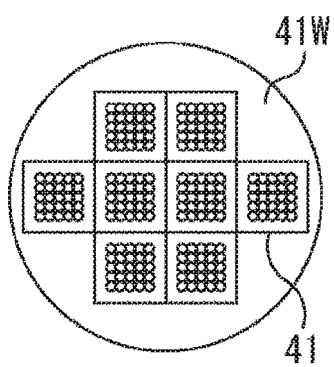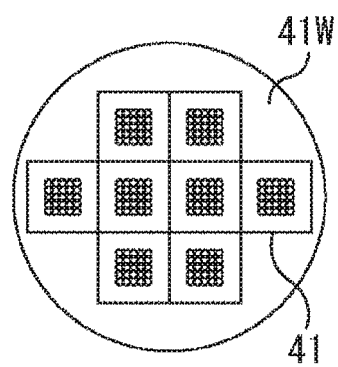
FIG. 8F  FIG. 8G  FIG. 8H

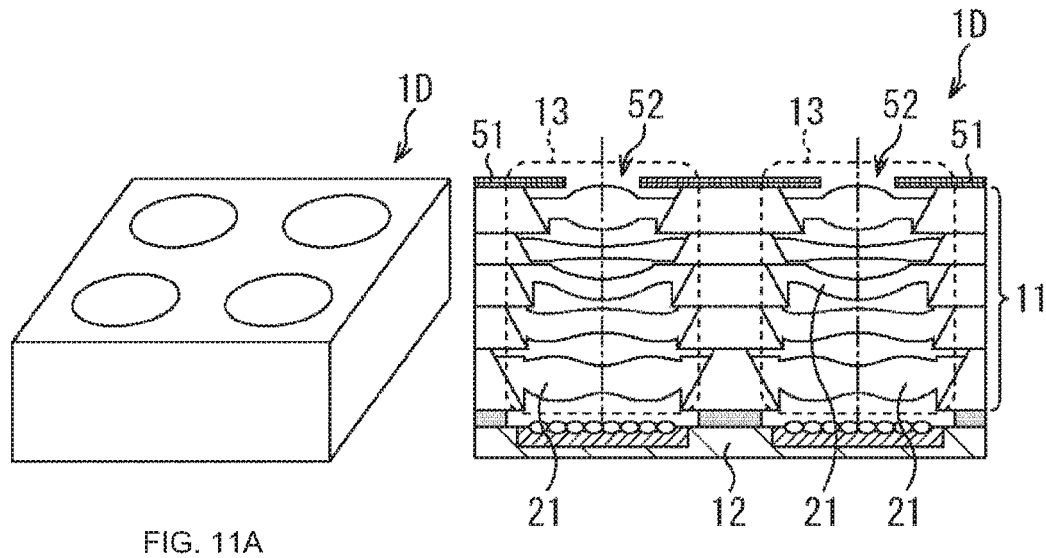
FIG. 11A
FIG. 11B
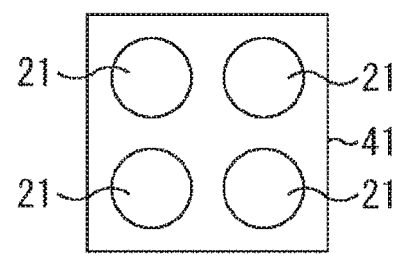
FIG. 11C
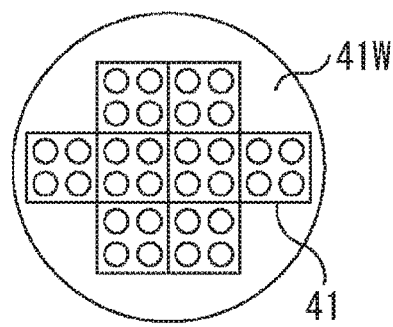
FIG. 11D

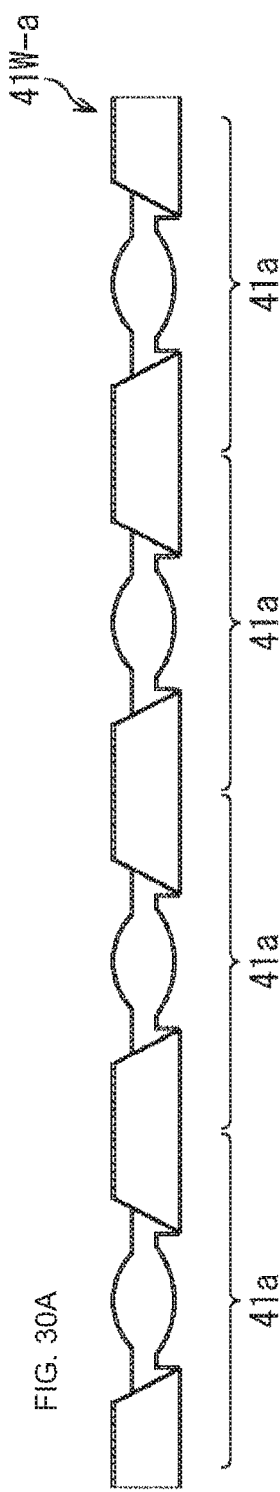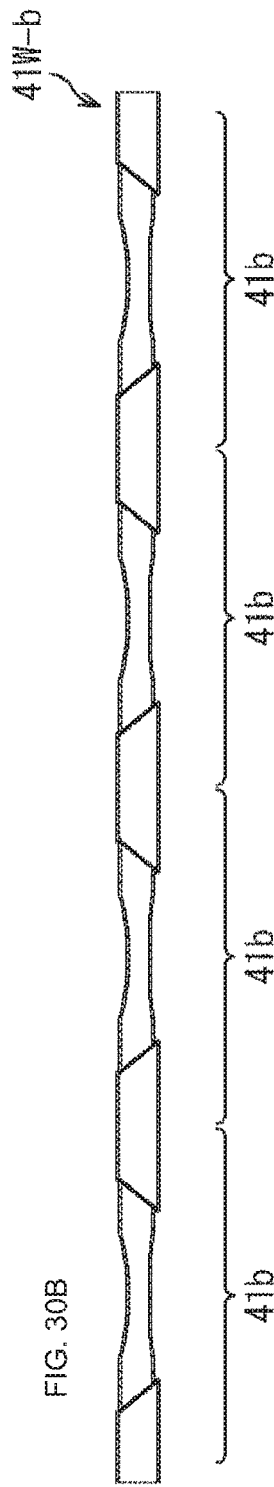

BEFORE IRRADIATION OF UV LIGHT

AT THE TIME OF IRRADIATION OF UV LIGHT

AFTER IRRADIATION OF UV LIGHT

BEFORE IRRADIATION OF UV LIGHT

AT THE TIME OF IRRADIATION OF UV LIGHT

AFTER IRRADIATION OF UV LIGHT

BEFORE IRRADIATION OF UV LIGHT

AT THE TIME OF IRRADIATION OF UV LIGHT

AFTER IRRADIATION OF UV LIGHT

HEAT TREATMENT

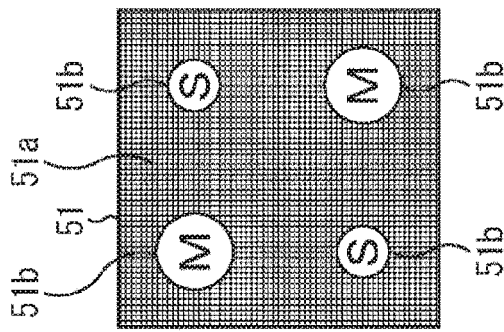
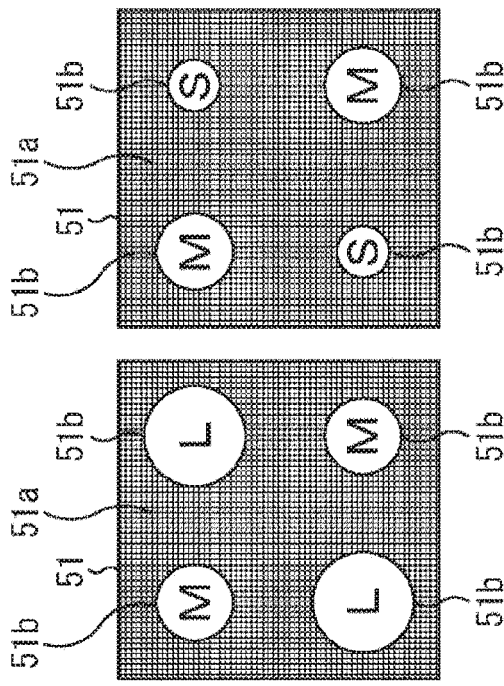
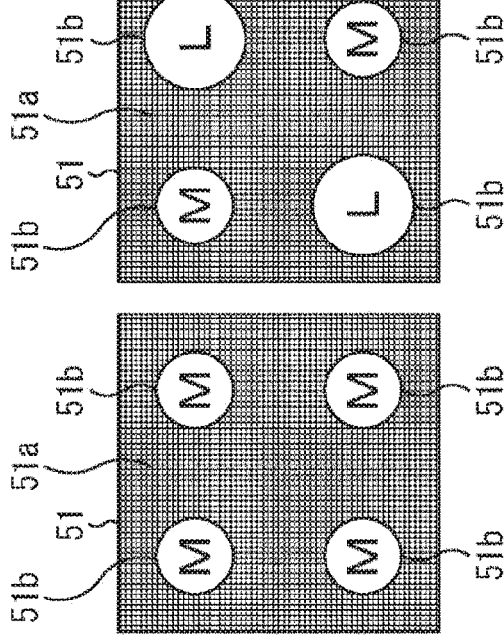
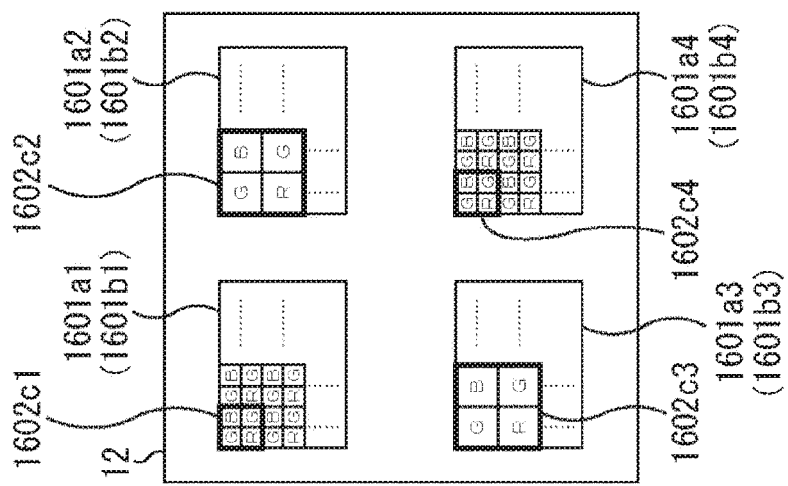

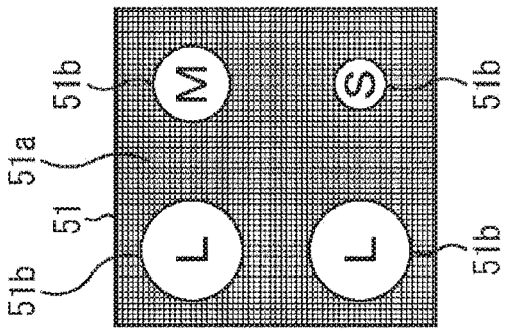
FIG. 79B
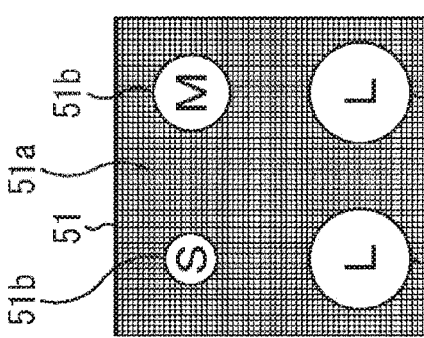
FIG. 79C
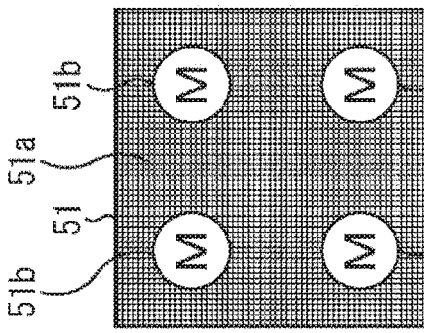
FIG. 79D
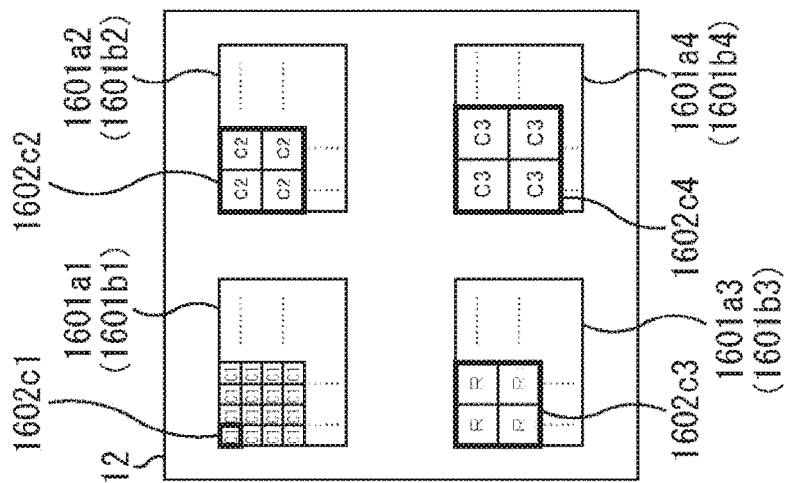

CAMERA MODULE, METHOD OF MANUFACTURING THE SAME, AND ELECTRONIC APPARATUS

CROSS REFERENCE TO RELATED APPLICATIONS

This application is a U.S. National Phase of International Patent Application No. PCT/JP2018/001089 filed on Jan. 17, 2018, which claims priority benefit of Japanese Patent Application No. JP 2017-014313 filed in the Japan Patent Office on Jan. 30, 2017. Each of the above-referenced applications is hereby incorporated herein by reference in its entirety.

TECHNICAL FIELD

The present technology relates to a camera module, a method of manufacturing the same, and an electronic apparatus, and more particularly, to a camera module, a method of manufacturing the same, and an electronic apparatus that suppress generation of a ghost or a flare.

BACKGROUND ART

In recent years, in order to realize miniaturization of a camera module, a technology of performing all manufacturing processes of a camera module including an image sensor and a lens at a wafer level using a low-cost heat-resistant lens or a through-electrode and a wafer level-mounting technology has been developed.

For example, Patent Document 1 discloses a method of manufacturing a camera module including a wafer level lens.

CITATION LIST

Patent Document

Patent Document 1: Japanese Patent Application Laid-Open No. 2009-141406

SUMMARY OF THE INVENTION

Problems to be Solved by the Invention

By the way, a camera module having an auto-focus (AF) function includes a drive unit for moving a lens barrel (lens) along an optical axis of the lens barrel, and an air layer is provided between the lens and an infrared light cut filter (IRCF) so that the lens and the IRCF are not in contact with each other.

However, due to a difference in a refractive index between the air layer and the IRCF, light passing through the lens is reflected on a surface of the IRCF, such that a ghost or a flare is generated.

The present technology has been made in view of such a situation, and an object of the present technology is to suppress generation of a ghost or a flare.

Solutions to Problems

A camera module according to the present technology includes an image sensor, a lens unit that is provided on a light receiving surface of the image sensor, and at least one refractive index adjustment layer that is formed between the image sensor and the lens unit.

The lens unit can be a stacked lens structure in which a plurality of lenses is stacked.

An infrared light cut filter (IRCF) can be provided between the image sensor and the lens unit, and the refractive index adjustment layer can be formed without a gap between the IRCF and the lens unit.

The lens unit can have a variable focus lens.

The lens unit can be an inner focus type lens.

The lens unit can have an apodized filter.

A method of manufacturing a camera module according to the present technology includes forming at least one refractive index adjustment layer between an image sensor and a lens unit provided on a light receiving surface of the image sensor.

An electronic apparatus according to the present technology includes a camera module, in which the camera module includes an image sensor, a lens unit that is provided on a light receiving surface of the image sensor, and at least one refractive index adjustment layer that is formed between the image sensor and the lens unit.

In the present technology, at least one refractive index adjustment layer is formed between an image sensor and a lens unit provided on a light receiving surface of the image sensor.

Effects of the Invention

According to the present technology, it is possible to suppress generation of a ghost or a flare. Note that an effect described here is not necessarily limited, and may be any effect described in the present disclosure.

BRIEF DESCRIPTION OF DRAWINGS

FIGS. 8A, 8B, 8C, 8D, 8E, 8F, 8G, and 8H are views for describing a configuration of a substrate with lenses.

FIGS. 11A, 11B, 11C, and 11D are views illustrating a fourth embodiment of a camera module using a stacked lens structure to which the present technology is applied.

FIGS. 20A, 20B, and 20C are views for describing a method of manufacturing a substrate with lenses.

FIGS. 30A and 30B are views for describing bonding between substrates with lenses in a substrate state.

FIGS. 73A, 73B, 73C, and 73D are views illustrating a fifth example of a pixel arrangement of the light receiving regions of the camera module.

FIGS. 79A, 79B, 79C, and 79D are views illustrating an eleventh example of a pixel arrangement of the light receiving regions of the camera module.

MODE FOR CARRYING OUT THE INVENTION

Hereinafter, modes for carrying out the present technology (hereinafter, referred to as embodiments) will be described. Note that a description will be given in the following order.

1. First Embodiment of Camera Module
2. Second Embodiment of Camera Module
3. Third Embodiment of Camera Module
4. Fourth Embodiment of Camera Module
5. Fifth Embodiment of Camera Module
6. Detailed Configuration of Camera Module According to Fourth Embodiment
7. Sixth Embodiment of Camera Module
8. Seventh Embodiment of Camera Module
9. Detailed Configuration of Substrate with Lenses
10. Method of Manufacturing Substrate with Lenses
11. Bonding between Substrates with Lenses
12. Eighth and Ninth Embodiments of Camera Module
13. Tenth Embodiment of Camera Module
14. Eleventh Embodiment of Camera Module
15. Effect of the Present Structure Compared to Other Structures
16. Various Modified Examples
17. Description of Pixel Arrangement of Light Receiving Element and Structure and Use of Diaphragm
18. Configuration of Conventional Camera Module Having Auto-Focus (AF) Function
19. First Configuration Example of Camera Module to which Present Technology Is Applied
20. Second Configuration Example of Camera Module to which Present Technology Is Applied
21. Third Configuration Example of Camera Module to which Present Technology Is Applied
22. Fourth Configuration Example of Camera Module to which Present Technology Is Applied
23. Fifth Configuration Example of Camera Module to which Present Technology Is Applied
24. Sixth Configuration Example of Camera Module to which Present Technology Is Applied
25. Seventh Configuration Example of Camera Module to which Present Technology Is Applied 26. Eighth Configuration Example of Camera Module to which Present Technology Is Applied
27. Application Example to Electronic Apparatus
28. Use Example of Camera Module
29. Application Example to In-vivo Information Acquisition System
30. Application Example to Endoscopic Surgery System
31. Application Example to Moving Body 1. First Embodiment of Camera Module FIGS. 1A and 1B are views illustrating a first embodiment of a camera module using a stacked lens structure to which the present technology is applied.

Figure 1A:
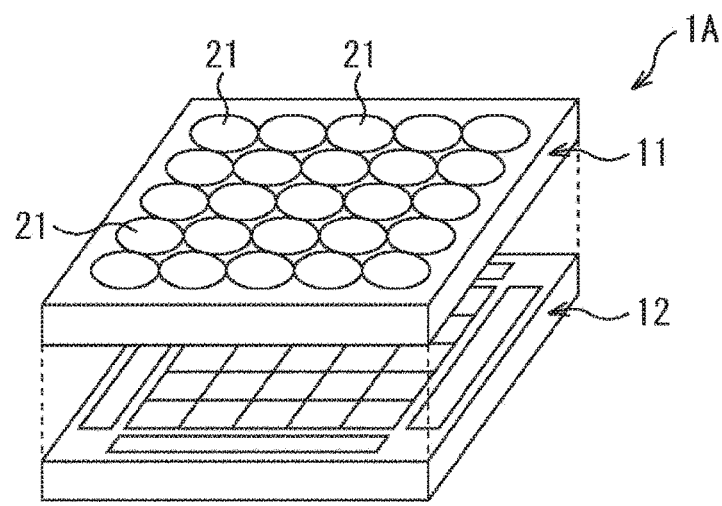
FIGS. 1A and 1B are views illustrating a first embodiment of a camera module using a stacked lens structure to which the present technology is applied.

FIG. 1A is a schematic view illustrating a configuration of a camera module 1A as a first embodiment of a camera module 1. FIG. 1B is a schematic cross-sectional view of the camera module 1A.

The camera module 1A includes a stacked lens structure 11 and a light receiving element 12. The stacked lens structure 11 includes a total of 25 optical units 13, five in each of the longitudinal and transverse directions. The optical unit 13 is configured to include a plurality of lenses 21 in one optical axis direction. The camera module 1A is a compound-eye camera module including a plurality of optical units 13.

Figure 1B:
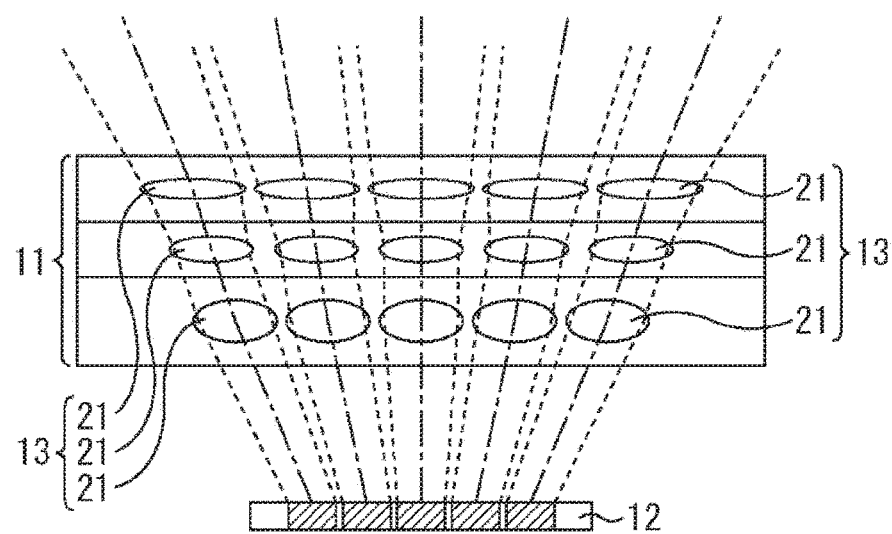

Optical axes of the plurality of optical units 13 included in the camera module 1A are arranged to spread toward the outside of the module as illustrated in FIG. 1B, which enables photographing of a wide-angle image.

Note that the stacked lens structure 11 has a structure in which lenses 21 of only three layers are stacked for simplification in FIG. 1B, but it goes without saying that more lenses 21 may be stacked.

The camera module 1A of FIGS. 1A and 1B can connect a plurality of images photographed through the plurality of optical units 13 to create one wide-angle image. In order to connect the plurality of images, a high accuracy is required for formation and arrangement of each optical unit 13 photographing each image. Furthermore, since an angle of incidence of light on the lens 21 is small particularly in a wide-angle side optical unit 13, a high accuracy is also required for a positional relationship between and arrangement of the lenses 21 in the optical unit 13.

Figure 2:
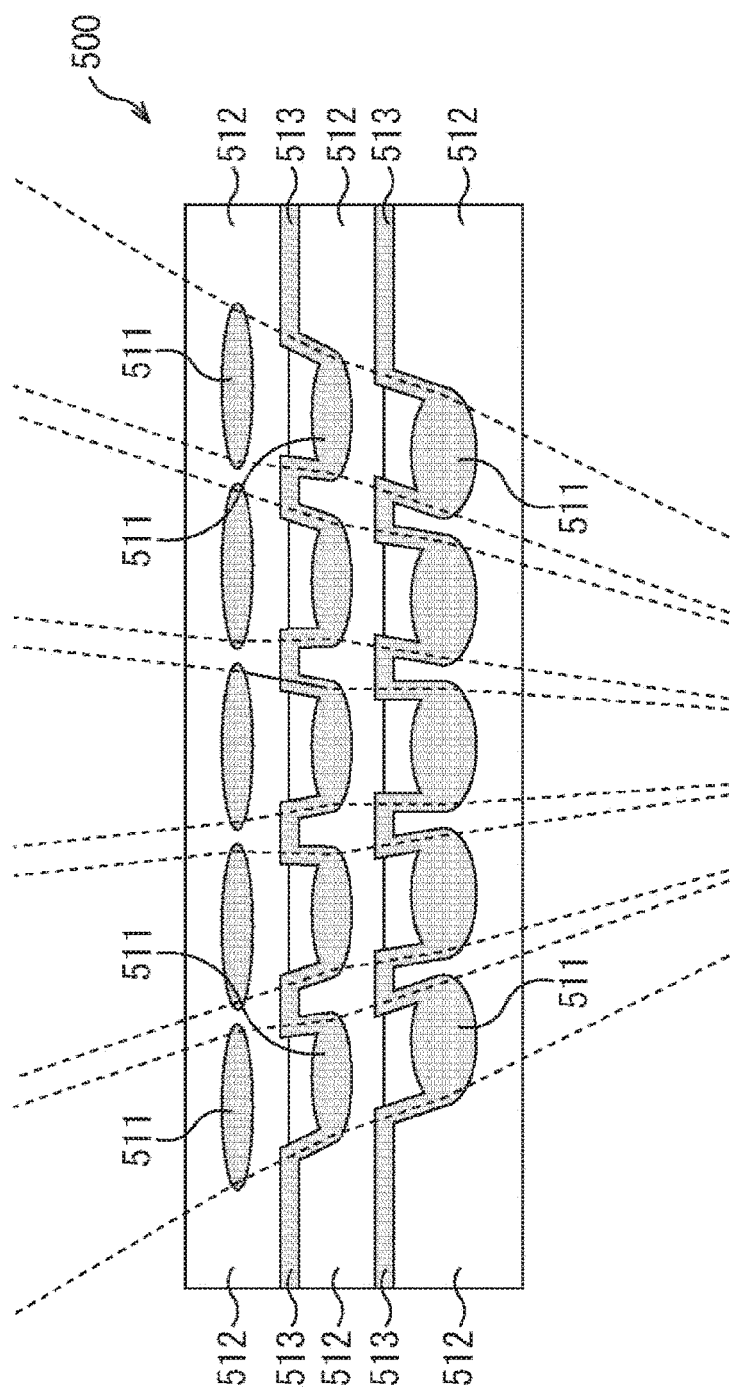
FIG. 2 is a cross-sectional view of a stacked lens structure disclosed in Patent Document 1.

FIG. 2 is a cross-sectional view of a stacked lens structure using a fixing technology by a resin disclosed in Patent Document 1.

In a stacked lens structure 500 illustrated in FIG. 2, a resin 513 is used as means for fixing between substrates 512 provided with lenses 511. The resin 513 is an energy curable resin such as an ultraviolet (UV) curable resin.

Before sticking the substrates 512 to each other, a layer of the resin 513 is formed over the entire surface of the substrate 512. Thereafter, the substrates 512 are stuck to each other, and the resin 513 is cured. With this arrangement, the substrates 512 stuck to each other are fixed to each other.

However, when the resin 513 is cured, the resin 513 is cured and shrunk. In a case of the structure illustrated in FIG. 2, after the layer of the resin 513 is formed over the entire substrate 512, the resin 513 is cured, such that a displacement amount of the resin 513 becomes large.

Furthermore, even after the stacked lens structure 500 formed by sticking the substrates 512 to each other is singulated and imaging elements are combined to each other to form the camera module, in the stacked lens structure 500 provided in the camera module, as illustrated in FIG. 2, the resin 513 is present over the entire region between the substrates 512 provided with the lenses 511. Therefore, when the camera module is mounted in a housing of a camera and is actually used, there is a possibility that the resin between the substrates of the stacked lens structure 500 will thermally expand due to a temperature rise caused by heat generation in an apparatus.

Figure 3:
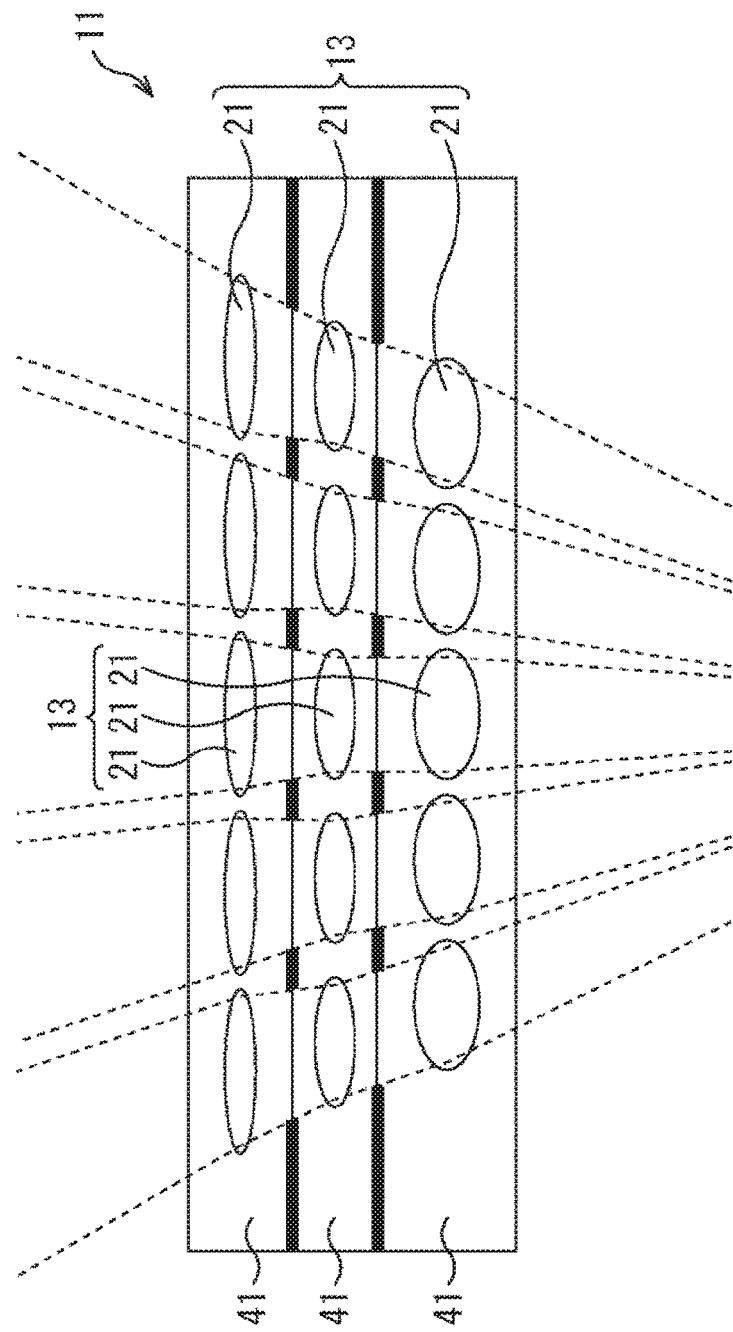
FIG. 3 is a cross-sectional view of the stacked lens structure of the camera module of FIGS. 1A and 1B.

FIG. 3 is a cross-sectional view illustrating only the stacked lens structure 11 of the camera module 1A of FIGS. 1A and 1B.

The stacked lens structure 11 of the camera module 1A is also formed by stacking a plurality of substrates 41 with lenses provided with the lenses 21.

In the stacked lens structure 11 of the camera module 1A, fixing means entirely different from those shown in the stacked lens structure 500 of FIG. 2 and other related art documents is used as means for fixing the substrates 41 with lenses provided with the lenses 21.

Figure 4:
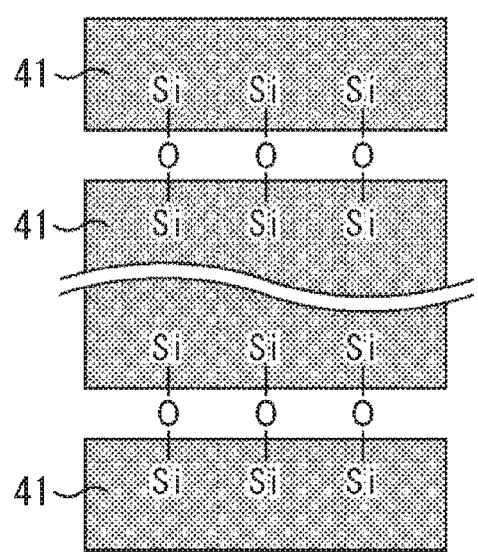
FIG. 4 is a view for describing direct bonding between substrates with lenses.

In other words, two substrates 41 with lenses that are stacked are directly bonded to each other by covalent bonds between a surface layer formed on a surface of one substrate and including oxide or nitride and a surface layer formed on a surface of the other substrate and including oxide or nitride. As a specific example, as illustrated in FIG. 4, a silicon oxide film or a silicon nitride film is formed as a surface layer on the surface of each of the two substrates 41 with lenses that are stacked, hydroxyl groups are bonded to the silicon oxide film or the silicon nitride film, and the two substrates 41 with lenses are then stuck to each other, rise in temperature, and are dehydrated and condensed. As a result, silicon-oxygen covalent bonds are formed between the surface layers of the two substrates 41 with lenses. With this arrangement, the two substrates 41 with lenses are directly bonded to each other. Note that elements contained in two surface layers can directly form covalent bonds as a result of the condensation.

In the present specification, the direct bonding refers to fixing the two substrates 41 with lenses through an inorganic substance layer arranged between the two substrates 41 with lenses, fixing the two substrates 41 with lenses by chemically bonding between inorganic substance layers arranged respectively on the surfaces of the two substrates 41 with lenses, fixing the two substrates 41 with lenses by forming bonds by dehydration condensation between inorganic substance layers arranged respectively on the surfaces of the two substrates 41 with lenses, fixing the two substrates 41 with lenses by forming covalent bonds through oxygen between inorganic substance layers arranged respectively on the surfaces of the two substrates 41 with lenses or forming covalent bonds between elements contained in the inorganic substance layers between the organic substance layers, or fixing the two substrates 41 with lenses by forming silicon-oxygen covalent bonds or silicon-silicon covalent bonds between silicon oxide layers or silicon nitride layers arranged respectively on the surfaces of the two substrates 41 with lenses, as described above.

In order to perform the sticking and the dehydration condensation by the rise in temperature, in the present embodiment, lenses are formed in a substrate state using substrates used in a field of manufacturing a semiconductor device or a flat display device, and the sticking and the dehydration condensation by the rise in temperature are performed in the substrate state, such that the substrates are bonded to each other by covalent bonds in the substrate state. A structure in which the inorganic substance layers formed on the surfaces of the two substrates 41 with lenses are bonded to each other by the covalent bonds brings about an action or effect of suppressing deformation due to the resin 513 being cured and shrunk over the entire substrate and deformation due to thermal expansion of the resin 513 at the time of actual use, which there is a possibility in a case where a technology illustrated in FIG. 2 disclosed in Patent Document 1 is used.

Figure 5:
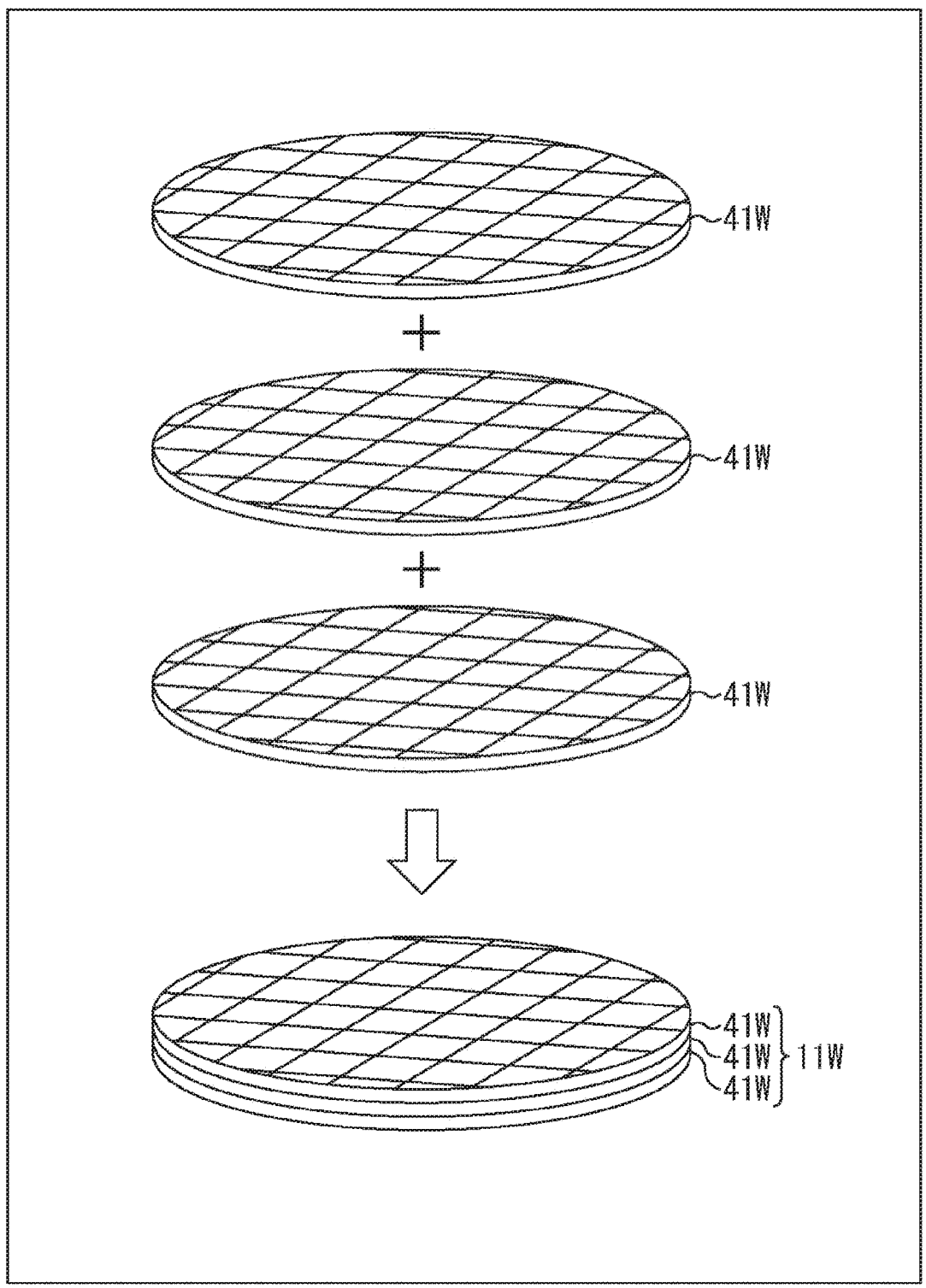
FIG. 5 is a view illustrating a process of forming the camera module of FIGS. 1A and 1B.
Figure 6:
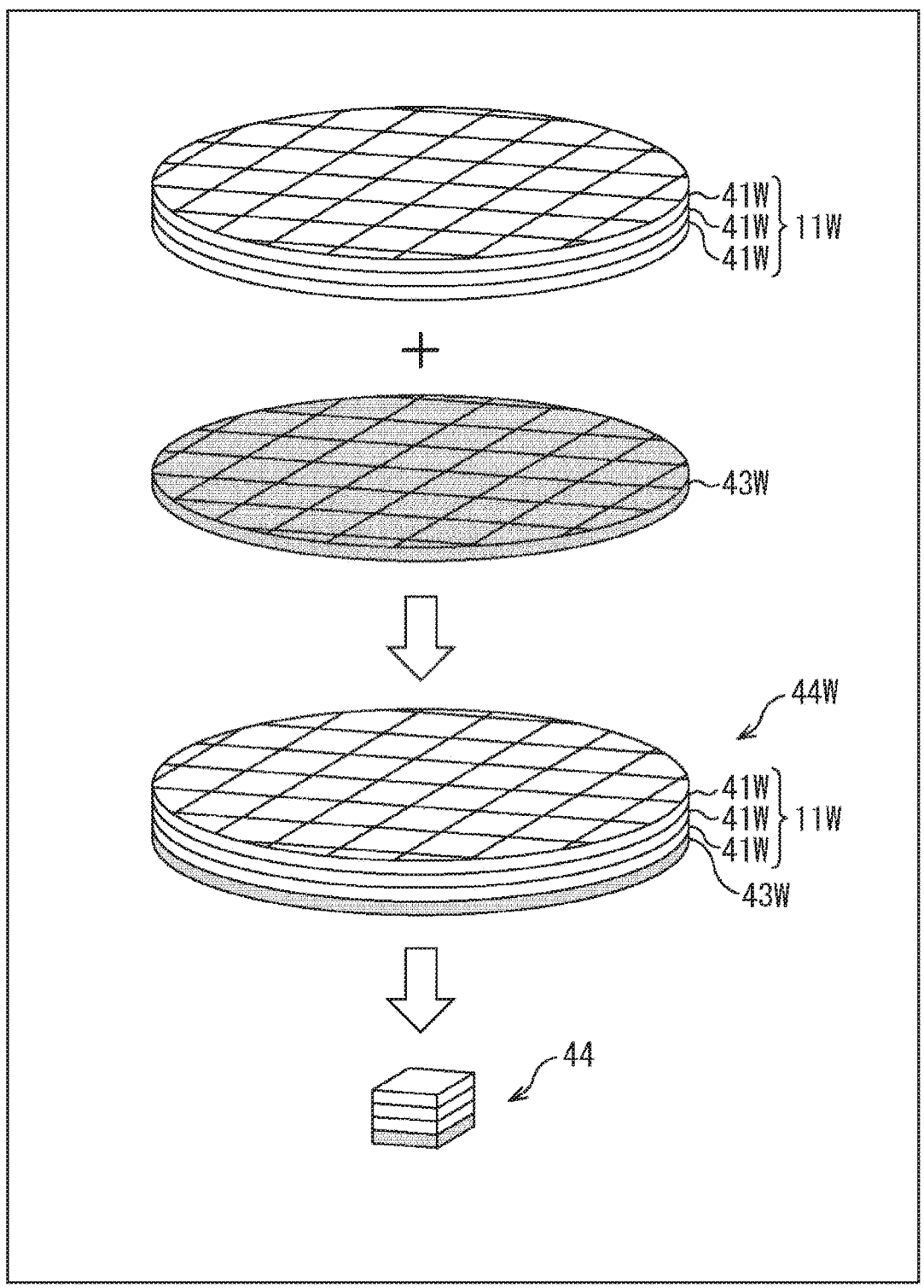
FIG. 6 is a view illustrating a process of forming the camera module of FIGS. 1A and 1B.

FIGS. 5 and 6 are views illustrating processes of forming the camera module 1A of FIGS. 1A and 1B in which the stacked lens structure 11 and the light receiving element 12 are combined with each other.

First, as illustrated in FIG. 5, a plurality of substrates 41W with lenses in which a plurality of lenses 21 (not illustrated) is formed in a plane direction is prepared, and is stacked. With this arrangement, a stacked lens structure 11W in a substrate state where the plurality of substrates 41W with lenses in a substrate state is stacked is obtained.

Next, as illustrated in FIG. 6, a sensor substrate 43W in a substrate state where a plurality of light receiving elements 12 is formed in the plane direction is manufactured and prepared separately from the stacked lens structure 11W in the substrate state illustrated in FIG. 5.

Then, the sensor substrate 43W in the substrate state and the stacked lens structure 11W in the substrate state are stacked, and an external terminal is attached to each module of the substrates stuck to each other, such that a camera module 44W in a substrate state is obtained.

Finally, the camera module 44W in the substrate state is singulated in module units or chip units. Singulated camera modules 44 are enclosed in separately prepared housings (not illustrated), such that final camera modules 44 are obtained.

Note that in the present specification and drawings, for example, a component that has "W" added to a reference sign thereof, such as the substrate 41W with lenses, indicates that it is in the substrate state (wafer state), and a component that does not have "W" attached to a reference sign thereof, such as the substrate 41 with lenses, indicates that it is in a state where it is singulated in module units or chip units. The same goes for the sensor substrate 43W, the camera module 44W, and the like.

Figure 7:
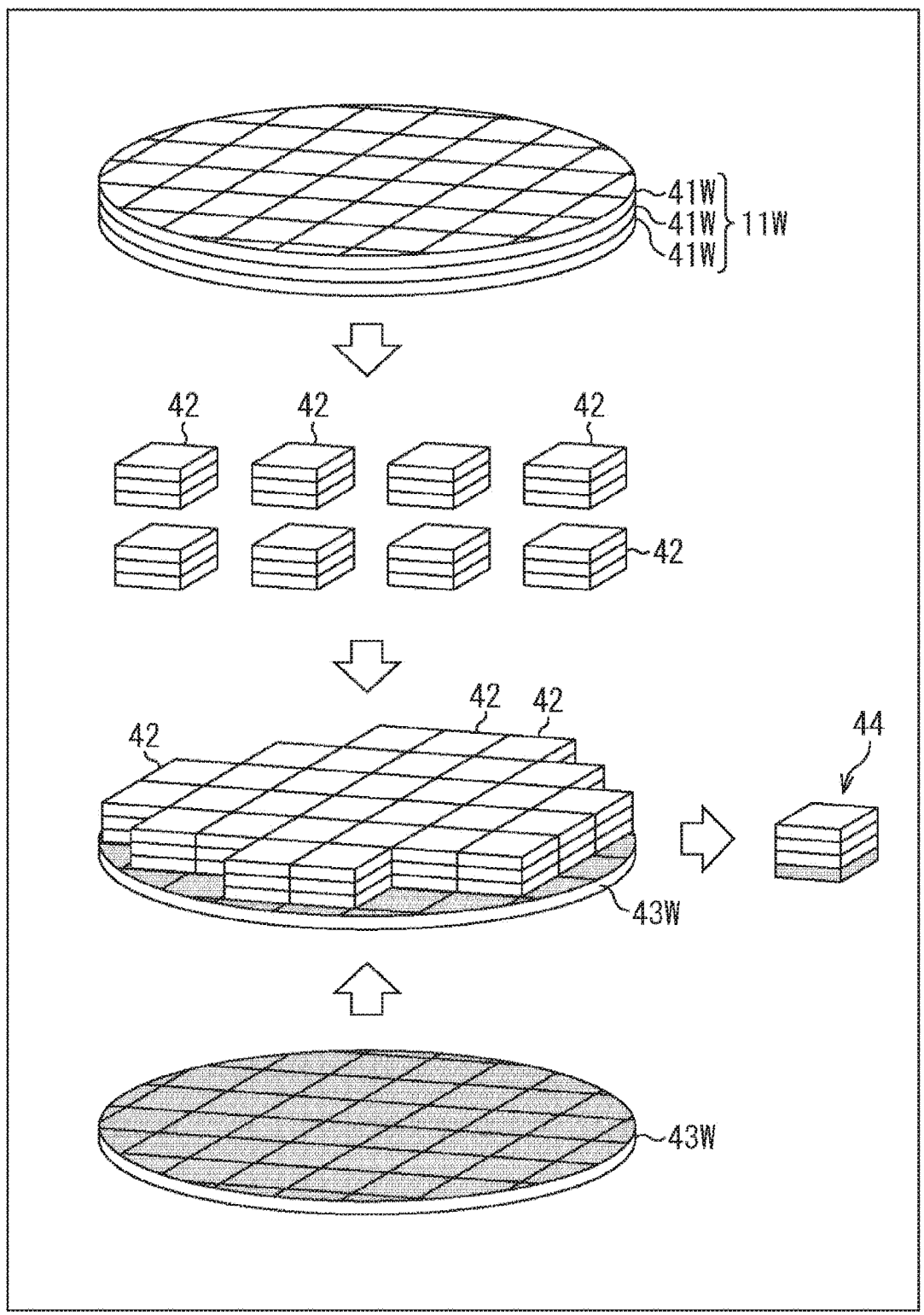
FIG. 7 is a view illustrating another process of forming the camera module of FIGS. 1A and 1B.

FIG. 7 is a view illustrating another process of forming the camera module 1A of FIGS. 1A and 1B in which the stacked lens structure 11 and the light receiving element 12 are combined with each other.

First, similar to the process described above, a stacked lens structure 11W in a substrate state where a plurality of substrates 41W with lenses in a substrate state is stacked is manufactured.

Next, the stacked lens structure 11W in the substrate state is singulated.

Furthermore, in addition to the stacked lens structure 11W in the substrate state, a sensor substrate 43W in the substrate state is manufactured and prepared.

Then, singulated stacked lens structures 11 are mounted one by one on the respective light receiving elements 12 of the sensor substrate 43W in the substrate state.

Finally, the sensor substrate 43W in the substrate state on which the singulated stacked lens structures 11 are mounted is singulated in module units or chip units. Singulated sensor substrates 43 on which the stacked lens structures 11 are mounted are enclosed in separately prepared housings (not illustrated), and external terminals are attached, such that final camera modules 44 are obtained.

Moreover, as an example of another process of forming the camera module 1A of FIGS. 1A and 1B in which the stacked lens structure 11 and the light receiving element 12 are combined with each other, the sensor substrate 43W in the substrate state illustrated in FIG. 7 may be singulated, and the stacked lens structures 11 after being singulated may be mounted respectively on the individual light receiving elements 12 obtained as a result of the singulation to obtain singulated camera modules 44.

FIGS. 8A, 8B, 8C, 8D, 8E, 8F, 8G, and 8H are views for describing a configuration of a substrate 41 with lenses in a camera module 1A.

FIG. 8A is a schematic view illustrating a configuration of a camera module 1A similar to A of FIG. 1A.

FIG. 8B is a schematic cross-sectional view of a camera module 1A similar to FIG. 1B.

The camera module 1A is a compound-eye camera module that includes a plurality of optical units 13 formed by combining a plurality of lenses 21 and including one optical axis, as illustrated in FIG. 8B. The stacked lens structure 11 includes a total of 25 optical units 13, five in each of the longitudinal and transverse directions.

In the camera module 1A, the optical axes of the plurality of optical units 13 are arranged so as to spread toward the outside of the module, which enables photographing of a wide-angle image. The stacked lens structure 11 has a structure in which substrates 41 with lenses of only three layers are stacked for simplification in FIG. 8B, but it goes without saying that more substrates 41 with lenses may be stacked.

FIGS. 8C, 8D, and 8E are view illustrating planar shapes of each of the substrates 41 with lenses of the three layers constituting the stacked lens structure 11.

FIG. 8C is a plan view of a substrate 41 with lenses of the uppermost layer among the three layers, FIG. 8D is a plan view of a substrate 41 with lenses of the middle layer among the three layers, and FIG. 8D is a plan view of a substrate 41 with lenses of the lowermost layer among the three layers. Since the camera module 1 is a compound-eye wide-angle camera module, a diameter of each of the lenses 21 is increased and a pitch between the lenses is increased, toward an upper layer.

FIGS. 8F, 8G, and 8H are plan views of substrates 41W with lenses in substrate states for obtaining the substrates 41 with lenses illustrated in FIGS. 8C, 8D, and 8E, respectively.

The substrate 41W with lenses illustrated in FIG. 8F illustrates a substrate state corresponding to the substrate 41 with lenses of FIG. 8C, the substrate 41W with lenses illustrated in FIG. 8G illustrates a substrate state corresponding to the substrate 41 with lenses of FIG. 8D, and the substrate 41W with lenses illustrated in FIG. 8H illustrates a substrate state corresponding to the substrate 41 with lenses of FIG. 8E.

The substrates 41W with lenses in the substrate states illustrated in FIGS. 8F, 8G, and 8H are configured to obtain eight camera modules 1A illustrated in FIG. 8A for each substrate.

It can be seen that a pitch between the lenses in the substrates 41 in module units is different between a substrate 41W with lenses of an upper layer and a substrate 41W with lenses of a lower layer among the respective substrates 41W with lenses in FIGS. 8F, 8G, and 8H, while a pitch at which the substrates 41 with lenses in the module units are arranged is constant from the substrate 41W with lenses of the upper layer to the substrate 41W with lenses of the lower layer in the respective substrates 41W with lenses.

2. Second Embodiment of Camera Module

FIGS. 9A, 9B, 9C, 9D, 9E, 9F, 9G, and 9H are views illustrating a second embodiment of a camera module using a stacked lens structure to which the present technology is applied.

Figure 9A:
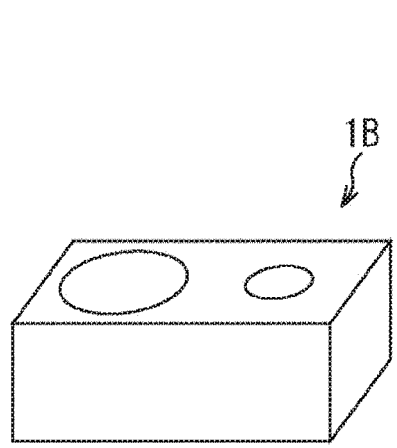
FIGS. 9A, 9B, 9C, 9D, 9E, 9F, 9G, and 9H are views illustrating a second embodiment of a camera module using a stacked lens structure to which the present technology is applied.
Figure 9B:
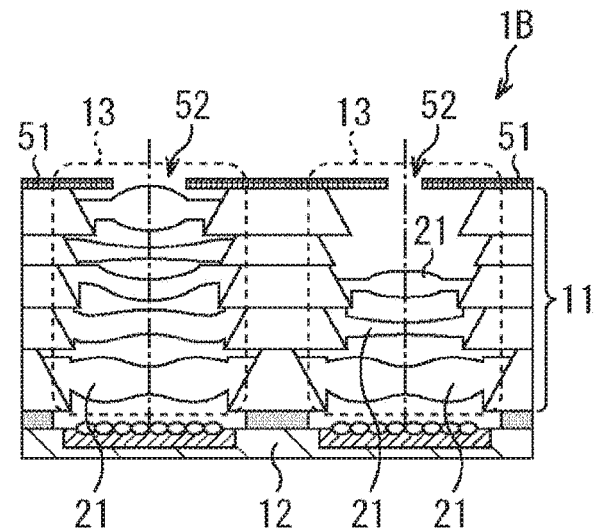

FIG. 9A is a schematic view illustrating an appearance of a camera module 1B as a second embodiment of a camera module 1. FIG. 9B is a schematic cross-sectional view of the camera module 1B.

The camera module 1B includes two optical units 13. The two optical units 13 include a diaphragm plate 51 on the uppermost layer of a stacked lens structure 11. The diaphragm plate 51 is provided with openings 52.

The camera module 1B includes the two optical units 13, but optical parameters of the two optical units 13 are different from each other. In other words, the camera module 1B includes two types of optical units 13 having different optical performances. The two types of optical units 13 can be, for example, an optical unit 13 having a short focal length in order to photograph a near view and an optical unit 13 having a long focal distance in order to photograph a distant view.

In the camera module 1B, the optical parameters of the two optical units 13 are different from each other. Therefore, for example, as illustrated in FIG. 9B, the numbers of lenses 21 of the two optical units 13 are different from each other. Furthermore, lenses 21 of the same layer of the stacked lens structure 11 included in the two optical units 13 can be configured so that any one of diameters, thicknesses, surface shapes, volumes, or distances between adjacent lenses thereof are different from each other. Therefore, in a planar shape of the lenses 21 in the camera module 1B, for example, the two optical units 13 may include lenses 21 having the same diameter as illustrated in FIG. 9C or may include lenses 21 having different shapes as illustrated in FIG. 9D, or one of the two optical units 13 may have a structure of a cavity 21X without a lens 21 as illustrated in FIG. 9E.

Figure 9C:
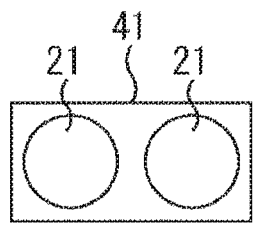
Figure 9D:
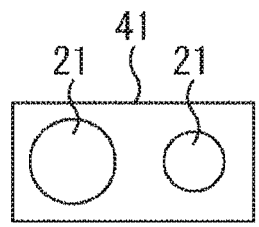
Figure 9E:
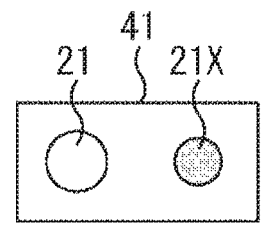
Figure 9F:
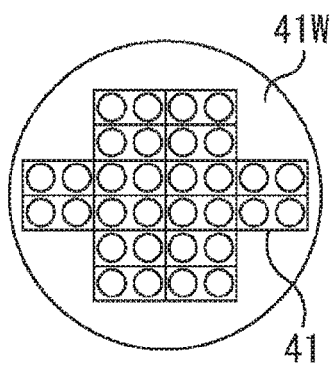
Figure 9G:
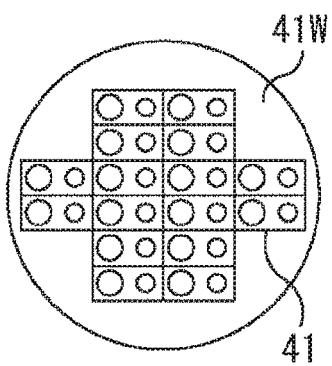
Figure 9H:
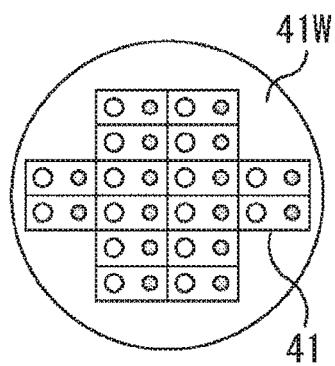

FIGS. 9F, 9G, and 9H are plan views of substrates 41W with lenses in substrate states for obtaining the substrates 41 with lenses illustrated in FIGS. 9C, 9D, and 9E, respectively.

The substrate 41W with lenses illustrated in FIG. 9F illustrates a substrate state corresponding to the substrate 41 with lenses of FIG. 9C, the substrate 41W with lenses illustrated in FIG. 9G illustrates a substrate state corresponding to the substrate 41 with lenses of FIG. 9D, and the substrate 41W with lenses illustrated in FIG. 9H illustrates a substrate state corresponding to the substrate 41 with lenses of FIG. 9E.

The substrates 41W with lenses in the substrate states illustrated in FIGS. 9F, 9G, and 9H are configured to obtain sixteen camera modules 1B illustrated in FIG. 9A for each substrate.

As illustrated in in FIGS. 9F, 9G, and 9H, in order to form the camera module 1B, it is possible to form lenses having the same shape, form lenses having different shapes, or form or not to form lenses over the entire surface of the substrate 41W with lenses in the substrate state.

3. Third Embodiment of Camera Module

FIGS. 10A, 10B, 10C, 10D, 10E, and 10F are views illustrating a third embodiment of a camera module using a stacked lens structure to which the present technology is applied.

Figure 10A:
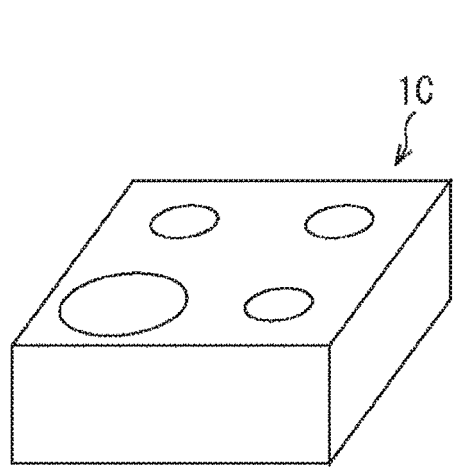
FIGS. 10A, 10B, 10C, 10D, 10E, and 10F are views illustrating a third embodiment of a camera module using a stacked lens structure to which the present technology is applied.
Figure 10B:
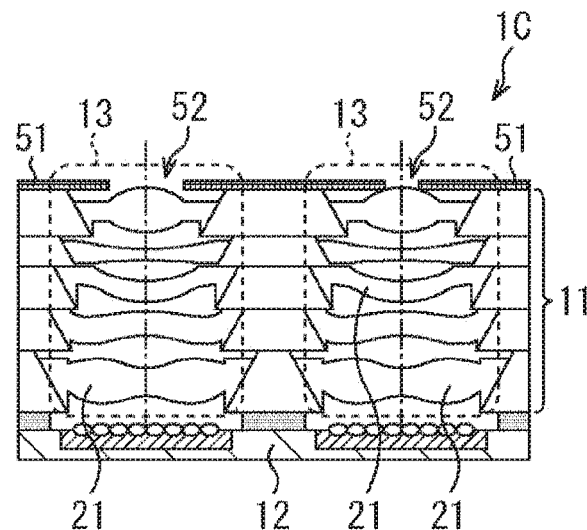

FIG. 10A is a schematic view illustrating an appearance of a camera module 1C as a third embodiment of a camera module 1. FIG. 10B is a schematic cross-sectional view of the camera module 1C.

The camera module 1C includes a total of four optical units 13, two in each of the longitudinal and transverse directions, on an incident surface of light. In the four optical units 13, shapes of lenses 21 are the same as each other.

The four optical units 13 include a diaphragm plate 51 on the uppermost layer of a stacked lens structure 11, but sizes of openings 52 of the diaphragm plate 51 are different among the four optical units 13. With this arrangement, the camera module 1C can realize, for example, the following camera module 1C. In other words, for example, in a monitoring camera for crime prevention, in the camera module 1C that uses a light receiving element 12 including light receiving pixels for monitoring a color image in the daytime that include three types of (RGB) color filters to receive three types of (RGB) light and light receiving pixels for monitoring a black-and-white image at night that do not include color filters for RGB, it is possible to increase sizes of openings of the diaphragm only in pixels for photographing the black-and-white image at night when illuminance is low. Therefore, in a planar shape of the lenses 21 in one camera module 1C, for example, diameters of the lenses 21 included in the four optical units 13 are the same as each other as illustrated in FIG. 10C, and sizes of the openings 52 of the diaphragm plate 51 are different from each other depending on the optical units 13 as illustrated in FIG. 10D.

Figure 10C:
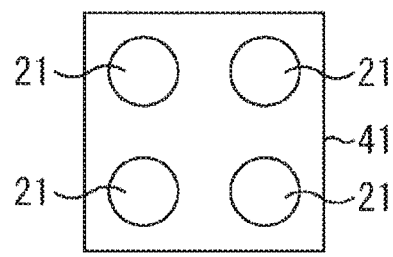
Figure 10D:
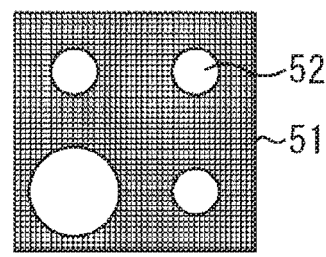
Figure 10E:
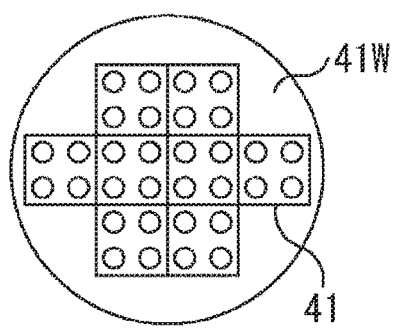
Figure 10F:
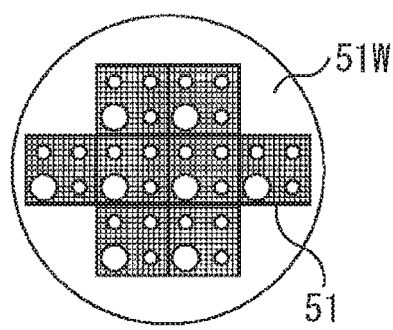

FIG. 10E is a plan view of a substrate 41W with lenses in a substrate state for obtaining the substrate 41 with lenses illustrated in FIG. 10C. FIG. 10F is a plan view illustrating a diaphragm plate 51W in a substrate state for obtaining the diaphragm plate 51 illustrated in FIG. 10D.

The substrate 41W with lenses in the substrate state illustrated in FIG. 10E and the diaphragm plate 51W in the substrate state illustrated in FIG. 10F are configured to obtain eight camera modules 1C illustrated in FIG. 10A for each substrate.

As illustrated in FIG. 10F, in the diaphragm plate 51W in the substrate state, sizes of the openings 52 can be set to be different from each other for each of the optical units 13 included in the camera module 1C, in order to form the camera module 1C.

4. Fourth Embodiment of Camera Module

FIGS. 11A, 11B, 11C, and 11D are views illustrating a fourth embodiment of a camera module using a stacked lens structure to which the present technology is applied.

FIG. 11A is a schematic view illustrating an appearance of a camera module 1D as a fourth embodiment of a camera module 1. FIG. 11B is a schematic cross-sectional view of the camera module 1D.

The camera module 1D includes a total of four optical units 13, two in each of the longitudinal and transverse directions, on an incident surface of light, similar to the camera module 1C. In the four optical units 13, shapes of lenses 21 and sizes of openings 52 of a diaphragm plate 51 are the same as each other.

In the camera module 1D, optical axes provided in the optical units 13 arranged as two in each of the longitudinal and transverse directions of the incident surface of the light extend in the same direction. Alternate long and short dash lines illustrated in FIG. 11B indicate the optical axes of each of the optical units 13. The camera module 1D having such a structure is appropriate for photographing an image having a resolution higher than that of an image photographed by one optical unit 13, using a super-resolution technology.

In the camera module 1D, in each of the longitudinal and transverse directions, it is possible to obtain a plurality of images that is not necessarily the same as each other while the optical axes facing the same direction by photographing images with a plurality of light receiving elements 12 arranged at different positions while the optical axes facing the same direction or by photographing images with light receiving pixels of different regions in one light receiving element 12. It is possible to obtain an image having a high resolution by combining between image data of each place of the plurality of images that are not same as each other. Therefore, it is preferable that planar shapes of the lenses 21 in one camera module 1D are the same as each other in the four optical units 13, as illustrated in FIG. 11C.

FIG. 11D is a plan view of a substrate 41W with lenses in a substrate state for obtaining the substrate 41 with lenses illustrated in FIG. 11C. The substrate 41W with lenses in the substrate state is configured to obtain eight camera modules 1D illustrated in FIG. 11A for each substrate.

As illustrated in FIG. 11D, in the substrate 41W with lenses in the substrate state, in order to form the camera module 1D, the camera module 1D includes a plurality of lenses 21, and a plurality of lens groups for one camera module is arranged at a constant pitch on the substrate.

5. Fifth Embodiment of Camera Module

FIGS. 12A, 12B, 12C, and 12D are views illustrating a fifth embodiment of a camera module using a stacked lens structure to which the present technology is applied.

Figures 12A, 12B:
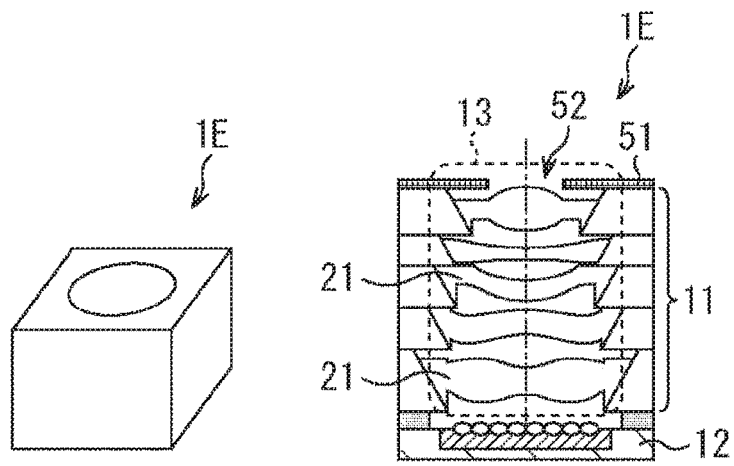
FIGS. 12A, 12B, 12C, and 12D are views illustrating a fifth embodiment of a camera module using a stacked lens structure to which the present technology is applied.

FIG. 12A is a schematic view illustrating an appearance of a camera module 1E as a fifth embodiment of a camera module 1. FIG. 12B is a schematic cross-sectional view of the camera module 1E.

The camera module 1E is a monocular camera module including one optical unit 13 having one optical axis in the camera module 1E.

Figure 12C:
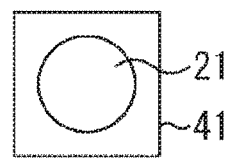

FIG. 12C is a plan view of a substrate 41 with lenses illustrating a planar shape of the lens 21 in the camera module 1E. The camera module 1E includes one optical unit 13.

Figure 12D:
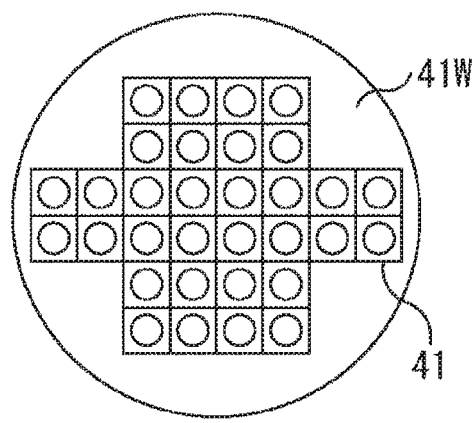

FIG. 12D is a plan view of a substrate 41W with lenses in a substrate state for obtaining the substrate 41 with lenses illustrated in FIG. 12C. The substrate 41W with lenses in the substrate state is configured to obtain thirty two camera modules 1E illustrated in FIG. 12A for each substrate.

As illustrated in FIG. 12D, in the substrate 41W with lenses in the substrate state, a plurality of lenses 21 for camera module 1E is arranged at a constant pitch on the substrate.

6. Detailed Configuration of Camera Module According to Fourth Embodiment

Next, a detailed configuration of the camera module 1D according to the fourth embodiment illustrated in FIGS. 11A, 11B, 11C, and 11D will be described with reference to FIG. 13.

Figure 13:
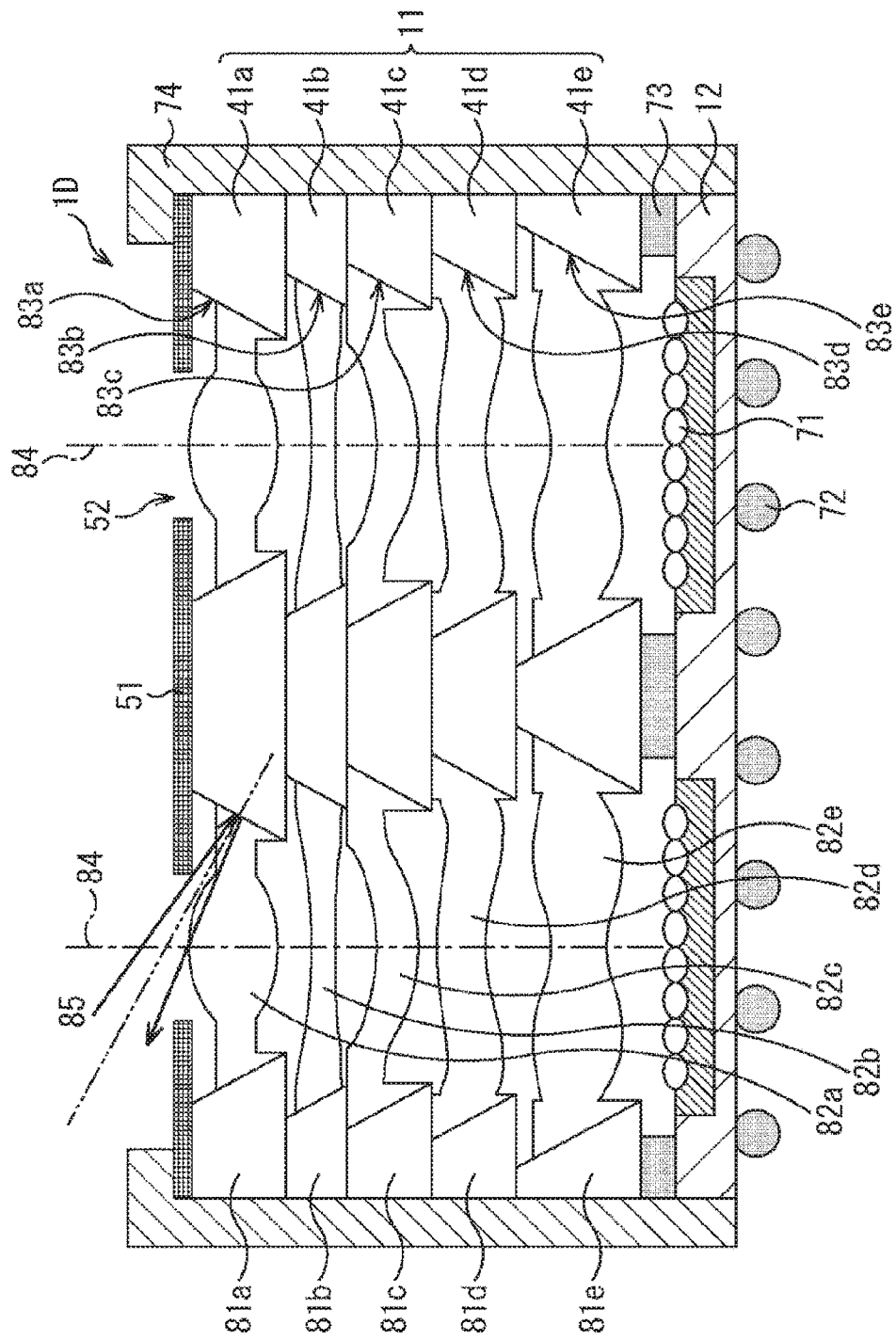
FIG. 13 is a view for describing a detailed configuration of the camera module according to the fourth embodiment.

FIG. 13 is a cross-sectional view of the camera module 1D illustrated in FIG. 11B.

The camera module 1D is configured to include a stacked lens structure 11 in which a plurality of substrates 41a to 41e with lenses is stacked, and the light receiving element 12. The stacked lens structure 11 includes a plurality of optical units 13. Alternate long and short dash lines 84 represent optical axes of the respective optical units 13. The light receiving element 12 is arranged below the stacked lens structure 11. In the camera module 1D, light incident into the camera module 1D from above is transmitted through the stacked lens structure 11, and is received by the light receiving element 12 arranged below the stacked lens structure 11.

The stacked lens structure 11 includes five substrates 41a to 41e with lenses that are stacked. In a case where the five substrates 41a to 41e with lenses are not particularly distinguished from each other, they will be simply referred to and described as a substrate 41 with lenses.

A cross-sectional shape of a through-hole 83 of each substrate 41 with lenses constituting the stacked lens structure 11 has a so-called downward tapered shape in which an opening width of the through-hole 83 is decreased toward a lower side (a side on which the light receiving element 12 is arranged).

The diaphragm plate 51 is arranged on the stacked lens structure 11. The diaphragm plate 51 includes, for example, a layer including a material having a light absorbing property or a light shielding property. The diaphragm plate 51 is provided with openings 52.

The light receiving element 12 includes, for example, a front side irradiation-type or a back side irradiation-type complementary metal oxide semiconductor (CMOS) image sensor. On-chip lenses 71 are formed on an upper surface of the light receiving element 12 adjacent the stacked lens structure 11, and external terminals 72 inputting and outputting signals are formed on a lower surface of the light receiving element 12.

The stacked lens structure 11, the light receiving element 12, the diaphragm plate 51, and the like, are housed in a lens barrel 74.

A structural material 73 is arranged on the light receiving element 12. The stacked lens structure 11 and the light receiving element 12 are fixed through the structural material 73. The structural material 73 is, for example, an epoxy-based resin.

In the present embodiment, the stacked lens structure 11 includes the five substrates 41a to 41e with lenses that are stacked, but the number of substrates 41 with lenses that are stacked is not particularly limited as long as it is two or more.

Each substrate 41 with lenses constituting the stacked lens structure 11 has a configuration in which a lens resin portion 82 is added to a carrier substrate 81. The carrier substrate 81 has the through-hole 83, and the lens resin portion 82 is formed inside the through-hole 83. The lens resin portion 82 includes the lens 21 described above, and refers to a portion integrated by a material constituting the lens 21 together with a portion extending up to the carrier substrate 81 and supporting the lens 21.

Note that in a case where the carrier substrates 81, the lens resin portions 82, or the through-holes 83 of each of the substrates 41a to 41e with lenses are distinguished from each other, they are referred to and described as the carrier substrates 81a to 81e, the lens resin portions 82a to 82e, or the through-holes 83a to 83e, respectively, so as to correspond the substrates 41a to 41e with lenses, as illustrated in FIG. 13.

<Detailed Description of Lens Resin Portion>

Next, a shape of the lens resin portion 82 will be described by taking the lens resin portion 82a of the substrate 41a with lenses as an example.

Figure 14:
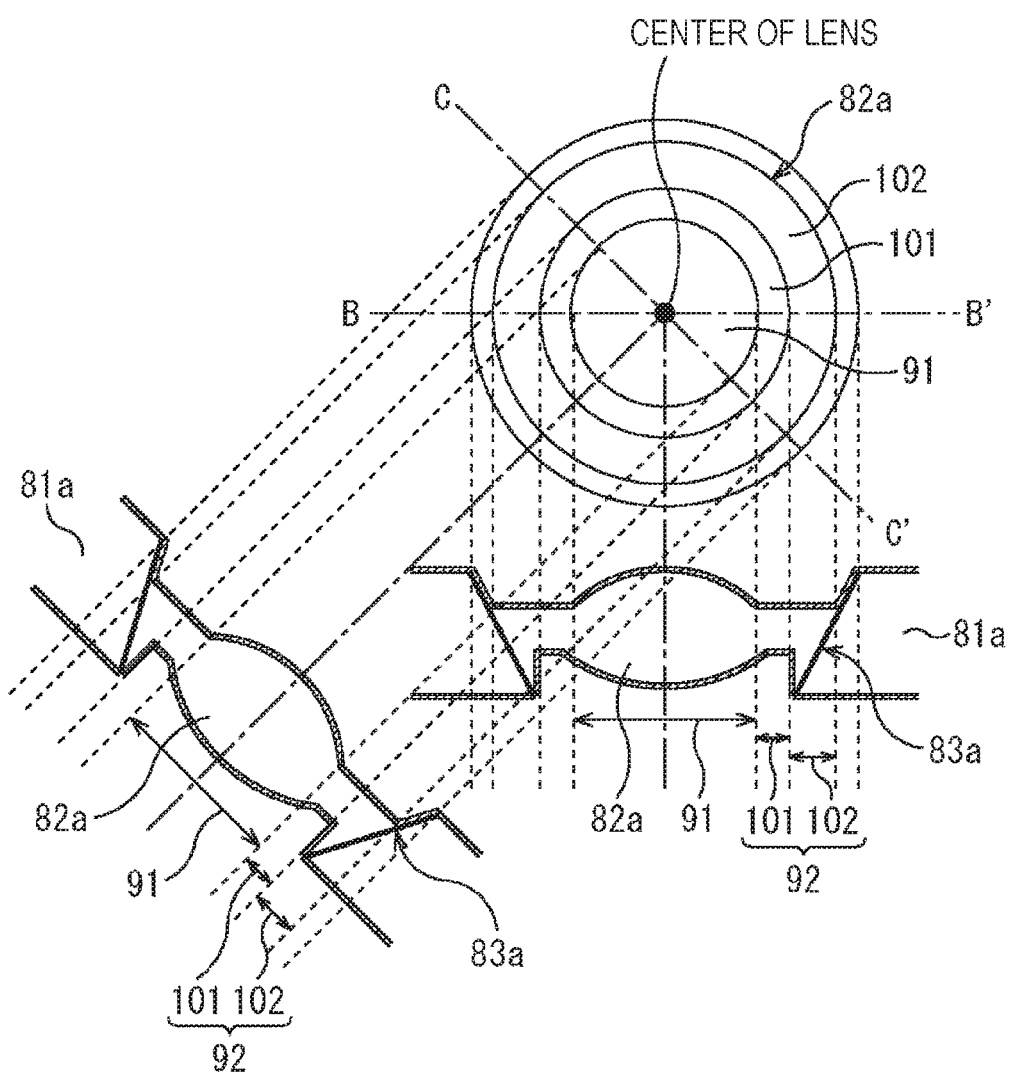
FIG. 14 is a plan view and cross-sectional views of a carrier substrate and a lens resin portion.

FIG. 14 is a plan view and cross-sectional views of the carrier substrate 81a and the lens resin portion 82a that constitute the substrate 41a with lenses.

The cross-sectional views of the carrier substrate 81a and the lens resin portion 82a illustrated in FIG. 14 are cross-sectional views taken along lines B-B' and C-C' illustrated in the plan view.

The lens resin portion 82a is a portion integrally including the material constituting the lens 21, and includes a lens portion 91 and a support portion 92. In the above description, the lens 21 corresponds to the entirety of the lens portion 91 or the lens resin portion 82a.

The lens portion 91 is a portion having performance as a lens, in other words, "a portion refracting light to focus or diverges the light" or "a portion having a curved surface such as a convex surface, a concave surface, or an aspheric surface, or a portion where a plurality of polygons used in a lens using a Fresnel lens or a diffraction grating is continuously arranged".

The support portion 92 is a portion extending from the lens portion 91 to the carrier substrate 81a and supporting the lens portion 91. The support portion 92 includes an arm portion 101 and a leg portion 102, and is positioned on an outer periphery of the lens portion 91.

The arm portion 101 is a portion arranged to be in contact with the lens portion 91 outside the lens portion 91 and extending from the lens portion 91 at a constant film thickness in an outward direction. The leg portion 102 is a portion including a portion of the support portion 92 other than the arm portion 101 and a portion in contact with sidewalls of the through-hole 83a. It is preferable that the leg portion 102 has a resin film thickness greater than that of the arm portion 101.

A planar shape of the through-hole 83a formed in the carrier substrate 81a is a circular shape, and cross-sectional shapes of the through-hole 83a are naturally the same as each other regardless of a direction of a diameter. A shape of the lens resin portion 82a, which is a shape determined by shapes of an upper mold and a lower mold at the time of forming the lens, is also formed so that cross-sectional shapes of the lens resin portion 82a are the same as each other regardless of a direction of a diameter.

Figure 15:
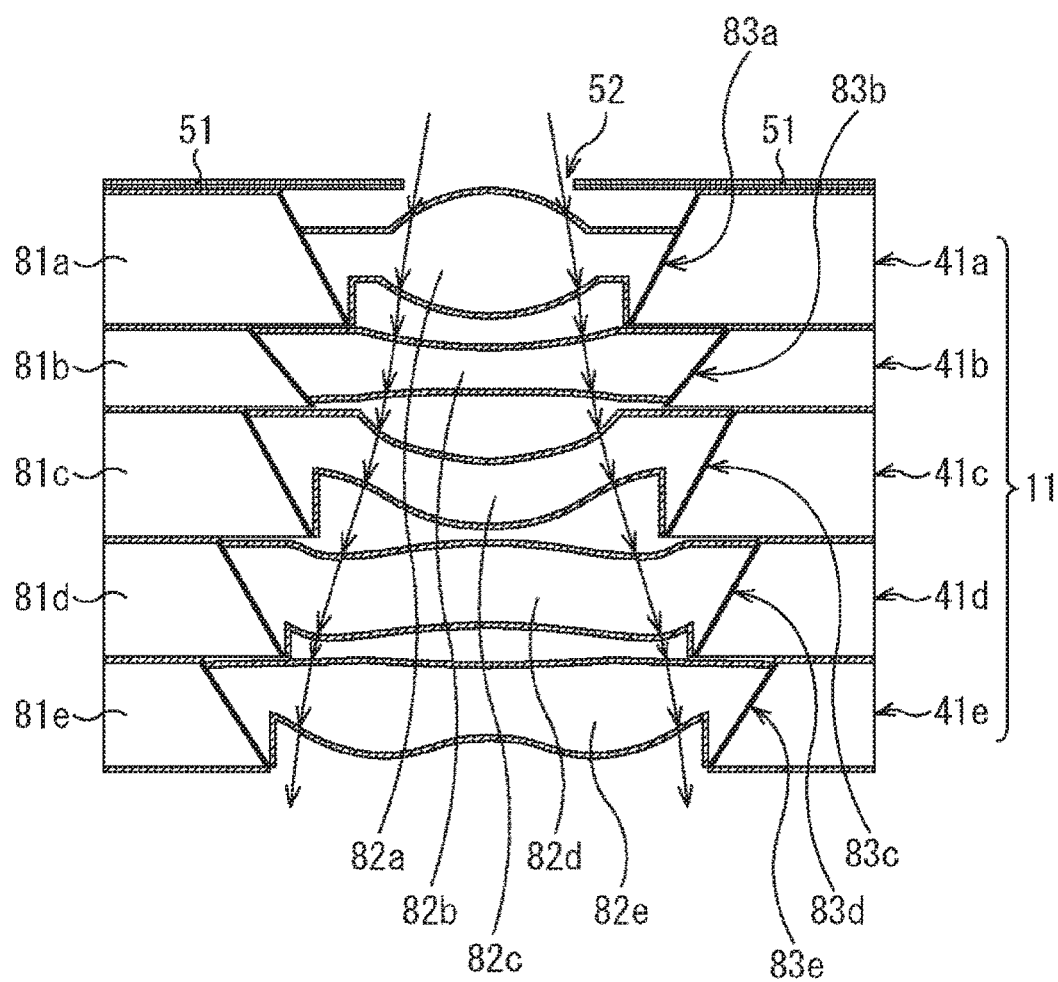
FIG. 15 is a cross-sectional view illustrating a stacked lens structure and a diaphragm plate.

FIG. 15 is a cross-sectional view illustrating the stacked lens structure 11 and the diaphragm plate 51 which are a part of the camera module 1D of FIG. 13.

In the camera module 1D, light incident in the camera module is narrowed by the diaphragm plate 51, is spread inside the stacked lens structure 11, and is then incident on the light receiving element 12 (not illustrated in FIG. 15) arranged below the stacked lens structure 11. In other words, when viewing the entirety of the stacked lens structure 11, the light incident in the camera module advances while being spread in a substantially fan shape from the opening 52 of the diaphragm plate 51 toward a lower side. Therefore, as an example of sizes of the lens resin portions 82 provided in the stacked lens structure 11, in the stacked lens structure 11 of FIG. 15, the lens resin portion 82a provided in the substrate 41a with lenses arranged immediately below the diaphragm plate 51 is the smallest, and the lens resin portion 82e provided in the substrate 41e with lenses arranged at the lowermost layer of the stacked lens structure 11 is the largest.

In a case where a thickness of the lens resin portion 82 of the substrate 41 with lenses is made constant, it is more difficult to manufacture a lens having a large size than to manufacture a lens having a small size. The reason is that, for example, it is difficult to maintain strength of the lens because of the large size at which the lens is easily deformed due to a load applied to the lens at the time of manufacturing the lens. Therefore, it is preferable that the lens having the large size has a thickness greater than that of the lens having the small size. Therefore, in the stacked lens structure 11 of FIG. 15, the lens resin portion 82e provided in the substrate 41e with lenses arranged at the lowermost layer among the lens resin portions 82 has the greatest thickness.

The stacked lens structure 11 of FIG. 15 further includes at least one of the following features in order to increase a degree of freedom in a lens design.

(1) A thickness of the carrier substrate 81 is different among at least the plurality of substrates 41 with lenses constituting the stacked lens structure 11. For example, the thickness of the carrier substrate 81 is greater in a substrate 41 with lenses of a lower layer.

(2) An opening width of the through-hole 83 provided in the substrate 41 with lenses is different among at least the plurality of substrates 41 with lenses constituting the stacked lens structure 11. For example, the opening width of the through-hole 83 is greater in the substrate 41 with lenses of the lower layer.

(3) A diameter of the lens portion 91 provided in the substrate 41 with lenses is different among at least the plurality of substrates 41 with lenses constituting the stacked lens structure 11. For example, the diameter of the lens portion 91 is greater in the lens portion 91 of the substrate 41 with lenses of the lower layer.

(4) A thickness of the lens portion 91 provided in the substrate 41 with lenses is different among at least the plurality of substrates 41 with lenses constituting the stacked lens structure 11. For example, the thickness of the lens portion 91 is greater in the lens portion 91 of the substrate 41 with lenses of the lower layer.

(5) A distance between the lenses provided in the substrate 41 with lenses is different among at least the plurality of substrates 41 with lenses constituting the stacked lens structure 11.

(6) A volume of the lens resin portion 82 provided in the substrate 41 with lenses is different among at least the plurality of substrates 41 with lenses constituting the stacked lens structure 11. For example, the volume of the lens resin portion 82 is greater in the lens resin portion 82 of the substrate 41 with lenses of the lower layer.

(7) A material of the lens resin portion 82 provided in the substrate 41 with lenses is different among at least the plurality of substrates 41 with lenses constituting the stacked lens structure 11.

In general, incident light incident on the camera module includes both of vertical incident light and oblique incident light. Most of the oblique incident light collides with the diaphragm plate 51, and is absorbed in the diaphragm plate 51 or is reflected from the diaphragm plate 51 to the outside of the camera module 1D. There is a possibility that the oblique incident light that is not narrowed by the diaphragm plate 51 will collide with the sidewall of the through-hole 83 depending on an incident angle thereof and be reflected from the sidewalls.

A direction in which the reflected light of the oblique incident light advances is determined by an incident angle of the oblique incident light 85 and an angle of the sidewall of the through-hole 83 that are illustrated in FIG. 13. In a case of a so-called fan shape in which the opening width of the through-hole 83 is increased from an incident side toward the light receiving element 12, when the oblique incident light 85 of a specific incident angle that is not narrowed by the diaphragm plate 51 collides with the sidewall of the through-hole 83, there is a possibility that the oblique incident angle will be reflected toward the light receiving element 12 to become stray light or noise light.

However, in the stacked lens structure 11 illustrated in FIG. 13, as illustrated in FIG. 15, the through-hole 83 has the so-called downward tapered shape in which the opening width of the through-hole 83 is decreased toward the lower side (the side on which the light receiving element 12 is arranged). In a case of such a shape, the oblique incident light 85 colliding with the sidewall of the through-hole 83 is not reflected in a downward direction, that is, toward the light receiving element 12, not is reflected in an upward direction, that is, toward the incident side. With this arrangement, it is possible to obtain an action or an effect of suppressing generation of the stray light or the noise light.

It is more preferable to arrange a material having a light absorbing property on the sidewall of the through-hole 83 of the substrate 41 with lenses in order to reduce the light colliding with and reflected from the sidewall of the through-hole 83.

As an example, in a case where light (for example, visible light) having a wavelength desired to be received at the time of using the camera module 1D as a camera is first light and light (for example, ultraviolet (UV) light) having a wavelength different from that of the first light is second light, a layer of a material having a light absorbing property with respect to the first light (the visible light) may be formed on the sidewall of the through-hole 83 by applying or spraying a resin in which carbon particles are dispersed as an absorbing material of the first light (the visible light) in a resin cured by the second light (the UV light) to or on a surface of the carrier substrate 81 and irradiating the second light (the UV light) only to the resin on the sidewall of the through-hole 83 to cure only the resin on the sidewall of the through-hole 83 and remove the resin of the other regions.

The stacked lens structure 11 illustrated in FIG. 15 is an example of a structure in which the diaphragm plate 51 is arranged on the top of the plurality of substrates 41 with lenses that is stacked. The diaphragm plate 51 is not arranged on the top of the plurality of substrates 41 with lenses that is stacked, but may be inserted and arranged somewhere in the middle substrate 41 with lenses.

As still another example, instead of providing the diaphragm plate 51 having a plate shape separately from the substrate 41 with lenses, a layer of a material having a light absorbing property may be formed on a surface of the substrate 41 with lenses and be allowed to function as a diaphragm. For example, the diaphragm may be formed on the surface of the substrate 41 with lenses by applying or spraying a resin in which carbon particles are dispersed as an absorbing material of the first light (the visible light) in a resin cured by the second light (the UV light) to or on the surface of the substrate 41 with lenses and irradiating the second light (the UV light) to the resin of a region other than a region desired to transmit light at the time of being allowed to function as the diaphragm to leave the resin cured and removing the resin of the region that is not cured, in other words, the region in which it is desired to transmit the light at the time of being allowed to function as the diaphragm.

Note that the substrate 41 with lenses having the diaphragm formed on the surface thereof may be a substrate 41 with lenses arranged at the uppermost layer of the stacked lens structure 11 or a substrate 41 with lenses that becomes an inner layer of the stacked lens structure 11.

The stacked lens structure 11 illustrated in FIG. 15 has a structure in which the substrates 41 with lenses are stacked.

As another embodiment, the stacked lens structure 11 may have a structure in which a plurality of substrates 41 with lenses that is stacked and at least one carrier substrate 81 that does not include the lens resin portion 82 are provided together. In this structure, the carrier substrate 81 that does not include the lens resin portion 82 may be arranged at the lowermost layer or the uppermost layer of the stacked lens structure 11 or may be arranged as an inner layer in the stacked lens structure 11. This structure can bring about, for example, an action or an effect that a distance between the plurality of lenses included in the stacked lens structure 11 or a distance between the lens resin portion 82 of the lowermost layer of the stacked lens structure 11 and the light receiving element 12 arranged below the stacked lens structure 11 can be arbitrarily set.

Alternatively, this structure can bring about an action or an effect that an opening width of the carrier substrate 81 that does not include the lens resin portion 82 can be appropriately set and a material having a light absorbing property can be arranged in a region other than openings to be allowed to function as a diaphragm.

7. Sixth Embodiment of Camera Module

Figure 16:
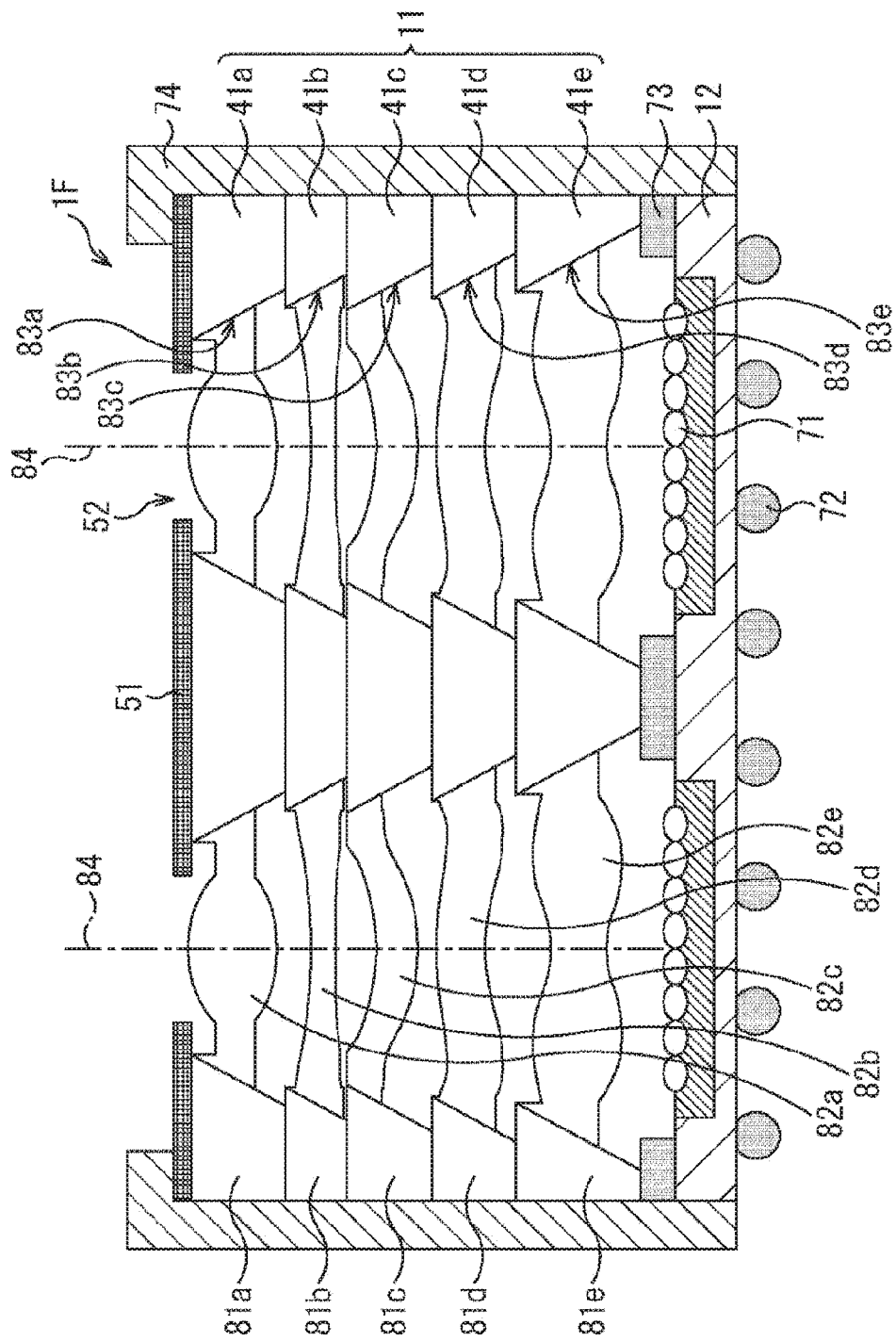
FIG. 16 is a view illustrating a sixth embodiment of a camera module using a stacked lens structure to which the present technology is applied.

FIG. 16 is a view illustrating a sixth embodiment of a camera module using a stacked lens structure to which the present technology is applied.

In FIG. 16, portions corresponding to those of the fourth embodiment illustrated in FIG. 13 will be denoted by the same reference numerals, and portions different from those of the camera module 1D of FIG. 13 will be described.

Also in a camera module 1F illustrated in FIG. 16, similarly to the camera module 1D illustrated in FIG. 13, incident light is narrowed by a diaphragm plate 51, is spread inside a stacked lens structure 11, and is then incident on a light receiving element 12 arranged below the stacked lens structure 11. In other words, when viewing the entirety of the stacked lens structure 11, the light advances while being spread in a fan shape from an opening 52 of the diaphragm plate 51 toward a lower side.

The camera module 1F of FIG. 16 is different from the camera module 1D illustrated in FIG. 13 in that a cross-sectional shape of a through-hole 83 of each substrate 41 with lenses constituting the stacked lens structure 11 has a so-called fan shape in which an opening width of the through-hole 83 is increased toward a lower side (a side on which the light receiving element 12 is arranged).

Since the stacked lens structure 11 of the camera module 1F has a structure in which the incident light advances while being spread in the fan shape from the opening 52 of the diaphragm plate 51 toward the lower side, for example, it is more difficult for the carrier substrate 81 to hinder an optical path in the fan shape in which the opening width of the through-hole 83 is increased toward the lower side than the downward tapered shape in which the opening width of the through-hole 83 is decreased toward the lower side. With this arrangement, an action that a degree of freedom in a lens design is high is brought about.

Furthermore, in a case of the downward tapered shape in which the opening width of the through-hole 83 is decreased toward the lower side, a cross-sectional area, in a substrate plane direction, of a lens resin portion 82 including a support portion 92 has a specific size on a lower surface of the lens resin portion 82 in order to transmit a ray of light incident on a lens 21, and becomes large from the lower surface of the lens resin portion 82 toward an upper surface of the lens resin portion 82.

On the other hand, in a case of the fan shape in which the opening width of the through-hole 83 is increased toward the lower side, the cross-sectional area of the lens resin portion 82 is substantially the same as that of the case of the downward tapered shape on a lower surface of the lens resin portion 82, but becomes small from the lower surface of the lens resin portion 82 toward an upper surface of the lens resin portion 82.

With this arrangement, a structure in which the opening width of the through-hole 83 is increased toward the lower side brings about an action or an effect that a size of the lens resin portion 82 including the support portion 92 can be suppressed to be small. Furthermore, with this arrangement, an action or an effect that a difficulty of lens formation occurring in a case where the lens is large as described above can be reduced is brought about.

8. Seventh Embodiment of Camera Module

Figure 17:
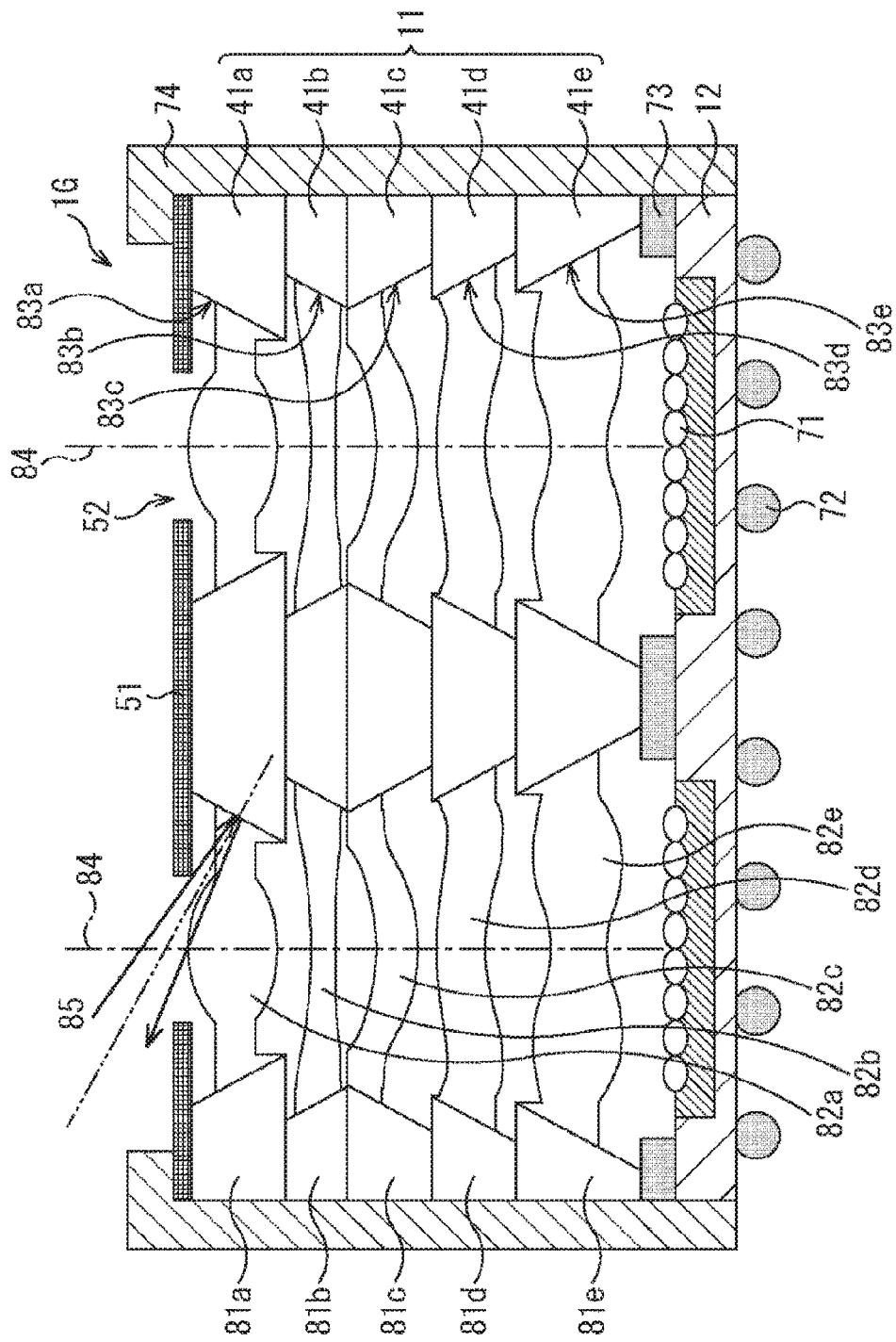
FIG. 17 is a view illustrating a seventh embodiment of a camera module using a stacked lens structure to which the present technology is applied.

FIG. 17 is a view illustrating a seventh embodiment of a camera module using a stacked lens structure to which the present technology is applied.

Also in FIG. 17, portions corresponding to those of FIG. 13 will be denoted by the same reference numerals, and portions different from those of the camera module 1D illustrated in FIG. 13 will be described.

A camera module 1G of FIG. 17 is also different in shapes of a lens resin portion 82 and a through-hole 83 of each substrate 41 with lenses constituting a stacked lens structure 11 from the camera module 1D illustrated in FIG. 13.

The stacked lens structure 11 of the camera module 1G includes both of substrates 41 with lenses in which a shape of a through-hole 83 is a so-called downward tapered shape in which an opening width of the through-hole 83 is decreased toward a lower side (a side on which a light receiving element 12 is arranged) and substrates 41 with lenses in which a shape of a through-hole 83 is a so-called fan shape in which an opening width of the through-hole 83 is increased toward a lower side.

In the substrates 41 with lenses in which the through-hole 83 has the so-called downward tapered shape in which the opening width of the through-hole 83 is decreased toward the lower side, as described above, oblique incident light 85 colliding with a sidewall of the through-hole 83 is reflected in an upward direction, that is, toward an incident side. With this arrangement, an action or an effect that generation of stray light or noise light is suppressed is brought about.

Therefore, in the stacked lens structure 11 of FIG. 17, particularly as a plurality of substrates 41 with lenses of an upper side (incident side) among a plurality of substrates 41 with lenses constituting the stacked lens structure 11, the substrates 41 with lenses in which the through-hole 83 has the so-called downward tapered shape in which the opening width of the through-hole 83 is decreased toward the lower side are used.

In the substrates 41 with lenses in which the through-hole 83 has the so-called fan shape in which the opening width of the through-hole 83 is increased toward the lower side, as described above, it is more difficult for a carrier substrate 81 provided in the substrate 41 with lenses to hinder an optical path. With this arrangement, an action or an effect that a degree of freedom in a lens design is increased or a size of the lens resin portion 82 provided in the substrate 41 with lenses and including a support portion 92 is suppressed to be small is brought about.

In the stacked lens structure 11 of FIG. 17, light advances while being spread in a fan shape from a diaphragm toward the lower side, and sizes of lens resin portions 82 provided in some substrates 41 with lenses arranged at the lower side among the plurality of substrates 41 with lenses constituting the stacked lens structure 11 are thus large. In such large lens resin portions 82, when the through-hole 83 having a fan shape is used, an action of suppressing the sizes of the lens resin portions 82 greatly appears.

Therefore, in the stacked lens structure 11 of FIG. 17, particularly as a plurality of substrates 41 with lenses of the lower side among the plurality of substrates 41 with lenses constituting the stacked lens structure 11, the substrates 41 with lenses in which the through-hole 83 has the so-called fan shape in which the opening width of the through-hole 83 is increased toward the lower side are used.

9. Detailed Configuration of Substrate with Lenses

Next, a detailed configuration of a substrate 41 with lenses will be described.

Figure 18A:
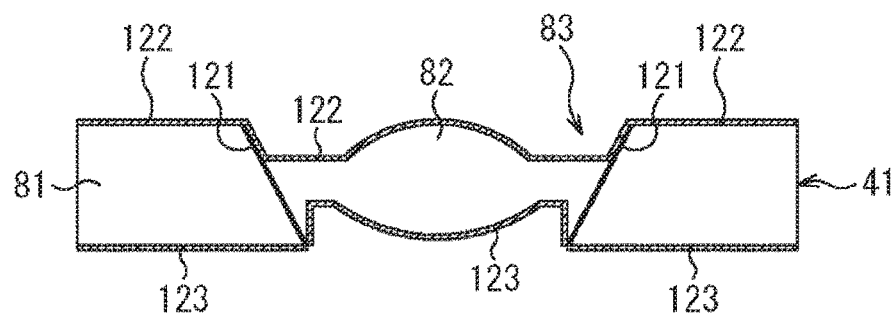
FIGS. 18A, 18B, and 18C is a are cross-sectional views illustrating a detailed configuration of a substrate with lenses.
Figure 18B:
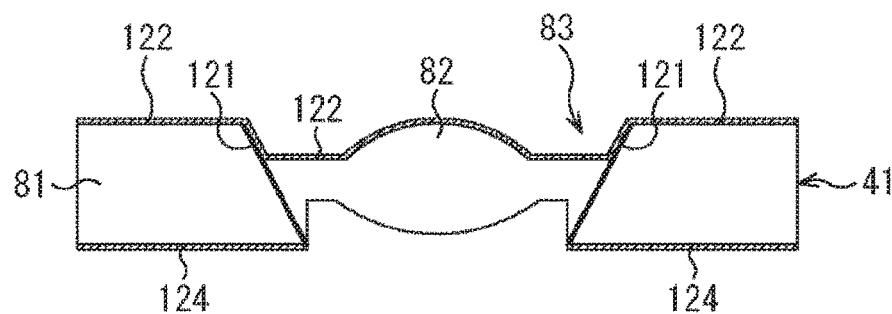
Figure 18C:
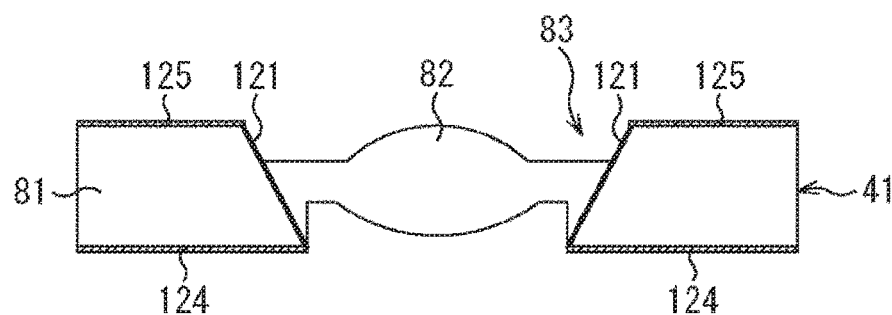

FIGS. 18A, 18B, and 18C are cross-sectional views illustrating a detailed configuration of a substrate 41 with lenses.

Note that the substrate 41a with lenses of the uppermost layer among the five substrates 41a to 41e with lenses is illustrated in FIGS. 18A, 18B, and 18C, but the other substrates 41 with lenses are configured similar to the substrate 41a with lenses.

A configuration of the substrate 41 with lenses can be any one of configurations of FIGS. 18A, 18B, and 18C.

In a substrate 41 with lenses illustrated in FIG. 18A, with respect to a through-hole 83 provided in a carrier substrate 81, a lens resin portion 82 is formed so as to close the through-hole 83 when viewed from an upper surface. The lens resin portion 82 includes a lens portion 91 (not illustrated) arranged at a central portion thereof and a support portion 92 (not illustrated) arranged at a peripheral portion thereof, as described with reference to FIG. 14.

Films 121 having a light absorbing property or a light shielding property are formed on sidewalls of the through-hole 83 of the substrate 41 with lenses in order to prevent a ghost or a flare caused by light reflection. These films 121 are referred to as light shielding films 121 for convenience.

An upper surface layer 122 containing oxide, nitride, or other insulators is formed on upper surfaces of the carrier substrate 81 and the lens resin portion 82, and a lower surface layer 123 containing oxide, nitride, or other insulators is formed on lower surfaces of the carrier substrate 81 and the lens resin portion 82.

The upper surface layer 122 constitutes an antireflective film in which a plurality of layers of low refractive films and high refractive films are alternately stacked, as an example. The antireflective film can be configured, for example, by alternately stacking a total of four layers of low refractive films and high refractive films. The low refractive film is, for example, an oxide film such as $SiO_x$ ($1 \leq x \leq 2$), SiOC, or SiOF, and the high refractive film is, for example, a metal oxide film such as TiO, TaO, or $Nb_2O_5$.

Note that it is sufficient if a configuration of the upper surface layer 122 is designed, for example, so as to obtain desired antireflection performance using optical simulation, and materials, film thicknesses, the numbers of stacked layers, and the like, of the low refractive films and the high refractive films are not particularly limited. In the present embodiment, the outermost surface of the upper surface layer 122 is a low refractive film of which a film thickness is, for example, 20 to 1000 nm, a density is, for example, 2.2 to 2.5 g/cm3, and a flatness is, for example, a root mean square roughness Rq (RMS) of about 1 nm or less. Furthermore, although described later in detail, the upper surface layer 122 also serves as a bonded film when being bonded to another substrate 41 with lenses.

The upper surface layer 122 may be an antireflective film in which a plurality of layers of low refractive films and high refractive films are alternately stacked, as an example, and may be an inorganic antireflective film among the antireflective films. The upper surface layer 122 may be a single-layer film containing oxide, nitride, or other insulators, as another example, and may be an inorganic film among the single-layer films.

The lower surface layer 123 may also be an antireflective film in which a plurality of layers of low refractive films and high refractive films are alternately stacked, as an example, and may be an inorganic antireflective film among the antireflective films. The lower surface layer 123 may be a single-layer film containing oxide, nitride, or other insulators, as another example, and may be an inorganic film among the single-layer films.

With respect to substrates 41 with lenses of FIGS. 18B and 18C, only portions different from those of the substrate 41 with lenses illustrated in FIG. 18A will be described.

In the substrate 41 with lenses illustrated in FIG. 18B, a film formed on lower surfaces of a carrier substrate 81 and a lens resin portion 82 is different from that of the substrate 41 with lenses illustrated in FIG. 18A.

In the substrate 41 with lenses illustrated in FIG. 18B, a lower surface layer 124 containing oxide, nitride, or other insulators is formed on the lower surface of the carrier substrate 81, while a lower surface layer 124 is not formed on the lower surface of the lens resin portion 82. The lower surface layer 124 may include the same material as that of the upper surface layer 122 or may include a material different from that of the upper surface layer 122.

Such a structure can be formed by, for example, a method of forming the lower surface layer 124 on the lower surface of the carrier substrate 81 before forming the lens resin portion 82 and then forming the lens resin portion 82. Alternatively, such a structure can be formed by forming a mask on the lens resin portion 82 after forming the lens resin portion 82 and depositing a film constituting the lower surface layer 124 on the lower surface of the carrier substrate 81 by, for example, physical vapor deposition (PVD) in a state where a mask is not formed on the carrier substrate 81.

In the substrate 41 with lenses illustrated in FIG. 18C, an upper surface layer 125 containing oxide, nitride, or other insulators is formed on the upper surface of the carrier substrate 81, while an upper surface layer 125 is not formed on the upper surface of the lens resin portion 82.

Similarly, also in a lower surface of the substrate 41 with lenses, a lower surface layer 124 containing oxide, nitride, or other insulators is formed on the lower surface of the carrier substrate 81, while a lower surface layer 124 is not formed on the lower surface of the lens resin portion 82.

Such a structure can be formed by, for example, a method of forming the upper surface layer 125 and the lower surface layer 124 on the upper surface of the carrier substrate 81 before the lens resin portion 82 is formed and then forming the lens resin portion 82. Alternatively, such a structure can be formed by forming a mask on the lens resin portion 82 after forming the lens resin portion 82 and depositing films constituting the upper surface layer 125 and the lower surface layer 124 on surfaces of the carrier substrate 81 by, for example, PVD in a state where a mask is not formed on the carrier substrate 81. The lower surface layer 124 and the upper surface layer 125 may include the same material or may include different materials.

The substrate 41 with lenses can be configured as described above.

10. Method of Manufacturing Substrate with Lenses

Next, a method of manufacturing the substrate 41 with lenses will be described with reference to FIGS. 19A, 19B, 20A, 20B, 20C, 21A, 21B, 21C, 21D, 21E, 21F, 22A, 22B, 23A, 23B, 23C, 23D, 23E, 23F, 23G, 24, 25, 26, 27A, 27B, 27C, 27D, 27E, 27F, 28, and 29.

Figure 19A:
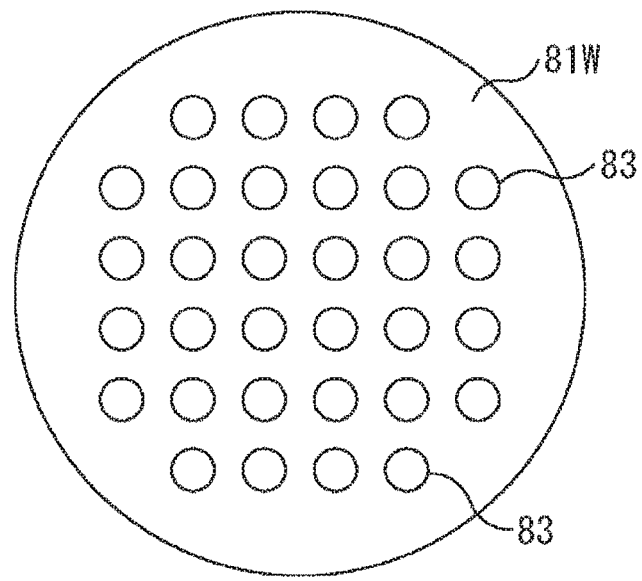
FIGS. 19A and 19B are views for describing a method of manufacturing a substrate with lenses.

First, a carrier substrate 81W in a substrate state where a plurality of through-holes 83 is formed is prepared. As the carrier substrate 81W, for example, a silicon substrate used for a general semiconductor device can be used. The carrier substrate 81W has, for example, a circular shape as illustrated in FIG. 19A and has a diameter of, for example, 200 mm, 300 mm or the like. The carrier substrate 81W may not be a silicon substrate, but may be, for example, a glass substrate, a resin substrate, or a metal substrate.

Figure 19B:
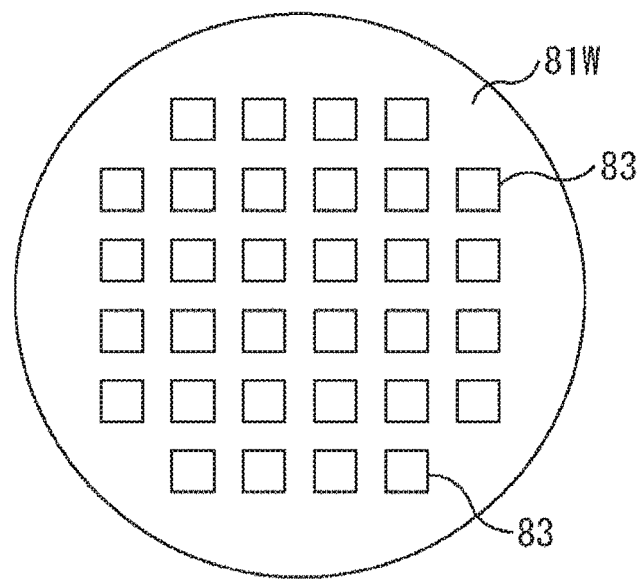

Furthermore, a planar shape of the through-hole 83 is a circular shape as illustrated in FIG. 19A in the present embodiment, but may also be a polygonal shape such as, for example, a quadrangular shape as illustrated in FIG. 19B.

An opening width of the through-hole 83 can be, for example, about 100 μm to about 20 mm. In this case, for example, about 100 to about 5,000,000 through-holes 83 can be arranged in the carrier substrate 81W.

In the present specification, a size of the through-hole 83 in a plane direction of the substrate 41 with lenses is referred to as an opening width. The opening width means a length of one side in a case where the planar shape of the through-hole 83 is the quadrangular shape and a diameter in a case where the planar shape of the through-hole 83 is the circular shape, unless stated otherwise.

Figure 20A:
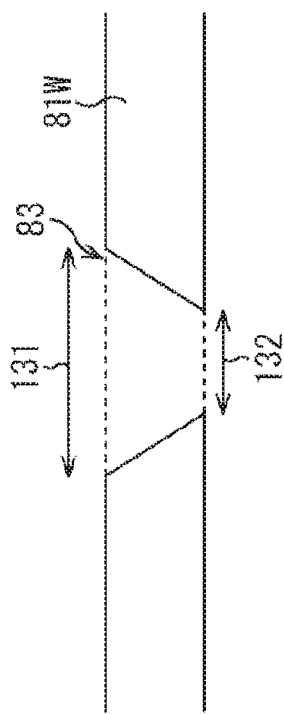
Figure 20C:
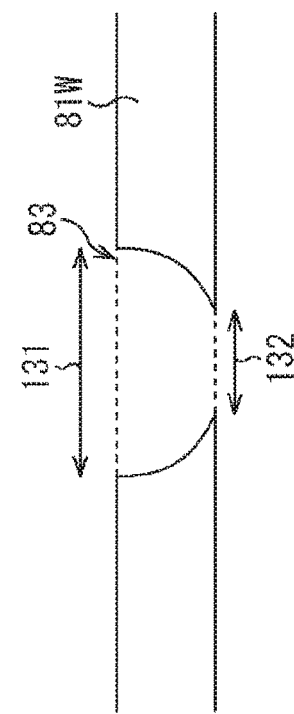
Figure 20C:
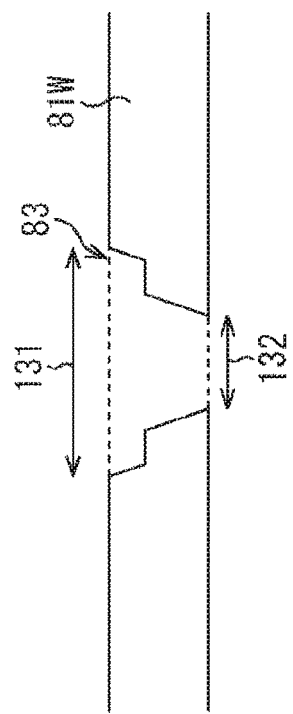

In the through-hole 83, as illustrated in FIGS. 20A, 20B, and 20C, a second opening width 132 in a second surface of the carrier substrate 81W opposing a first surface of the carrier substrate 81W is smaller than a first opening width 131 in the first surface.

As an example of a three-dimensional shape of the through-hole 83 in which the second opening width 132 is smaller than the first opening width 131, the through-hole 83 may have a truncated cone shape illustrated in FIG. 20A or may have a polygonal truncated pyramid shape. A cross-sectional shape of sidewalls of the through-hole 83 may be a straight line as illustrated in FIG. 20A or may be a curved line as illustrated in FIG. 20B. Alternatively, a cross-sectional shape of a sidewall of the through-hole 83 may have a step as illustrated in FIG. 20C.

In the through-hole 83 having a shape in which the second opening width 132 is smaller than the first opening width 131, when the lens resin portion 82 is formed by supplying a resin into the through-hole 83 and pressing the resin with mold members in directions opposing each other from each of the first and second surfaces, the resin that becomes the lens resin portion 82 is pressed against the sidewalls of the through-hole 83 by receiving a force from two mold members opposing each other. With this arrangement, it is possible to bring about an action that adhesion strength between the resin that becomes the lens resin portion 82 and the carrier substrate is increased.

Note that as another embodiment of the through-hole 83, the through-hole 83 may have a shape in which the first opening width 131 and the second opening width 132 may be the same as each other, that is, a shape in which a cross section of the sidewalls of the through-hole 83 is vertical.

<Method of Forming Through-Hole Using Wet Etching>

The through-hole 83 of the carrier substrate 81W can be formed by etching the carrier substrate 81W by wet etching. Specifically, an etching mask for preventing a non-opening region of the carrier substrate 81W from being etched is formed on a surface of the carrier substrate 81W, before etching the carrier substrate 81W. As a material of the etching mask, for example, an insulating film such as a silicon oxide film or a silicon nitride film is used. The etching mask is formed by forming a layer of an etching mask material on the surface of the carrier substrate 81W and opening a pattern that becomes a planar shape of the through-hole 83 in the layer of the etching mask material. After the etching mask is formed, the through-hole 83 is formed in the carrier substrate 81W by etching the carrier substrate 81W.

In a case where, for example, single crystal silicon having a substrate surface orientation of (100) is used as the carrier substrate 81W, crystal anisotropic wet etching using an alkaline solution such as KOH can be adopted in order to form the through-hole 83.

When the crystal anisotropic wet etching is performed using the alkaline solution such as KOH on the carrier substrate 81W, which is the single crystal silicon having the substrate surface orientation of (100), the etching is performed so that a (111) plane appears on an opening sidewall. As a result, regardless of whether a planar shape of an opening of the etching mask is a circular shape or a quadrangular shape, the through-hole 83 of which the planar shape is the quadrangular shape, the second opening width 132 is smaller than the first opening width 131 in terms of the opening width of the through-hole 83, and the three-dimensional shape of the through-hole 83 is the truncated pyramid shape or a shape similar to the truncated pyramid shape is obtained. An angle of the sidewall of the through-hole 83 that is a truncated pyramid is about 55° with respect to a substrate plane.

The etching for forming the through-hole is performed by wet etching using a liquid chemical capable of etching silicon in an arbitrary shape without being restricted by a crystal orientation as disclosed in WO 2011/010739 A or the like, as another example. As this liquid chemical, for example, a liquid chemical obtained by adding at least one of polyoxyethylene alkylphenyl ether, polyoxyalkylene alkyl ether, or polyethylene glycol, which is a surfactant, to an aqueous solution of tetramethyl ammonium hydroxide (TMAH), a liquid chemical obtained by adding isopropyl alcohol to an aqueous solution of KOH or the like, can be adopted.

When the etching for forming the through-hole 83 is performed on the carrier substrate 81W, which is the single crystal silicon having the substrate surface orientation of (100), using any one of the liquid chemicals described above, in a case where the planar shape of the opening of the etching mask is the circular shape, the through-hole 83 of which the planar shape is the circular shape, the second opening width 132 is smaller than the first opening width 131, and the three-dimensional shape is the truncated cone shape or a shape similar to the truncated cone shape is obtained.

In a case where the planar shape of the opening of the etching mask is the quadrangular shape, the through-hole 83 of which the planar shape is the quadrangular shape, the second opening width 132 is smaller than the first opening width 131 in terms of the opening width, and the three-dimensional shape is the truncated pyramid shape or a shape similar to the truncated pyramid shape is obtained. An angle of the sidewall of the through-hole 83 that is a truncated cone or a truncated pyramid is about 45° with respect to a substrate plane.

<Method of Forming Through-Hole Using Dry Etching>

Furthermore, it is also possible to use dry etching instead of the wet etching described above as the etching for forming the through-hole 83.

A method of forming the through-hole 83 using dry etching will be described with reference to FIGS. 21A, 21B, 21C, 21D, 21E, and 21F.

Figure 21A:
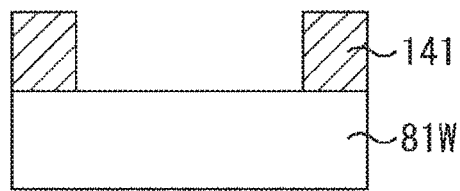
FIGS. 21A, 21B, 21C, 21D, 21E, and 21F are views for describing a method of manufacturing a substrate with lenses.

As illustrated in FIG. 21A, an etching mask 141 is formed on one surface of the carrier substrate 81W. The etching mask 141 is a mask pattern in which a portion for forming the through-hole 83 is opened.

Figure 21B:
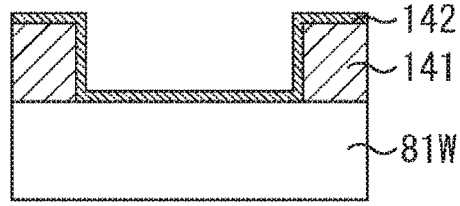
Figure 21C:
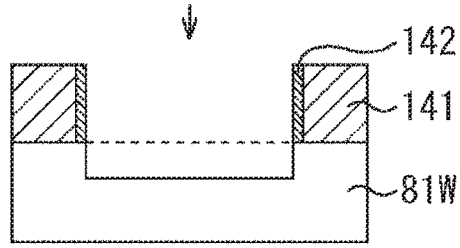

Next, a protective film 142 for protecting sidewalls of the etching mask 141 is formed as illustrated in FIG. 21B, and the carrier substrate 81W is then etched at a predetermined by dry etching, as illustrated in FIG. 21C. The protective film 142 on a surface of the carrier substrate 81W and a surface of the etching mask 141 is removed by a dry etching process, but the protective film 142 on side surfaces of the etching mask 141 remains, such that the sidewalls of the etching mask 141 are protected. After the etching, as illustrated in FIG. 21D, the protective film 142 on the sidewalls is removed, and the etching mask 141 retracts in a direction in which a pattern size of an opening pattern is increased.

Figure 21D:
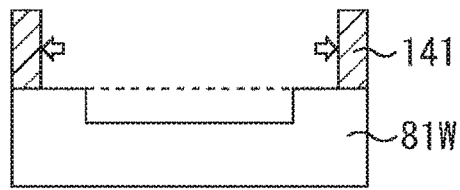
Figure 21E:
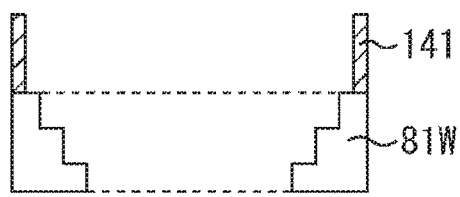

Then, again, a protective film forming process, a dry etching process, and an etching mask retreat process of FIGS. 21B, 21C, and 21D are repeatedly performed plural times. With this arrangement, as illustrated in FIG. 21E, the carrier substrate 81W is etched so as to have a stair shape (rugged shape) having steps with periodicity.

Figure 21F:
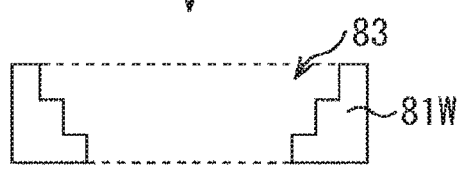

Finally, when the etching mask 141 is removed, the through-hole 83 having sidewalls having a stair shape is formed in the carrier substrate 81W, as illustrated in FIG. 21F. A width (width of one step) of the stair shape of the through-hole 83 in a plane direction is, for example, about 400 nm to 1 μm.

In a case where the through-hole 83 is formed using the dry etching as described above, the protective film forming process, the dry etching process, and the etching mask retreat process are repeatedly performed.

The sidewall of the through-hole 83 has a stair shape (rugged shape) having periodicity, such that it is possible to suppress reflection of incident light. Furthermore, in a case where the sidewall of the through-hole 83 has a rugged shape of a random size, a void (gap) is generated in an adhesion layer between a lens formed in the through-hole 83 and the sidewall, and adhesion between the sidewall and the lens may be reduced due to the void. However, according to the method of forming the through-hole described above, the sidewall of the through-hole 83 has the rugged shape having the periodicity, and the adhesion is thus improved, such that it is possible to suppress a change in optical characteristics due to a deviation of a lens position.

As an example of the material used in each step, for example, the carrier substrate 81W can be single crystal silicon, the etching mask 141 can be a photoresist, the protective film 142 can be a fluorocarbon polymer formed using gas plasma such as C4F8 or CHF3, the etching treatment can be plasma etching using a gas containing F such as SF6/O2 or C4F8/SF6, and the etching mask retreat process can be plasma etching containing O2 such as an O2 gas or CF4/O2.

Alternatively, the carrier substrate 81W can be single crystal silicon, the etching mask 141 can be SiO2, the etching can be plasma containing Cl2, the protective film 142 can be an oxide film obtained by oxidizing an etching target material using O2 plasma, the etching treatment can be plasma etching a gas containing Cl2, and the etching mask retreat process can be plasma etching using a gas containing F such as CF4/O2.

Figure 22A:
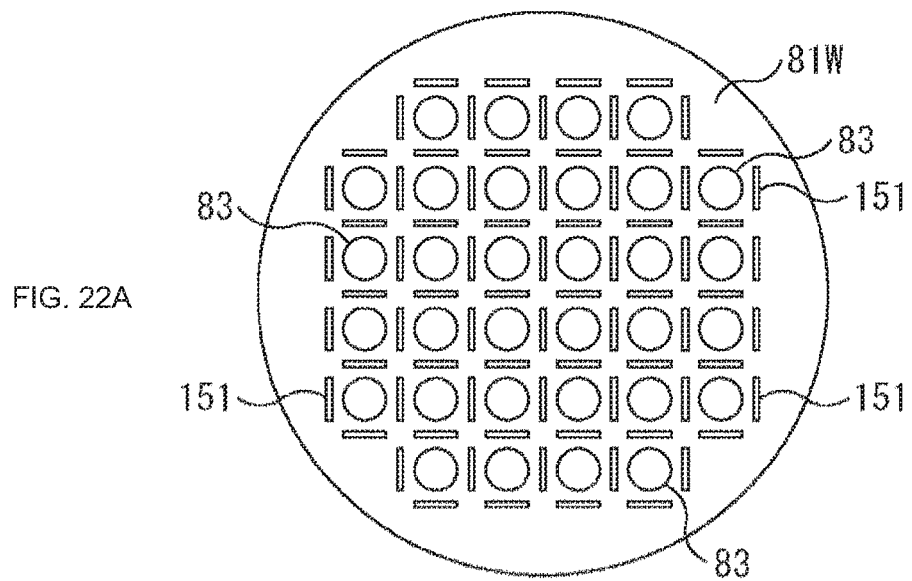
FIGS. 22A and 22B are views for describing a method of manufacturing a substrate with lenses.

As described above, the plurality of through-holes 83 can be simultaneously formed in the carrier substrate 81W by the wet etching or the dry etching, but in the carrier substrate 81W, as illustrated in FIG. 22A, through-grooves 151 may be formed in a region where the through-holes 83 are not formed.

FIG. 22A is a plan view of a carrier substrate 81W in which the through-grooves 151 are formed in addition to the through-holes 83.

The through-grooves 151 are arranged, for example, only in parts between the respective through-holes 83 in a row direction and a column direction while avoiding the plurality of through-holes 83 arranged in a matrix shape, as illustrated in FIG. 22A.

Furthermore, the through-grooves 151 of the carrier substrate 81W can be arranged at the same positions between the substrates 41 with lenses constituting the stacked lens structure 11. In this case, in a state where a plurality of carrier substrates 81W is stacked as the stacked lens structure 11, as illustrated in a cross-sectional view of FIG. 22B, the through-grooves 151 of the plurality of carrier substrates 81W have a structure in which they penetrate through the plurality of carrier substrates 81W.

The through-grooves 151 of the carrier substrates 81W as parts of the substrates 41 with lenses can bring about an action or an effect of alleviating deformation of the substrates 41 with lenses due to stress deforming the substrates 41 with lenses, for example, in a case where the stress acts from the outside of the substrates 41 with lenses.

Alternatively, the through-grooves 151 can bring about an action or an effect of alleviating deformation of the substrate 41 with lenses due to stress deforming the substrate 41 with lenses, for example, in a case where the stress is generated from the inside of the substrate 41 with lenses.

<Method of Manufacturing Substrate with Lenses>

Next, a method of manufacturing the substrate 41W with lenses in a substrate state will be described with reference to FIGS. 23A, 23B, 23C, 23D, 23E, 23F, and 23G.

Figure 23A:
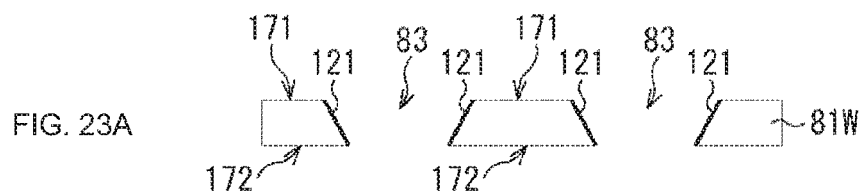
FIGS. 23A, 23B, 23C, 23D, 23E, 23F, and 23G are views for describing a method of manufacturing a substrate with lenses.

First, as illustrated in FIG. 23A, the carrier substrate 81W in which the plurality of through-holes 83 is formed is prepared. The light shielding films 121 are formed on the sidewalls of the through-holes 83. Only two through-holes 83 are illustrated in FIGS. 23A, 23B, 23C, 23D, 23E, 23F, and 23G due to restriction of paper, but actually, as illustrated in FIGS. 19A and 19B, a large number of through-holes 83 are formed in a plane direction of the carrier substrate 81W. Furthermore, an alignment mark (not illustrated) for alignment is formed in a region close to an outer periphery of the carrier substrate 81W.

A front flat portion 171 on an upper side of the carrier substrate 81W and a back flat portion 172 on a lower side of the carrier substrate 81W are flat surfaces formed flat enough to enable plasma bonding to be performed in the subsequent process. A thickness of the carrier substrate 81W serves as a spacer determining a distance between lenses when the substrate 41W with lenses in the substrate state is finally singulated as the substrates 41 with lenses and the substrate 41 with lenses overlaps another substrate 41 with lenses.

It is preferable to use a base material having a low thermal expansion coefficient of 10 ppm/° C. or less in the carrier substrate 81W.

Figure 23B:
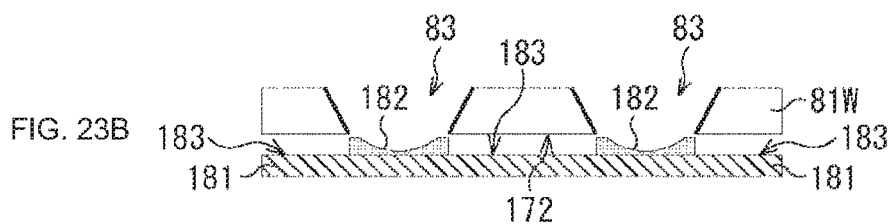

Next, as illustrated in FIG. 23B, the carrier substrate 81W is arranged on a lower mold 181 on which a plurality of optical transfer surfaces 182 having a concave shape is arranged at a regular interval. More specifically, the back flat portion 172 of the carrier substrate 81W and a flat surface 183 of the lower mold 181 overlap each other so that the optical transfer surfaces 182 having the concave shape are positioned inside the through-holes 83 of the carrier substrate 81W. The optical transfer surfaces 182 of the lower mold 181 are formed so as to correspond to the through-holes 83 of the carrier substrate 81W on a one-to-one basis, and positions of the carrier substrate 81W and the lower mold 181 in the plane direction are adjusted so that the centers of the optical transfer surfaces 182 and the through-holes 83 corresponding to each other coincide with each other in an optical axis direction. The lower mold 181 includes a hard mold member, and includes, for example, metal, silicon, quartz, or glass.

Figure 23C:
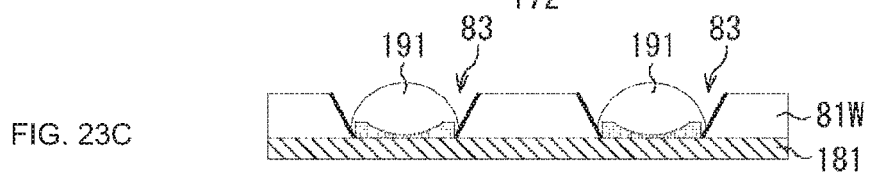

Next, as illustrated in FIG. 23C, energy curable resins 191 are filled (dropped) inside the lower mold 181 and the through-holes 83 of the carrier substrate 81W overlapping each other. The lens resin portions 82 are formed using the energy curable resins 191. Therefore, it is preferable that the energy curable resins 191 are defoamed in advance so as not to contain bubbles. It is preferable that the defoaming is vacuum defoaming or defoaming by a centrifugal force. Furthermore, it is preferable that the vacuum defoaming is performed after the energy curable resins are filled. By performing the defoaming, it is possible to mold the lens resin portions 82 without holding the bubbles.

Figure 23D:
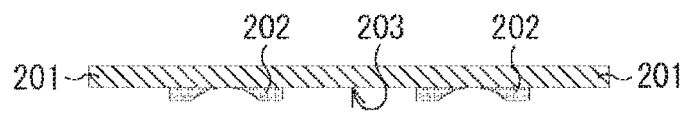

Next, as illustrated in FIG. 23D, an upper mold 201 is arranged on the lower mold 181 and the carrier substrate 81W overlapping each other. A plurality of optical transfer surfaces 202 having a concave shape is arranged at a regular interval on the upper mold 201, and the upper mold 201 is accurately positioned and is then arranged so that the centers of the through-holes 83 and the centers of the optical transfer surfaces 202 in the optical axis direction coincide with each other in a similar manner to that when the lower mold 181 is arranged.

In a height direction, which is a longitudinal direction on paper, a position of the upper mold 201 is fixed so that an interval between the upper mold 201 and the lower mold 181 becomes a predetermined distance by a control device controlling the interval between the upper mold 201 and the lower mold 181. In this case, a space sandwiched between the optical transfer surfaces 202 of the upper mold 201 and the optical transfer surfaces 182 of the lower mold 181 becomes equal to the thickness of the lens resin portions 82 (lenses 21) calculated by an optical design.

Figure 23E:
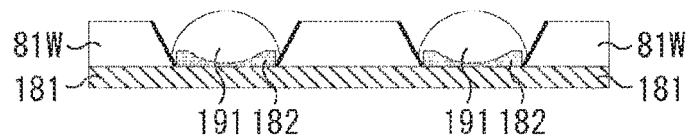

Alternatively, as illustrated in FIG. 23E, a flat surface 203 of the upper mold 201 and the front flat portion 171 of the carrier substrate 81W may overlap each other in a similar manner to that when the lower mold 181 is arranged. In this case, a distance between the upper mold 201 and the lower mold 181 is equal to the thickness of the carrier substrate 81W, such that highly accurate alignment in the plane direction and the height direction becomes possible.

When the interval between the upper mold 201 and the lower mold 181 is controlled to be a preset distance, in the process of FIG. 23C described above, an amount of filled energy curable resin 191 dropped the inside of the through-hole 83 of the carrier substrate 81W is an amount controlled so that the energy curable resin 191 does not overflow from a space surrounded by the through-hole 83 of the carrier substrate 81W, and the upper mold 201 and the lower mold 181 arranged respectively on and beneath the through-hole 83. With this arrangement, it is possible reduce a manufacturing cost without wasting a material of the energy curable resin 191.

Subsequently, in a state illustrated in FIG. 23E, curing treatment of the energy curable resins 191 is performed. The energy curable resins 191 are cured by, for example, giving heat or UV light as energy to the energy curable resins 191 and leaving the energy curable resins 191 for a predetermined time. During curing of the energy curable resins 191, deformation of the energy curable resins 191 due to shrinkage of the energy curable resins 191 can be suppressed to be as small as possible by pushing the upper mold 201 downward or performing the alignment.

Instead of the energy curable resins 191, thermoplastic resins may be used. In that case, in the state illustrated in FIG. 23E, the energy curable resins 191 are molded in a lens shape by raising temperatures of the upper mold 201 and the lower mold 181, and are cured by cooling.

Figure 23F:
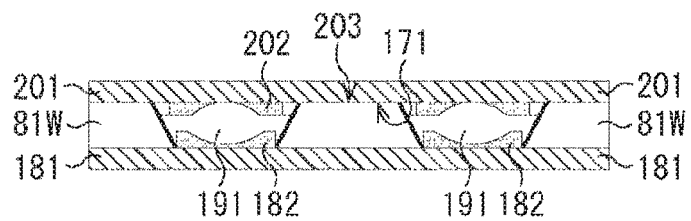

Next, as illustrated in FIG. 23F, the control device controlling positions of the upper mold 201 and the lower mold 181 moves the upper mold 201 upward and move the lower mold 181 downward to release the upper mold 201 and the lower mold 181 from the carrier substrate 81W. When the upper mold 201 and the lower mold 181 are released from the carrier substrate 81W, the lens resin portions 82 including the lenses 21 are formed inside the through-hole 83 of the carrier substrate 81W.

Note that surfaces of the upper mold 201 and the lower mold 181 in contact with the carrier substrate 81W may be coated with, for example, a fluorine-based or silicon-based release agent. By doing so, the carrier substrate 81W can be easily released from the upper mold 201 and the lower mold 181. Furthermore, as a method of easily releasing the upper mold 201 and the lower mold 181 from contact surfaces with the carrier substrate 81W, various coatings such as fluorine-containing diamond like carbon (DLC) may be performed.

Figure 23G:
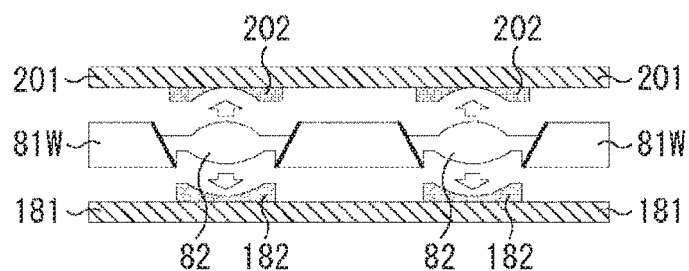

Next, as illustrated in FIG. 23G, the upper surface layer 122 is formed on front surfaces of the carrier substrate 81W and the lens resin portions 82, and the lower surface layer 123 is formed on back surfaces of the carrier substrate 81W and the lens resin portions 82. Before and after film formation of the upper surface layer 122 and the lower surface layer 123, chemical mechanical polishing (CMP) or the like may be performed, if necessary, to planarize the front flat portion 171 and the back flat portion 172 of the carrier substrate 81W.

As described above, the lens resin portions 82 are formed in the through-holes 83 formed in the carrier substrate 81W by pressure-molding (imprinting) the energy curable resins 191 using the upper mold 201 and the lower mold 181, such that the substrate 41 with lenses can be manufactured.

Shapes of the optical transfer surface 182 and the optical transfer surface 202 are not limited to the concave shape described above, and are appropriately determined depending on a shape of the lens resin portion 82. As illustrated in FIG. 15, the lenses of the substrates 41a to 41e with lenses can have various shapes derived by an optical system design, for example, a biconvex shape, a biconcave shape, a planoconvex shape, a planoconcave shape, a convex meniscus shape, a concave meniscus shape, a high-order aspheric surface shape, and the like.

Furthermore, the shapes of the optical transfer surface 182 and the optical transfer surface 202 can also be shapes in which shapes of the lenses after being formed are moth-eye structures.

According to the method of manufacturing a substrate with lenses described above, it is possible to prevent a variation in a distance between the lens resin portions 82 in the plane direction due to the curing shrinkage of the energy curable resins 191 by interposition of the carrier substrate 81W, and it is thus possible to control a distance between the lenses with a high accuracy. Furthermore, there is an effect of reinforcing the energy curable resins 191 having a low strength with the carrier substrate 81W having a high strength. With this arrangement, there is an effect that it is possible to provide a lens array substrate in which a plurality of lenses with a good handling property is arranged and suppress warpage of the lens array substrate.

Example in which Shape of Through-Hole is Polygonal Shape

As illustrated to FIG. 19B, the planar shape of the through-hole 83 may be, for example, a polygonal shape, such as a quadrangular shape.

Figure 24:
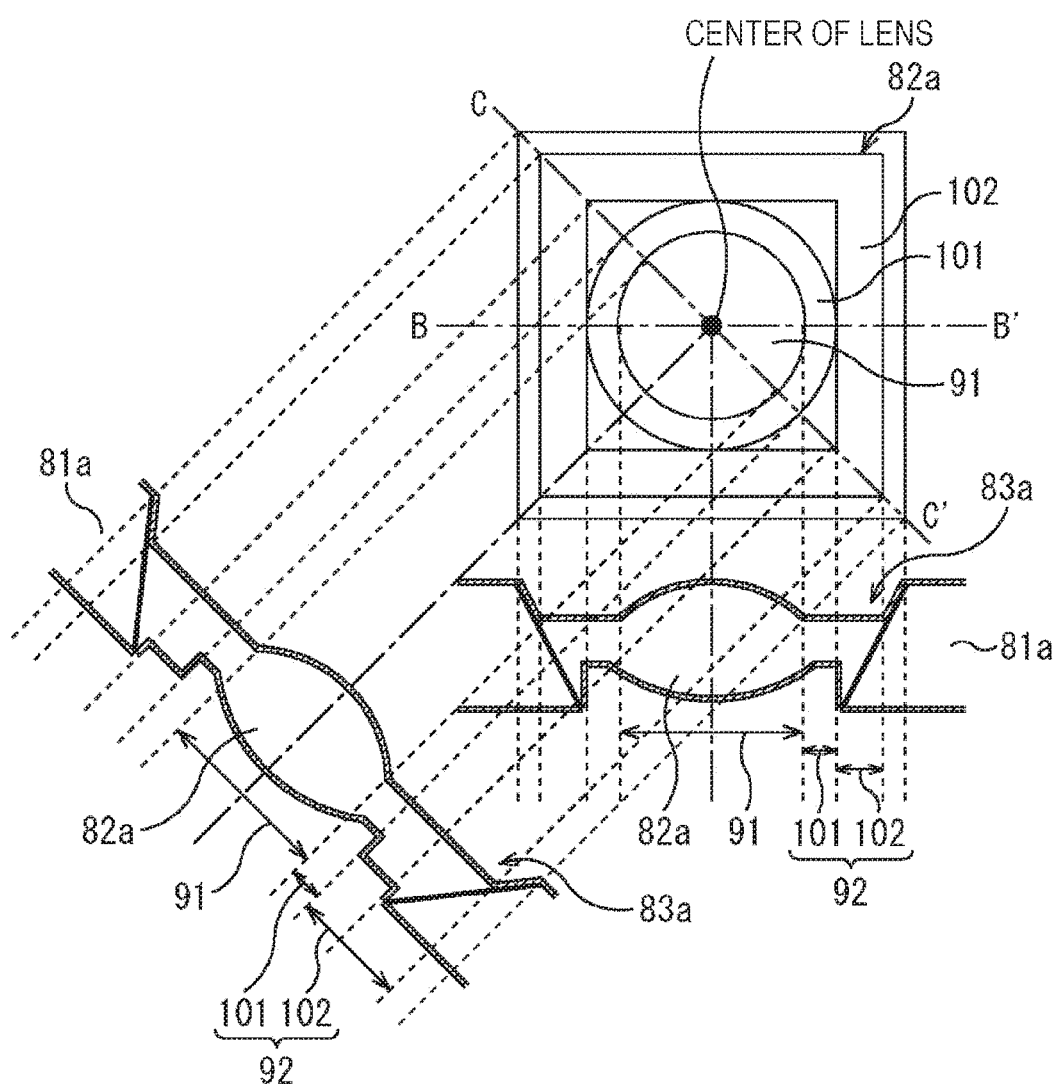
FIG. 24 is a view for describing a method of manufacturing a substrate with lenses.

FIG. 24 is a plan view and cross-sectional views of the carrier substrate 81a and the lens resin portion 82a of the substrate 41a with lenses in a case where the planar shape of the through-hole 83 is the quadrangular shape.

The cross-sectional views of the substrate 41a with lenses in FIG. 24 are cross-sectional views taken along lines B-B' and C-C' of the plan view.

As can be seen by comparing a cross-sectional view taken along line B-B' and a cross-sectional view taken along line C-C' with each other, in a case where the through-hole 83a is a quadrangle, a distance from the center of the through-hole 83a to an upper outer edge of the through-hole 83a and a distance from the center of the through-hole 83a to a lower outer edge of the through-hole 83a are different between a side direction and a diagonal direction of the through-hole 83a, which is the quadrangle, and are larger in the diagonal direction than in the side direction. Therefore, in a case where the planar shape of the through-hole 83a is the quadrangular shape, when the lens portion 91 is circular, a distance from an outer periphery of the lens portion 91 to the sidewall of the through-hole 83a, in other words, a length of the support portion 92 needs to be set to be different between the side direction and the diagonal direction of the quadrangle.

Therefore, the lens resin portion 82a illustrated in FIG. 24 has the following structures.

(1) A length of the arm portion 101 arranged on the outer periphery of the lens portion 91 is the same between the side direction and the diagonal direction of the quadrangle.

(2) A length of the leg portion 102 arranged outside the arm portion 101 and extending to the sidewall of the through-hole 83a is set so that a length of the leg portion 102 in the diagonal direction of the quadrangle is greater than that of the leg portion 102 in the side direction of the quadrangle.

As illustrated in FIG. 24, the leg portion 102 is not in direct contact with the lens portion 91, while the arm portion 101 is in direct contact with the lens portion 91.

In the lens resin portion 82a of FIG. 24, by making the length and a thickness of the arm portion 101 in direct contact with the lens portion 91 constant over the entire outer periphery of the lens portion 91, it is possible to bring about an action or an effect of supporting the entire lens portion 91 with a constant force without bias.

Moreover, since the entire lens portion 91 is supported with the constant force without the bias, for example, in a case where stress is applied from the carrier substrate 81a surrounding the through-hole 83a to the entire outer periphery of the through-hole 83a, the stress is transferred to the entire lens portion 91 without being biased, such that it is possible to bring about an action or an effect of suppressing the stress from being transferred only to a specific part of the lens portion 91 with being biased.

Figure 25:
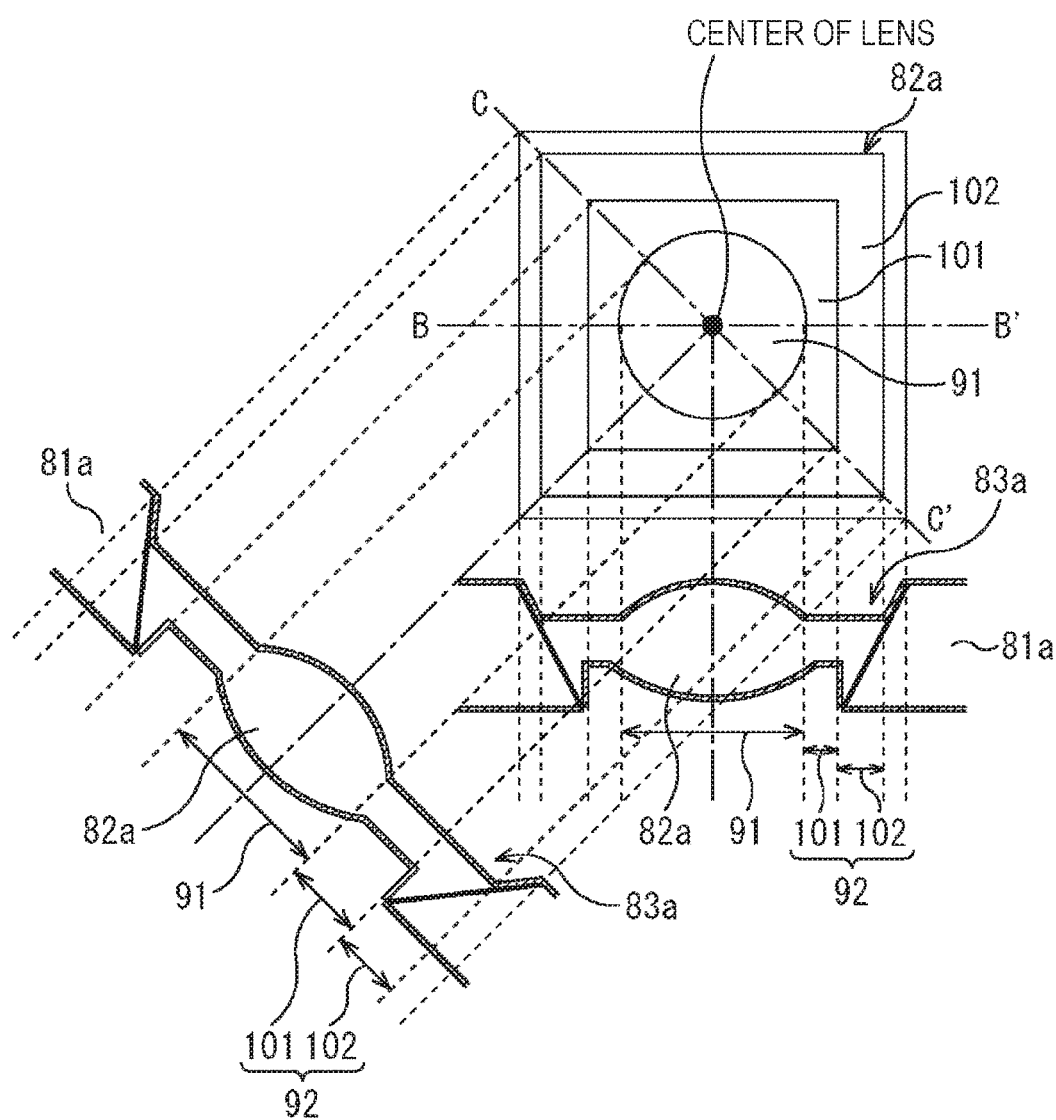
FIG. 25 is a view for describing a method of manufacturing a substrate with lenses.

FIG. 25 is a plan view and cross-sectional views of the carrier substrate 81a and the lens resin portion 82a of the substrate 41a with lenses, illustrating another example of the through-hole 83 of which the planar shape is the quadrangular shape.

The cross-sectional views of the substrate 41a with lenses in FIG. 25 are cross-sectional views taken along lines B-B' and C-C' of the plan view.

Figure 22B:
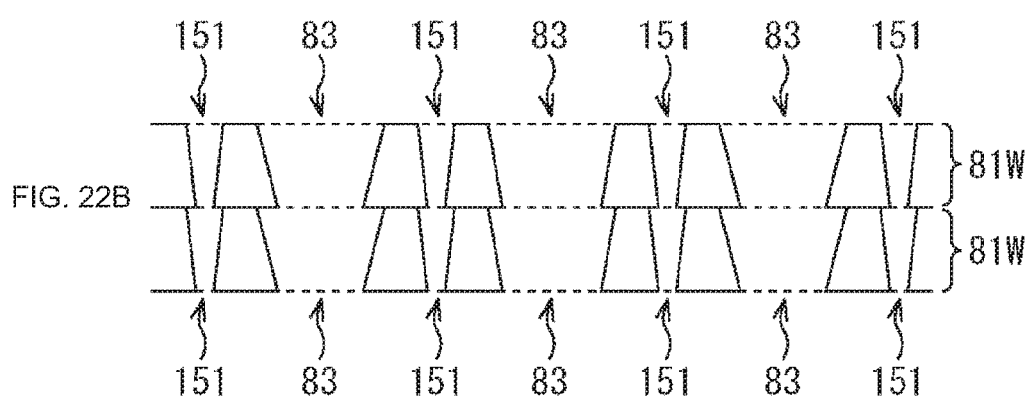

Also in FIG. 25, similar to FIGS. 22A and 22B, a distance from the center of the through-hole 83a to an upper outer edge of the through-hole 83a and a distance from the center of the through-hole 83a to a lower outer edge of the through-hole 83a are different between a side direction and a diagonal direction of the through-hole 83a, which is the quadrangle, and are larger in the diagonal direction than in the side direction. Therefore, in a case where the planar shape of the through-hole 83a is the quadrangular shape, when the lens portion 91 is circular, a distance from an outer periphery of the lens portion 91 to the sidewall of the through-hole 83a, in other words, a length of the support portion 92 needs to be set to be different between the side direction and the diagonal direction of the quadrangle.

Therefore, the lens resin portion 82a illustrated in FIG. 25 has the following structures.

(1) A length of the leg portion 102 arranged on the outer periphery of the lens portion 91 is constant along four sides of the quadrangle of the through-hole 83a.

(2) In order to realize the structure of the above (1), a length of the arm portion 101 is set so that a length of the arm portion in the diagonal direction of the quadrangle is greater than that of the arm portion in the side direction of the quadrangle.

As illustrated in FIG. 25, a film thickness of a resin is greater in the leg portion 102 than in the arm portion 101. Therefore, a volume per unit area of the substrate 41a with lenses in the plane direction is also greater in the leg portion 102 than in the arm portion 101.

In an embodiment illustrated in FIG. 25, since the volume of the leg portion 102 is made as small as possible and is made constant along the four sides of the quadrangle of the through-hole 83a, for example, in a case where deformation such as swelling of the resin occurs, it is possible to bring about an action or an effect of suppressing a change in the volume due to the deformation as much as possible and allowing the change in the volume not to be biased over the entire outer periphery of the lens portion 91 as much as possible.

Figure 26:
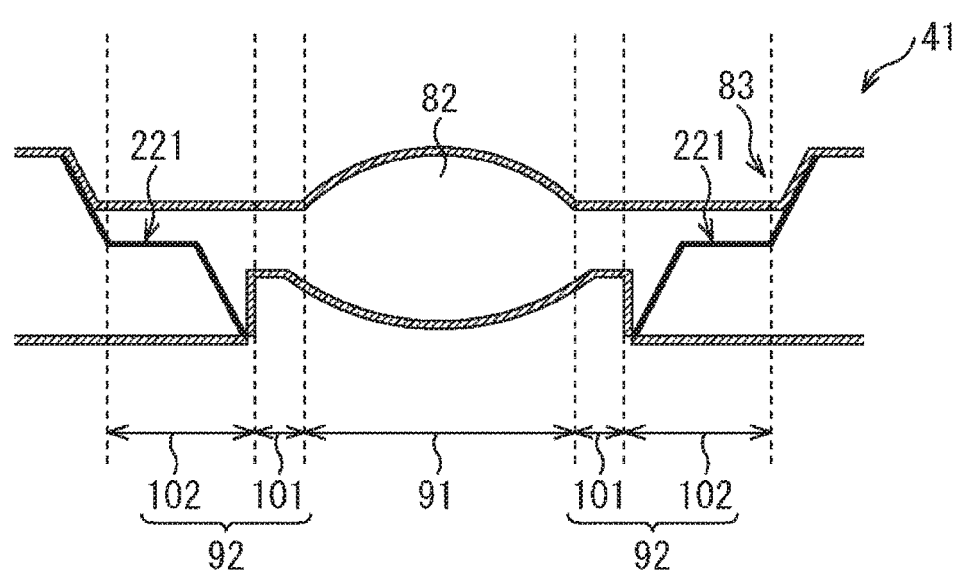
FIG. 26 is a view for describing a method of manufacturing a substrate with lenses.

FIG. 26 is a cross-sectional view illustrating another embodiment of the lens resin portion 82 and the through-hole 83 of the substrate 41 with lenses.

The lens resin portion 82 and the through-hole 83 illustrated in FIG. 26 have the following structures.

(1) A sidewall of the through-hole 83 has a stepped shape including a stepped portion 221.

(2) The leg portion 102 of the support portion 92 of the lens resin portion 82 is not only arranged above the sidewall of the through-hole 83, but also extends in the plane direction of the substrate 41 with lenses on the stepped portion 221 provided in the through-hole 83.

A method of forming the through-hole 83 having the stepped shape illustrated in FIG. 26 will be described with reference to FIGS. 27A, 27B, 27C, 27D, 27E, and 27F.

Figure 27:
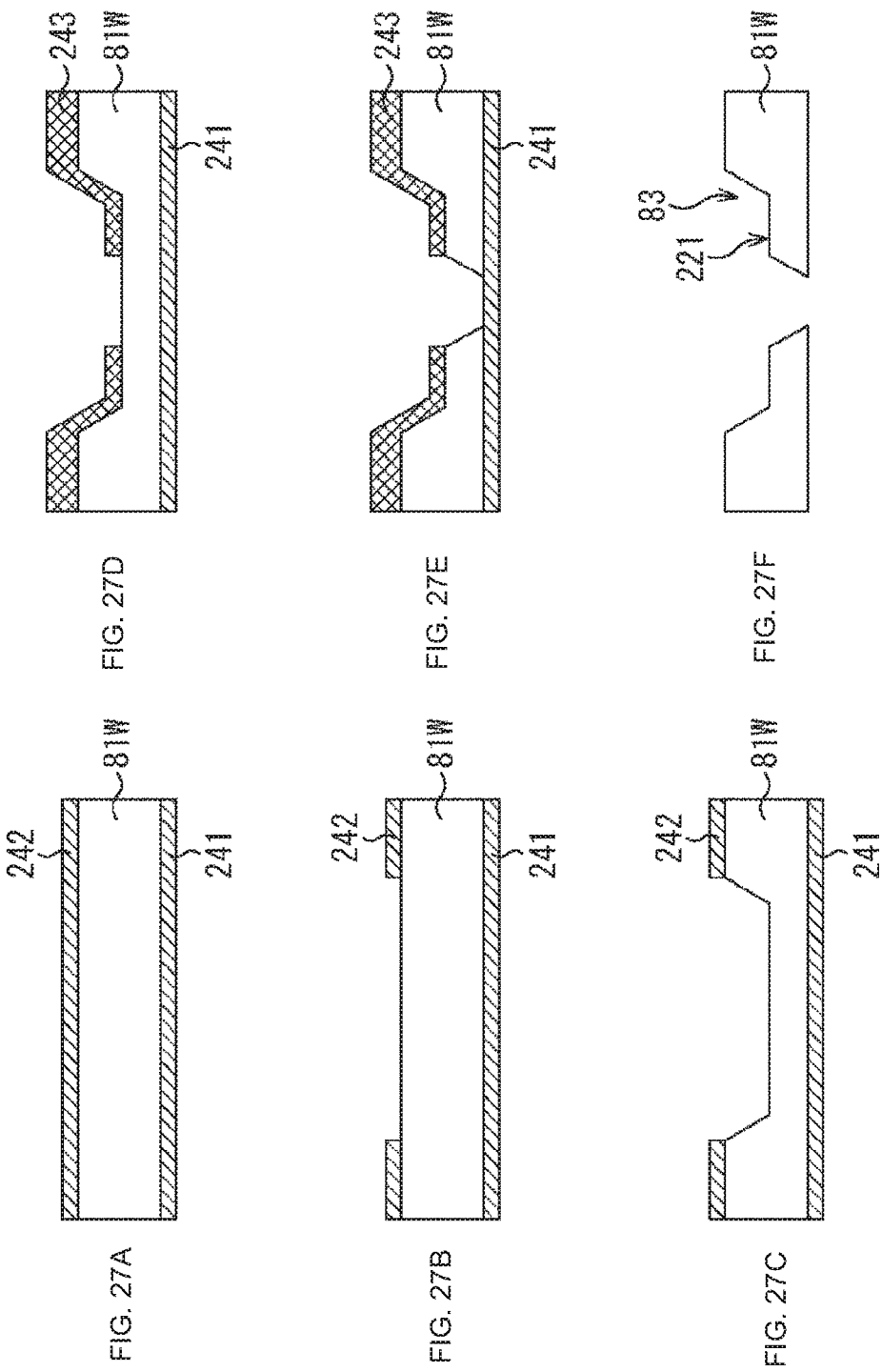
FIGS. 27A, 27B, 27C, 27D, 27E, and 27F are views for describing a method of manufacturing a substrate with lenses.

First, as illustrated in FIG. 27A, an etch stop film 241 having resistance to wet etching at the time of opening the through-hole is formed on one surface of the carrier substrate 81W. The etch stop film 241 can be, for example, a silicon nitride film.

Then, a hard mask 242 having resistance to the wet etching at the time of opening the through-hole is formed on the other surface of the carrier substrate 81W. The hard mask 242 can also be, for example, a silicon nitride film.

Next, as illustrated in FIG. 27B, a predetermined region of the hard mask 242 is opened for first etching. In the first etching, a portion that becomes an upper end of the stepped portion 221 of the through-hole 83 is etched. Therefore, an opening of the hard mask 242 for the first etching is a region corresponding to an opening in an upper substrate surface of the substrate 41 with lenses illustrated in FIG. 26.

Next, as illustrated in FIG. 27C, the carrier substrate 81W is etched by a predetermined depth according to the opening of the hard mask 242 by the wet etching.

Next, as illustrated in FIG. 27D, a hard mask 243 is again formed on a surface of the carrier substrate 81W after being etched, and the hard mask 243 is opened so as to correspond to a portion that becomes a lower side of the stepped portion 221 of the through-hole 83. A second hard mask 243 can also be, for example, a silicon nitride film.

Next, as illustrated in FIG. 27E, the carrier substrate 81W is etched according to an opening of the hard mask 243 by the wet etching until an etched portion arrives at the etch stop film 241.

Finally, as illustrated in FIG. 27F, the hard mask 243 on an upper surface of the carrier substrate 81W and the etch stop film 241 on a lower surface of the carrier substrate 81W are removed.

As described above, the through-hole 83 having the stepped shape illustrated in FIG. 26 is obtained by performing the etching of the carrier substrate 81W for forming the through-hole by the wet etching two times.

Figure 28:
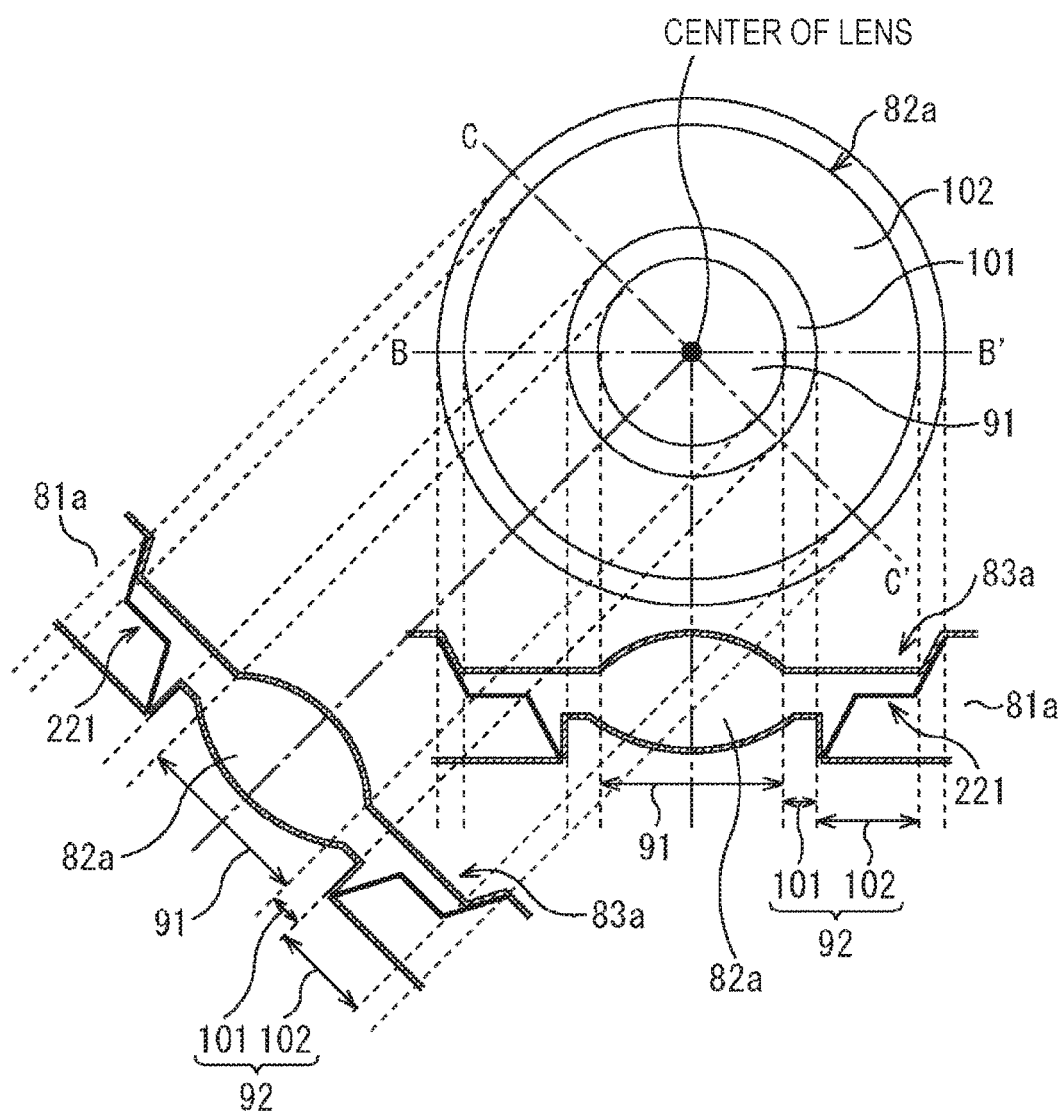
FIG. 28 is a view for describing a method of manufacturing a substrate with lenses.

FIG. 28 is a plan view and cross-sectional views of the carrier substrate 81a and the lens resin portion 82a of the substrate 41a with lenses in a case where the through-hole 83a has a stepped portion 221 and the planar shape of the through-hole 83a is the circular shape.

The cross-sectional views of the substrate 41a with lenses in FIG. 28 are cross-sectional views taken along lines B-B' and C-C' of the plan view.

In a case where the planar shape of the through-hole 83a is the circular shape, cross-sectional shapes of the through-hole 83a are naturally the same as each other regardless of a direction of a diameter. In addition, the cross-sectional shapes of an outer edge of the lens resin portion 82a, the arm portion 101, and the leg portion 102 are also formed to be the same to each other regardless of the direction of the diameter.

In the through-hole 83a having a stepped shape illustrated in FIG. 28, as compared with the through-hole 83a of FIG. 14 that does not include the stepped portion 221 therein, an action or an effect that a contact area between the leg portion 102 of the support portion 92 of the lens resin portion 82 and the sidewall of the through-hole 83a can be increased is brought about. Furthermore, with this arrangement, an action or an effect of increasing adhesion strength between the lens resin portion 82 and the sidewall of the through-hole 83a, in other words, adhesion strength between the lens resin portion 82a and the carrier substrate 81W is brought about.

Figure 29:
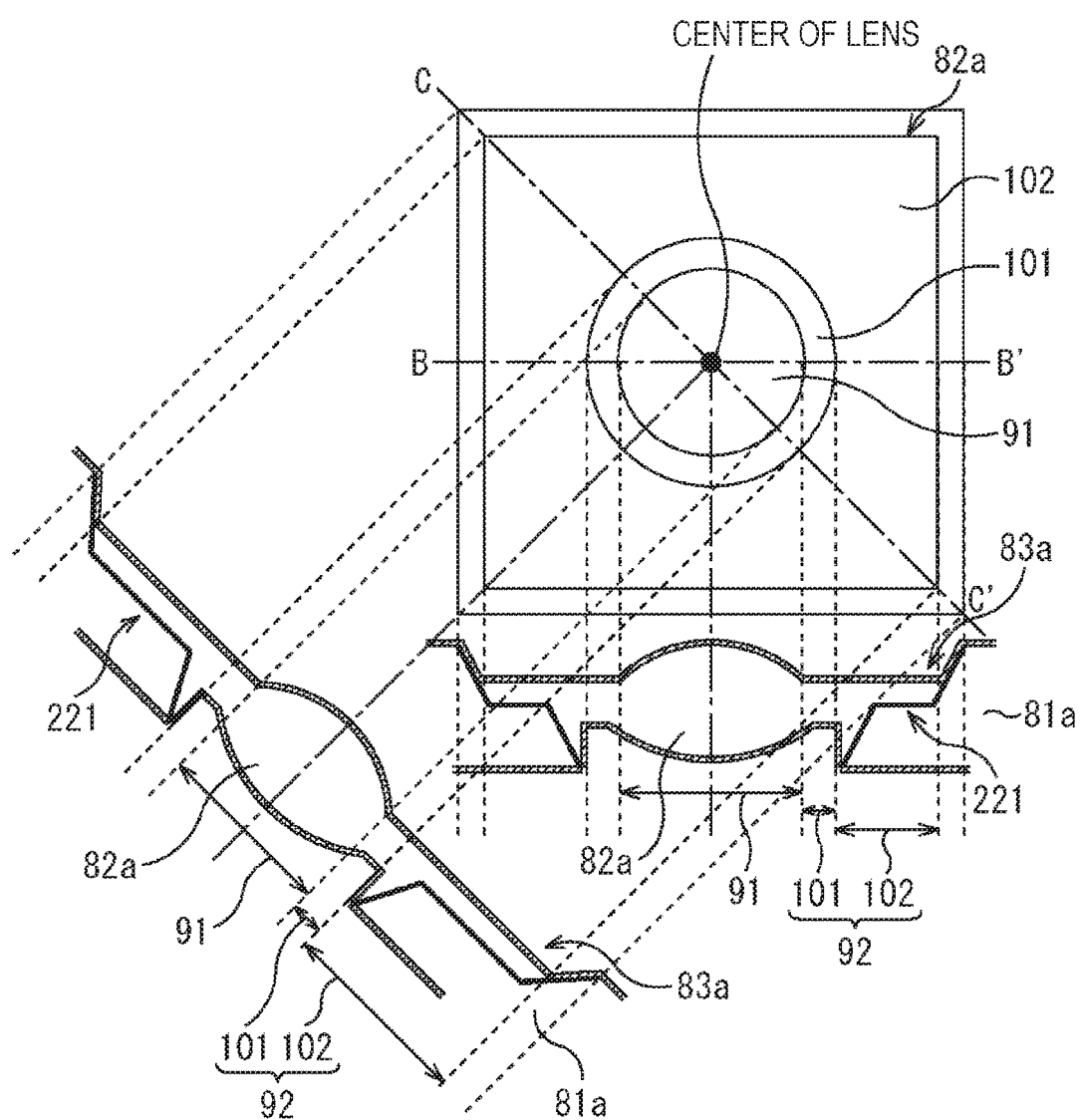
FIG. 29 is a view for describing a method of manufacturing a substrate with lenses.

FIG. 29 is a plan view and cross-sectional views of the carrier substrate 81a and the lens resin portion 82a of the substrate 41a with lenses in a case where the through-hole 83a has a stepped portion 221 and the planar shape of the through-hole 83a is the quadrangular shape.

The cross-sectional views of the substrate 41a with lenses in FIG. 29 are cross-sectional views taken along lines B-B' and C-C' of the plan view.

The lens resin portion 82 and the through-hole 83 illustrated in FIG. 29 have the following structures.

(1) A length of the arm portion 101 arranged on the outer periphery of the lens portion 91 is the same between the side direction and the diagonal direction of the quadrangle.

(2) A length of the leg portion 102 arranged outside the arm portion 101 and extending to the sidewall of the through-hole 83a is set so that a length of the leg portion 102 in the diagonal direction of the quadrangle is greater than that of the leg portion 102 in the side direction of the quadrangle.

As illustrated in FIG. 29, the leg portion 102 is not in direct contact with the lens portion 91, while the arm portion 101 is in direct contact with the lens portion 91.

In the lens resin portion 82a of FIG. 29, similar to the lens resin portion 82a illustrated in FIG. 24, by making the length and a thickness of the arm portion 101 in direct contact with the lens portion 91 constant over the entire outer periphery of the lens portion 91, it is possible to bring about an action or an effect of supporting the entire lens portion 91 with a constant force without bias.

Moreover, since the entire lens portion 91 is supported with the constant force without the bias, for example, in a case where stress is applied from the carrier substrate 81a surrounding the through-hole 83a to the entire outer periphery of the through-hole 83a, the stress is transferred to the entire lens portion 91 without being biased, such that it is possible to bring about an action or an effect of suppressing the stress from being transferred only to a specific part of the lens portion 91 with being biased.

Moreover, in a structure of the through-hole 83a illustrated in FIG. 29, as compared with the through-hole 83a of FIG. 24 or the like that does not include the stepped portion 221 therein, an action or an effect that a contact area between the leg portion 102 of the support portion 92 of the lens resin portion 82a and the sidewall of the through-hole 83a can be increased is brought about. With this arrangement, an action or an effect of increasing adhesion strength between the lens resin portion 82a and the sidewall portion of the through-hole 83a, in other words, adhesion strength between the lens resin portion 82a and the carrier substrate 81a is brought about.

11. Direct Bonding Between Substrates with Lenses

Next, direct bonding between substrates 41W with lenses in a substrate state where a plurality of substrates 41 with lenses is formed will be described.

In the following description, as illustrated in FIGS. 30A and 30B, a substrates 41W with lenses in a substrate state where a plurality of substrates 41a with lenses is formed is referred to as a substrate 41W-a with lenses, and a substrates 41W with lenses in a substrate state where a plurality of substrates 41b with lenses is formed is referred to as a substrate 41W-b with lenses. The same goes for the other substrates 41c to 41e with lenses.

Direct bonding between the substrate 41W-a with lenses in the substrate state and the substrate 41W-b with lenses in the substrate state will be described with reference to FIGS. 31A and 31B.

Figure 31A:
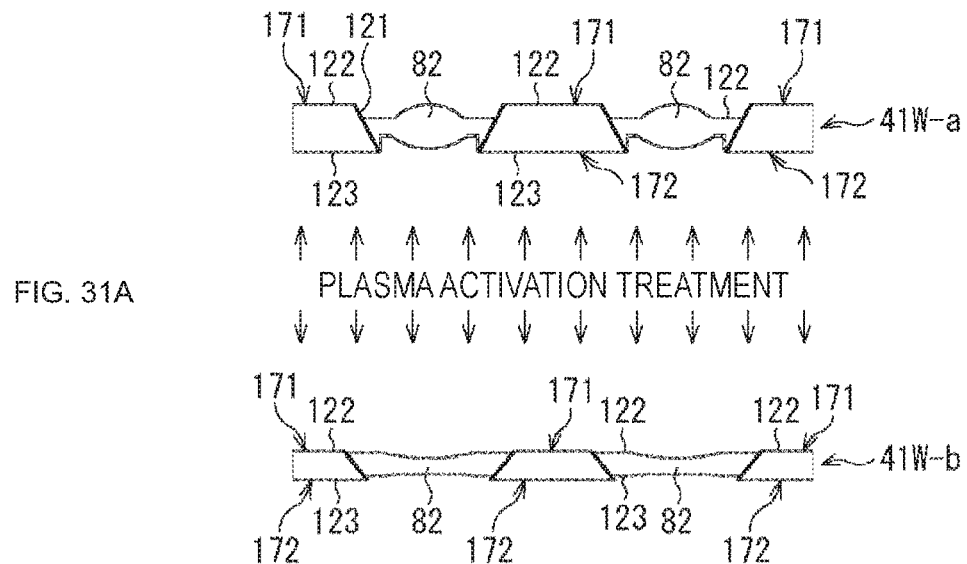
FIGS. 31A and 31B are views for describing bonding between substrates with lenses in a substrate state.
Figure 31B:
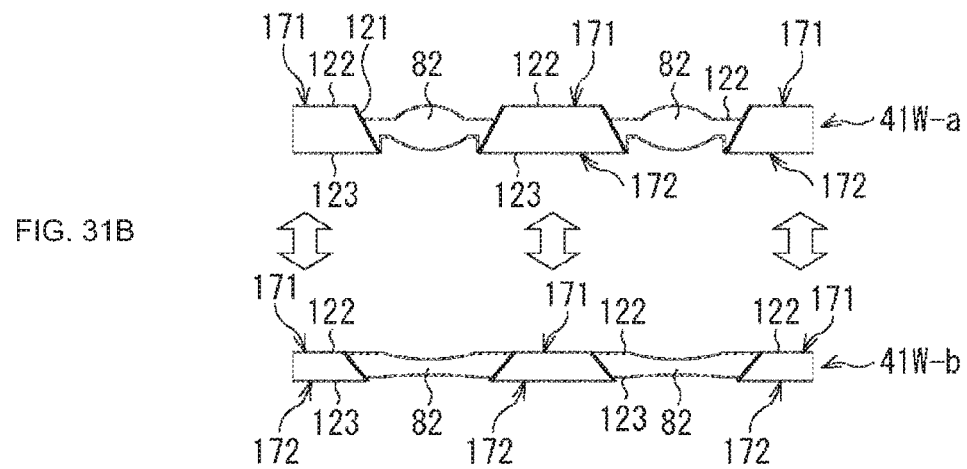

Note that in FIGS. 31A and 31B, portions the substrate 41W-b with lenses corresponding to the respective portions of the substrate 41W-a with lenses will be denoted by the same reference numeral as those of the substrate 41W-a with lenses.

The upper surface layers 122 or 125 are formed on upper surfaces of the substrate 41W-a with lenses and the substrate 41W-b with lenses. The lower surface layers 123 or 124 are formed on lower surfaces of the substrate 41W-a with lenses and the substrate 41W-b with lenses. Then, as illustrated in FIG. 31A, plasma activation treatment is performed over the entire lower surface including the back flat portion 172 of the substrate 41W-a with lenses and the entire upper surface including the front flat portion 171 of the substrate 41W-b with lenses, which are bonded surface of the substrates 41W-a and 41W-a with lenses. A gas used for the plasma activation treatment may be any gas capable of performing plasma treatment, such as O2, N2, He, Ar, or H2. However, it is preferable that the same gas as a constituent element of the upper surface layer 122 and the lower surface layer 123 is used as the gas used for the plasma activation treatment, since deterioration of films themselves of the upper surface layer 122 and the lower surface layer 123 can be suppressed.

Then, as illustrated in FIG. 31B, the back flat portion 172 of the substrate 41W-a with lenses in the surface state and the front flat portion 171 of the substrate 41W-b with lenses in the surface state that are activated are stuck to each other.

Hydrogen bonds are generated between hydrogen of OH groups on a surface of the lower surface layer 123 or 124 of the substrate 41W-a with lenses and hydrogen of OH groups on a surface of the upper surface layer 122 or 125 of the substrate 41W-b with lenses by this sticking treatment between the substrates with lenses. With this arrangement, the substrate 41W-a with lenses and the substrate 41W-b with lenses are fixed. The sticking treatment between the substrates with lenses can be performed under the condition of atmospheric pressure.

Annealing treatment is applied to the substrate 41W-a with lenses and the substrate 41W-b with lenses on which the sticking treatment is performed. With this treatment, dehydration condensation occurs from a state where the OH groups are hydrogen-bonded to each other, such that covalent bonds through oxygen are formed between the lower surface layer 123 or 124 of the substrate 41W-a with lenses and the upper surface layer 122 or 125 of the substrate 41W-b with lenses. Alternatively, elements contained in the lower surface layer 123 or 124 of the substrate 41W-a with lenses are covalently bonded to elements contained in the upper surface layer 122 or 125 of the substrate 41W-b with lenses. Two substrates with lenses are firmly fixed by these covalent bonds. In the present specification, direct bonding refers to fixing the two substrates 41W with lenses by forming the covalent bonds between the lower surface layer 123 or 124 of the substrate 41W with lenses arranged at an upper side and the upper surface layer 122 or 125 of the substrate 41W with lenses arranged at a lower side, as described above. In a method of fixing the plurality of substrates with lenses by the resin formed over the entire surface of the substrate disclosed in Patent Document 1, there is a possibility that curing shrinkage or thermal expansion of the resin and deformation of the lenses due to the curing shrinkage or the thermal expansion of the resin will occur. On the other hand, in the direct bonding of the present technology, the resin is not used at the time of fixing the plurality of substrates 41W with lenses, and an action or an effect that the plurality of substrates 41W with lenses can be fixed without causing the curing shrinkage or the thermal expansion due to the resin is thus brought about.

The above annealing treatment can also be performed under the condition of atmospheric pressure. This annealing treatment can be performed at 100° C. or more, 150° C. or more, or 200° C. or more in order to perform the dehydration condensation. On the other hand, this annealing treatment can be performed at 400° C. or less, 350° C. or less, or 300° C. or less from a viewpoint of protecting the energetic curable resin 191 for forming the lens resin portion 82 from heat or a viewpoint of suppressing degassing from the energetic curable resin 191.

In a case where the sticking treatment between the substrates 41W with lenses or the direct bonding treatment between the substrates 41W with lenses is performed under a condition other than atmospheric pressure, when the substrate 41W-a with lenses and the substrate 41W-b with lenses bonded to each other are returned to the environment of atmospheric pressure, a pressure difference between a space between the lens resin portion 82 and the lens resin portion 82 bonded to each other and the outside of the lens resin portions 82 is generated. Due to this pressure difference, a pressure is applied to the lens resin portions 82, such that there is a possibility that the lens resin portions 82 will be deformed.

When both of the sticking treatment between the substrates 41W with lenses or the direct bonding treatment between the substrates with lenses are performed under the condition of atmospheric pressure, an action or an effect that the deformation of the lens resin portions 82, of which a possibility arises in a case where the bonding is performed under the condition other than atmospheric pressure, can be avoided is brought about.

By directly bonding the substrates on which the plasma activation treatment is performed to each other, in other words, by performing plasma bonding, for example, it is possible to suppress flowability and thermal expansion as in a case of using a resin as an adhesive, and it is thus possible to improve position accuracy at the time of bonding the substrate 41W-a with lenses and the substrate 41W-b with lenses to each other.

As described above, the upper surface layer 122 or the lower surface layer 123 is formed on the back flat portion 172 of the substrate 41W-a with lenses and the front flat portion 171 of the substrate 41W-b with lenses. On the upper surface layer 122 and the lower surface layer 123, dangling bonds are easily formed by the plasma activation treatment performed previously. In other words, the lower surface layer 123 formed on the back flat portion 172 of the substrate 41W-a with lenses and the upper surface layer 122 formed on the front flat portion 171 of the substrate 41W-b with lenses also serve to increase a bonding strength.

Furthermore, in a case where the upper surface layer 122 or the lower surface layer 123 includes an oxide film, the upper surface layer 122 or the lower surface layer 123 is not affected by a change in a film quality due to plasma (O2), and thus, has an effect that corrosion of the lens resin portions 82 due to the plasma is suppressed.

As described above, the substrate 41W-a with lenses in the substrate state where the plurality of substrates 41a with lenses is formed and the substrate 41W-b with lenses in the substrate state where the plurality of substrates 41b with lenses is formed are directly bonded to each other after performing the surface activation treatment by the plasma, in other words, are bonded to each other using plasma bonding.

FIGS. 32A, 32B, 32C, 32D, 32E, and 32F illustrate a first stacking method of stacking the five substrates 41a to 41e with lenses corresponding to the stacked lens structure 11 of FIG. 13 in the substrate state using the method of bonding substrates 41W in the substrate state to each other, described with reference to FIGS. 31A and 31B.

Figure 32A:
FIGS. 32A, 32B, 32C, 32D, 32E, and 32F are views for describing a first stacking method of stacking five substrates with lenses in a substrate state.

First, as illustrated in FIG. 32A, a substrate 41W-e with lenses in a substrate state positioned at the lowermost layer in the stacked lens structure 11 is prepared.

Figure 32B:

Next, as illustrated in FIG. 32B, a substrate 41W-d with lenses in a substrate state positioned at a second layer from the bottom in the stacked lens structure 11 is bonded onto the substrate 41W-e with lenses in the substrate state.

Figure 32C:
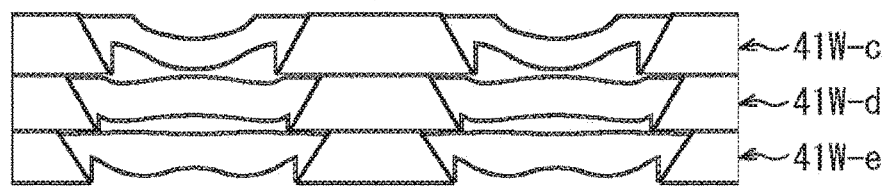

Next, as illustrated in FIG. 32C, a substrate 41W-c with lenses in a substrate state positioned at a third layer from the bottom in the stacked lens structure 11 is bonded onto the substrate 41W-d with lenses in the substrate state.

Figure 32D:
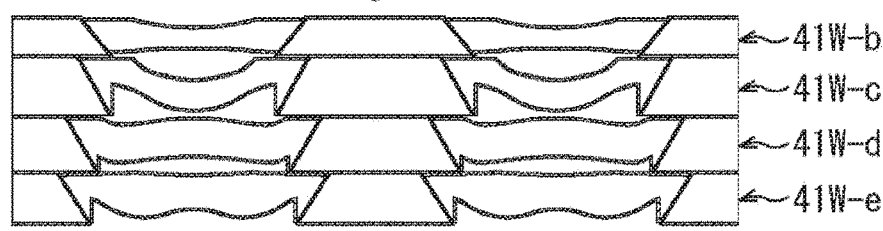

Next, as illustrated in FIG. 32D, the substrate 41W-b with lenses in the substrate state positioned at a fourth layer from the bottom in the stacked lens structure 11 is bonded onto the substrate 41W-c with lenses in the substrate state.

Figure 32E:
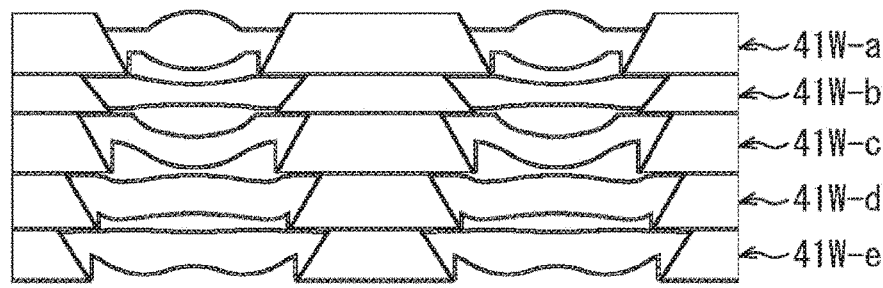

Next, as illustrated in FIG. 32E, the substrate 41W-a with lenses in the substrate state positioned at a fifth layer from the bottom in the stacked lens structure 11 is bonded onto the substrate 41W-b with lenses in the substrate state.

Figure 32F:
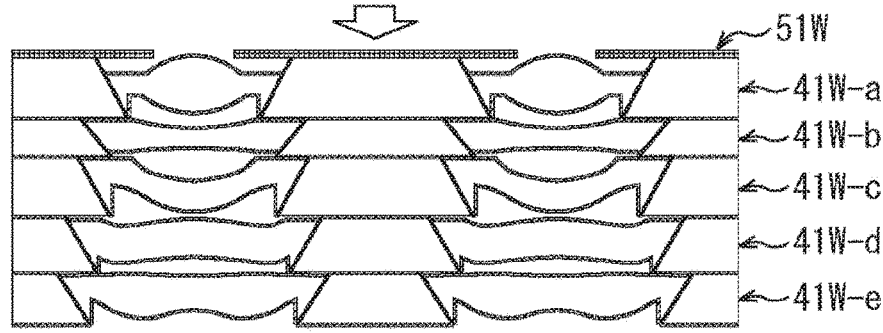

Finally, as illustrated in FIG. 32F, the diaphragm plate 51W positioned on an upper layer of the substrate 41a with lenses in the stacked lens structure 11 is bonded onto the substrate 41W-a with lenses in the substrate state.

As described above, by sequentially stacking the five substrates 41W-a to 41W-e with lenses in the substrate states one by one from the substrate 41W with lenses of the lower layer to the substrate 41W with lenses of the upper layer in the stacked lens structure 11, the stacked lens structure 11W in the substrate state is obtained.

FIGS. 33A, 33B, 33C, 33D, 33E, and 33F illustrate a second stacking method of stacking the five substrates 41a to 41e with lenses corresponding to the stacked lens structure 11 of FIG. 13 in the substrate state using the method of bonding substrates 41W with lenses in the substrate state to each other, described with reference to FIGS. 31A and 31B.

Figure 33A:
FIGS. 33A, 33B, 33C, 33D, 33E, and 33F are views for describing a second stacking method of stacking five substrates with lenses in a substrate state.

First, as illustrated in FIG. 33A, the diaphragm plate 51W positioned on an upper layer of the substrate 41a with lenses in the stacked lens structure 11 is prepared.

Figure 33B:
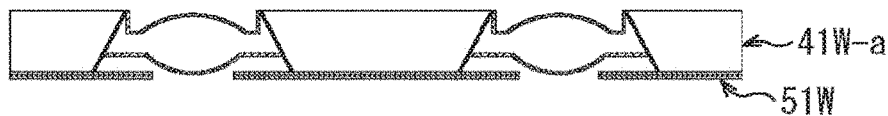

Next, as illustrated in FIG. 33B, the substrate 41W-a with lenses in the substrate state positioned at the uppermost layer in the stacked lens structure 11 is turned upside down and is then bonded onto the diaphragm plate 51W.

Figure 33C:
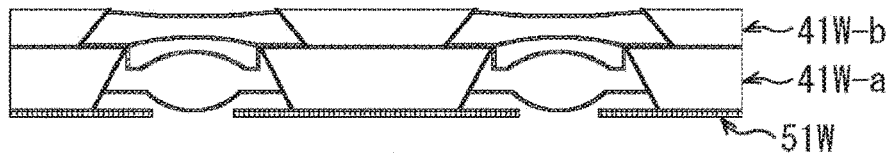

Next, as illustrated in FIG. 33C, the substrate 41W-b with lenses in the substrate state positioned at a second layer from the top in the stacked lens structure 11 is turned upside down and is then bonded onto the substrate 41W-a with lenses in the substrate state.

Figure 33D:
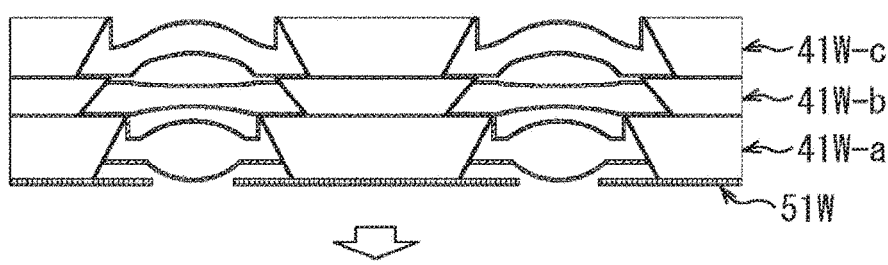

Next, as illustrated in FIG. 33D, a substrate 41W-c with lenses in a substrate state positioned at a third layer from the top in the stacked lens structure 11 is turned upside down and is then bonded onto the substrate 41W-b with lenses in the substrate state.

Figure 33E:
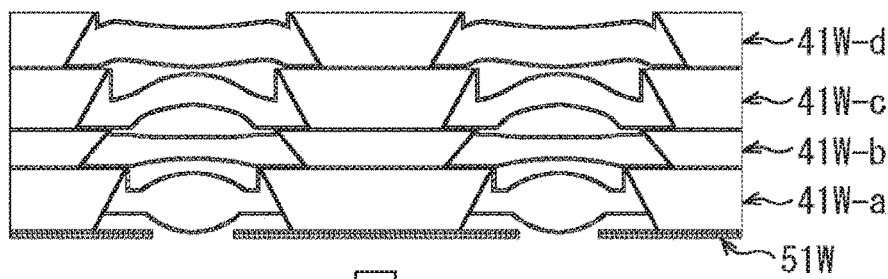

Next, as illustrated in FIG. 33E, a substrate 41W-d with lenses in a substrate state positioned at a fourth layer from the top in the stacked lens structure 11 is turned upside down and is then bonded onto the substrate 41W-c with lenses in the substrate state.

Figure 33F:
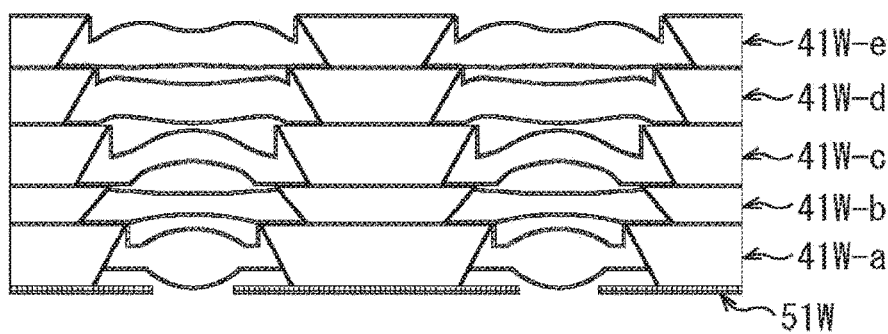

Next, as illustrated in FIG. 33F, a substrate 41W-e with lenses in a substrate state positioned at a fifth layer from the top in the stacked lens structure 11 is turned upside down and is then bonded onto the substrate 41W-d with lenses in the substrate state.

As described above, by sequentially stacking the five substrates 41W-a to 41W-e with lenses in the substrate states one by one from the substrate 41W with lenses of the upper layer to the substrate 41W with lenses of the lower layer in the stacked lens structure 11, the stacked lens structure 11W in the substrate state is obtained.

The five substrates 41W-a to 41W-e with lenses in the substrate state stacked by the stacking method described in FIGS. 32A, 32B, 32C, 32D, 32E, and 32F or 33A, 33B, 33C, 33D, 33E, and 32F are singulated in module units or chip units using a blade, a laser beam or the like to become the stacked lens structure 11 in which the five substrates 41a to 41e with lenses are stacked.

12. Eighth and Ninth Embodiments of Camera Module

Figure 34:
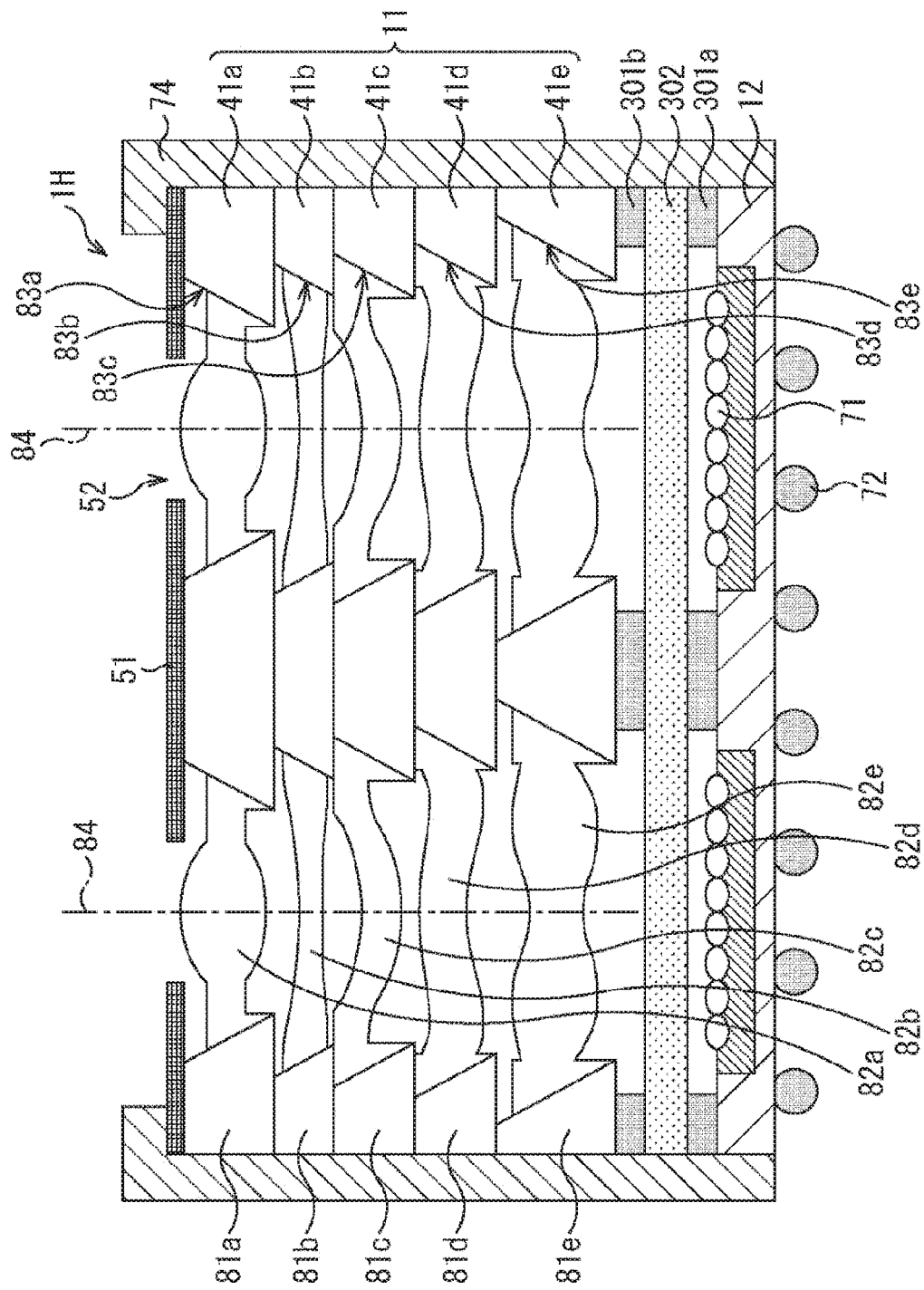
FIG. 34 is a view illustrating an eighth embodiment of a camera module using a stacked lens structure to which the present technology is applied.

FIG. 34 is a view illustrating an eighth embodiment of a camera module using a stacked lens structure to which the present technology is applied.

Figure 35:
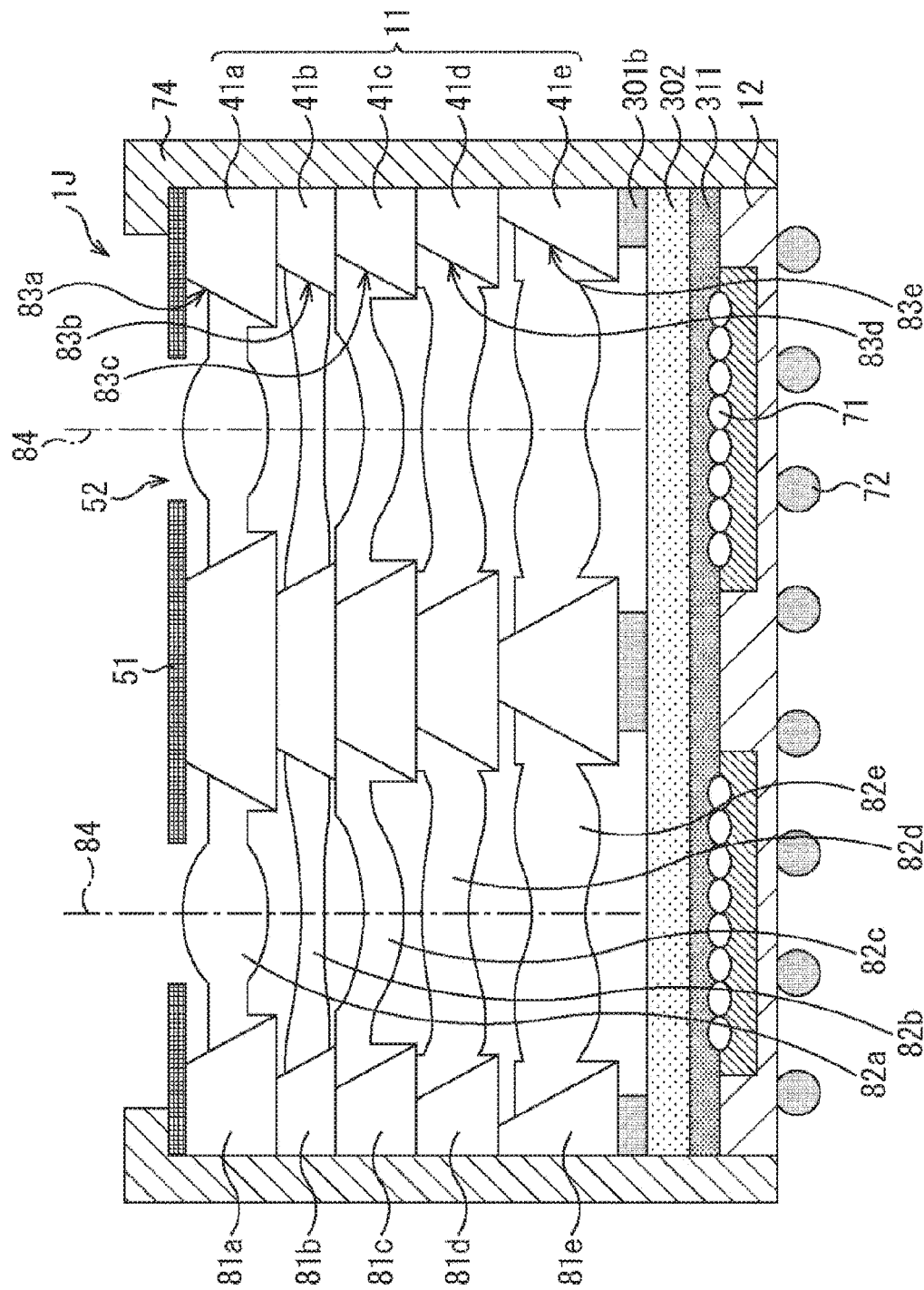
FIG. 35 is a view illustrating a ninth embodiment of a camera module using a stacked lens structure to which the present technology is applied.

FIG. 35 is a view illustrating a ninth embodiment of a camera module using a stacked lens structure to which the present technology is applied.

In a description of FIGS. 34 and 35, only portions different from those of the camera module E illustrated in FIG. 13 will be described.

In a camera module 1H of FIG. 34 and a camera module 1J of FIG. 35, a portion of the structural material 73 in the camera module E illustrated in FIG. 13 is replaced by a structure different from that described above.

In the camera module 1H of FIG. 34, a portion of the structural material 73 in the camera module 1J is replaced with structural materials 301a and 301b and a light transmissive substrate 302.

Specifically, the structural material 301a is arranged on a part of an upper side of the light receiving element 12. The light receiving element 12 and the light transmissive substrate 302 are fixed through the structural material 301a. The structural material 301a is, for example, an epoxy-based resin.

A structural material 301b is arranged on the light transmissive substrate 302. The light transmissive substrate 302 and the stacked lens structure 11 are fixed through the structural material 301b. The structural material 301b is, for example, an epoxy-based resin.

On the other hand, in the camera module 1J of FIG. 35, a portion of the structural material 301a of the camera module 1H of FIG. 34 is replaced with a resin layer 311 having light transmissivity.

The resin layer 311 is arranged over the entire upper surface of the light receiving element 12. The light receiving element 12 and the light transmissive substrate 302 are fixed through the resin layer 311. In a case where stress is applied to from above the light transmissive substrate 302 to the light transmissive substrate 302, the resin layer 311 arranged over the entire upper surface of the light receiving element 12 brings about an action an effect of preventing the stress from being intensively applied to a partial region of the light receiving element 12 to allow the stress to be dispersed and received over the entire surface of the light receiving element 12.

A structural material 301b is arranged on the light transmissive substrate 302. The light transmissive substrate 302 and the stacked lens structure 11 are fixed through the structural material 301b.

The camera module 1H of FIG. 34 and the camera module 1J of FIG. 35 are provided with the light transmissive substrate 302 arranged above the light receiving element 12. The light transmissive substrate 302 brings about an operation or an effect of suppressing damage to the light receiving element 12, for example, during manufacturing of the camera module 1H or 1J.

13. Tenth Embodiment of Camera Module

Figure 36:
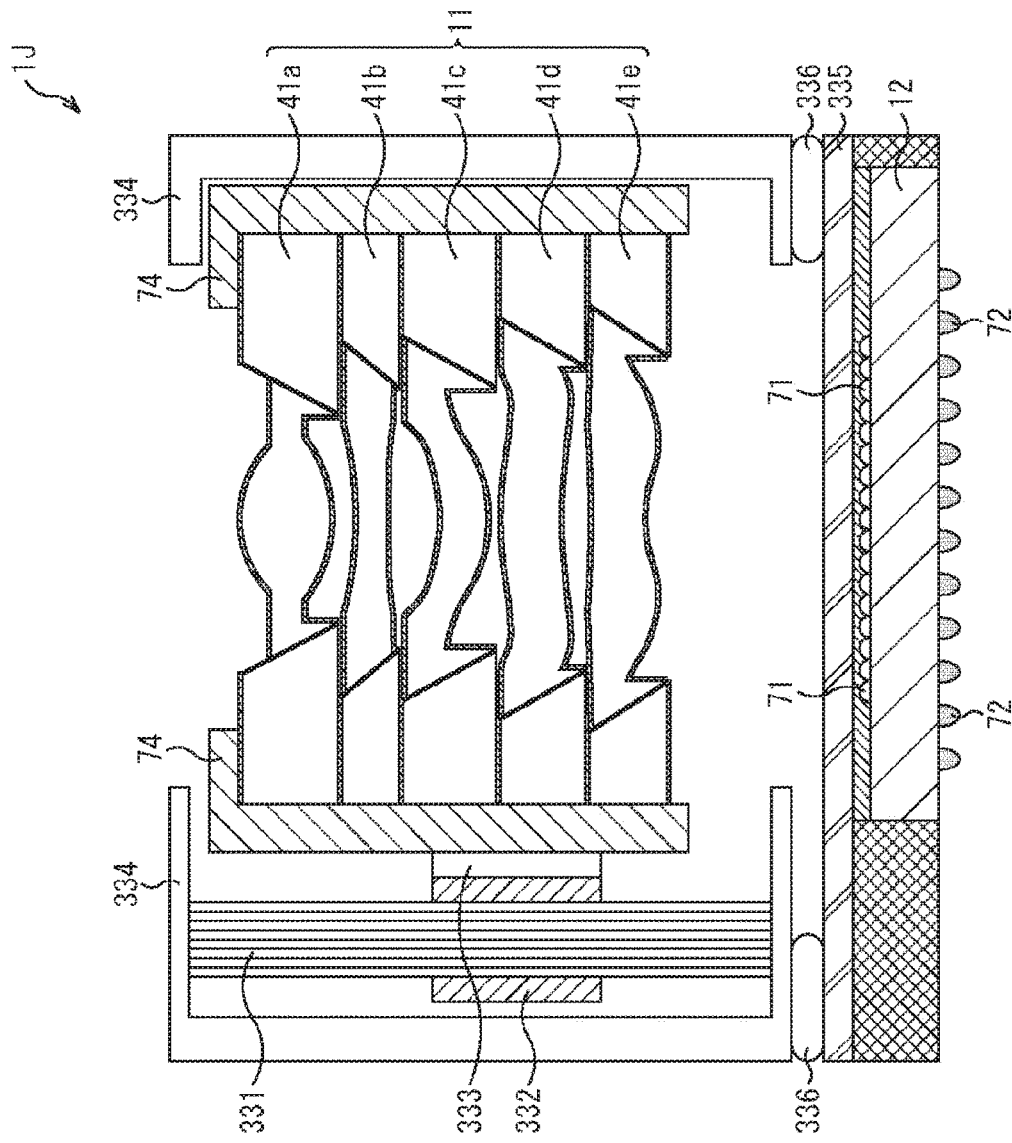
FIG. 36 is a view illustrating a tenth embodiment of a camera module using a stacked lens structure to which the present technology is applied.

FIG. 36 is a view illustrating a tenth embodiment of a camera module using a stacked lens structure to which the present technology is applied.

In a camera module 1J illustrated in FIG. 36, the stacked lens structure 11 is housed in a lens barrel 74. The lens barrel 74 is fixed by a moving member 332 moving along a shaft 331 and a fixing member 333. The lens barrel 74 is moved in an axial direction of the shaft 331 by a drive motor (not illustrated), such that a distance from the stacked lens structure 11 to an imaging surface of the light receiving element 12 is adjusted.

The lens barrel 74, the shaft 331, the moving member 332, and the fixing member 333 are housed in a housing 334. A protective substrate 335 is arranged on the top of the light receiving element 12, and the protective substrate 335 and the housing 334 are connected to each other by an adhesive 336.

A mechanism moving the stacked lens structure 11 described above brings about an action or an effect of enabling a camera using the camera module 1J to perform an auto-focus operation at the time of photographing an image.

14. Eleventh Embodiment of Camera Module

Figure 37:
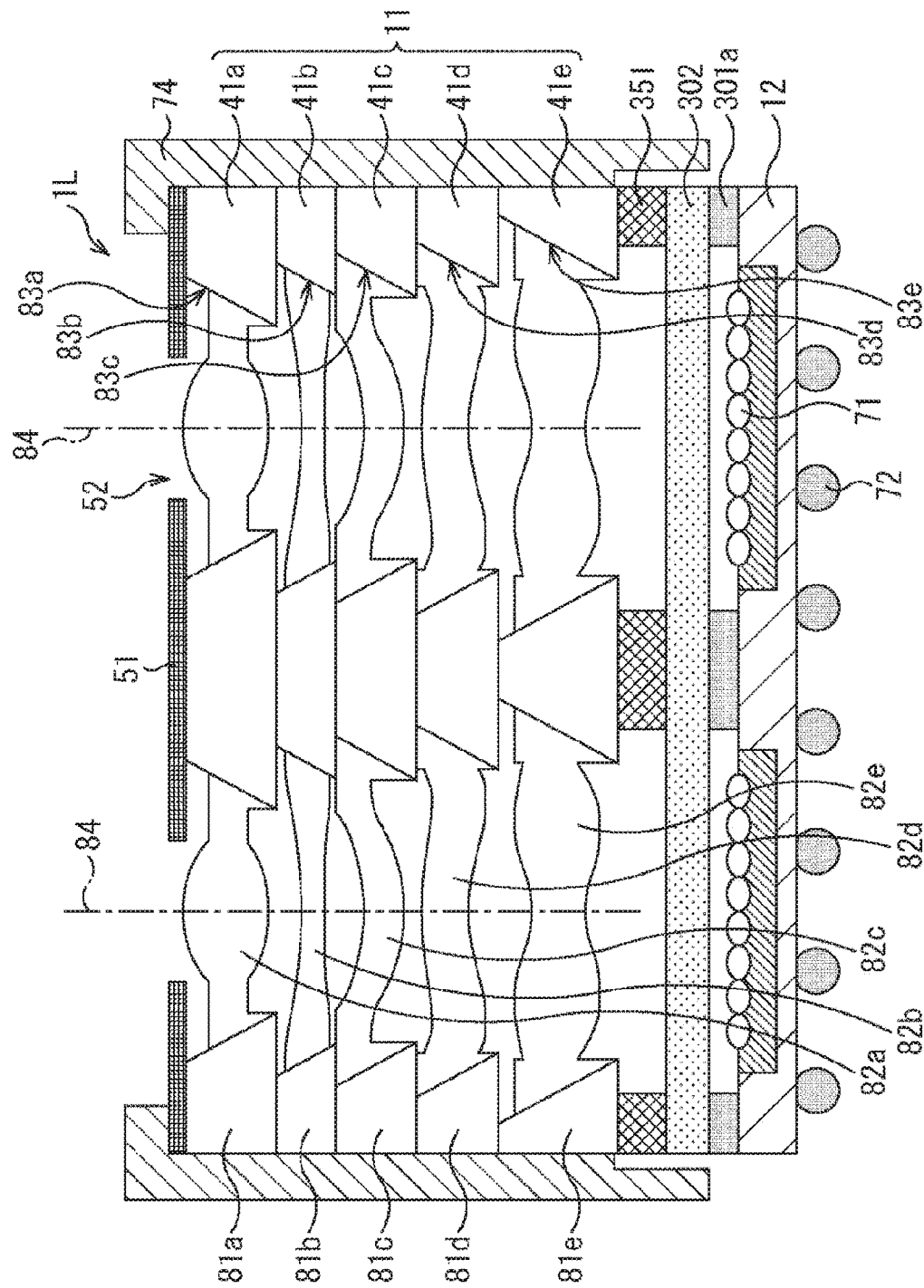
FIG. 37 is a view illustrating an eleventh embodiment of a camera module using a stacked lens structure to which the present technology is applied.

FIG. 37 is a view illustrating an eleventh embodiment of a camera module using a stacked lens structure to which the present technology is applied.

A camera module 1L of FIG. 37 is a camera module to which a focusing mechanism by a piezoelectric element is added.

In other words, in the camera module 1L, similar to a camera module 1H of FIG. 34, the structural material 301a is arranged on a part of an upper side of the light receiving element 12. The light receiving element 12 and the light transmissive substrate 302 are fixed through the structural material 301a. The structural material 301a is, for example, an epoxy-based resin.

A piezoelectric element 351 is arranged on the light transmissive substrate 302. The light transmissive substrate 302 and the stacked lens structure 11 are fixed through the piezoelectric element 351.

In the camera module 1L, by applying and interrupting a voltage to the piezoelectric element 351 arranged beneath the stacked lens structure 11, it is possible to move the stacked lens structure 11 in a vertical direction. Means moving the stacked lens structure 11 is not limited to the piezoelectric element 351, and another device of which a shape is changed by application and interruption of a voltage can be used as the means moving the stacked lens structure 11. For example, a micro-electro mechanical systems (MEMS) device can be used.

A mechanism moving the stacked lens structure 11 described above brings about an action or an effect of enabling a camera using the camera module 1L to perform an auto-focus operation at the time of photographing an image.

15. Effect of the Present Structure Compared to Other Structures

The stacked lens structure 11 has a structure in which the substrates 41 with lenses are fixed by the direct bonding between the substrates 41 with lenses (hereinafter, referred to as the present structure). An action and an effect of the present structure will be described in comparison with other structures of a substrate with lenses on which the lenses are formed.

Comparative Structure Example 1

Figure 38:
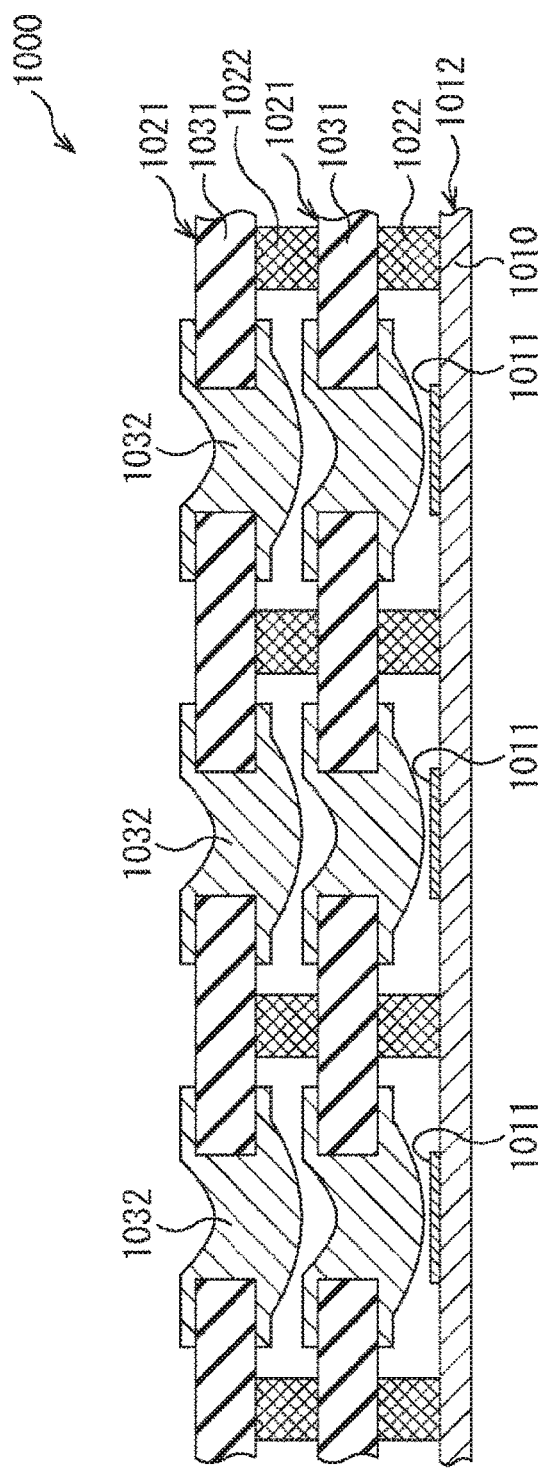
FIG. 38 is a cross-sectional view of a wafer level stacked structure as Comparative Structure Example 1.

FIG. 38 is a cross-sectional view of a wafer level stacked structure which is a first substrate structure (hereinafter, referred to as Comparative Structure Example 1) for comparing with the present structure and is disclosed as FIG. 14(*b*) in Japanese Patent Application Laid-Open No. 2011-138089 (hereinafter, referred to as Comparative Document 1).

A wafer level stacked structure 1000 illustrated in FIG. 38 has a structure in which two lens array substrates 1021 are stacked, through columnar spacers 1022, on a sensor array substrate 1012 in which a plurality of image sensors 1011 is arranged on a wafer substrate 1010. Each lens array substrate 1021 includes a substrate 1031 with lenses and lenses 1032 formed in a plurality of through-holes formed in the substrate 1031 with lenses.

Comparative Structure Example 2

Figure 39:
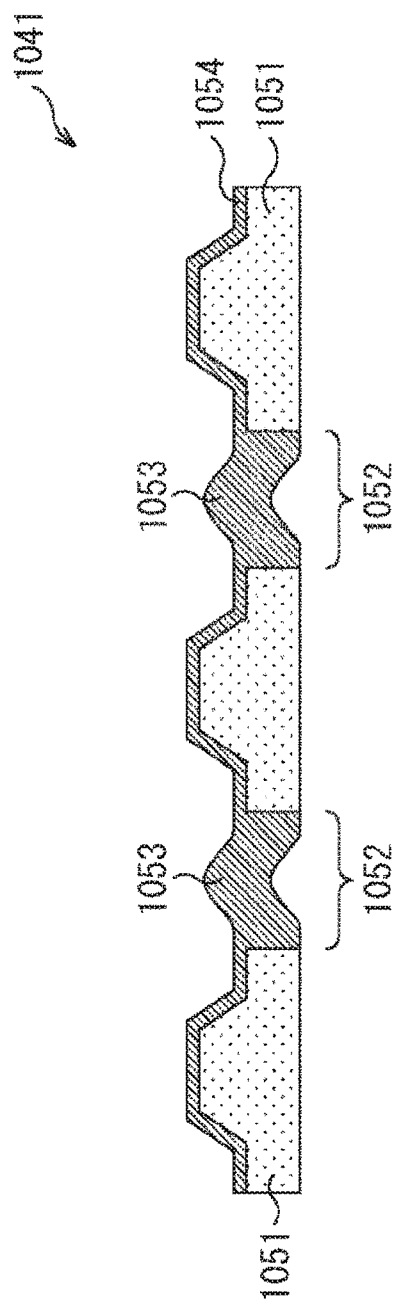
FIG. 39 is a cross-sectional view of a lens array substrate as Comparative Structure Example 2.

FIG. 39 is a cross-sectional view of a lens array substrate which is a second substrate structure (hereinafter, referred to as Comparative Structure Example 2) for comparing with the present structure and is disclosed as FIG. 5(*a*) in Japanese Patent Application Laid-Open No. 2009-279790 (hereinafter, referred to as Comparative Document 2).

In a lens array substrate 1041 illustrated in FIG. 39, a lens 1053 is provided in each of a plurality of through-holes 1052 provided in a substrate 1051 having a plate shape. Each lens 1053 includes a resin (energy curable resin) 1054, and the resin 1054 is also formed on an upper surface of the substrate 1051.

A method of manufacturing the lens array substrate 1041 of FIG. 39 will be described with reference to FIGS. 40A, 40B, and 40C.

Figure 40A:
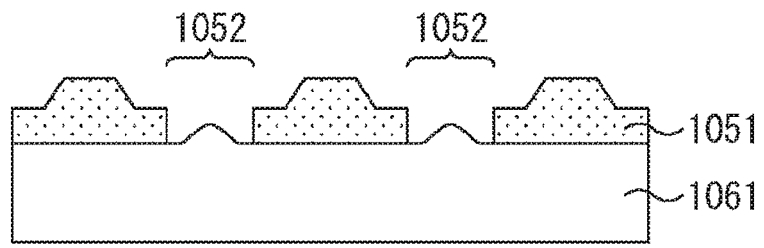
FIGS. 40A, 40B, and 40C are views for describing a method of manufacturing the lens array substrate of FIG. 39.

FIG. 40A illustrates a state where the substrate 1051 in which the plurality of through-holes 1052 is formed is placed on a lower mold 1061. The lower mold 1061 is a mold pressing the resin 1054 upward from below in the subsequent step.

Figure 40B:
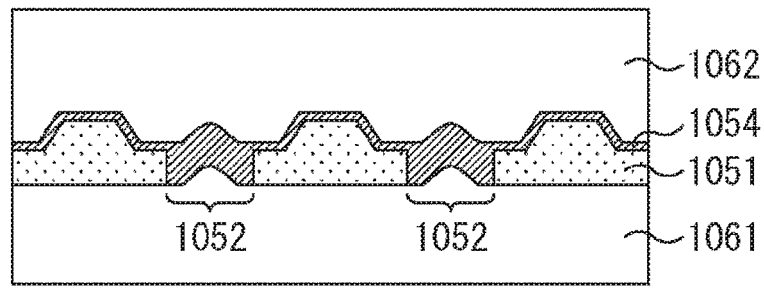

FIG. 40B illustrates a state where the resin 1054 is applied to inner portions of the plurality of through-holes 1052 and the upper surface of the substrate 1051, an upper mold 1062 is arranged on the substrate 1051, and pressure-molding is then performed using the upper mold 1062 and the lower mold 1061. The upper mold 1062 is a mold pressing the resin 1054 downward from above. In the state illustrated in FIG. 40B, curing of the resin 1054 is performed.

Figure 40C:
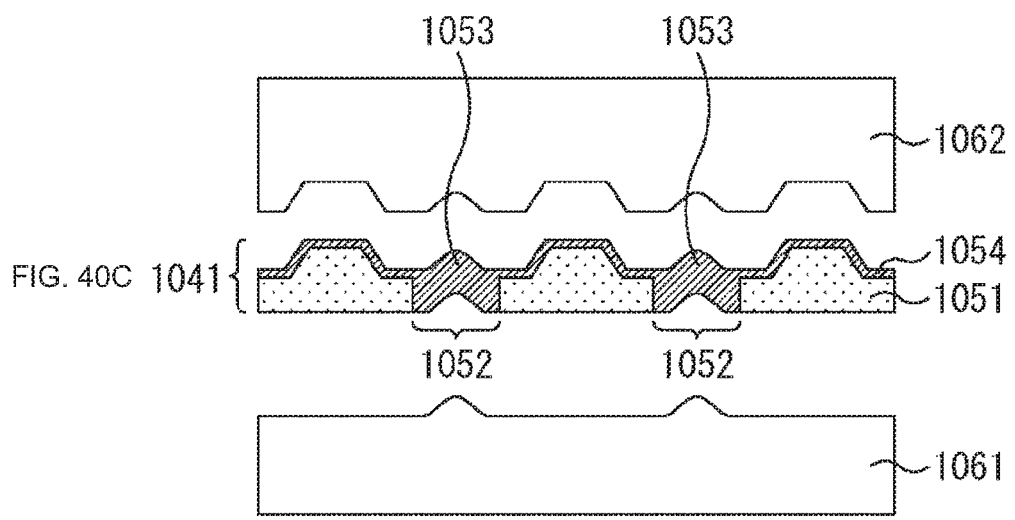

FIG. 40C illustrates a state where the lens array substrate 1041 is completed by releasing the upper mold 1062 and the lower mold 1061 from each other after the resin 1054 is cured.

The lens array substrate 1041 is characterized in that (1) the resins 1054 formed at positions of the through-holes 1052 of the substrate 1051 become the lenses 1053, such that a plurality of lenses 1053 is formed in the substrate 1051, and (2) a thin layer of the resin 1054 is formed over the entire upper surface of the substrate 1051 positioned between the plurality of lenses 1053.

In a case where a structure in which a plurality of lens array substrates 1041 is stacked is formed, the thin layer of the resin 1054 formed over the entire upper surface of the substrate 1051 brings about an action or an effect as an adhesive adhering the substrates to each other.

Furthermore, in a case where the structure in which the plurality of lens array substrates 1041 is stacked is formed, as compared with the wafer level stacked structure 1000 of FIG. 38 illustrated as Comparative Structure Example 1, an adhering area between the substrates can be increased, and the substrates can thus be adhered to each other with a stronger force.

Action Brought about by Resin in Comparative Structure Example 2

In Comparative Document 2 in which the lens array substrate 1041 of FIG. 39, which is Comparative Structure Example 2, is disclosed, the following is disclosed as an action of the resin 1054 which becomes the lens 1053.

In Comparative Structure Example 2, an energy curable resin is used as the resin 1054. Then, a photocurable resin is used as an example of the energy curable resin. In a case where the photocurable resin is used as the energy curable resin, when the resin 1054 is irradiated with UV light, the resin 1054 is cured. Due to this curing, curing shrinkage occurs in the resin 1054.

However, according to the structure of the lens array substrate 1041 of FIG. 39, even though the curing shrinkage of the resin 1054 occurs, the substrate 1051 is interposed between the plurality of lenses 1053, and it is thus possible to prevent a variation in a distance between the lenses 1053 due to the curing shrinkage of the resin 1054. Therefore, it is possible to suppress warpage of the lens array substrate 1041 in which the plurality of lenses 1053 is arranged.

Comparative Structure Example 3

Figure 41:
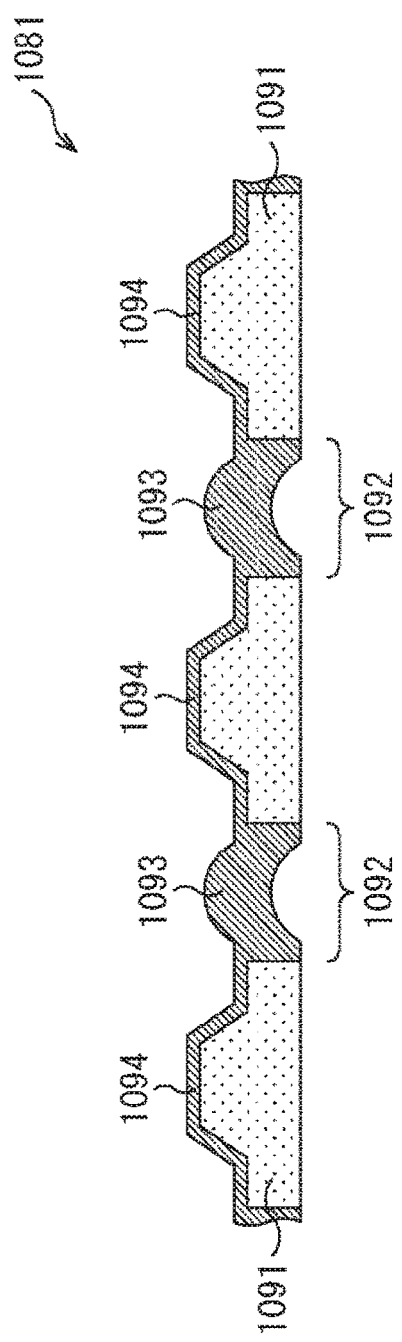
FIG. 41 is a cross-sectional view of a lens array substrate as Comparative Structure Example 3.

FIG. 41 is a cross-sectional view of a lens array substrate which is a third substrate structure (hereinafter, referred to as Comparative Structure Example 3) for comparing with the present structure and is disclosed as FIG. 1 in Japanese Patent Application Laid-Open No. 2010-256563 (hereinafter, referred to as Comparative Document 3).

In a lens array substrate 1081 illustrated in FIG. 41, a lens 1093 is provided in each of a plurality of through-holes 1092 provided in a substrate 1091 having a plate shape. Each lens 1093 includes a resin (energy curable resin) 1094, and the resin 1094 is also formed on an upper surface of the substrate 1091 in which the through-holes 1092 are not provided.

A method of manufacturing the lens array substrate 1081 of FIG. 41 will be described with reference to FIGS. 42A, 42B, and 42C.

Figure 42A:
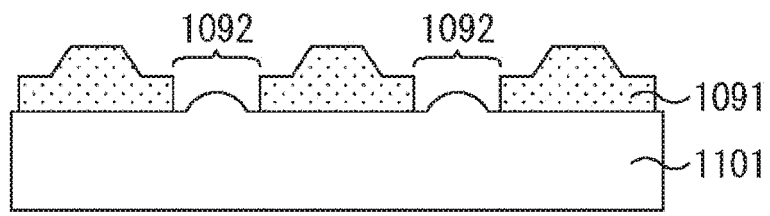
FIGS. 42A, 42B, and 42C are views for describing a method of manufacturing the lens array substrate of FIG. 41.

FIG. 42A illustrates a state where the substrate 1091 in which the plurality of through-holes 1092 is formed is placed on a lower mold 1101. The lower mold 1101 is a mold pressing the resin 1094 upward from below in the subsequent step.

Figure 42B:
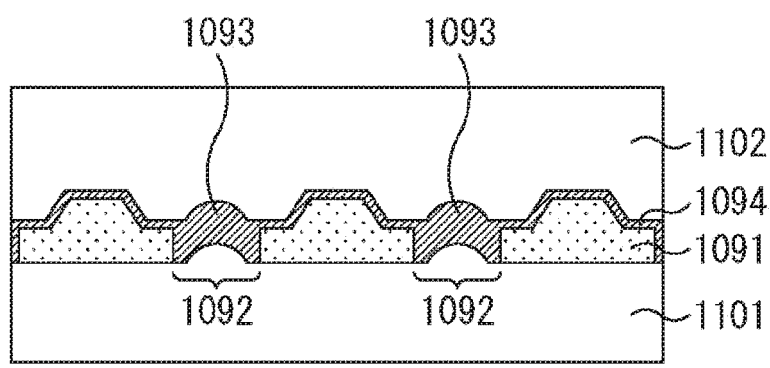

FIG. 42B illustrates a state where the resin 1094 is applied to inner portions of the plurality of through-holes 1092 and the upper surface of the substrate 1091, an upper mold 1102 is arranged on the substrate 1091, and pressure-molding is then performed using the upper mold 1102 and the lower mold 1101. The upper mold 1102 is a mold pressing the resin 1094 downward from above. In the state illustrated in FIG. 42B, curing of the resin 1094 is performed.

Figure 42C:
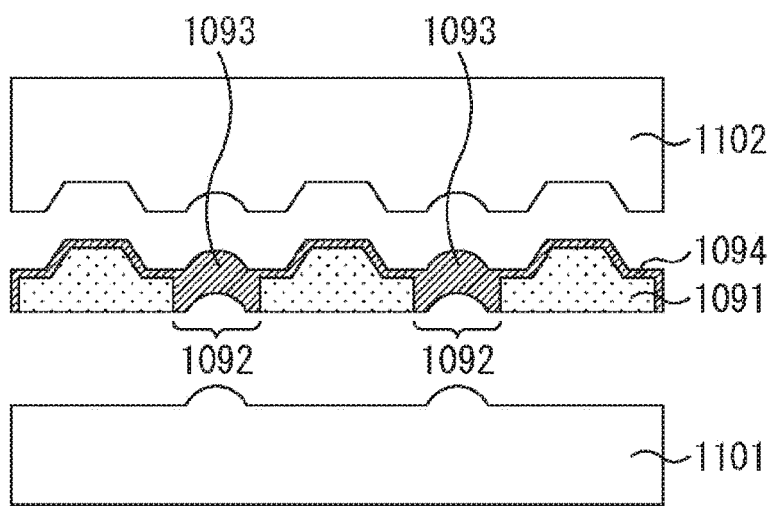

FIG. 42C illustrates a state where the lens array substrate 1081 is completed by releasing the upper mold 1102 and the lower mold 1101 from each other after the resin 1094 is cured.

The lens array substrate 1081 is characterized in that (1) the resins 1094 formed at positions of the through-holes 1092 of the substrate 1091 become the lenses 1093, such that a plurality of lenses 1093 is formed in the substrate 1091, and (2) a thin layer of the resin 1094 is formed over the entire upper surface of the substrate 1091 positioned between the plurality of lenses 1093.

Action Brought About by Resin in Comparative Structure Example 3

In Comparative Document 3 in which the lens array substrate 1081 of FIG. 41, which is Comparative Structure Example 3, is disclosed, the following is disclosed as an action of the resin 1094 which becomes the lens 1093.

In Comparative Structure Example 3, an energy curable resin is used as the resin 1094. Then, a photocurable resin is used as an example of the energy curable resin. In a case where the photocurable resin is used as the energy curable resin, when the resin 1094 is irradiated with UV light, the resin 1094 is cured. Due to this curing, curing shrinkage occurs in the resin 1094.

However, according to the structure of the lens array substrate 1081 of FIG. 41, even though the curing shrinkage of the resin 1094 occurs, the substrate 1091 is interposed between the plurality of lenses 1093, and it is thus possible to prevent a variation in a distance between the lenses 1093 due to the curing shrinkage of the resin 1094. Therefore, it is possible to suppress warpage of the lens array substrate 1081 in which the plurality of lenses 1093 is arranged.

As described above, Comparative Documents 2 and 3 disclose that the curing shrinkage occurs when the photocurable resin is cured. Note that in addition to Comparative Documents 2 and 3, for example, Japanese Patent Application Laid-Open No. 2013-1091 or the like discloses that the curing shrinkage occurs when the photocurable resin is cured.

Furthermore, when the resin is molded in a shape of the lens and the resin after being molded is cured, the resin in which the curing shrinkage occurs, which is problematic, is not limited to the photocurable resin. For example, also in a thermosetting resin, which is a kind of energy curable resin, an occurrence of curing shrinkage at the time of curing is problematic, similar to the photocurable resin. This is also disclosed, for example, in Comparative Document 1 or 3, Japanese Patent Application Laid-Open No. 2010-204631 and the like.

Comparative Structure Example 4

Figure 43:
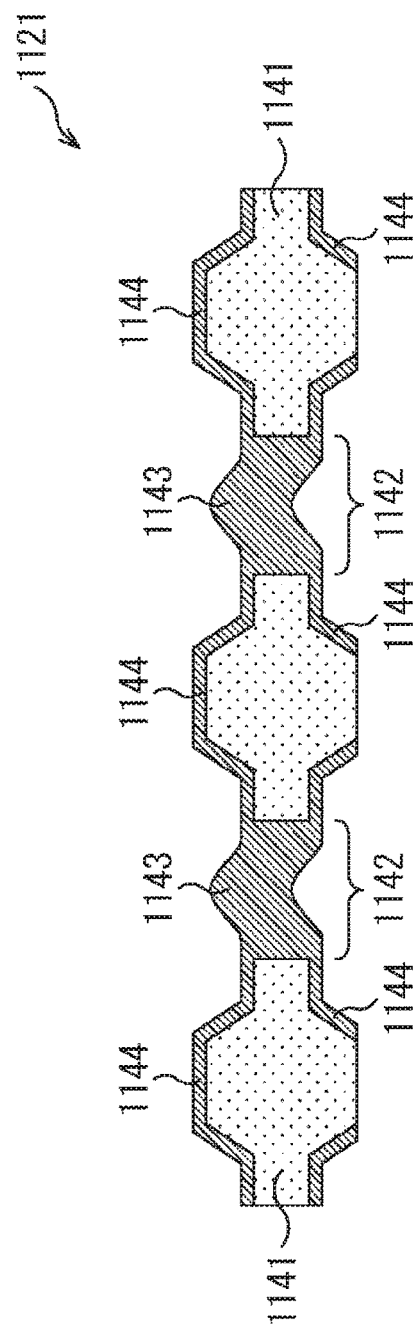
FIG. 43 is a cross-sectional view of a lens array substrate as Comparative Structure Example 4.

FIG. 43 is a cross-sectional view of a lens array substrate which is a fourth substrate structure (hereinafter, referred to as Comparative Structure Example 4) for comparing with the present structure and is disclosed as FIG. 6 in Comparative Document 2 described above.

When a lens array substrate 1121 of FIG. 43 is compared with the lens array substrate 1041 illustrated in FIG. 39, the lens array substrate 1121 is different from the lens array substrate 1041 illustrated in FIG. 39 in that a substrate 1141 has a shape in which portions thereof other than through-holes 1042 protrude in a downward direction as well as an upward direction and in that a resin 1144 is also formed on parts of a lower surface of the substrate 1141. The other configurations of the lens array substrate 1121 are similar to those of the lens array substrate 1041 illustrated in FIG. 39.

Figure 44:
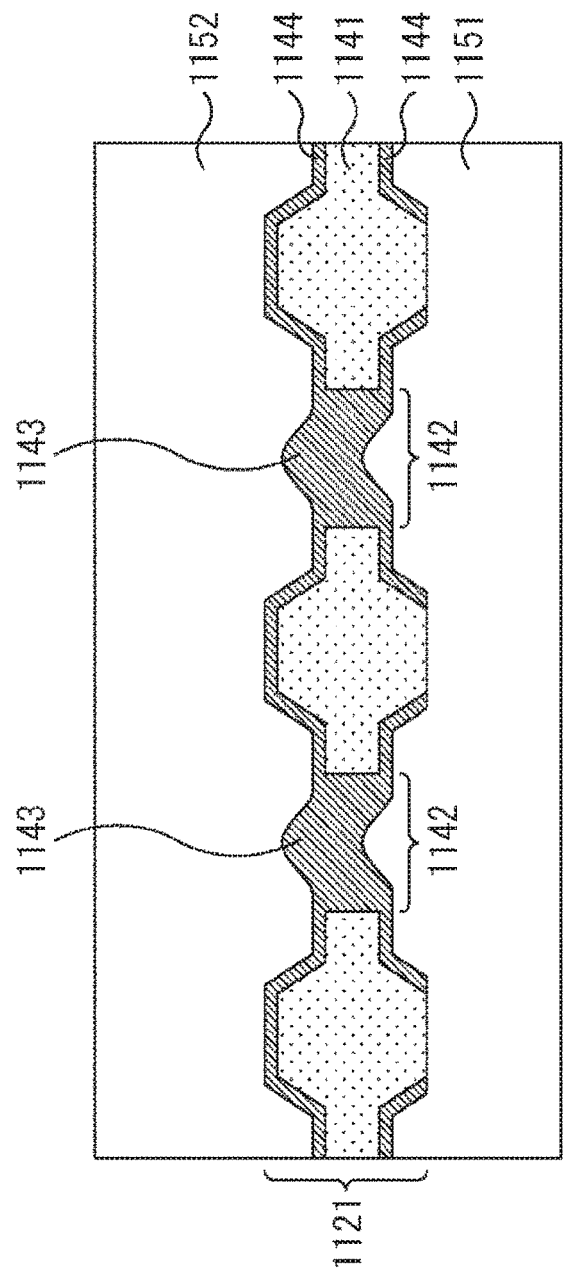
FIG. 44 is a view for describing a method of manufacturing the lens array substrate of FIG. 43.

FIG. 44 is a view for describing a method of manufacturing the lens array substrate 1121 of FIG. 43, and is a view corresponding to FIG. 40B.

FIG. 44 illustrates a state where the resin 1144 is applied to inner portions of the plurality of through-holes 1142 and an upper surface of the substrate 1141 and pressure-molding is then performed using an upper mold 1152 and a lower mold 1151. The resin 1144 is also injected between a lower surface of the substrate 1141 and the lower mold 1151. In the state illustrated in FIG. 44, curing of the resin 1144 is performed.

The lens array substrate 1121 is characterized in that (1) the resins 1144 formed at positions of the through-holes 1142 of the substrate 1141 become the lenses 1143, such that a plurality of lenses 1143 is formed in the substrate 1141, and (2) a thin layer of the resin 1144 is formed not only over the entire upper surface of the substrate 1141 positioned between the plurality of lenses 1143, but also on parts of a lower surface of the substrate 1141.

Action Brought About by Resin in Comparative Structure Example 4

In Comparative Document 2 in which the lens array substrate 1121 of FIG. 43, which is Comparative Structure Example 4, is disclosed, the following is disclosed as an action of the resin 1144 which becomes the lens 1143.

Also in the lens array substrate 1121 of FIG. 43, which is Comparative Structure Example 4, a photocurable resin, which is an example of an energy curable resin, is used as the resin 1144. Then, when the resin 1144 is irradiated with UV light, the resin 1144 is cured. Due to this curing, curing shrinkage occurs in the resin 1144, similar to Comparative Structure Examples 2 and 3.

However, in the lens array substrate 1121 of Comparative Structure Example 4, a thin layer of the resin 1144 is not only formed over the entire upper surface of the substrate 1141 positioned between the plurality of lenses 1143, but is also formed on predetermined regions of the lower surface of the substrate 1141.

As described above, due to a structure in which the resins 1144 are formed on both of the upper surface and the lower surface of the substrate 1141, directions of warpage of the entire lens array substrate 1121 can be offset by each other.

On the other hand, in the lens array substrate 1041 illustrated in FIG. 39 as Comparative Structure Example 2, the thin layer of resin 1054 is formed over the entire upper surface of the substrate 1051 positioned between the plurality of lenses 1053, but is not formed at all on a lower surface of the substrate 1051.

Therefore, in the lens array substrate 1121 of FIG. 43, it is possible to provide a lens array substrate of which an amount of warpage is reduced as compared with the lens array substrate 1041 of FIG. 39.

Comparative Structure Example 5

Figure 45:
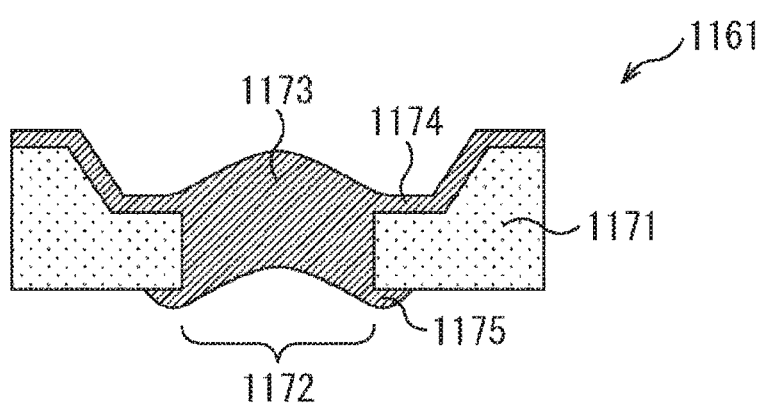
FIG. 45 is a cross-sectional view of a lens array substrate as Comparative Structure Example 5.

FIG. 45 is a cross-sectional view of a lens array substrate which is a fifth substrate structure (hereinafter, referred to as Comparative Structure Example 5) for comparing with the present structure and is disclosed as FIGS. 9A, 9B, 9C, 9D, 9E, 9F, 9G, and 9H in Comparative Document 2 described above.

A lens array substrate 1161 of FIG. 45 is different from the lens array substrate 1041 illustrated in FIG. 39 in that a resin protruding region 1175 is provided on a back surface of a substrate 1171 in the vicinity of a through-hole 1172 formed in the substrate 1171. The other configurations of the lens array substrate 1161 are similar to those of the lens array substrate 1041 illustrated in FIG. 39.

Note that FIG. 45 illustrates a state of the lens array substrate 1161 after being singulated.

The lens array substrate 1161 is characterized in that (1) resins 1174 formed at positions of the through-holes 1172 of the substrate 1171 become the lenses 1173, such that a plurality of lenses 1173 is formed in the substrate 1171, and (2) a thin layer of the resin 1174 is formed not only over the entire upper surface of the substrate 1171 positioned between the plurality of lenses 1173, but also on parts of a lower surface of the substrate 1171.

Action Brought About by Resin in Comparative Structure Example 5

In Comparative Document 2 in which the lens array substrate 1161 of FIG. 45, which is Comparative Structure Example 5, is disclosed, the following is disclosed as an action of the resin 1174 which becomes the lens 1173.

Also in the lens array substrate 1161 of FIG. 45, which is Comparative Structure Example 5, a photocurable resin, which is an example of an energy curable resin, is used as the resin 1174. Then, when the resin 1174 is irradiated with UV light, the resin 1174 is cured. Due to this curing, curing shrinkage occurs in the resin 1174, similar to Comparative Structure Examples 2 and 3.

However, in the lens array substrate 1171 of Comparative Structure Example 5, a thin layer (the resin protruding region 1175) of the resin 1174 is not only formed over the entire upper surface of the substrate 1171 positioned between the plurality of lenses 1173, but is also formed on predetermined regions of the lower surface of the substrate 1171. With this arrangement, directions of warpage of the entire lens array substrate 1171 are offset by each other, such that it is possible to provide a lens array substrate of which an amount of warpage is reduced.

Comparison Between Actions Brought about by Resin in Comparative Structure Examples 2 to 5

The actions brought about by the resins in Comparative Structure Examples 2 to 5 are summarized as follows.

(1) In a case of a structure in which a layer of a resin is arranged over the entire upper surface of the lens array substrate as in Comparative Structure Examples 2 and 3, warpage occurs in the substrate in which the plurality of lenses is arranged.

Figure 46A:
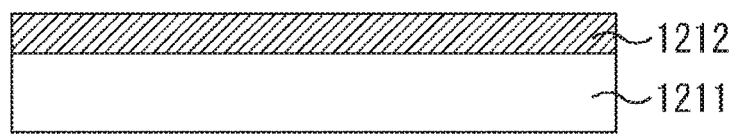
FIGS. 46A, 46B, and 46C are views for describing an action brought about by a resin constituting a lens.
Figure 46B:
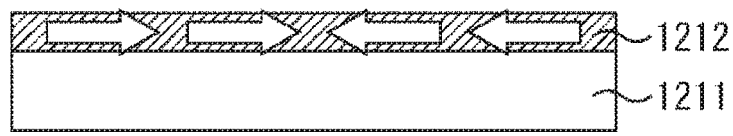
Figure 46C:
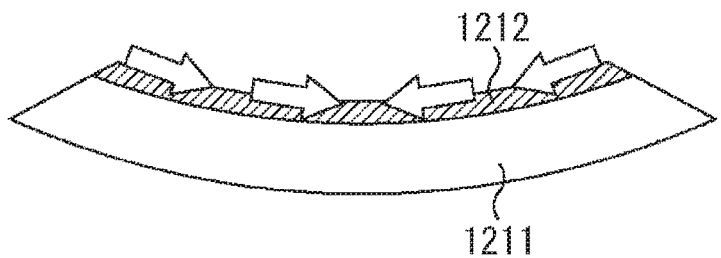

FIGS. 46A, 46B, and 46C are views schematically illustrating a structure in which a layer of a resin is arranged over the entire upper surface of a lens array substrate as in Comparative Structure Examples 2 and 3, and is a view for describing an action brought about by the resin that becomes a lens.

As illustrated in FIGS. 46A and 46B, curing shrinkage occurs in a layer of a photocurable resin 1212 arranged on an upper surface of a lens array substrate 1211 (of which illustration of lenses and through-holes is omitted), by irradiation of UV light for curing the photocurable resin. As a result, a force in a shrinkage direction caused by the photocurable resin 1212 is generated in the layer of the photocurable resin 1212.

On the other hand, the lens array substrate 1211 itself neither shrinks nor expands even though the UV light is irradiated. In other words, a force caused by the substrate is not generated on the lens array substrate 1211 itself. As a result, as illustrated in FIGS. 46A, 46B, and 46C, the lens array substrate 1211 warps in a downward convex shape.

(2) However, in a case of a structure in which the layers of the resins are arranged on both of the upper surface and the lower surface of the lens array substrate as in Comparative Structure Examples 4 and 5, directions of warpage of the lens array substrate are offset by each other, and an amount of warpage of the lens array substrate can be made smaller than that in Comparative Structure Examples 2 and 3.

Figure 47A:
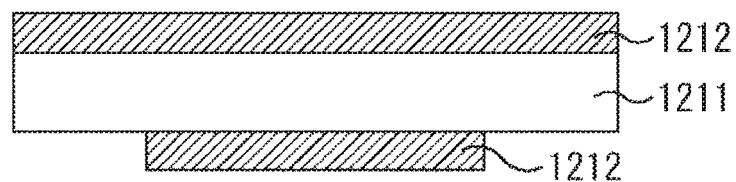
FIGS. 47A, 47B, and 47C are views for describing an action brought about by a resin constituting a lens.
Figure 47B:
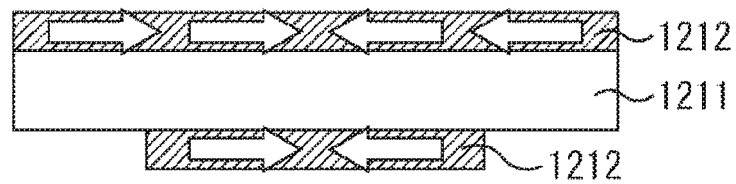
Figure 47C:
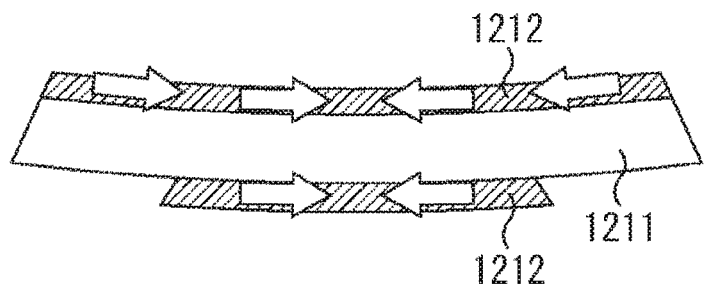

FIGS. 47A, 47B, and 47C are views schematically illustrating a structure in which layers of resins are arranged on both of an upper surface and a lower surface of a lens array substrate as in Comparative Structure Examples 4 and 5, and is a view for describing an action brought about by the resin that becomes a lens.

As illustrated in FIGS. 47A and 47B, curing shrinkage occurs in a layer of a photocurable resin 1212 arranged on an upper surface of a lens array substrate 1211, by irradiation of UV light for curing the photocurable resin. As a result, a force in a shrinkage direction caused by the photocurable resin 1212 is generated in the layer of the photocurable resin 1212 arranged on the upper surface of the lens array substrate 1211. Therefore, a force allowing the lens array substrate 1211 to warp in a downward convex shape acts on an upper surface side of the lens array substrate 1211.

On the other hand, the lens array substrate 1211 itself neither shrinks nor expands even though the UV light is irradiated. In other words, a force caused by the substrate is not generated on the lens array substrate 1211 itself.

Meanwhile, curing shrinkage occurs in a layer of a photocurable resin 1212 arranged on a lower surface of the lens array substrate 1211, by irradiation of UV light for curing the photocurable resin. As a result, a force in a shrinkage direction caused by the photocurable resin 1212 is generated in the layer of the photocurable resin 1212 arranged on the lower surface of the lens array substrate 1211. Therefore, a force allowing the lens array substrate 1211 to warp in an upward convex shape acts on a lower surface side of the lens array substrate 1211.

The force allowing the lens array substrate 1211 to warp in the downward convex shape acts on the upper surface side of the lens array substrate 1211 and the force allowing the lens array substrate 1211 to warp in the upward convex shape acts on the lower surface side of the lens array substrate 1211 act to be offset by each other.

As a result, as illustrated in FIG. 47C, a warpage amount of the lens array substrate 1211 in Comparative Structure Examples 4 and 5 is reduced more than that in Comparative Structure Examples 2 and 3 illustrated in FIG. 46C.

As described above, the force allowing the lens array substrate to warp and the warpage amount of the lens array substrate are affected by a relative relationship between (1) a direction and a magnitude of the force acting on the lens array substrate on the upper surface of the lens array substrate and (2) a direction and a magnitude of the force acting on the lens array substrate on the lower surface of the lens array substrate.

Comparative Structure Example 6

Figure 48A:
FIGS. 48A, 48B, and 48C are views schematically illustrating a lens array substrate as Comparative Structure Example 6.

By the way, for example, as illustrated in FIG. 48A, a lens array substrate structure in which a layer and an area of a photocurable resin 1212 arranged on an upper surface of a lens array substrate 1211 and a layer and an area of a photocurable resin 1212 arranged on a lower surface of the lens array substrate 1211 are the same as each other can be considered. This lens array substrate structure is referred to as a sixth substrate structure (hereinafter, referred to as Comparative Structure Example 6) for comparing with the present structure.

In Comparative Structure Example 6, a force in a shrinkage direction caused by the photocurable resin 1212 is generated in a layer of the photocurable resin 1212 arranged on the upper surface of the lens array substrate 1211. A force caused by the substrate is not generated on the lens array substrate 1211 itself. Therefore, a force allowing the lens array substrate 1211 to warp in a downward convex shape acts on an upper surface side of the lens array substrate 1211.

Meanwhile, a force in a shrinkage direction caused by the photocurable resin 1212 is generated in a layer of the photocurable resin 1212 arranged on the lower surface of the lens array substrate 1211. A force caused by the substrate is not generated on the lens array substrate 1211 itself. Therefore, a force allowing the lens array substrate 1211 to warp in an upward convex shape acts on a lower surface side of the lens array substrate 1211.

The above two forces allowing the lens array substrate 1211 to warp act in directions in which they are further offset by each other as compared with the structure illustrated in FIG. 47A. As a result, the force allowing the lens array substrate 1211 to warp and a warpage amount of the lens array substrate 1211 are further reduced as compared with Comparative Structure Examples 4 and 5.

Comparative Structure Example 7

By the way, in fact, all of the shapes of the substrates with lenses constituting the stacked lens structure incorporated into the camera module are not the same as each other. More specifically, the plurality of substrates with lenses constituting the stacked lens structure may have, for example, a difference in a thickness thereof or a size of the through-hole thereof or may have a difference in a thickness, a shape, a volume, or the like, of the lens formed in the through-hole. Further, film thicknesses or the like of the photocurable resins formed on the upper surface and the lower surface of the substrate with lenses may be different between the respective substrates with lenses.

Figure 48B:
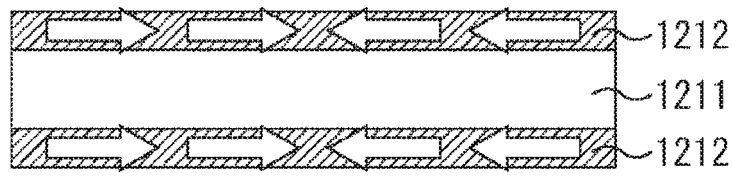
Figure 48C:
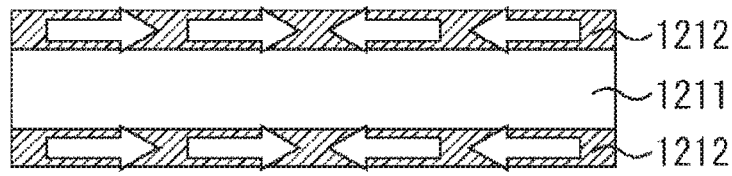
Figure 49:
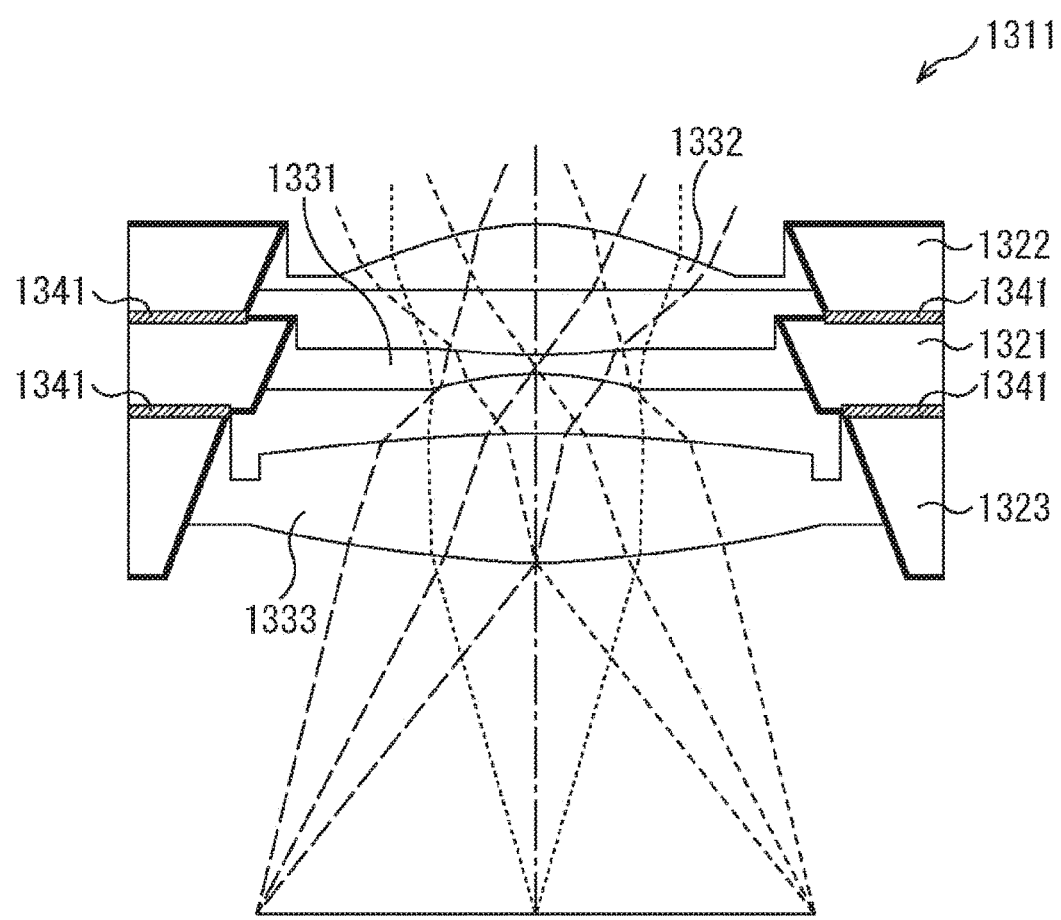
FIG. 49 is a cross-sectional view of a stacked lens structure as Comparative Structure Example 7.

FIG. 49 is a cross-sectional view of a stacked lens structure configured by stacking three substrates with lenses as a seventh substrate structure (hereinafter, referred to as Comparative Structure Example 7). In this stacked lens structure, similar to Comparative Structure Example 6 illustrated in FIGS. 48A, 48B, and 48C, it is assumed that layers and areas of photocurable resins arranged on an upper surface and a lower surface of each substrate with lenses are the same as each other.

A stacked lens structure 1311 illustrated in FIG. 49 includes three substrates 1321 to 1323 with lenses.

Hereinafter, the middle substrate 1321 with lenses among the three substrates 1321 to 1323 with lenses is referred to as a first substrate 1321 with lenses, the uppermost substrate 1322 with lenses among the three substrates 1321 to 1323 with lenses is referred to a second substrate 1322 with lenses, and the lowermost substrate 1323 with lenses among the three substrates 1321 to 1323 with lenses is referred to a third substrate 1323 with lenses.

The second substrate 1322 with lenses arranged at the uppermost layer and the third substrate 1323 with lenses arranged at the lowermost layer are different from each other in a thickness thereof and a thickness of the lens.

More specifically, the lenses are formed to have a greater thickness in the third substrate 1323 with lenses than in the second substrate 1322 with lenses, and accordingly, the third substrate 1323 with lenses is formed to have a greater thickness than that of the second substrate 1322 with lenses.

Resins 1341 are formed over the entirety of a contact surface between the first substrate 1321 with lenses and the second substrate 1322 with lenses and a contact surface between the first substrate 1321 with lenses and the third substrate 1323 with lenses.

A cross-sectional shape of each of through-holes of the three substrates 1321 to 1323 with lenses is a so-called fan shape in which a lower surface of each of the substrates is wider than an upper surface of each of the substrates.

An action brought about by the three substrates 1321 to 1323 with lenses having different shapes will be described with reference to FIGS. 50A, 50B, 50C, and 50D.

Figure 50A:
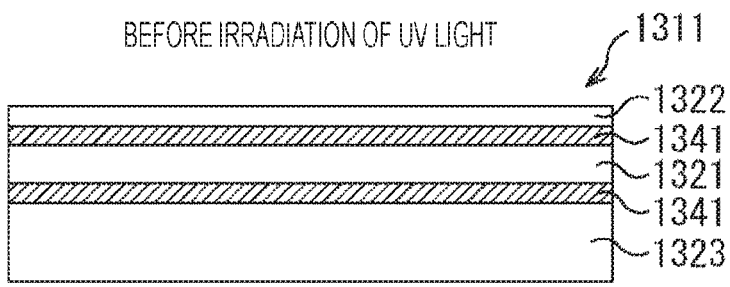
FIGS. 50A, 50B, 50C, and 50D are views for describing an action brought about by the stacked lens structure of FIG. 49.
Figure 50B:
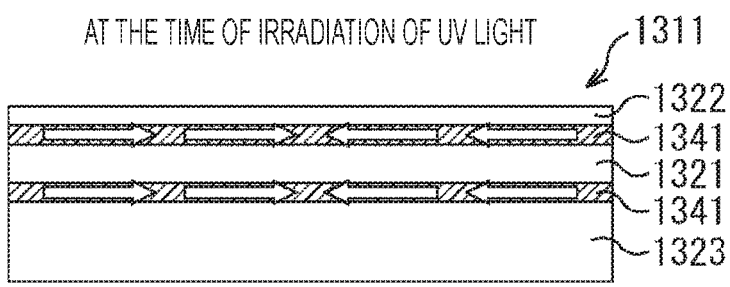
Figure 50C:
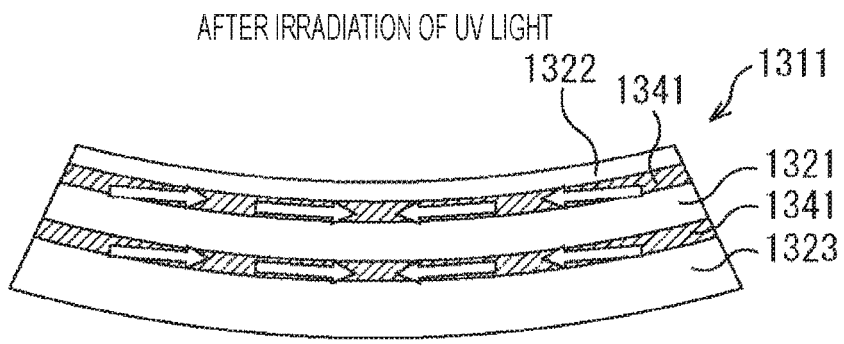

FIGS. 50A, 50B, and 50C are views schematically illustrating the stacked lens structure 1311 illustrated in FIG. 49.

When the second substrate 1322 with lenses and the third substrate 1323 with lenses having different thicknesses are arranged on the upper surface and the lower surface of the first substrate 1321 with lenses, respectively, as in the stacked lens structure 1311, a force allowing the stacked lens structure 1311 to wrap and a warpage amount of the stacked lens structure 1311 are changed depending on positions at which layers of the resins 1341 existing over the entirety of the contact surfaces between the three substrates 1321 to 1323 with lenses exist in a thickness direction of the stacked lens structure 1311.

When the layers of the resins 1341 existing over the entirety of the contact surfaces between the three substrates 1321 to 1323 with lenses are not arranged to be symmetrical to each other with respect to the center line of the stacked lens structure 1311, that is, a line passing through the middle point of the stacked lens structure 1311 in the thickness direction of the stacked lens structure 1311 and moving in a substrate plane direction, actions of forces generated by curing shrinkage of the resins 1341 arranged on the upper surface and the lower surface of the first substrate 1321 with lenses cannot be completely offset by each other as illustrated in FIG. 48C. As a result, the stacked lens structure 1311 warps in either direction.

For example, in a case where the resins 1341 of two layers arranged on the upper surface and the lower surface of the first substrate 1321 with lenses are arranged to deviate upward from the center line of the stacked lens structure 1311 in the thickness direction of the stacked lens structure 1311, when the resins 1341 of the two layers causes curing shrinkage, the stacked lens structure 1311 warps in a downward convex shape, as illustrated in FIG. 50C.

Moreover, in a case where a cross-sectional shape of a through-hole of a substrate, having a smaller thickness, of the second substrate 1322 with lenses and the third substrate 1323 with lenses, is a shape in which the through-hole becomes larger toward the first substrate 1321 with lenses, it is likely that the lens will be lost or damaged.

Figure 50D:
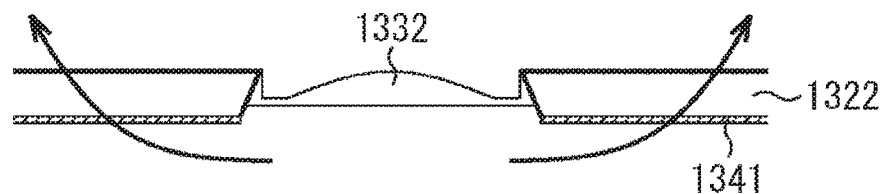

In the example illustrated in FIG. 49, a cross-sectional shape of a through-hole of the second substrate 1322 with lenses, having the smaller thickness, of the second substrate 1322 with lenses and the third substrate 1323 with lenses is a fan shape in which the through-hole becomes larger toward the first substrate 1321 with lenses. In such a shape, when the resins 1341 of the two layers arranged on the upper surface and the lower surface of the first substrate 1321 with lenses are cured and shrunk, a force allowing the stacked lens structure 1311 to warp in a downward convex shape as illustrated in FIG. 50C acts on the stacked lens structure 1311, and this force acts as a force in a direction in which the lens and the substrate are separated from each other in the second substrate 1322 with lenses, as illustrated in FIG. 50D. Due to this action, it is likely that that the lens 1332 of the second substrate 1322 with lenses will be lost or damaged.

Next, a case where the resin thermally expands is considered.

Comparative Structure Example 8

Figure 51:
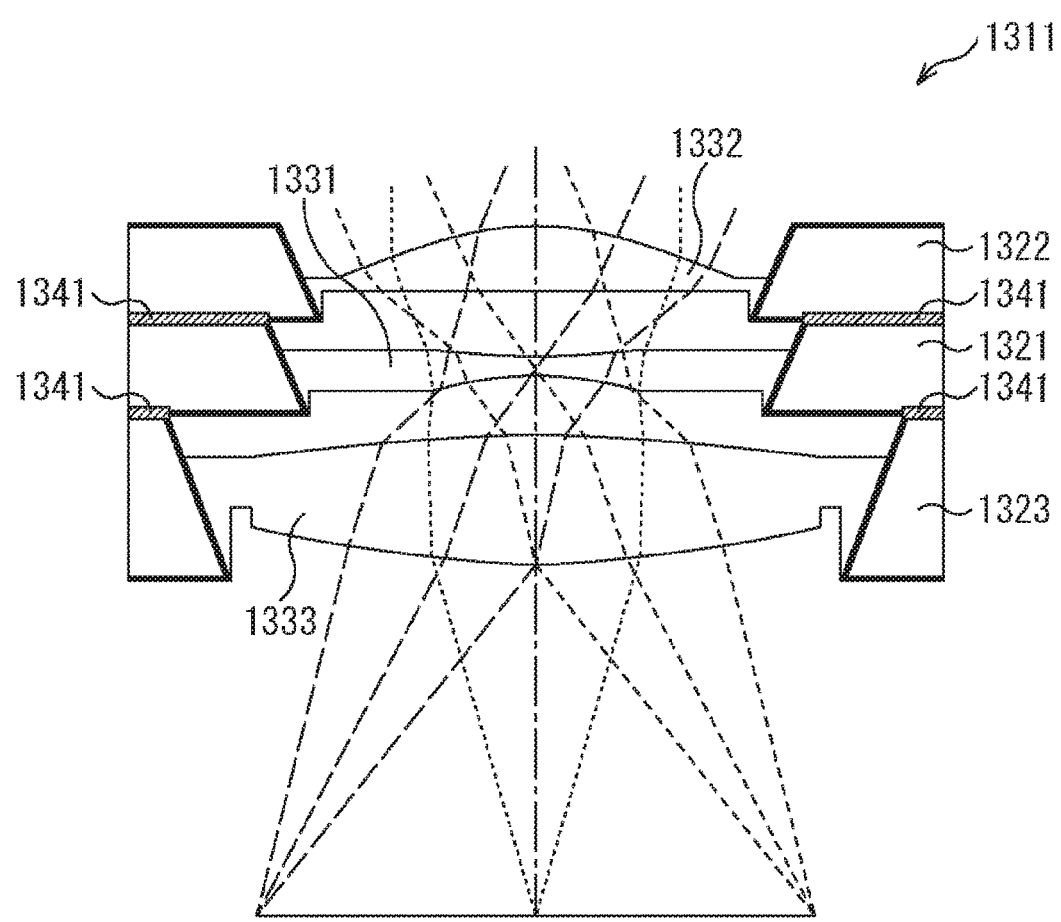
FIG. 51 is a cross-sectional view of a stacked lens structure as Comparative Structure Example 8.

FIG. 51 is a cross-sectional view of a stacked lens structure configured by stacking three substrates with lenses as an eighth substrate structure (hereinafter, referred to as Comparative Structure Example 8). In this stacked lens structure, similar to Comparative Structure Example 6 illustrated in FIGS. 48A, 48B, and 48C, it is assumed that layers and areas of photocurable resins arranged on an upper surface and a lower surface of each substrate with lenses are the same as each other.

Comparative Structure Example 8 of FIG. 51 is different from Comparative Structure Example 7 of FIG. 49 only in that a cross-sectional shape of each of through-holes of three substrates 1321 to 1323 with lenses is a so-called downward tapered shape in which a lower surface of the substrate is narrower than an upper surface of the substrate.

Figure 52A:
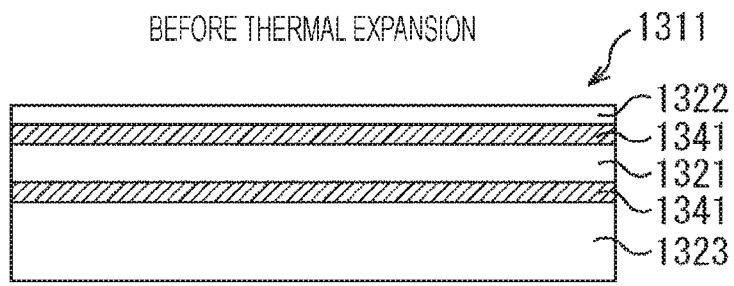
FIGS. 52A, 52B, 52C, and 52D are views for describing an action brought about by the stacked lens structure of FIG. 51.
Figure 52B:
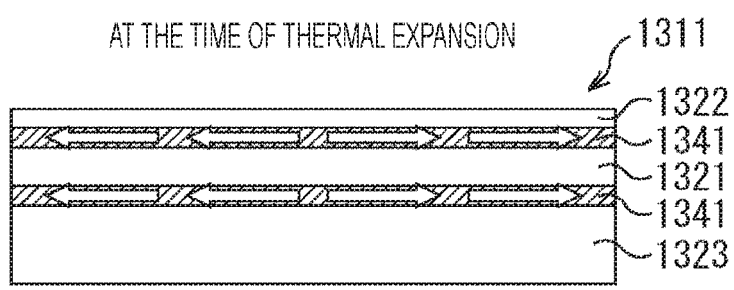
Figure 52C:
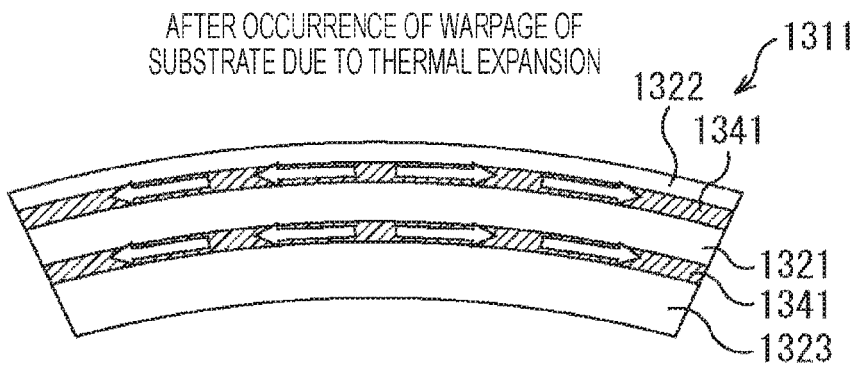

FIGS. 52A, 52B, and 52C are views schematically illustrating the stacked lens structure 1311 illustrated in FIG. 51.

When a user actually uses a camera module, a temperature in a housing of a camera rises due to an increase in power consumption according to an operation, such that a temperature of the camera module also rises. Due to this temperature rise, in the stacked lens structure 1311 of FIG. 51, resins 1341 arranged on an upper surface and a lower surface of a first substrate 1321 with lenses, respectively, thermally expands.

Even though areas and thicknesses of the resins 1341 arranged on the upper surface and the lower surface of the first substrate 1321 with lenses are the same as each other as in FIG. 48A, when layers of the resins 1341 existing over the entirety of contact surfaces between the three substrates 1321 to 1323 with lenses are not arranged to be symmetrical to each other with respect to the center line of the stacked lens structure 1311, that is, a line passing through the middle point of the stacked lens structure 1311 in the thickness direction of the stacked lens structure 1311 and moving in the substrate plane direction, actions of forces generated by the thermal expansion of the resins 1341 arranged on the upper surface and the lower surface of the first substrate 1321 with lenses cannot be completely offset by each other as illustrated in FIG. 48C. As a result, the stacked lens structure 1311 warps in either direction.

For example, in a case where the resins 1341 of two layers arranged on the upper surface and the lower surface of the first substrate 1321 with lenses are arranged to deviate upward from the center line of the stacked lens structure 1311 in the thickness direction of the stacked lens structure 1311, when the resins 1341 of the two layers cause the thermal expansion, the stacked lens structure 1311 warps in an upward convex shape, as illustrated in FIG. 52C.

Figure 52D:
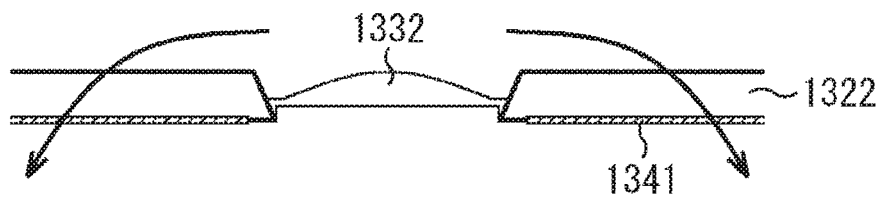

Moreover, in the example illustrated in FIG. 51, a cross-sectional shape of a through-hole of a second substrate 1322 with lenses, having a smaller thickness, of the second substrate 1322 with lenses and a third substrate 1323 with lenses is a downward tapered shape in which the through-hole becomes smaller toward the first substrate 1321 with lenses. In such a shape, when the resins 1341 of the two layers arranged on the upper surface and the lower surface of the first substrate 1321 with lenses are cured and shrunk, a force allowing the stacked lens structure 1311 to warp in an upward convex shape acts on the stacked lens structure 1311, and this force acts as a force in a direction in which the lens and the substrate are separated from each other in the second substrate 1322 with lenses, as illustrated in of FIG. 52D. Due to this action, it is likely that that the lens 1332 of the second substrate 1322 with lenses will be lost or damaged.

<Present Structure>

Figure 53A:
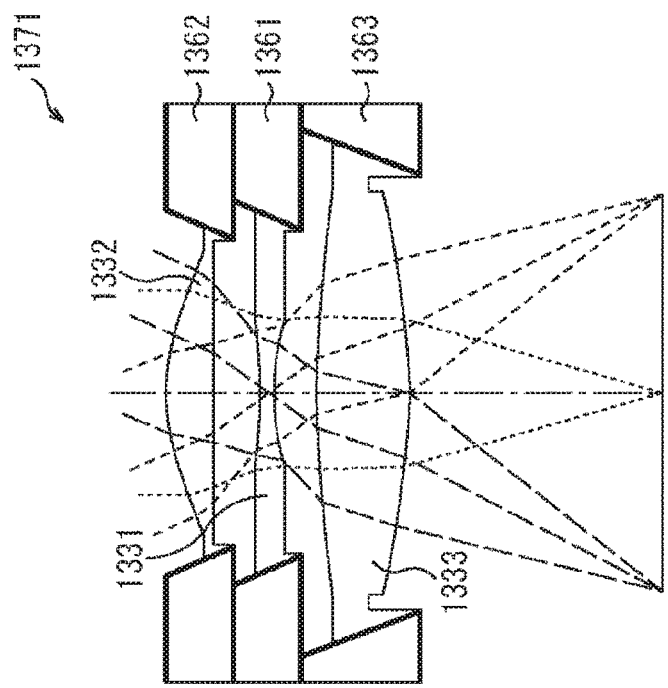
FIGS. 53A and 53B is a are cross-sectional views of a stacked lens structure in which the present structure is adopted.
Figure 53B:
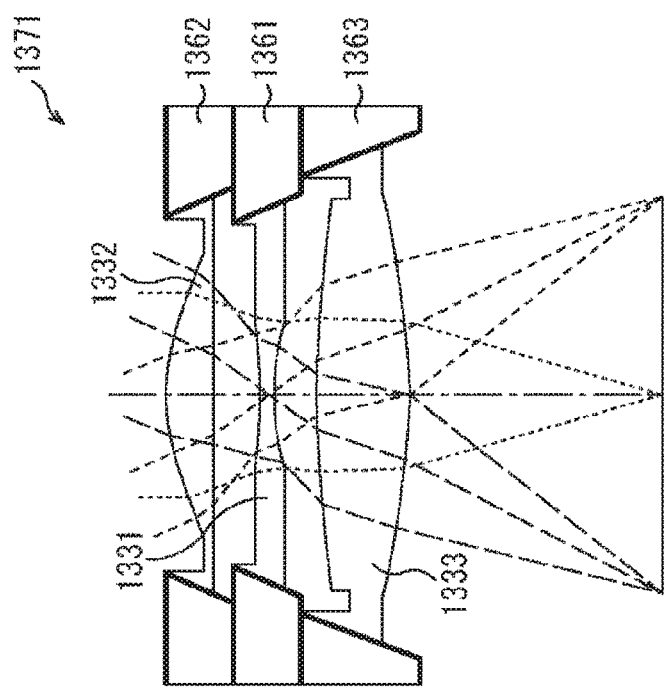

FIGS. 53A and 53B are views illustrating a stacked lens structure 1371 including three substrates 1361 to 1363 with lenses in which the present structure is adopted.

FIG. 53A is a structure corresponding to the stacked lens structure 1311 of FIG. 49, and a cross-sectional shape of a through-hole is a structure having a so-called fan shape. On the other hand, FIG. 53B is a structure corresponding to the stacked lens structure 1311 of FIG. 51, and a cross-sectional shape of a through-hole is a structure having a so-called downward tapered shape.

Figure 54A:
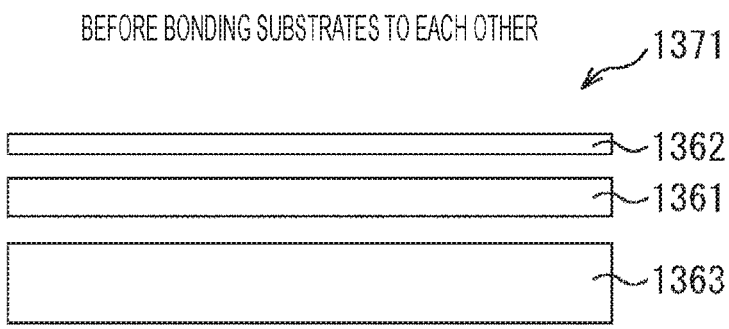
FIGS. 54A, 54B, and 54C are views schematically illustrating the stacked lens structure of FIGS. 53A and 53B.
Figure 54B:
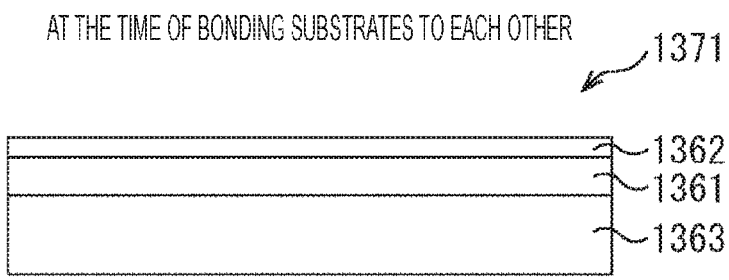
Figure 54C:
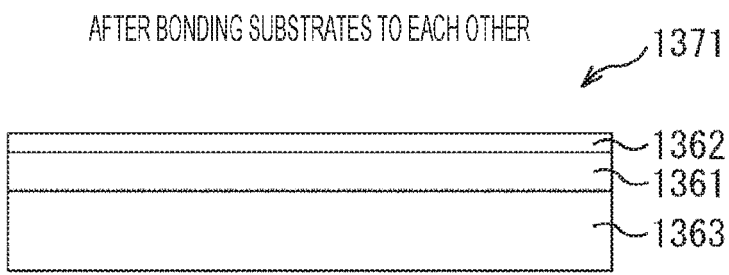

FIGS. 54A, 54B, and 54C are views schematically illustrating the stacked lens structure 1371 of FIGS. 53A and 53B in order to describe an action brought about by the present structure.

The stacked lens structure 1371 is a structure in which a second substrate 1362 with lenses is arranged above a first substrate 1361 with lenses arranged in the middle and a third substrate 1363 with lenses is arranged below the first substrate 1361 with lenses.

The second substrate 1362 with lenses arranged at the uppermost layer and the third substrate 1363 with lenses arranged at the lowermost layer are different from each other in a thickness thereof and a thickness of the lens. More specifically, the lenses are formed have a greater thickness in the third substrate 1363 with lenses than in the second substrate 1362 with lenses, and accordingly, the third substrate 1363 with lenses is formed to have a greater thickness than that of the second substrate 1362 with lenses.

In the stacked lens structure 1371 of the present structure, direct bonding between the substrates with lenses is used as means of fixing the substrates with lenses. In other words, plasma activation treatment is performed on the substrates with lenses that are fixed, such that the two substrates with lenses that are fixed are plasma-bonded to each other. In other words, a silicon oxide film is formed on a surface of each of the two substrates with lenses that are stacked, and hydroxyl groups are bonded to the silicon oxide film, the two substrates with lenses are then stuck to each other, rise in temperature, and are dehydrated and condensed. Therefore, the two substrates with lenses are directly bonded to each other by silicon-oxygen covalent bonds.

Therefore, in the stacked lens structure 1371 of the present structure, adhesion by a resin is not used as means of fixing the substrates with lenses. Therefore, the resin for forming a lens or a resin for adhering the substrates with lenses to each other is not arranged between the substrate with lenses and the substrate with lenses. Furthermore, since the resin is not arranged on the upper surface or the lower surface of the substrate with lenses, the resin does not thermally expand or is not cured and shrunk on the upper surface or the lower surface of the substrate with lenses.

Therefore, in the stacked lens structure 1371, even though the second substrate 1362 with lenses and the third substrate 1363 with lenses having different lens thicknesses and different substrate thicknesses are arranged on an upper layer and a lower layer of the first substrate 1351 with lenses, respectively, the warpage of the substrate due to the curing shrinkage of the resin and the warpage of the substrate due to the thermal expansion of the resin as in Comparative Structure Examples 1 to 8 described above do not occur.

In other words, in the present structure in which the substrates with lenses are fixed by the direct bonding, even in a case where the substrates with lenses having different lens thicknesses and different substrate thicknesses are stacked at an upper side and a lower side of the present structure, respectively, an action and an effect that the warpage of the substrate can be significantly suppressed as compared with Comparative Structure Examples 1 to 8 described above are brought about.

16. Various Modified Examples

Other modified examples of each of the embodiments described above will be described below.

<16.1 Cover Glass with Optical Diaphragm>

In order to protect a surface of a lens 21 of a stacked lens structure 11, a cover glass may be provided on the stacked lens structure 11. In this case, the cover glass can have a function of an optical diaphragm.

Figure 55:
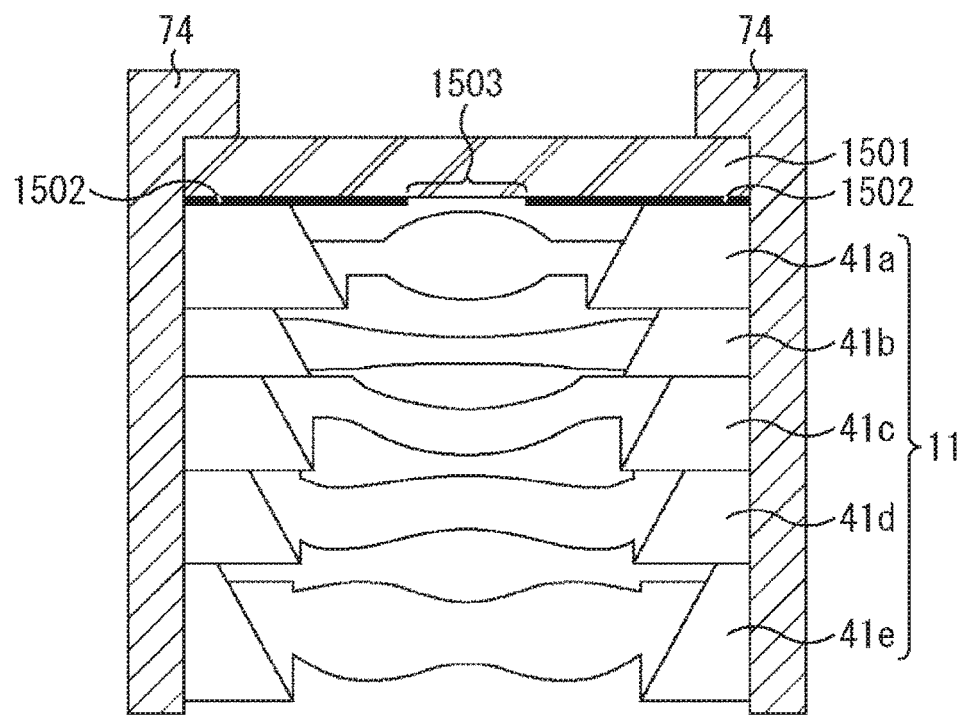
FIG. 55 is a view illustrating a first configuration example in which a diaphragm is added to a cover glass.

FIG. 55 is a view illustrating a first configuration example in which a cover glass has a function of an optical diaphragm.

In the first configuration example illustrated in FIG. 55 in which the cover glass has the function of the optical diaphragm, a cover glass 1501 is further stacked on the stacked lens structure 11. Then, a lens barrel 74 is arranged outside the stacked lens structure 11 and the cover glass 1501.

A light shielding film 1502 is formed on a surface of the cover glass 1501 (a lower surface of the cover glass 1501 in FIG. 55) adjacent to a substrate 41a with lenses. Here, a predetermined range from the lens center (optical center) of each of the substrates 41a to 41e with lenses is an opening 1503 in which the light shielding film 1502 is not formed, and the opening 1503 functions as an optical diaphragm. With this arrangement, for example, the diaphragm plate 51 provided in the camera module 1D or the like in FIG. 13 is omitted.

Figure 56A:
FIGS. 56A and 56B are views for describing a method of manufacturing the cover glass of FIG. 55.
Figure 56B:

FIGS. 56A and 56B are views for describing a method of manufacturing the cover glass 1501 on which the light shielding film 1502 is formed.

First, as illustrated in FIG. 56A, for example, a light absorbing material is applied over the entirety of one surface of a cover glass (glass substrate) 1501W having a form of a wafer or a panel by spin-coating, such that the light shielding film 1502 is formed. As the light absorbing material used as the light shielding film 1502, for example, a resin containing a carbon black pigment or a titanium black pigment and having a light absorbing property is used.

Next, predetermined regions of the light shielding film 1502 are removed by a lithography technology or etching treatment, such that a plurality of openings 1503 is formed at predetermined intervals, as illustrated in FIG. 56B. An arrangement of the openings 1503 corresponds to an arrangement of the through-holes 83 of the carrier substrate 81W of FIGS. 23A, 23B, 23C, 23D, 23E, 23F, and 23G on a one-to-one basis. Note that as an example of another method for forming the light shielding film 1502 and an aperture 1503, a method of jetting a light absorbing material that becomes the light shielding film 1502 to regions excluding the opening 1503 by inkjet can be used.

The cover glass 1501W in a substrate state manufactured in this manner and a plurality of substrates 41W with lenses in a substrate state is stuck to each other, and are then singulated by dicing or the like using a blade, a laser beam or the like. As a result, the stacked lens structure 11 in which the cover glass 1501 having the function of the diaphragm illustrated in FIG. 55 is stacked is completed.

As described above, by forming the cover glass 1501 as one process of semiconductor processes, it is possible to suppress generation of a waste defect, which there is a possibility in a case of forming the cover glass in another assembly process.

According to the first configuration example illustrated in FIG. 55, since the optical diaphragm is formed by the applying, the light shielding film 1502 can be formed at a thin film thickness of about 1 μm, and a diaphragm mechanism has a predetermined thickness, such that it is possible to suppress deterioration of optical performance (reduction in light in a peripheral portion) due to the shielding of incident light.

Note that in the example described above, the cover glass 1501W is singulated after being bonded to the plurality of substrates 41W with lenses, but may be singulated before being bonded to the plurality of substrates 41W with lenses. In other words, the bonding between the cover glass 1501 including the light shielding film 1502 and the five substrates 41a to 41e with lenses may be performed at a wafer level or may be performed at a chip level.

A surface of the light shielding film 1502 may be rough. In this case, since surface reflection of the surface of the cover glass 1501 on which the light shielding film 1502 is formed can be decreased and a surface area of the light shielding film 1502 can be increased, a bonding strength between the cover glass 1501 and the substrate 41 with lenses can be improved.

As a method of making the surface of the light shielding film 1502 a rough surface, there are, for example, a method of applying the light absorbing material that becomes the light shielding film 1502 and then performing rough surface processing on the light absorbing material by etching or the like, a method of forming the cover glass 1501 before the light absorbing material is applied on a rough surface and then applying the light absorbing material, a method of forming a film by the light absorbing material that is aggregated and then causing a ruggedness on the surface of the film, a method of forming a film by the light absorbing material containing a solid content and then causing a ruggedness on the surface of the film, and the like.

Furthermore, an antireflective film may be formed between the light shielding film 1502 and the cover glass 1501.

The cover glass 1501 is also used as a support substrate of the diaphragm, such that a size of the camera module 1 can be reduced.

Figure 57:
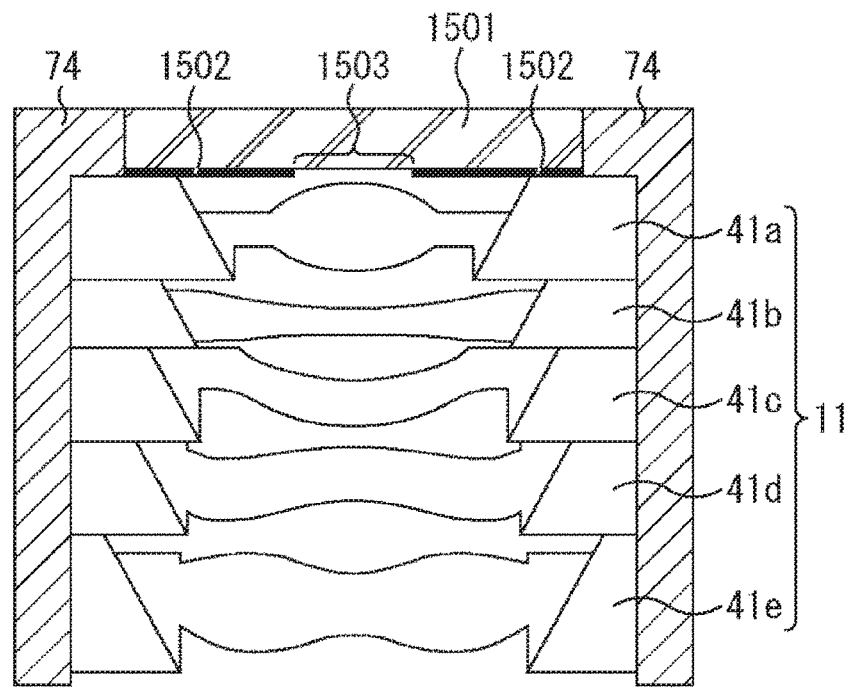
FIG. 57 is a view illustrating a second configuration example in which a diaphragm is added to a cover glass.

FIG. 57 is a view illustrating a second configuration example in which a cover glass has a function of an optical diaphragm.

In the second configuration example illustrated in FIG. 57 in which the cover glass has the function of the optical diaphragm, a cover glass 1501 is arranged at a position of an opening of the lens barrel 74. The other configurations are the same as those of the first configuration example illustrated in FIG. 55.

Figure 58:
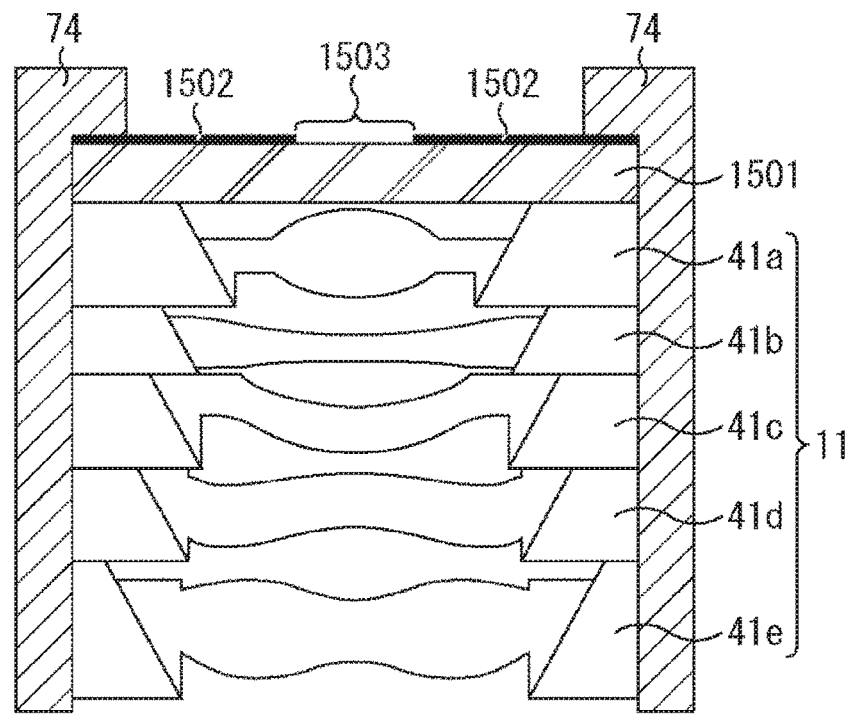
FIG. 58 is a view illustrating a third configuration example in which a diaphragm is added to a cover glass.

FIG. 58 is a view illustrating a third configuration example in which a cover glass has a function of an optical diaphragm.

In the third configuration example illustrated in FIG. 58 in which the cover glass has the function of the optical diaphragm, a light shielding film 1502 is formed on an upper surface of the cover glass 1501, in other words, on a side of the cover glass 1501 opposite to the substrate 41*a* with lenses. The other configurations are the same as those of the first configuration example illustrated in FIG. 55.

Note that also in the configuration illustrated in FIG. 57 in which the cover glass 1501 is arranged in the opening of the lens barrel 74, the light shielding film 1502 may be formed on the upper surface of the cover glass 1501.

<16.2 Formation of Diaphragm by Through-Hole>

Next, an example in which an opening itself of a through-hole 83 of a substrate 41 with lenses is used as a diaphragm mechanism instead of the diaphragm using the diaphragm plate 51 or the cover glass 1501 described above will be described.

Figure 59A:
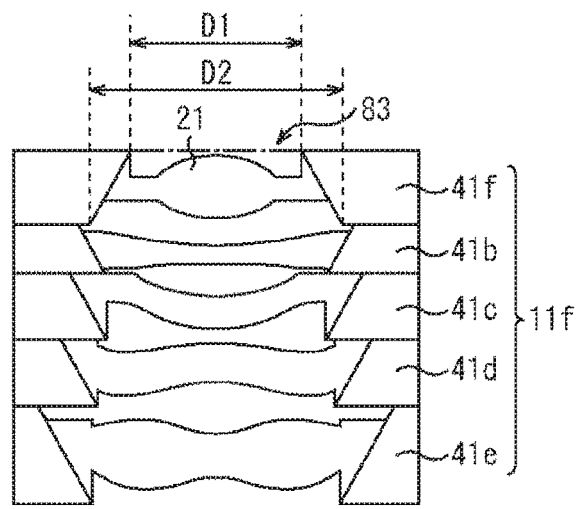
FIGS. 59A and 59B are views illustrating a configuration example in which an opening itself of a through-hole is used as a diaphragm mechanism.

FIG. 59A is a view illustrating a first configuration example in which an opening itself of a through-hole 83 is used as a diaphragm mechanism.

Note that in a description of FIGS. 59A, 59B, and 59C, only portions different from those of the stacked lens structure 11 illustrated in FIG. 58 will be described, and a description of the same portions as those of the stacked lens structure 11 illustrated in FIG. 58 will be appropriately omitted. Furthermore, in FIGS. 59A, 59B, and 59C, only reference numerals necessary for the description are illustrated in order to avoid complication of the drawing.

A stacked lens structure 11*f* illustrated in FIG. 59A has a configuration in which the substrate 41*a* with lenses positioned closest to a light incident side and farthest from the light receiving element 12 among the five substrates 41*a* to 41*e* with lenses constituting the stacked lens structure 11 illustrated in FIG. 58 is replaced by a substrate 41*f* with lenses.

Figure 59B:
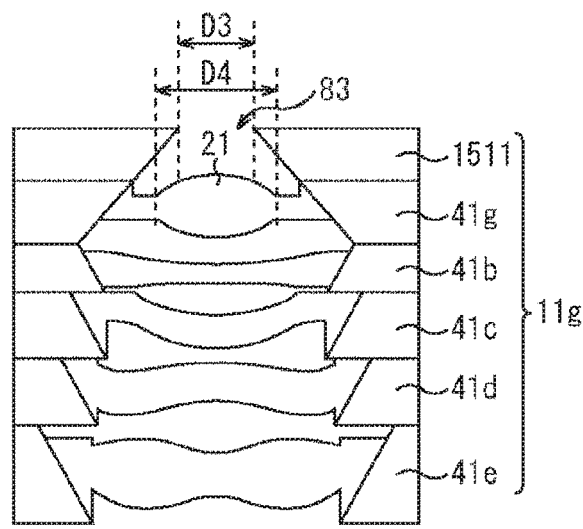
Figure 59C:
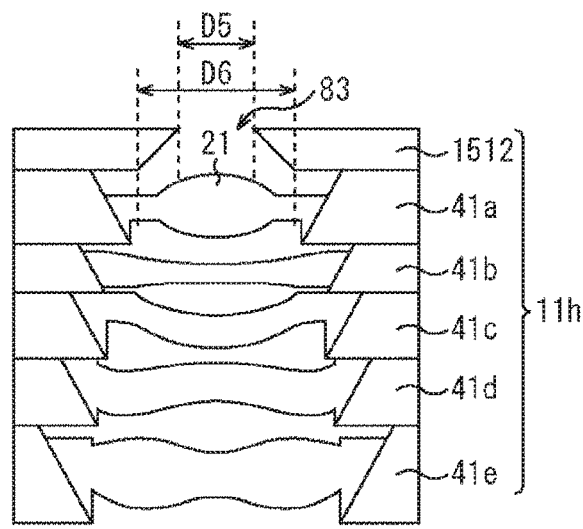

When comparing the substrate 41*f* with lenses with the substrate 41*a* with lenses of FIG. 58, in the substrate 41*a* with lenses of FIG. 58, a hole diameter of an upper surface is larger than that of a lower surface, while in the substrate 41*f* with lenses of FIGS. 59A, 59B, and 59C, a hole diameter D1 of an upper surface is smaller than a hole diameter D2 of a lower surface. In other words, a cross-sectional shape of a through-hole 83 of the substrate 41*f* with lenses is a so-called fan shape.

A height position of the outermost surface of a lens 21 formed in the through-hole 83 of the substrate 41*f* with lenses is lower than a position of the uppermost surface of the substrate 41*f* with lenses indicated by an alternate long and short dash line in FIG. 59A.

In the stacked lens structure 11*f*, a hole diameter on an light incident side of the through-hole 83 of the substrate 41*f* with lenses of the uppermost layer among the plurality of substrates 41 with lenses is smallest, such that a portion at which a hole diameter of the through hole 83 is smallest (a portion of the hole diameter D1) functions as an optical diaphragm limiting a beam of incident light.

FIG. 59B is a view illustrating a second configuration example in which an opening itself of a through-hole 83 is used as a diaphragm mechanism.

A stacked lens structure 11*g* illustrated in FIG. 59B has a configuration in which the substrate 41*a* with lenses of the uppermost layer among the five substrates 41*a* to 41*e* with lenses constituting the stacked lens structure 11 illustrated in FIG. 58 is also replaced by a substrate 41*g* with lenses. Then, the stacked lens structure 11*g* has a configuration in which a substrate 1511 is further stacked on the substrate 41*g* with lenses.

A hole diameter of a through-hole 83 of the substrate 41*g* with lenses has a fan shape in which it is smaller at an light incident side of the through-hole, similar to the substrate 41*f* with lenses illustrated in FIG. 59A. The substrate 1511 is a substrate that has a through-hole 83 but does not hold the lens 21. All of cross-sectional shapes of the through-holes 83 of the substrate 41*g* with lenses and the substrate 1511 are so-called fan shapes.

By stacking the substrate 1511 on the substrate 41*g* with lenses, a plane region on which incident light is incident is further narrowed than that of the substrate 41*f* with lenses of FIG. 59A. A hole diameter D3 of an upper surface of the substrate 1511 is configured to smaller than a diameter D4 of a curved surface portion (lens portion 91) of the lens 21. With this arrangement, the smallest portion (a portion of the hole diameter D3) of a hole diameter of the through-hole 83 of the substrate 1511 functions as an optical diaphragm limiting a beam of the incident light.

When a position of the optical diaphragm is as far as possible from a lens 21 of the uppermost surface in the stacked lens structure 11*g*, an exit pupil position can be separated to suppress shading.

As illustrated in FIG. 59B, by further stacking the substrate 1511 on five substrates 41*b* to 41*e* and 41*g* with lenses, a position of the optical diaphragm can be made significantly far from a lens 21 of the substrate 41*g* with lenses, which is the lens 21 of the uppermost surface in the stacked lens structure 11*g*, in an opposite direction to an incident direction of light, such that it is possible to suppress the shading.

FIG. 59C is a view illustrating a third configuration example in which an opening itself of a through-hole 83 is used as a diaphragm mechanism.

A stacked lens structure 11*h* illustrated in FIG. 59C has a configuration in which a substrate 1512 is further stacked on the substrate 41*a* with lenses among the five substrates 41*a* to 41*f* with lenses constituting the stacked lens structure 11 illustrated in FIG. 58.

The substrate 1512 is a substrate that has the through-hole 83 but does not hold the lens 21. A through-hole 83 of the substrate 1512 has a hole diameter different between the uppermost surface and the lowermost surface of the substrate 1512, and has a so-called fan shape in which a hole diameter D5 of an upper surface of the substrate 1512 is smaller than a hole diameter D5 of a lower surface of the substrate 1512. Furthermore, the hole diameter D5 of the uppermost surface of the substrate 1512 is configured to be smaller than a diameter of a curved surface portion (lens portion 91) of the lens 21. With this arrangement, the smallest portion (a portion of the hole diameter D5) of a hole diameter of the through-hole 83 functions as an optical diaphragm limiting a beam of the incident light. Note that as another example of a shape of the substrate 1512, a shape of the substrate 1512 may be a so-called downward tapered shape in which the hole diameter D5 of the upper surface of the substrate 1512 is larger than the hole diameter D5 of the lower surface of the substrate 1512.

Note that all of the examples FIGS. 59A, 59B, and 59C are examples in which the hole diameter of the through-hole 83 of the substrate 41*f* with lenses of the uppermost surface (a position farthest from the light receiving element 12) among the plurality of substrates 41 with lenses constituting the stacked lens structure 11 is configured as the optical diaphragm or the hole diameter of the through-hole 83 of the substrate 1511 or 1512 arranged in the uppermost layer is configured as the optical diaphragm.

However, a hole diameter of a through-hole 83 of any of the substrates 41*b* to 41*e* with lenses other than the uppermost surface among the plurality of substrates 41 with lenses constituting the stacked lens structure 11 may be configured as in the substrate 41f with lenses or the substrate 1511 or 1512 described above to be allowed to function as the optical diaphragm.

However, it is preferable in terms of suppressing the shading that the substrate 41 with lenses having the function of the optical diaphragm is arranged at the uppermost layer or a position as high as possible (position farthest from the light receiving element 12), as illustrated in FIGS. 59A, 59B, and 59C.

As described above, by allowing a predetermined one substrate 41 with lenses among the plurality of substrates 41 with lenses constituting the stacked lens structure 11 or the substrate 1511 or 1512 that does not hold the lens 21 to have the function of the optical diaphragm, it is possible to reduce sizes of the stacked lens structure 11 and the camera module 1.

By integrating the optical diaphragm with the substrate 41 with lenses holding the lens 21, position accuracy of a lens curved surface closest to the diaphragm having an influence on image formation performance and the optical diaphragm is improved, such that the image formation performance can be improved.

<16.3 Wafer Level Bonding by Metal Bonding>

In the embodiment described above, the substrates 41W with lenses in which the lenses 21 are formed in the through-holes 83 are bonded to each other by plasma bonding, but may be stuck to each other using metal bonding.

FIGS. 60A, 60B, 60C, 60D, and 60E are views for describing sticking at a wafer level using metal bonding.

Figure 60A:
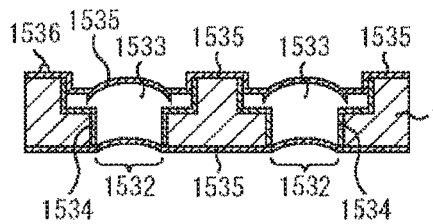
FIGS. 60A, 60B, 60C, 60D, and 60E are views for describing sticking at a wafer level using metal bonding.

First, as illustrated in FIG. 60A, a substrate 1531W-a with lenses in a substrate state in which lenses 1533 are formed in each of a plurality of formed through-holes 1532 is prepared, and antireflective films 1535 are formed on an upper surface and a lower surface of the substrate 1531W-a with lenses.

The substrate 1531W with lenses corresponds to the substrate 41W with lenses in the substrate state described above. Furthermore, the antireflective films 1535 correspond to the upper surface layer 122 and the lower surface layer 123 described above.

Here, a state where a foreign matter 1536 is mixed in a part of the antireflective film 1535 formed on the upper surface of the substrate 1531W-a with lenses is assumed. The upper surface of the substrate 1531W-a with lenses is a surface that is to be bonded to a substrate 1531W-b with lenses in a process of FIG. 60D as described later.

Figure 60B:
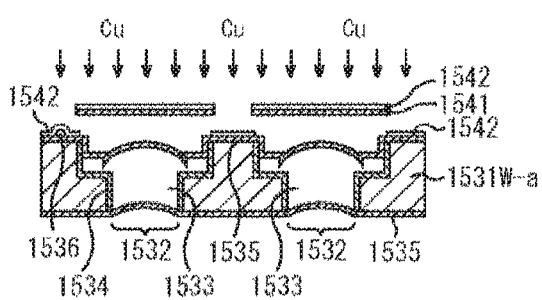

Next, as illustrated in FIG. 60B, a metal film 1542 is formed on the upper surface of the substrate 1531W-a with lenses that becomes a bonded surface with the substrate 1531W-b with lenses. In this case, portions of the through-holes 1532 in which the lenses 1533 are formed are masked using a metal mask 1541 so that the metal film 1542 is not formed.

Next, as illustrated in B of FIG. 60, a metal film 1542 is formed on the upper surface of the substrate 1531W-a with lenses that becomes a bonded surface with the substrate 1531W-b with lenses. In this case, portions of the through-holes 1532 in which the lenses 1533 are formed are masked using a metal mask 1541 so that the metal film 1542 is not formed.

As a material of the metal film 1542, for example, Cu, which is often used as metal bonding, can be used. As a method of forming the metal film 1542, a PVD method such as a deposition method, a sputtering method, or an ion plating method, capable of forming the metal film at a low temperature can be used.

Note that in addition to Cu, Ni, Co, Mn, Al, Sn, In, Ag, Zn, or the like, or alloy materials of two or more thereof may be used as the material of the metal film 1542. Furthermore, a material other than those exemplified may be used as the material of the metal film 1542 as long as it is a metal material that is easily plastically deformed.

As a method of forming the metal film 1542, for example, an inkjet method using metal nanoparticles such as silver particles may be used, in addition to the PVD method and a formation method by a metal mask.

Figure 60C:
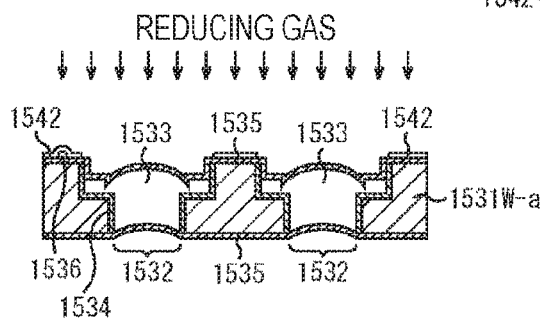

Next, as illustrated in FIG. 60C, as a pretreatment before bonding, a surface of the metal film 1542 is cleaned by removing an oxide film formed on the surface of the metal film 1542 at the time of being opened to the atmosphere using a reducing gas such as formic acid, a hydrogen gas, or a hydrogen radical.

As a method of cleaning the surface of the metal film 1542, in addition to the reducing gas, Ar ions in plasma may be made to be incident on the metal surface to physically remove the oxide film by a sputtering action.

A substrate 1531W-b with lenses, which is another substrate 1531W in a substrate state to be bonded, is prepared by processes similar to FIGS. 60A 60B, and 60C described above.

Figure 60D:
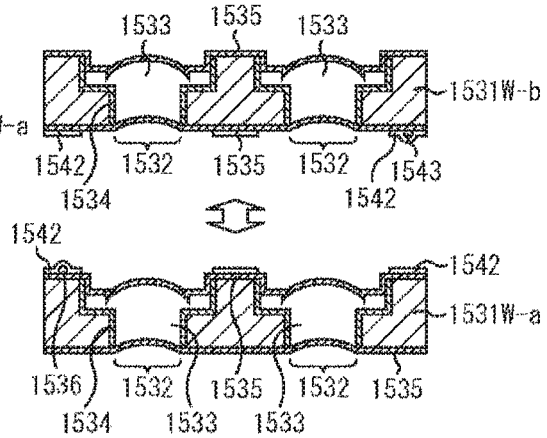

Then, as illustrated in FIG. 60D, when a bonded surface of the substrate 1531W-b with lenses and the bonded surface of the substrate 1531W-a with lenses are arranged to face each other, the substrate 1531W-b with lenses and the substrate 1531W-a with lenses are aligned with each other, and an appropriate pressure is then applied to the substrate 1531W-b with lenses and the substrate 1531W-a with lenses, the metal film 1542 of the substrate 1531W-a with lenses and the metal film 1542 of the substrate 1531W-b with lenses are bonded to each other by metal bonding.

Here, it is assumed that, for example, a foreign matter 1543 is also mixed in a lower surface of the substrate 1531W-b with lenses, which is the bonded surface of the substrate 1531W-b with lenses. However, even though the foreign matter 1536 or foreign matter 1543 exists, the metal material that is easily plastically deformed is used as the material of the metal film 1542, and the metal film 1542 is thus deformed, such that the substrate 1531W-a with lenses and the substrate 1531W-b with lenses are bonded to each other.

Figure 60E:
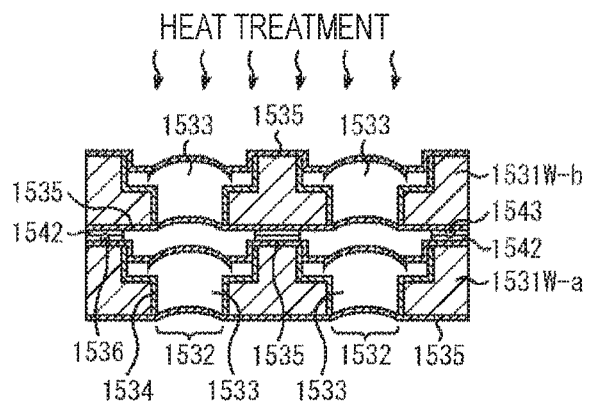

Finally, as illustrated in FIG. 60E, heat treatment is performed to promote interatomic bonding and crystallization of a metal and enhances a bonding strength. Note that this heat treatment process can be omitted.

In this manner, the substrates 1531W with lenses in which the lenses 1533 are formed in each of the plurality of through-holes 1532 can be stuck to each other using the metal bonding.

Note that a film that becomes an adhesion layer can be formed between the substrate 1531W-a with lenses and the metal film 1542 in order to obtain bonding between the substrate 1531W-a with lenses and the metal film 1542. In this case, the adhesion layer is formed on an upper side (outer side) of the antireflective film 1535, in other words, between the antireflective film 1535 and the metal film 1542. For example, Ti, Ta, W, or the like can be used as the adhesion layer. Alternatively, nitride or oxide such as Ti, Ta, or W or a stacked structure of nitride and oxide may be used. The same goes for bonding between the substrate 1531W-b with lenses and the metal film 1542.

Furthermore, a material of the metal film 1542 formed on the substrate 1531W-a with lenses and a material of the metal film 1542 formed on the substrate 1531W-b with lenses may be different metal materials.

By sticking the substrates 1531W with lenses in the substrate state to each other using the metal bonding having a low Young's modulus and easily plastically deformed, the metal films are deformed due to a pressing pressure even in a case where a foreign matter is present on the bonded surface, such that a contact area is obtained.

In a case where a plurality of substrates 1531W with lenses stuck to each other using the metal bonding is singulated to form a stacked lens structure 11 and the stacked lens structure is incorporated into the camera module 1 described above, the metal film 1542 can have an excellent sealing property to prevent inflow of light and moisture from a side surface, and it is thus possible to manufacture the stacked lens structure 11 and the camera module 1 having a high reliability.

<16.4 Substrate with Lenses Using Heavily Doped Substrate>

Figure 61A:
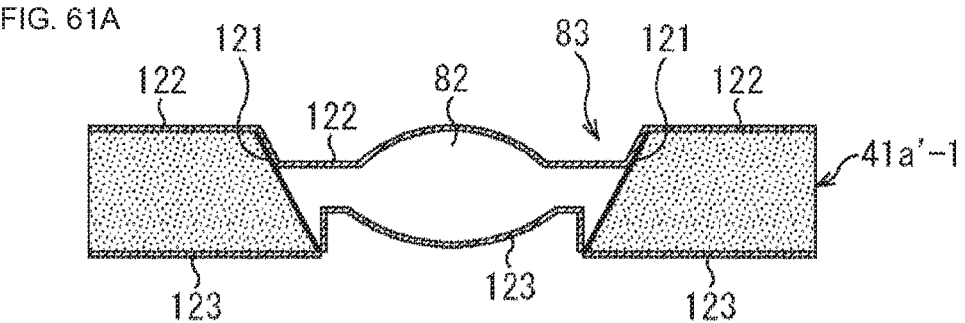
FIGS. 61A and 61B are views illustrating an example of a substrate with lenses using a heavily doped substrate.
Figure 61B:
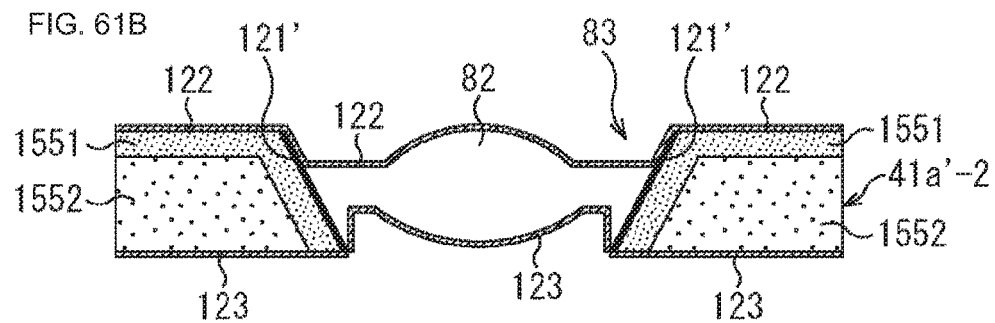

FIGS. 61A and 61B are cross-sectional views of substrates 41$a'$-1 and 41$a'$-2 with lenses which are modified examples of the substrate 41$a$ with lenses described above.

In a description of the substrates 41$a'$-1 and 41$a'$-2 with lenses in FIGS. 61A and 61B, a description of the same portions as those of the substrate 41$a$ with lenses described above will be omitted, and only portions different from those of the substrate 41$a$ with lenses described above will be described.

The substrate 41$a'$-1 with lenses illustrated in FIG. 61A is a heavily doped substrate in which B (boron) is diffused (ion-implanted) at a high concentration in a silicon substrate. An impurity concentration of the substrate 41$a'$-1 with lenses is, for example, about $1\times1019$ cm-3, and the substrate 41$a'$-1 with lenses can efficiently absorb light in a wide range of wavelength.

The other configurations of the substrate 41$a'$-1 with lenses are similar to those of the substrate 41$a$ with lenses described above.

On the other hand, in the substrate 41$a'$-2 with lenses illustrated in FIG. 61B, a region of a silicon substrate is divided into two regions having different impurity concentrations, in other words, a first region 1551 and a second region 1552.

The first region 1551 is formed at a predetermined depth (for example, about 3 μm) from a substrate surface on a light incident side. An impurity concentration of the first region 1551 is, for example, a high concentration of about $1\times10^{16}$ cm$^{-3}$. An impurity concentration of the second region 1552 is, for example, about $1\times10^{10}$ cm$^{-3}$, which is lower than the impurity concentration of the first concentration. Ions diffused (ion-implanted) in the first region 1551 and the second region 1552 are, for example, B (boron), similar to the substrate 41$a'$-1 with lenses.

The impurity concentration of the first region 1551 that becomes the light incident side of the substrate 41$a'$-2 with lenses is about $1\times1016$ cm-3, which is lower than the impurity concentration (for example, $1\times1019$ cm-3) of the substrate 41$a'$-1 with lenses. Therefore, in the substrate 41$a'$-2 with lenses, a film thickness of a light shielding film 121' formed on a sidewall of a through-hole 83 is greater than a light shielding film 121 of the substrate 41$a'$-1 with lenses illustrated in FIG. 61A. For example, assuming that the film thickness of the light shielding film 121 of the substrate 41$a'$-1 with lenses is 2 μm, the film thickness of the light shielding film 121' of the substrate 41$a'$-2 with lenses is 5 μm.

The other configurations of the substrate 41$a'$-2 with lenses are similar to those of the substrate 41$a$ with lenses described above.

As described above, by adopting the heavily doped substrates as the substrates 41$a'$-1 and 41$a'$-2 with lenses, light transmitted through a light shielding film 121 or an upper surface layer 122 and then arriving at the substrate can be absorbed by a base material itself, and reflected light can thus be suppressed. Since it is preferable to be able to absorb the light arriving at the substrate, a doping amount can be appropriately set depending on an amount of the light arriving at the substrate and a film thickness of the light shielding film 121 and the upper surface layer 122.

Furthermore, since the silicon substrates easy to handle are used as the substrates 41$a'$-1 and 41$a'$-2 with lenses, handling is easy. Since the light transmitted through the light shielding film 121 and the upper surface layer 122 and then arriving at the substrate can be absorbed by the base material itself, thicknesses or the like of the light shielding film 121 or the upper surface layer 122, and the stacked substrate itself can be reduced, such that it is possible to reduce a film thickness and simplify a structure.

Note that in the substrates 41$a'$-1 and 41$a'$-2 with lenses, ions doped in the silicon substrate are not limited to B (boron), and may be other ions, for example, phosphorus (P), arsenic (As), antimony (Sb), or the like, and may also be an element that can take a band structure in which a light absorption amount is increased.

Furthermore, the other substrates 41$b$ to 41$e$ with lenses constituting the stacked lens structure 11 can also be configured in a manner similar to that of the substrates 41$a'$-1 and 41$a'$-2 with lenses.

<Manufacturing Method>

A method of manufacturing the substrate 41$a'$-1 with lenses illustrated A of in FIG. 61 will be described with reference to FIG. 62.

<Manufacturing Method>

A method of manufacturing the substrate 41$a'$-1 with lenses illustrated in FIG. 61A will be described with reference to FIGS. 62A, 62B, 62C, and 62D.

Figure 62A:
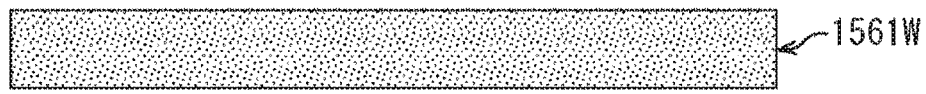
FIGS. 62A, 62B, 62C, and 62D are views for describing a method of manufacturing a substrate with lenses of A of FIG. 61A.

First, as illustrated in FIG. 62A, a heavily doped substrate 1561W in a substrate state in which B (boron) is diffused (ion-implanted) at a high concentration is prepared. An impurity concentration of the heavily doped substrate 1561W is, for example, about $1\times1019$ cm-3.

Figure 62B:
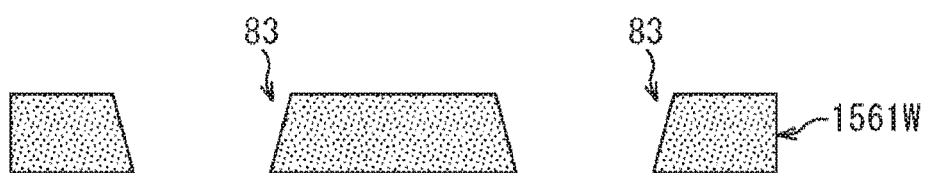

Next, as illustrated in FIG. 62B, through-holes 83 are formed at predetermined positions of the heavily doped substrate 1561W by etching. Only two through-holes 83 are illustrated in FIGS. 62A, 62B, 62C, and 62D due to restriction of paper, but actually, a large number of through-holes 83 are formed in a plane direction of the heavily doped substrate 1561W.

Figure 62C:
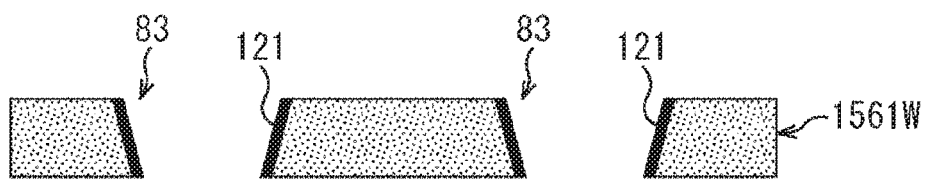

Next, as illustrated in FIG. 62C, light shielding films 121 are formed by applying a black resist material to sidewalls of the through-holes 83 by spray coating.

Figure 62D:
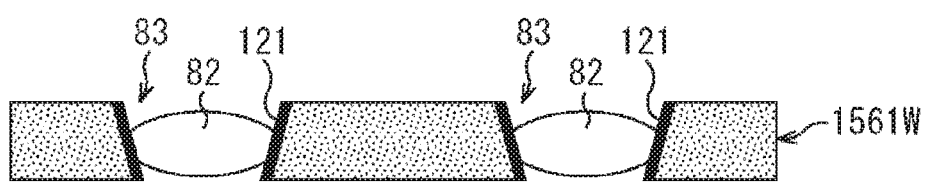

Then, as illustrated in of FIG. 62D, lens resin portions 82 including lenses 21 are formed inside the through-holes 83 by pressure-molding using the upper mold 201 and the lower mold 181 described with reference to FIGS. 23A, 23B, 23C, 23D, 23E, 23F, and 23G.

Thereafter, although not illustrated, the upper surface layer 122 is formed on upper surfaces of the heavily doped substrate 1561W and the lens resin portions 82, a lower surface layer 123 is formed on lower surfaces of the heavily doped substrate 1561W and the lens resin portions 82, and the heavily doped substrate 1561W is singulated. As a result, the substrate 41a'-1 with lenses illustrated in FIG. 61A is completed.

Next, a method of manufacturing the substrate 41a'-2 with lenses illustrated in FIG. 61B will be described with reference to FIGS. 63A, 63B, 63C, 63D, 63E, and 63F.

Figure 63A:
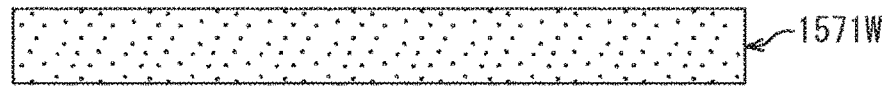
FIGS. 63A, 63B, 63C, 63D, 63E, and 63F are views for describing a method of manufacturing a substrate with lenses of FIG. 61B.

First, as illustrated in FIG. 63A, a doped substrate 1571W in a substrate state in which B (boron) is diffused (ion-implanted) at a predetermined concentration is prepared. An impurity concentration of the doped substrate 1571W is, for example, about 1×1010 cm-3.

Figure 63B:
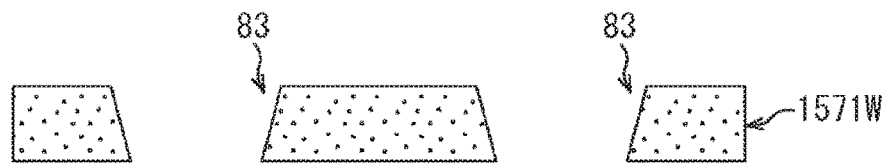

Next, as illustrated in FIG. 63B, through-holes 83 are formed at predetermined positions of the doped substrate 1571W by etching. Only two through-holes 83 are illustrated in FIGS. 63A, 63B, 63C, 63D, 63E, and 63F due to restriction of paper, but actually, a large number of through-holes 83 are formed in a plane direction of the doped substrate 1571W.

Figure 63C:
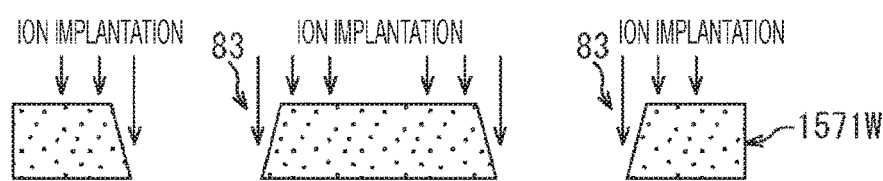
Figure 63D:
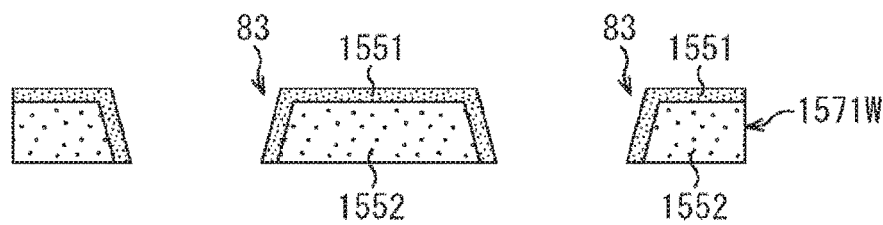

Next, as illustrated in FIG. 63C, B (boron) is ion-implanted from a substrate surface of the doped substrate 1571W adjacent to an incident surface of light to a predetermined depth (for example, about 3 μm), and heat treatment is then performed at 900° C. As a result, as illustrated in FIG. 63D, the first region 1551 having a high impurity concentration and the second region 1552 having a lower concentration are formed.

Figure 63E:
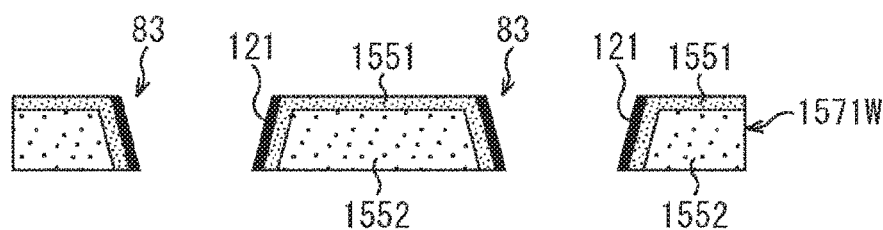

Then, as illustrated in FIG. 63E, light shielding films 121 are formed by applying a black resist material to sidewalls of the through-holes 83 by spray coating.

Figure 63F:
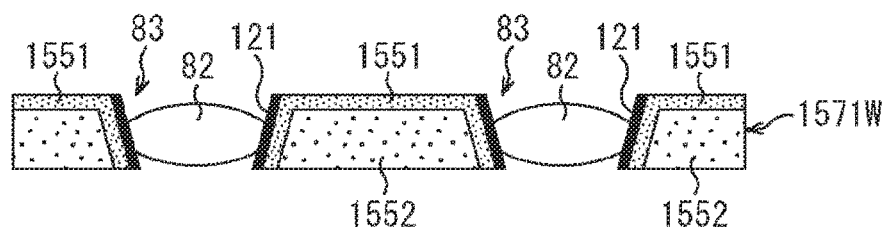

Furthermore, as illustrated in FIG. 63F, lens resin portions 82 including lenses 21 are formed inside the through-holes 83 by pressure-molding using the upper mold 201 and the lower mold 181 described with reference to FIGS. 23A, 23B, 23C, 23D, 23E. 23F and 23G.

Thereafter, although not illustrated, the upper surface layer 122 is formed on upper surfaces of the doped substrate 1571W and the lens resin portions 82, a lower surface layer 123 is formed on lower surfaces of the doped substrate 1571W and the lens resin portions 82, and the doped substrate 1571W is singulated. As a result, the substrate 41a'-2 with lenses illustrated in FIG. 61B is completed.

The heavily doped substrate as illustrated in FIGS. 61A and 61B can be used as each of the substrates 41a to 41e with lenses constituting the stacked lens structure 11 illustrated in FIGS. 1A and 1B. With this use, it is possible to increase a light absorption amount of the substrate itself.

17. Description of Pixel Arrangement of Light Receiving Element and Structure and Use of Diaphragm Next, a pixel arrangement of the light receiving element 12 and a configuration of the diaphragm plate 51 included in the camera modules 1 illustrated in FIGS. 10A, 10B, 10C, 10D, 10E, 10F, 11A, 11B, 11C, and 11D will be further described.

FIGS. 64A, 64B, 64C, and 64D are views illustrating an example of a planar shape of the diaphragm plate 51 provided in the camera modules 1 illustrated in FIGS. 10A, 10B, 10C, 10D, 10E, 10F, 11A, 11B, 11C, and 11D.

The diaphragm plate 51 includes a shielding region 51a preventing an incidence of light by absorbing or reflecting the light and opening regions 51b transmitting light therethrough.

In the four optical units 13 provided in the camera modules 1 illustrated in FIGS. 10A, 10B, 10C, 10D, 10E, 10F, 11A, 11B, 11C, and 11D, all of four opening diameters of the opening regions 51b of the diaphragm plate 51 may have the same size or may have different sizes, as illustrated in FIGS. 64A, 64B, 64C, and 64D. "L", "M", and "S" in FIGS. 64A, 64B, 64C, and 64D indicate that the opening diameters of the opening regions 51b are "large", "medium", and "small", respectively.

Figure 64A:
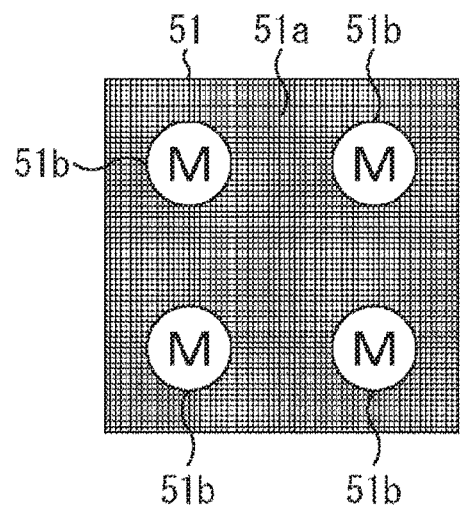
FIGS. 64A, 64B, 64C, and 64D are views illustrating an example of a planar shape of a diaphragm plate provided in a camera module.

In a diaphragm plate 51 illustrated in FIG. 64A, opening diameters of four diaphragm regions 51b are the same as one another.

Figure 64B:
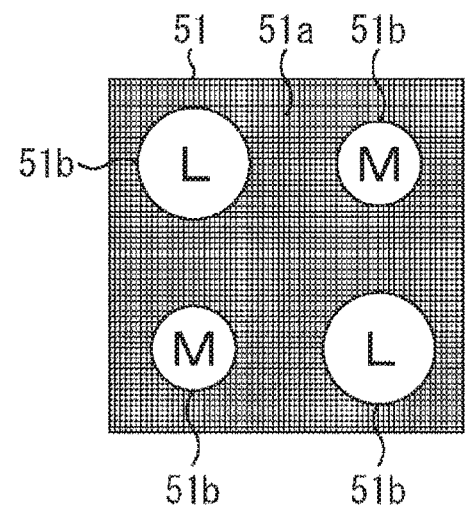

In a diaphragm plate 51 illustrated in FIG. 64B, sizes of opening diameters of two opening regions 51b are "medium", that is, openings of standard diaphragms. For example, as illustrated in FIG. 13, the diaphragm plate 51 may slightly overlap the lens 21 of the substrate 41 with lenses. In other words, the opening region 51b of the diaphragm plate 51 may be slightly smaller than a diameter of the lens 21. Then, the remaining two opening regions 51b of the diaphragm plate 51 illustrated in FIG. 64B have a "large" opening diameter, that is, an opening diameter larger than that of the "medium" described above. The large opening regions 51b bring about an action of causing more light to be incident on the light receiving element 12 provided in the camera module 1, for example, in a case where illuminance of a subject is low.

Figure 64C:
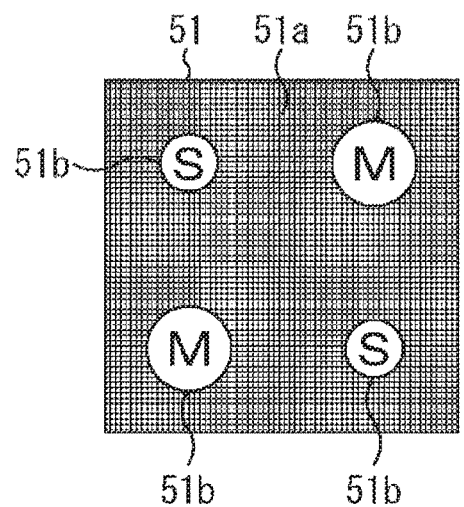

In a diaphragm plate 51 illustrated in FIG. 64C, sizes of opening diameters of two opening regions 51b are "medium", that is, openings of standard diaphragms. Then, the remaining two opening regions 51b of the diaphragm plate 51 illustrated in FIG. 64C have a "small" opening diameter, that is, an opening diameter smaller than that of the "medium" described above. The small opening regions 51b bring about an action of reducing an amount of light incident on the light receiving element 12, for example, in a case where illuminance of a subject is high and a quantity of electric charges generated in a photoelectric conversion unit provided in the light receiving element 12 when light from the subject is incident on the light receiving element 12 provided in the camera module 1 through the opening regions 51b of which the opening diameters are "medium" exceed a quantity of saturation electric charges of the photoelectric conversion unit.

Figure 64D:
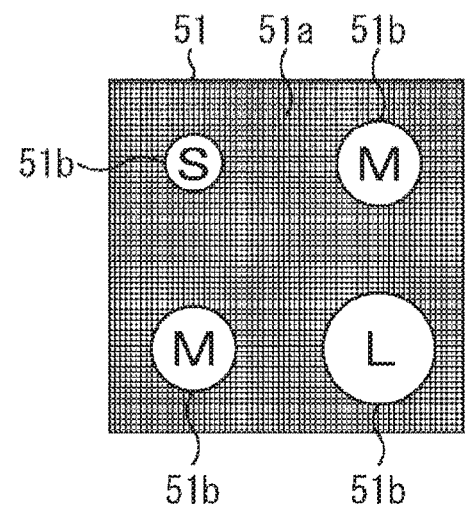

In a diaphragm plate 51 illustrated in FIG. 64D, sizes of opening diameters of two opening regions 51b are "medium", that is, openings of standard diaphragms. Then, a size of an opening diameter of one of the remaining two opening regions 51b of the diaphragm plate 51 illustrated in FIG. 64D is "large", and a size of an opening diameter of the other of the remaining two opening regions 51b of the diaphragm plate 51 is "small". These opening regions 51b bring about an action similar to that of the opening regions 51b of which the opening diameters are "large" and "small" illustrated in FIGS. 64B and 64C.

Figure 65:
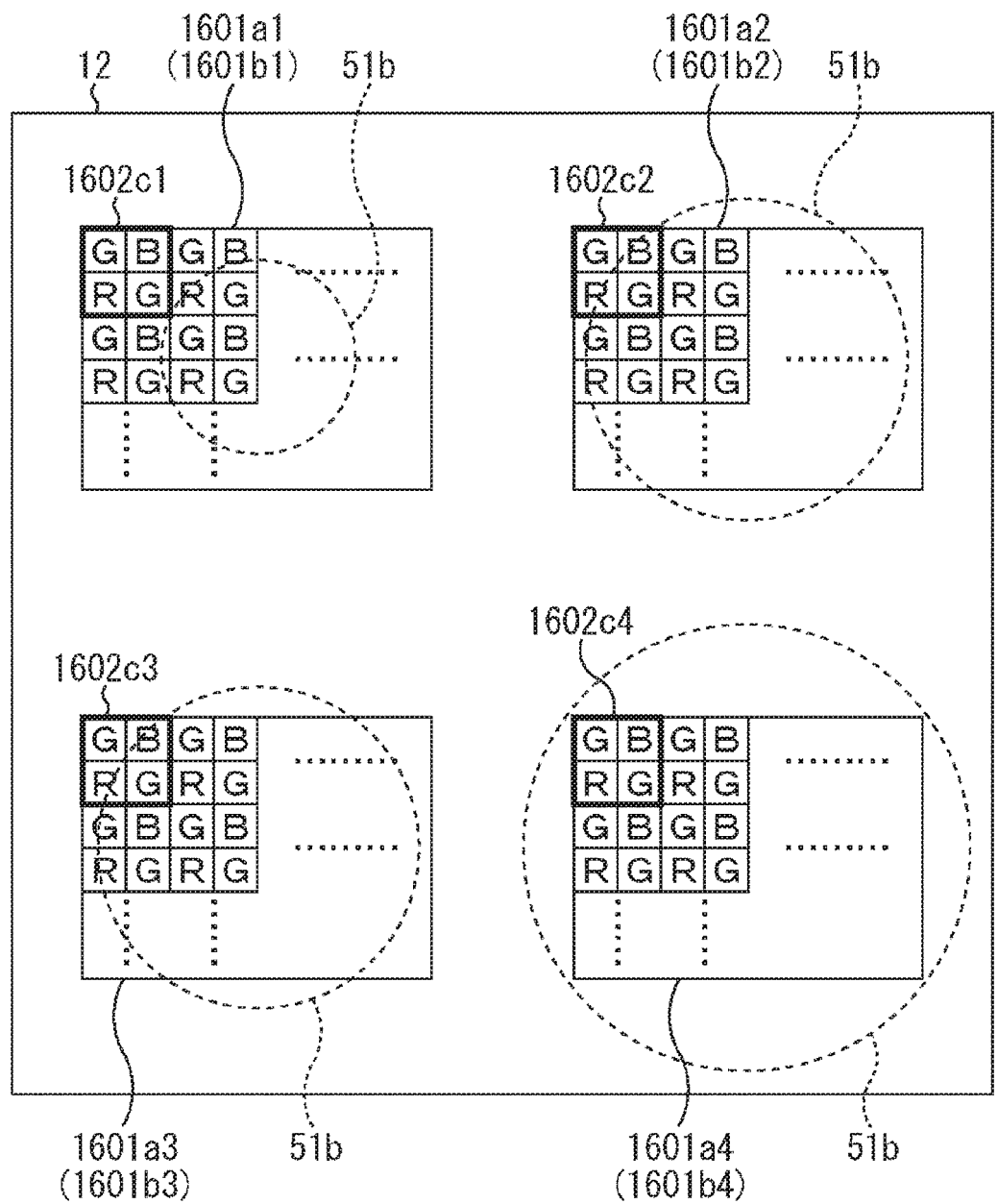
FIG. 65 is a view for describing a configuration of light receiving regions of the camera module.

FIG. 65 illustrates a configuration of light receiving regions of the camera modules 1 illustrated in FIGS. 10A, 10B, 10C, 10D, 10E, 10F, 11A, 11B, 11C, and 11D.

The camera module 1 includes four optical units 13 (not illustrated), as illustrated in FIG. 65. Then, light incident on the four optical units 13 is received by each of light receiving means corresponding to the respective optical units 13. Therefore, in the camera modules 1 illustrated in FIGS. 10A, 10B, 10C, 10D, 10E, 10F, 11A, 11B, 11C and 11D, the light receiving element 12 includes four light receiving regions 1601a1 to 1601a4.

Note that the light receiving element 12 may include one light receiving region 1601a receiving light incident on one optical unit 13 provided in the camera module 1 and the camera module 1 may include such light receiving elements 12 as many as the number of optical units 13 provided in the camera module 1, for example, four in a case of the camera module 1 illustrated in FIGS. 10A, 10B, 10C, 10D, 10E, 10F, 11A 11B 11C and 11D, as another embodiment related to the light receiving means.

The light receiving regions 1601a1 to 1601a4 include pixel arrays 1601b1 to 1601b4 in which pixels receiving light are arranged in an array form, respectively.

Note that in FIG. 65, for simplicity, circuits for driving the pixels or circuits for reading the pixels that are provided in pixel arrays are omitted, and the light receiving regions 1601a1 to 1601a4 and the pixel arrays 1601b1 to 1601b4 are represented at the same size.

The pixel arrays 1601b1 to 1601b4 provided in the light receiving regions 1601a1 to 1601a4 include repeating units 1602c1 to 1602c4 of pixels including a plurality of pixels, and are configured by arranging a plurality of repeating units 1602c1 to 1602c4 in an array form in both of longitudinal and transverse directions.

The optical units 13 are arranged on the four light receiving regions 1601a1 to 1601a4 of the light receiving element 12, respectively. The four optical units 13 include the diaphragm plate 51 as a part thereof. In FIG. 65, as an example of openings diameters of four opening regions 51b of the diaphragm plate 51, the opening regions 51b of the diaphragm plate 51 illustrated in FIG. 64D are represented by broken lines.

In a signal processing field of an image, a super-resolution technology has been known as a technology of obtaining an image having a higher resolution by being applied to an original image. For example, Japanese Patent Application Laid-Open No. 2015-102794 discloses an example of such a technology.

The camera modules 1 illustrated in FIGS. 10A, 10B, 10C, 10D, 10E, 10F, 11A, 11B, 11C, and 11D can have the structures illustrated in FIGS. 13, 16, and 17, or FIGS. 34, 35, 37, and 55.

In these camera modules 1, optical axes provided in the optical units 13 arranged as two in each of the longitudinal and transverse directions of a surface of the camera module 1 that becomes an incident surface of light extend in the same direction. With this arrangement, it is possible to obtain a plurality of images that is not necessarily the same as each other using different light receiving regions while the optical axes facing the same direction.

The camera module 1 having such a structure is appropriate for obtaining an image having a resolution higher than that of one image obtained from one optical unit 13 by applying the super-resolution technology to a plurality of original images that is obtained on the basis of the plurality of original images.

FIGS. 66 to 69 illustrate configuration examples of pixels of the light receiving regions of the camera modules 1 illustrated in FIGS. 10A, 10B, 10C, 10D, 10E, 10F, 11A, 11B, 11C, and 11D.

Note that in FIGS. 66 to 69, G pixels refer to pixels receiving light of a green wavelength, R pixels refer to pixels receiving light of a red wavelength, and pixels of B refer to pixels receiving light of a blue wavelength. C pixels refer to pixels receiving light in the entire wavelength range of visible light.

Figure 66:
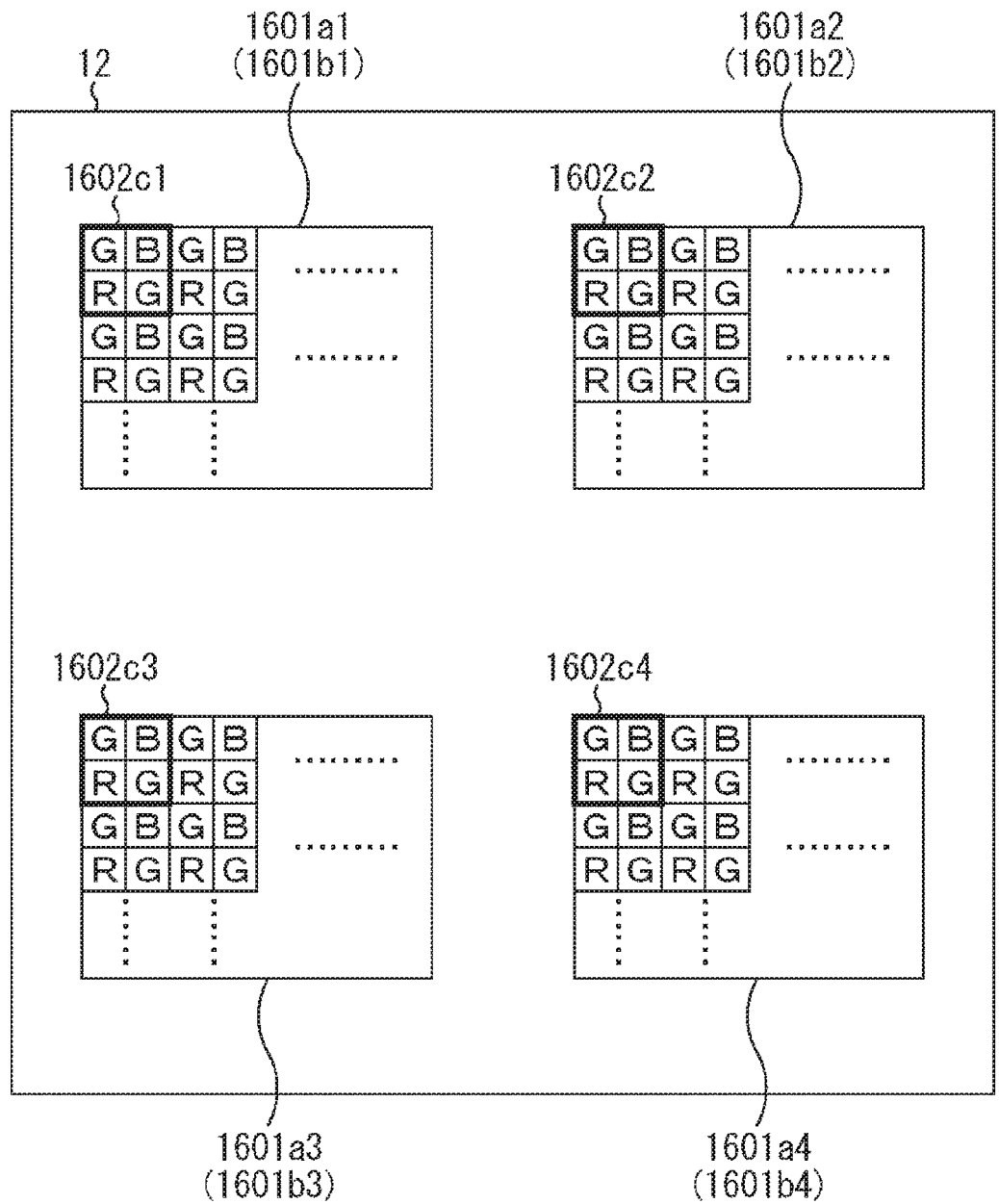
FIG. 66 is a view illustrating a first example of a pixel arrangement of the light receiving regions of the camera module.

FIG. 66 illustrates a first example of a pixel arrangement of the four pixel arrays 1601b1 to 1601b4 provided in the light receiving element 12 of the camera module 1.

In the four pixel arrays 1601b1 to 1601b4, repeating units 1602c1 to 1602c4 are repeatedly arranged in a row direction and a column direction, respectively. Each of the repeating units 1602c1 to 1602c4 in FIG. 66 includes R, G, B, and G pixels.

The pixel arrangement illustrated in FIG. 66 brings about an action that it is appropriate for splitting incident light from a subject irradiated with visible light into red (R), green (G) and blue (B) to obtain an image including RGB three colors.

Figure 67:
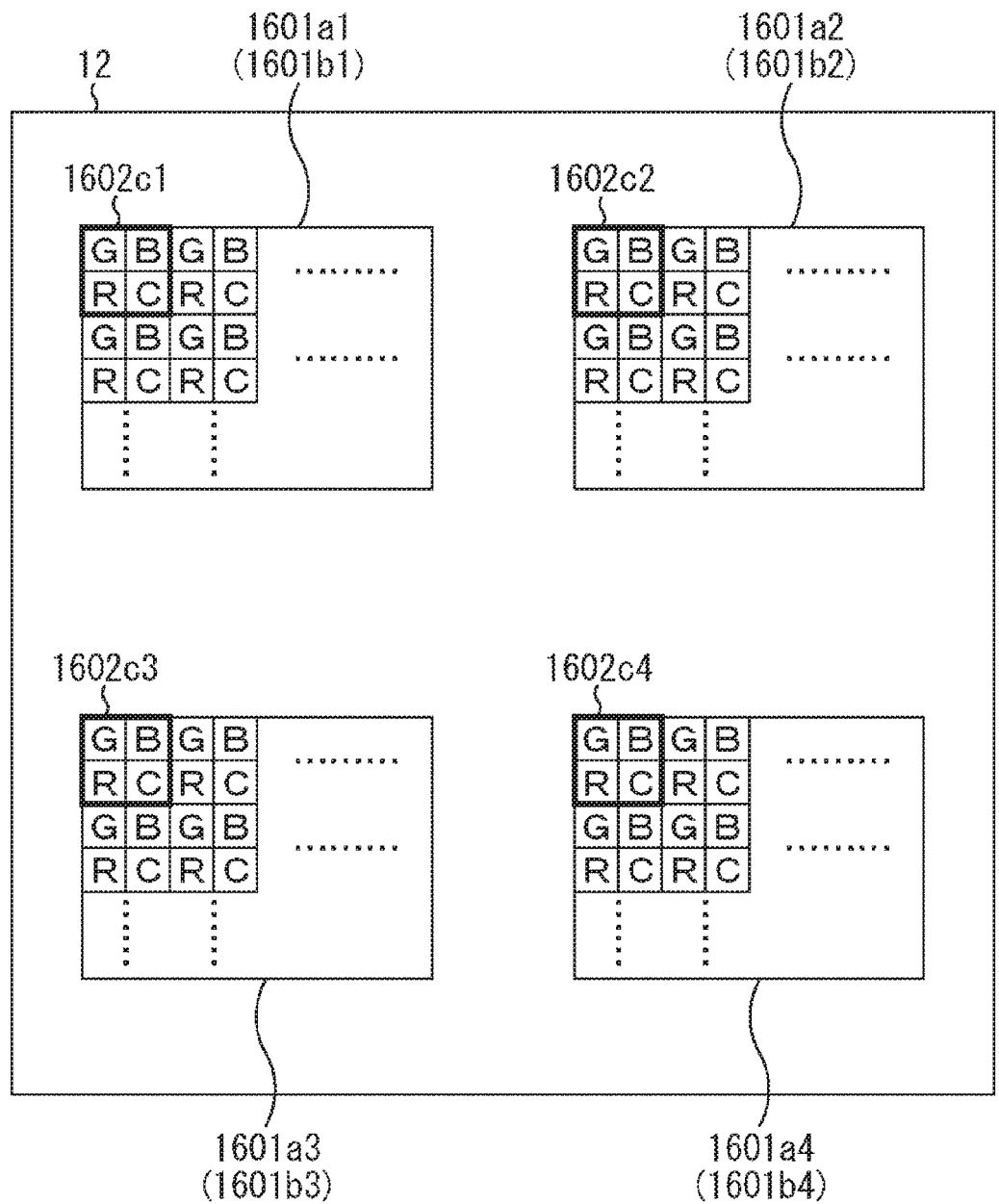
FIG. 67 is a view illustrating a second example of a pixel arrangement of the light receiving regions of the camera module.

FIG. 67 illustrates a second example of a pixel arrangement of the four pixel arrays 1601b1 to 1601b4 provided in the light receiving element 12 of the camera module 1.

The pixel arrangement in FIG. 67 is different in a combination of wavelengths (colors) of light received by each of pixels constituting the repeating units 1602c1 to 1602c4 from the pixel arrangement in FIG. 66. In FIG. 67, each of the repeating units 1602c1 to 1602c4 includes R, G, B, and C pixels.

The pixel arrangement in FIG. 67 includes pixels of C receiving light in the entire wavelength region of visible light without splitting the light into R, G, and B as described above. The C pixels receive a larger amount of light than those of the R, G, and B pixels receiving parts of the split light. Therefore, this configuration brings about an action that an image having a higher brightness or an image having more grayscale characteristics for illuminance can be obtained using information obtained by the C pixels receiving the larger amount of light, for example, luminance information of a subject, for example, even in a case where illuminance of the subject is low.

Figure 68:
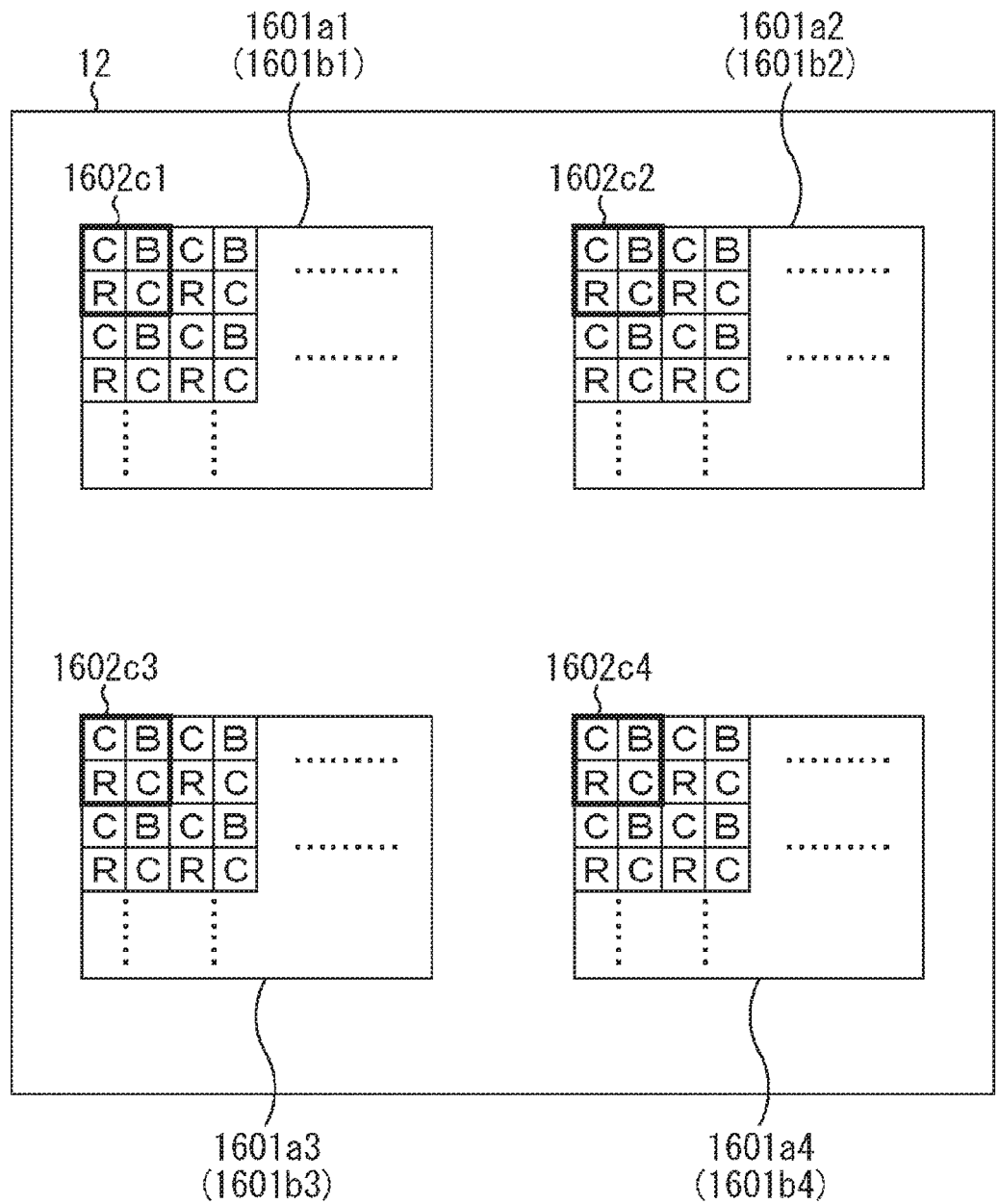
FIG. 68 is a view illustrating a third example of a pixel arrangement of the light receiving regions of the camera module.

FIG. 68 illustrates a third example of a pixel arrangement of the four pixel arrays 1601b1 to 1601b4 provided in the light receiving element 12 of the camera module 1.

In FIG. 68, each of the repeating units 1602c1 to 1602c4 includes R, C, B, and C pixels.

The repeating units 1602c1 to 1602c4 of the pixels illustrated in FIG. 68 do not include G pixels. Information corresponding to the G pixels is obtained by arithmetically processing information from C, R, and B pixels. For example, this information is obtained by subtracting output values of the R pixels and the B pixels from output values of the C pixels.

The repeating units 1602c1 to 1602c4 of the pixels illustrated in FIG. 68 include two C pixels receiving light in the entire wavelength region, which is twice the number of C pixels in the repeating units 1602c1 to 1602c4 illustrated in FIG. 67. Furthermore, in the repeating units 1602c1 to 1602c4 of the pixel illustrated in FIG. 68, two C pixels are arranged in a diagonal direction of an outline of the repeating unit 1602c so that a pitch of C pixels in a pixel array 1601b provided in FIG. 68 is twice the pitch of C pixels in a pixel array 1601b provided in FIG. 67 in both of transverse and longitudinal directions of the pixel array 1601b.

Therefore, a configuration illustrated in FIG. 68 brings about an action that information obtained from the C pixels receiving a large amount of light, for example, luminance information can be obtained at a resolution twice higher than that of the configuration illustrated in FIG. 67, for example, in a case where illuminance of a subject is low, such that it is possible to obtain a clear image with the resolution twice higher than that of the configuration illustrated in FIG. 67.

Figure 69:
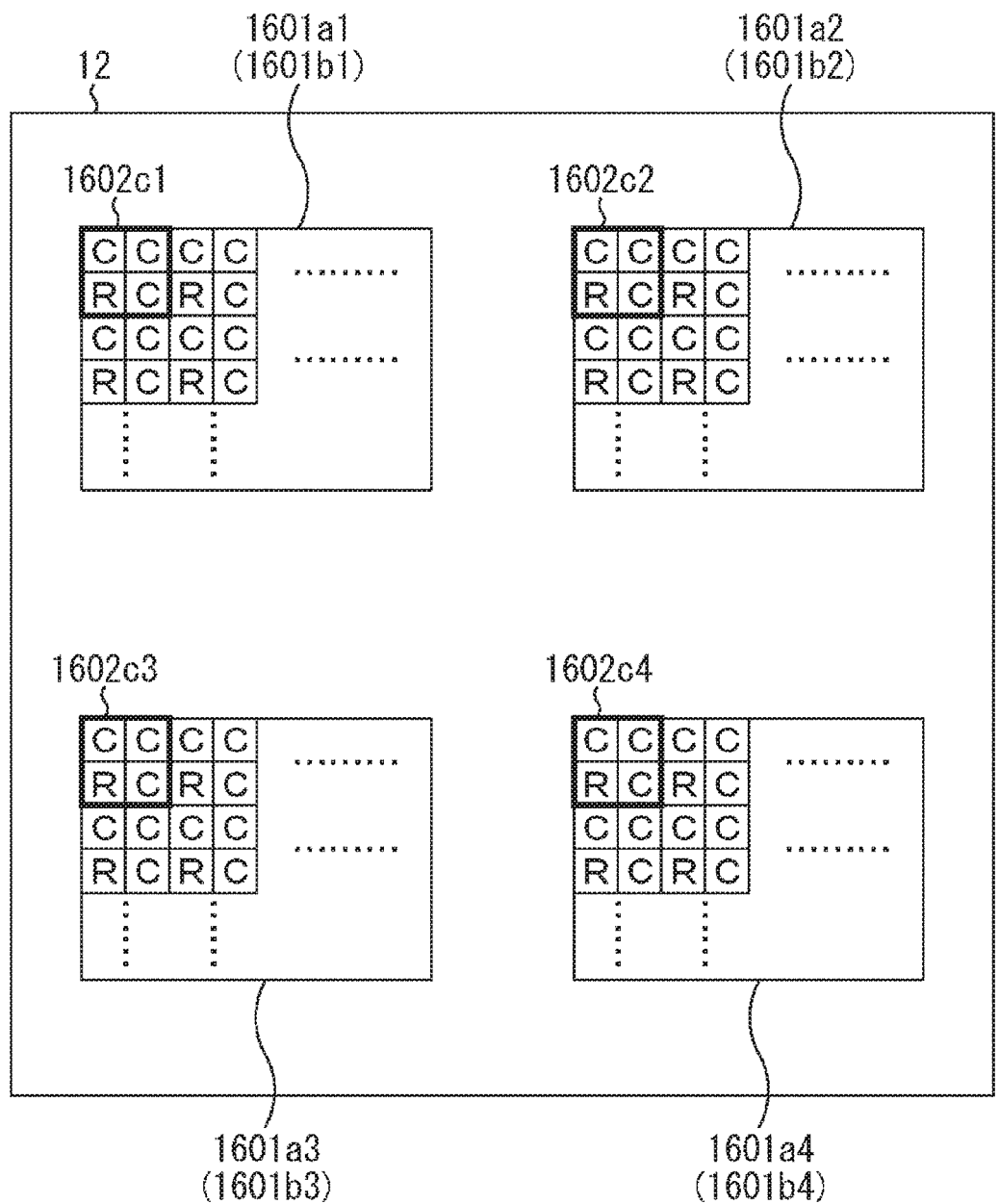
FIG. 69 is a view illustrating a fourth example of a pixel arrangement of the light receiving regions of the camera module.

FIG. 69 illustrates a fourth example of a pixel arrangement of the four pixel arrays 1601b1 to 1601b4 provided in the light receiving element 12 of the camera module 1.

In FIG. 69, each of the repeating units 1602c1 to 1602c4 includes R, C, C, and C pixels.

For example, in a case of a camera use mounted on a vehicle and photographing a forward region, a color image is not necessarily required in many cases. In many cases, it is required to be able to recognize a red brake lamp of a vehicle traveling ahead and a red signal of a traffic light installed on a road and be able to recognize shapes of other subjects.

Therefore, a configuration illustrated in FIG. 69 brings about an action that it is possible to recognize the red brake lamp of the vehicle and the red signal of the traffic light installed on the road by including the R pixels and it is possible to obtain a clear image with a higher resolution, for example, even in a case where illuminance of a subject is low, by including the C pixels that receive a large amount of light and are more than those of the repeating units 1602c of the pixels illustrated in FIG. 68.

Note that in all of the camera modules 1 including the light receiving elements 12 illustrated in FIGS. 66 to 69, any of the shapes illustrated in A to D in FIGS. 64A, 64B, 64C, and 64D may be used as a shape of the diaphragm plate 51.

In the camera modules 1 including any one of the light receiving elements 12 illustrated in FIGS. 66 to 69 and the diaphragm plate 51 of any one of FIGS. 64A, 64B, 64C, and 64D and illustrated in FIGS. 10A, 10B, 10C, 10D, 10E, 10F, 11A, 11B, 11C, and 11D, the optical axes provided in the optical units 13 arranged as two in each of the longitudinal direction and the transverse direction of the surface of the camera module 1 that becomes the incident surface of the light extend in the same direction.

The camera modules 1 having such a structure bring about an effect that it is possible to obtain an image with a higher resolution by applying the super-resolution technology to a plurality of original images that is obtained.

Figure 70:
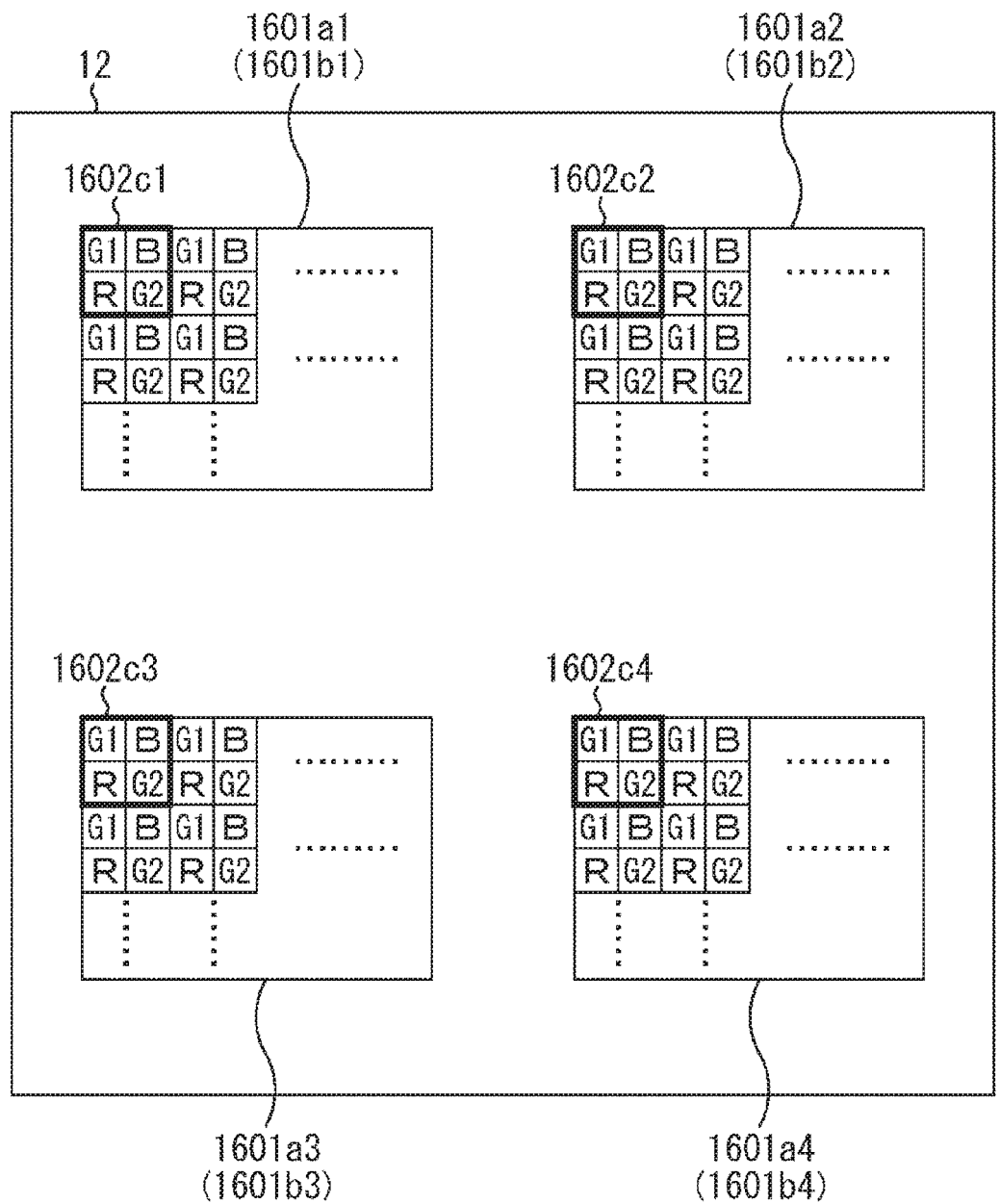
FIG. 70 is a view illustrating a modified example of the pixel arrangement illustrated in FIG. 66.

FIG. 70 illustrates a modified example of the pixel arrangement illustrated in FIG. 66.

The repeating units 1602c1 to 1602c4 of FIG. 66 include the R, G, B, and G pixels and structures of two G pixels of the same color are the same as each other, while in FIG. 70, repeating units 1602c1 to 1602c4 include R, G1, B, and G2 pixels, and structures of two G pixels of the same color, in other words, G1 and G2 pixels, are different from each other.

The G1 pixel and the G2 pixel include signal generation means (for example, photodiodes), and an appropriate operating limit of the signal generation means of the G2 pixel is higher than that of the signal generation means of the G1 pixel (for example, a quantity of saturated electric charges of the signal generation means of the G2 pixel is greater than that of the signal generation means of the G1 pixel). Meanwhile, the G1 pixel and the G2 pixel include generated signal conversion means (for example, an electric charge to voltage conversion capacitor), and the generated signal conversion means of the G2 pixel is also larger than that of the G1 pixel.

With these configurations, since an output signal in a case where a certain amount of signals (for example, electric charges) are generated per unit time is suppressed to be smaller in the G2 pixel than in the G1 pixel and a quantity of saturated electric charges is large in the G2 pixel than in the G1 pixel, an action that the pixels do not reach the operation limits, for example, even in a case where illuminance of a subject is high, such that it is possible to obtain an image having high grayscale characteristics is brought about.

On the other hand, since the G1 pixel can obtain an output signal larger than that of the G2 pixel in a case where a certain amount of signals (for example, electric charges) are generated per unit time, an action that it is possible to obtain an image having high grayscale characteristics, for example, in a case where illuminance of a subject is low, is brought about.

The light receiving element 12 illustrated in FIG. 70 includes such G1 pixels and G2 pixels, and thus, brings about an action that it is possible to obtain an image having high grayscale characteristics in a wide illumination range and to obtain a wide image having a so-called dynamic range.

Figure 71:
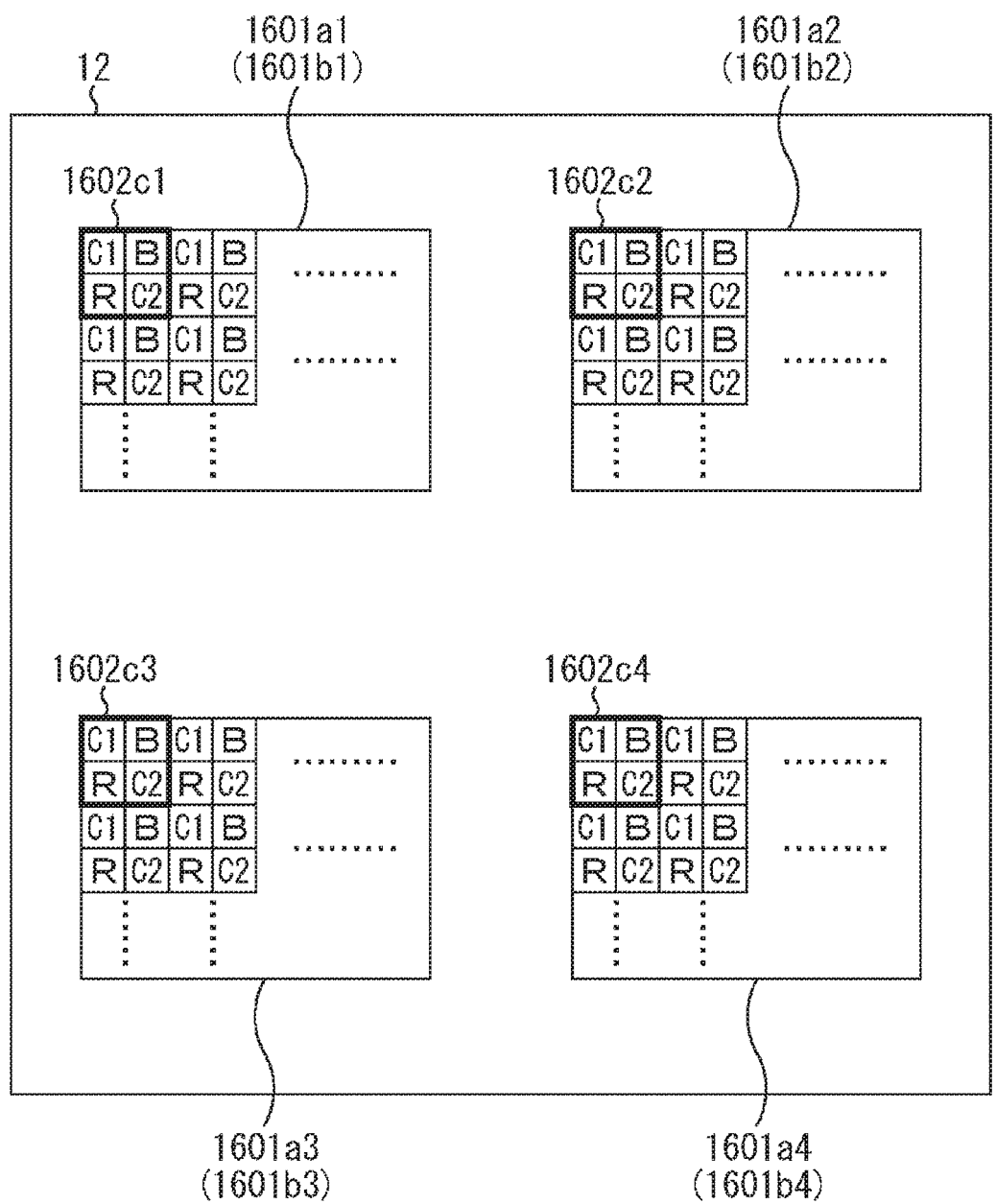
FIG. 71 is a view illustrating a modified example of the pixel arrangement of FIG. 68.

FIG. 71 illustrates a modified example of the pixel arrangement of FIG. 68.

The repeating units 1602c1 to 1602c4 of FIG. 68 include the R, C, B, and C pixels and structures of two C pixels of the same color are the same as each other, while in FIG. 71, repeating units 1602c1 to 1602c4 include R, C1, B, and C2 pixels, and structures of two C pixels of the same color, in other words, C1 and C2 pixels, are different from each other.

The C1 pixel and the C2 pixel also include signal generation means (for example, photodiodes), and an operation limit of the signal generation means of the C2 pixel is higher than that of the signal generation means of the C1 pixel (for example, a quantity of saturated electric charges of the signal generation means of the C2 pixel is larger than that of the signal generation means of the C1 pixel). Meanwhile, the C1 pixel and the C2 pixel include generated signal conversion means (for example, electric charge to voltage conversion capacitors), and the generated signal conversion means of the C2 pixel is also larger than that of the C1 pixel.

Figure 72:
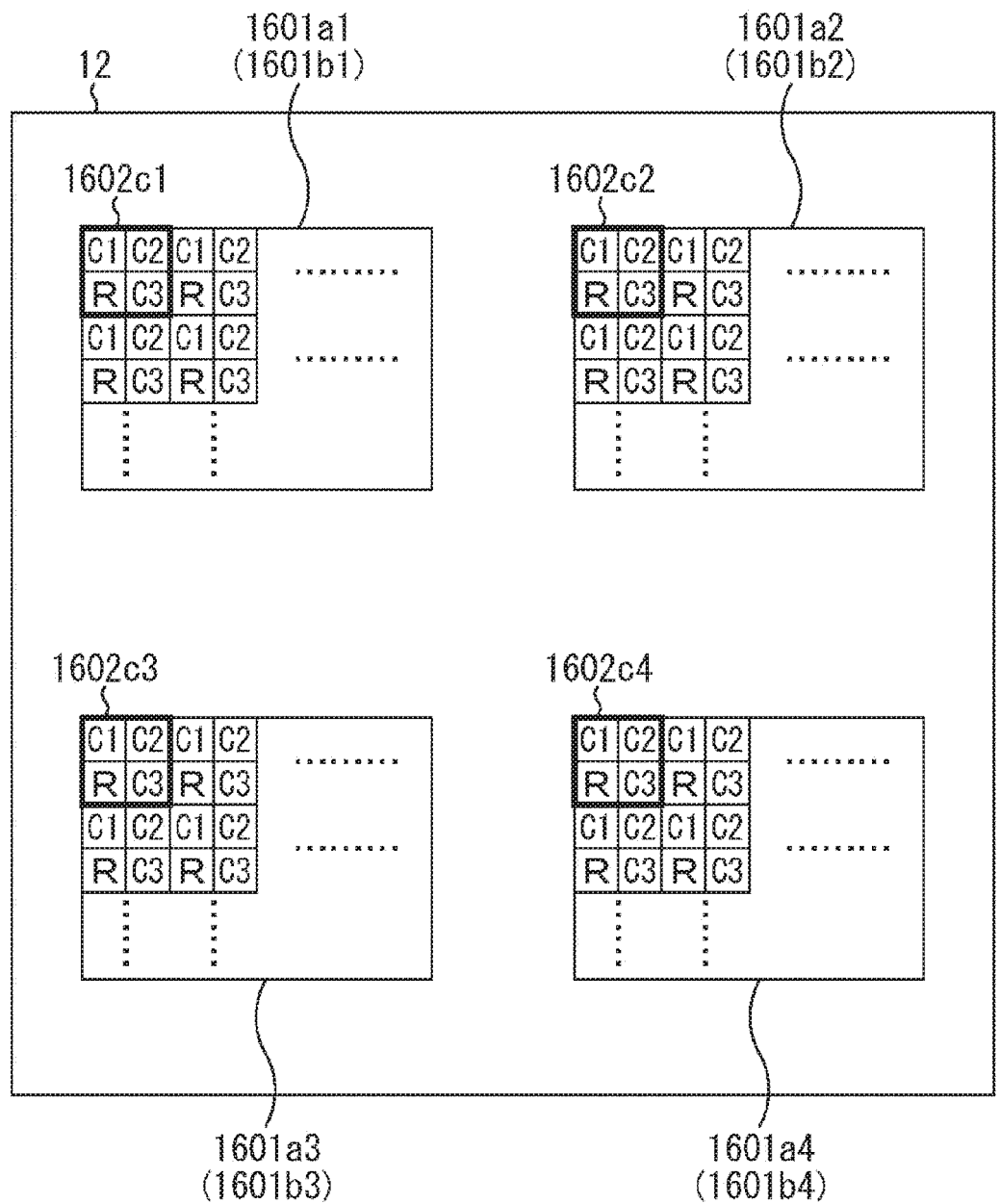
FIG. 72 is a view illustrating a modified example of the pixel arrangement of FIG. 69.

FIG. 72 illustrates a modified example of the pixel arrangement of FIG. 69.

The repeating units 1602c1 to 1602c4 of FIG. 69 include the R, C, C, and C pixels and structures of three C pixels of the same color are the same as one another, while in FIG. 72, repeating units 1602c1 to 1602c4 include R, C1, C2, and C3 pixels, and structures of three C pixels of the same color, in other words, C1, C2, and C3 pixels, are different from one another.

For example, the C1 to C3 pixels also include signal generation means (for example, photodiodes), and operation limits of the signal generation means of the pixels are higher in a sequence of the C3 pixel, the C2 pixel, and the C1 pixel (for example, quantities of saturated electric charges of the signal generation means are larger in a sequence of the C3 pixel, the C2 pixel, and the C1 pixel) Furthermore, the C1 pixel and the C2 pixel include generated signal conversion means (for example, electric charge to voltage conversion capacitors), and the generated signal conversion means of the pixels are larger in a sequence of the C3 pixel, the C2 pixel, and the C1 pixel.

The light receiving elements 12 illustrated in FIGS. 71 and 72 have the configuration described above, and thus, brings about an action that it is possible to obtain an image having high grayscale characteristics in a wide illumination range and to obtain a wide image having a so-called dynamic range, similar to the light receiving element 12 illustrated in FIG. 70.

As configurations of the diaphragm plates 51 of the camera modules 1 including the light receiving elements 12 illustrated in FIGS. 70 to 72, the configurations of various diaphragm plates 51 illustrated in FIGS. 64A, 64B, 64C, and 64D or modified examples thereof can be adopted.

In the camera modules 1 including any one of the light receiving elements 12 illustrated in FIGS. 70 to 72 and the diaphragm plate 51 of any one of FIGS. 64A, 64B, 64C, and 64D and illustrated in FIGS. 10A, 10B, 10C, 10D, 10E, 10F, 11A, 11B, 11C, and 11D, the optical axes provided in the optical units 13 arranged as two in each of the longitudinal direction and the transverse direction of the surface of the camera module 1 that becomes the incident surface of the light extend in the same direction.

The camera modules 1 having such a structure bring about an effect that it is possible to obtain an image with a higher resolution by applying the super-resolution technology to a plurality of original images that is obtained.

FIG. 73A illustrates a fifth example of a pixel arrangement of the four pixel arrays 1601*b*1 to 1601*b*4 provided in the light receiving element 12 of the camera module 1.

The four pixel arrays 1601*b*1 to 1601*b*4 provided in the light receiving element 12 do not necessarily have the same structure as described above, and may have different structures as illustrated in FIG. 73A.

In the light receiving element 12 illustrated in FIG. 73A, structures of the pixel array 1601*b*1 and the pixel array 1601*b*4 are the same as each other, and structures of the repeating units 1602*c*1 and 1602*c*4 constituting the pixel arrays 1601*b*1 and 1601*b*4 are also the same as each other.

On the other hand, structures of the pixel array 1601*b*2 and the pixel array 1601*b*3 are different from those of the pixel array 1601*b*1 and the pixel array 1601*b*4. Specifically, pixel sizes included in the repeating units 1602*c*2 and 1602*c*3 of the pixel array 1601*b*2 and the pixel array 1601*b*3 are larger than those of the repeating units 1602*c*1 and 1602*c*4 of the pixel array 1601*b*1 and the pixel array 1601*b*4. Furthermore, sizes of photoelectric conversion units included in the pixels are large. Since the pixel sizes are large, region sizes of the repeating units 1602*c*2 and 1602*c*3 are also larger than those of the repeating units 1602*c*1 and 1602*c*4. Therefore, the pixel array 1601*b*2 and the pixel array 1601*b*3 are configured to have the same area as that of the pixel array 1601*b*1 and the pixel array 1601*b*4, but have a smaller number of pixels than that of the pixel array 1601*b*1 and the pixel array 1601*b*4.

As a configuration of the diaphragm plate 51 of the camera module 1 including the light receiving element 12 illustrated in FIG. 73A, the configurations of various diaphragm plates 51 illustrated in FIGS. 64A, 64B, and 64C, configurations of diaphragm plates 51 illustrated in FIGS. 73B, 73C, and 73D, or modified examples thereof can be adopted.

Generally, a light receiving element using large pixels brings about an action that an image having a signal to noise ratio (S/N ratio) better than that of a light receiving element using small pixels can be obtained.

For example, a magnitude of noise in a circuit reading a signal or a circuit amplifying a read signal is approximately the same between the light receiving element using the large pixels and the light receiving element using the small pixels, but magnitudes of signals generated by signal generating units provided in the pixels become larger as the pixels become larger.

Therefore, the light receiving element using the large pixels brings about an action that the image having the signal to noise ratio (S/N ratio) better than that of the light receiving element using the small pixels can be obtained.

Meanwhile, when sizes of the pixel arrays are the same as each other, the light receiving element using the small pixels has a resolution higher than that the light receiving element using the large pixels.

Therefore, the light receiving element using the small pixels brings about an action that an image having the resolution higher than that of the light receiving element using the large pixels can be obtained.

The above configuration provided in the light receiving element 12 illustrated in FIG. 73A brings about an action that it is possible to obtain an image having a high resolution using the light receiving regions 1601*a*1 and 1601*a*4 in which pixel sizes are small and a resolution is high, for example, in a case where illuminance of a subject is high and a large signal can thus be obtained in the light receiving element 12, and furthermore, the super resolution technology is applied to these two images to obtain an image having a higher resolution.

Furthermore, the above configuration brings about an action that it is possible to obtain an image having a high S/N ratio using the light receiving regions 1601*a*2 and 1601*a*3 in which an image having a high S/N ratio is obtained in a case where it is a possibility that an S/N ratio of an image will be reduced since illuminance of a subject is low and a large signal cannot thus be obtained in the light receiving element 12, and furthermore, the super-resolution technology is applied to these two images to obtain an image having a higher resolution.

In this case, in the camera module 1 including the light receiving element 12 illustrated in FIG. 73A, a shape of the diaphragm plate 51 may be, for example, a shape of the diaphragm plate 51 illustrated in FIG. 73B among three shapes of the diaphragm plates 51 illustrated in FIGS. 73B, 73C, and 73D.

For example, in the diaphragm plate 51 illustrated in FIG. 73C among the three shapes of the diaphragm plates 51 illustrated in FIGS. 73B, 73C, and 73D, opening regions 51*b* of the diaphragm plate 51 used in combination with the light receiving regions 1601*a*2 and 1601*a*3 using large pixels are larger than opening regions 51*b* of the diaphragm plate 51 used in combination with the other light receiving regions.

Therefore, in the camera module 1 using the diaphragm plate 51 of FIG. 73C among the three shapes of the diaphragm plates 51 illustrated in FIGS. 73B, 73C, and 73D in combination with the light receiving element 12 illustrated in FIG. 73A, as compared with the camera module 1 using the diaphragm plate 51 of FIG. 73B in combination with the light receiving element 12 illustrated in FIG. 73A, an action that it is possible to obtain an image having a higher S/N ratio in the light receiving regions 1601*a*2 and 1601*a*3, for example, in a case where illuminance of a subject is low and a large signal cannot thus be obtained in the light receiving element 12, is brought about.

For example, in the diaphragm plate 51 illustrated in FIG. 73D among the three shapes of the diaphragm plates 51 illustrated in FIGS. 73B, 73C, and 73D, opening regions 51*b* of the diaphragm plate 51 used in combination with the light receiving regions 1601*a*2 and 1601*a*3 using large pixels are smaller than opening regions 51*b* of the diaphragm plate 51 used in combination with the other light receiving regions.

Therefore, in the camera module 1 using the diaphragm plate 51 of FIG. 73D among the three shapes of the diaphragm plates 51 illustrated in FIGS. 73B, 73C, and 73D in combination with the light receiving element 12 illustrated in FIG. 73A, as compared with the camera module 1 using the diaphragm plate 51 of FIG. 73B among the three shapes of the diaphragm plates 51 illustrated in FIGS. 73B, 73C, and 73D in combination with the light receiving element 12 illustrated in FIG. 73A, an action that an amount of light incident on the light receiving regions 1601*a*2 and 1601*a*3 is suppressed, for example, in a case where illuminance of a subject is high and a large signal can thus be obtained in the light receiving element 12, is brought about.

With this action, an action that an occurrence of a situation in which excessive light is incident on the pixels provided in the light receiving regions 1601*a*2 and 1601*a*3 and the pixels provided in the light receiving regions 1601*a*2 and 1601a3 thus exceed their appropriate operation limits (for example, exceed quantities of saturated electric charges) is suppressed is brought about.

Figure 74B:
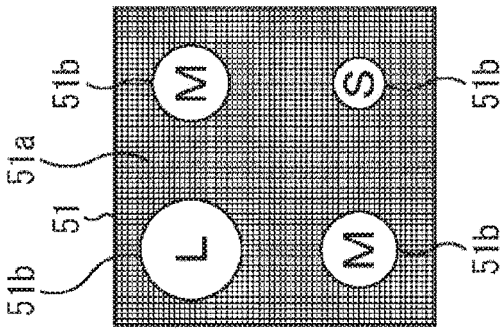
FIGS. 74A, 74B, 74C, and 74D are views illustrating a sixth example of a pixel arrangement of the light receiving regions of the camera module.
Figure 74C:
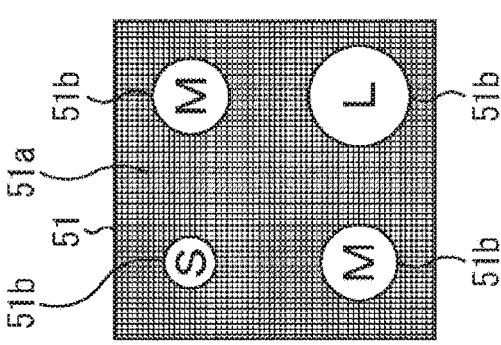
Figure 74D:
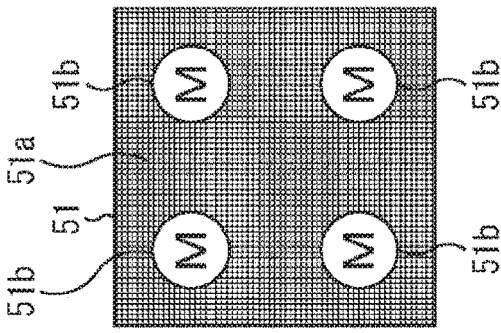
Figure 74A:
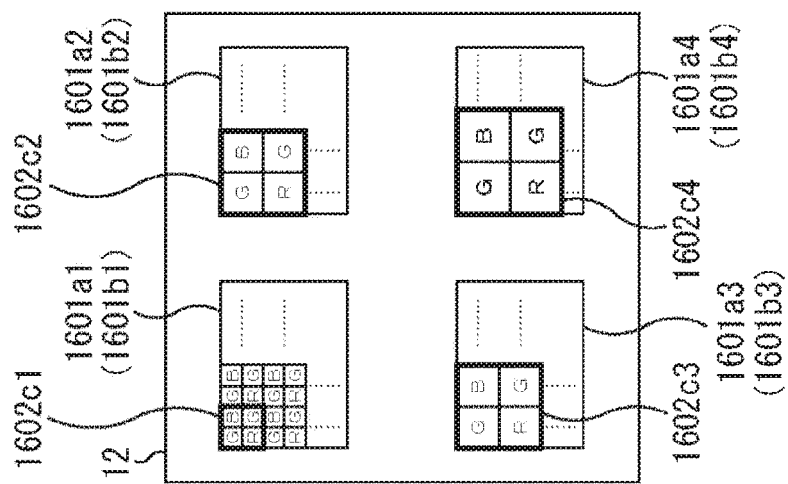

FIG. 74A illustrates a sixth example of a pixel arrangement of the four pixel arrays 1601b1 to 1601b4 provided in the light receiving element 12 of the camera module 1.

In the light receiving element 12 illustrated in FIG. 74A, a region size of the repeating unit 1602c1 of the pixel array 1601b1 is smaller than that of the repeating units 1602c1 and 1602c2 of the pixel arrays 1601b2 and 1601b3. A region size of the repeating unit 1602c4 of the pixel array 1601b4 is larger than that of the repeating units 1602c1 and 1602c2 of the pixel arrays 1601b2 and 1601b3.

In other words, the region sizes of the repeating units 1602c1 to 1602c4 have a relation of repeating unit 1602c1< (repeating unit 1602c2=repeating unit 1602c3)<repeating unit 1602c4.

The larger the region sizes of the repeating units 1602c1 to 1602c4, the larger the pixel sizes and the larger the sizes of the photoelectric conversion units.

As a configuration of the diaphragm plate 51 of the camera module 1 including the light receiving element 12 illustrated in FIG. 74A, the configurations of various diaphragm plates 51 illustrated in FIGS. 64A, 64B, and 64C, configurations of diaphragm plates 51 illustrated in FIGS. 74B, 74C, and 74D, or modified examples thereof can be adopted.

The above configuration provided in the light receiving element 12 illustrated in FIG. 74A brings about an action that it is possible to obtain an image having a high resolution using the light receiving regions 1601a1 in which a pixel size is small and a resolution is high, for example, in a case where illuminance of a subject is high and a large signal can thus be obtained in the light receiving element 12.

Furthermore, the above configuration brings about an action that it is possible to obtain an image having a high S/N ratio using the light receiving regions 1601a2 and 1601a3 in which an image having a high S/N ratio is obtained in a case where it is a possibility that an S/N ratio of an image will be reduced since illuminance of a subject is low and a large signal cannot thus be obtained in the light receiving element 12, and furthermore, the super-resolution technology is applied to these two images to obtain an image having a higher resolution.

The above configuration brings about an action that it is possible to obtain an image having a higher S/N ratio using the light receiving region 1601a4 in which an image having a higher S/N ratio is obtained in a case where it is a possibility that illuminance of a subject is lower and an S/N ratio of an image is thus further reduced in the light receiving element 12.

In this case, in the camera module 1 including the light receiving element 12 illustrated in FIG. 74A, a shape of the diaphragm plate 51 may be, for example, a shape of the diaphragm plate 51 illustrated in FIG. 74B among three shapes of the diaphragm plates 51 illustrated in FIGS. 74B, 74C, and 74D.

For example, in the diaphragm plate 51 illustrated in FIG. 74C among the three shapes of the diaphragm plates 51 illustrated in FIGS. 74B, 74C, and 74D, opening regions 51b of the diaphragm plate 51 used in combination with the light receiving regions 1601a2 and 1601a3 using large pixels are larger than an opening region 51b of the diaphragm plate 51 used in combination with the light receiving region 1601a1 using small images. Furthermore, an opening region 51b of the diaphragm plate 51 used in combination with the light receiving region 1601a4 using larger pixels is larger.

Therefore, in the camera module 1 using the diaphragm plate 51 of FIG. 74C among the three shapes of the diaphragm plates 51 illustrated in FIGS. 74B, 74C, and 74D in combination with the light receiving element 12 illustrated in FIG. 74A, as compared with the camera module 1 using the diaphragm plate 51 of FIG. 74B among the three shapes of the diaphragm plates 51 illustrated in FIGS. 74B, 74C, and 74D in combination with the light receiving element 12 illustrated in FIG. 74A, an action that it is possible to obtain an image having a higher S/N ratio in the light receiving regions 1601a2 and 1601a3, for example, in a case where illuminance of a subject is low and a large image cannot thus be obtained in the light receiving element 12 and it is possible to obtain an image having a higher S/N ratio in the light receiving region 1601a4 in a case where illuminance of a subject is lower is brought about.

For example, in the diaphragm plate 51 illustrated in FIG. 74D among the three shapes of the diaphragm plates 51 illustrated in FIGS. 74B, 74C, and 74D, opening regions 51b of the diaphragm plate 51 used in combination with the light receiving regions 1601a2 and 1601a3 using large pixels are smaller than an opening region 51b of the diaphragm plate 51 used in combination with the light receiving region 1601a1 using small images. Furthermore, an opening region 51b of the diaphragm plate 51 used in combination with the light receiving region 1601a4 using larger pixels is smaller.

Therefore, in the camera module 1 using the diaphragm plate 51 of D of FIG. 74D among the three shapes of the diaphragm plates 51 illustrated in FIGS. 74B, 74C, and 74D in combination with the light receiving element 12 illustrated in FIG. 74A, as compared with the camera module 1 using the diaphragm plate 51 of FIG. 74B among the three shapes of the diaphragm plates 51 illustrated in FIGS. 74B, 74C, and 74D in combination with the light receiving element 12 illustrated in FIG. 74A, an action that an amount of light incident on the light receiving regions 1601a2 and 1601a3 is suppressed, for example, in a case where illuminance of a subject is high and a large signal can thus be obtained in the light receiving element 12, is brought about.

With this action, an action that an occurrence of a situation in which excessive light is incident on the pixels provided in the light receiving regions 1601a2 and 1601a3 and the pixels provided in the light receiving regions 1601a2 and 1601a3 thus exceed their appropriate operation limits (for example, exceed quantities of saturated electric charges) is suppressed is brought about.

Furthermore, an action that an amount of light incident on the light receiving region 1601a4 is further suppressed, such that an occurrence of a situation in which excessive light is incident on the pixels provided in the light receiving region 1601a4 and the pixels provided in the light receiving region 1601a4 thus exceed their appropriate operation limits (for example, exceed quantities of saturated electric charges) is suppressed is brought about.

Note that as another embodiment, a structure in which the camera module includes the diaphragm plate 51 in which the opening regions 51b are variable to change the size of the opening of the diaphragm depending on illuminance of a subject, using a structure similar to a diaphragm of which a size of an opening is changed by combining a plurality of plates with each other and changing a position relationship between the plurality of plates so as to be used in, for example, a general camera, may be used.

For example, in a case where the light receiving elements 12 illustrated in FIG. 73A and FIG. 74A are used, a structure in which the shapes of FIG. 73C and FIG. 74C are used among the three shapes of the diaphragm plates 51 illustrated in FIGS. 73B, 73C, and 73D and FIGS. 74B, 74C, and 74D in a case where the illuminance of the subject is low, the shapes of FIG. 73B and FIG. 74B are used in a case where the illuminance of the subject is higher, and the shapes of FIG. 73D and FIG. 74D are used in a case where the illuminance of the subject is further higher may be used.

Figure 75:
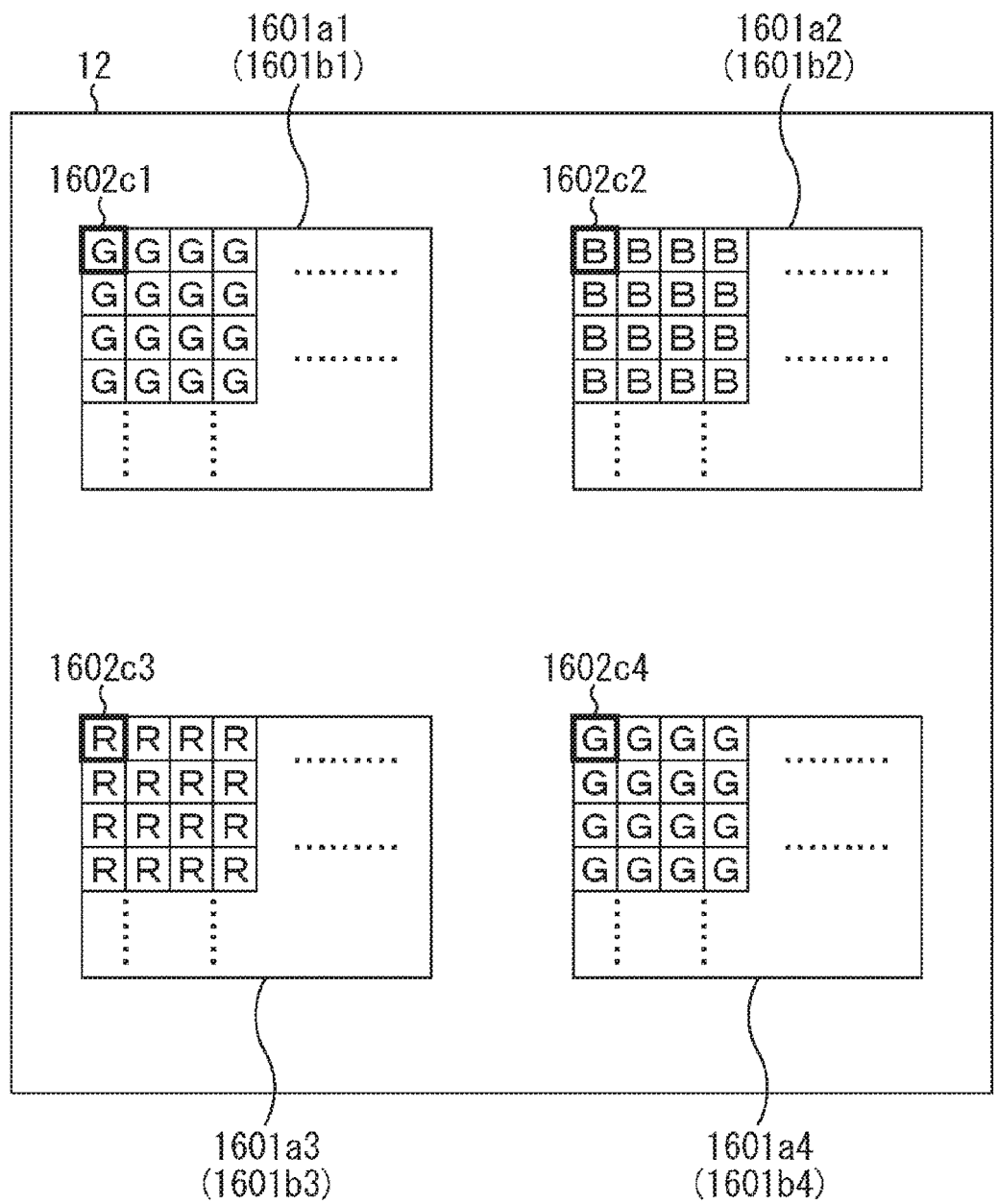
FIG. 75 is a view illustrating a seventh example of a pixel arrangement of the light receiving regions of the camera module.

FIG. 75 illustrates a seventh example of a pixel arrangement of the four pixel arrays 1601b1 to 1601b4 provided in the light receiving element 12 of the camera module 1.

In the light receiving element 12 illustrated in FIG. 75, all the pixels of the pixel array 1601b1 are pixels receiving light of a green wavelength. All the pixels of the pixel array 1601b2 are pixels receiving light of a blue wavelength. All the pixels of the pixel array 1601b3 are pixels receiving light of a red wavelength. All the pixels of the pixel array 1601b4 are pixels receiving light of a green wavelength.

Figure 76:
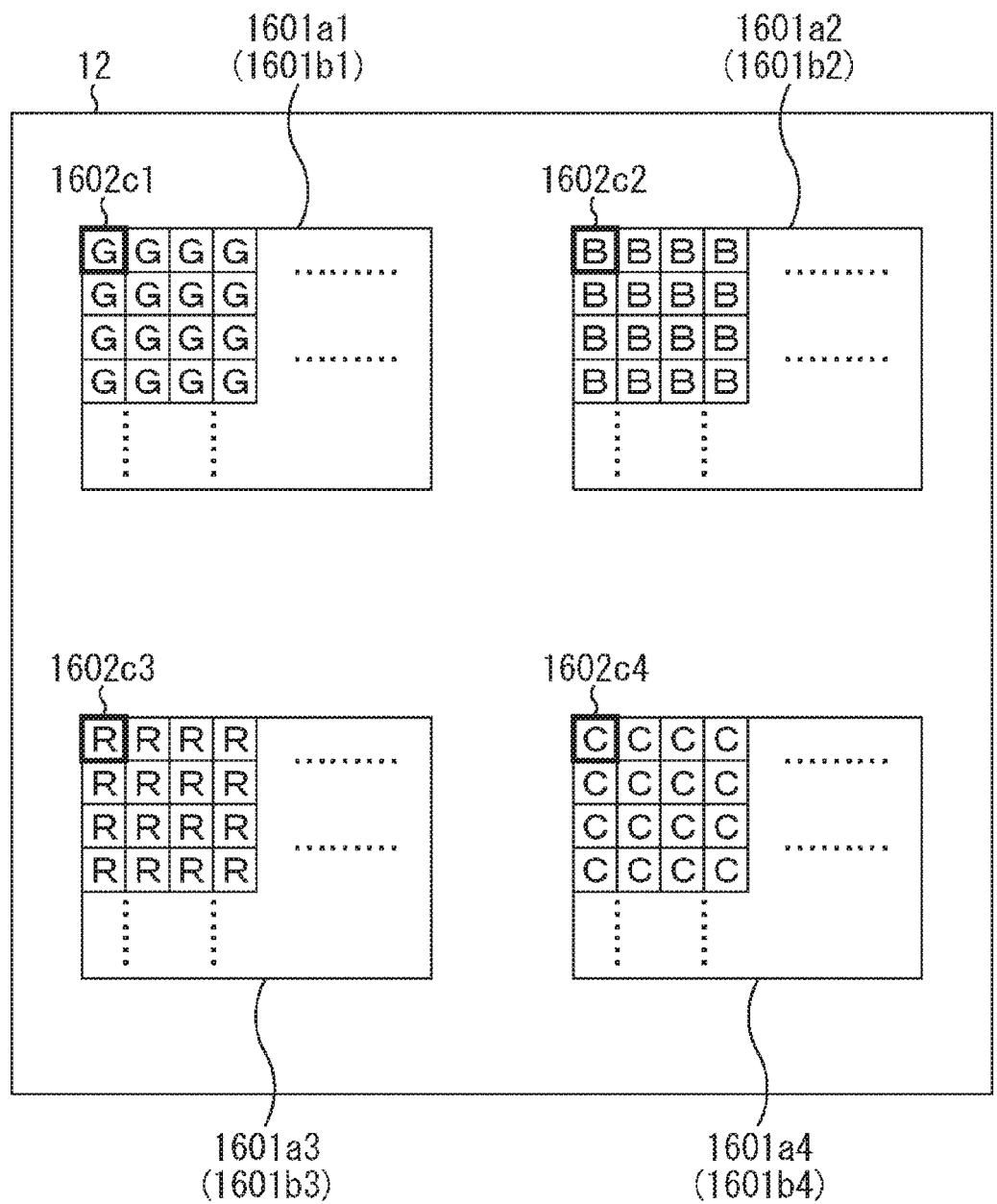
FIG. 76 is a view illustrating an eighth example of a pixel arrangement of the light receiving regions of the camera module.

FIG. 76 illustrates an eighth example of a pixel arrangement of the four pixel arrays 1601b1 to 1601b4 provided in the light receiving element 12 of the camera module 1.

In the light receiving element 12 illustrated in FIG. 76, all the pixels of the pixel array 1601b1 are pixels receiving light of a green wavelength. All the pixels of the pixel array 1601b2 are pixels receiving light of a blue wavelength. All the pixels of the pixel array 1601b3 are pixels receiving light of a red wavelength. All the pixels of the pixel array 1601b4 are pixels receiving light of a wavelength in the entire visible light region.

Figure 77:
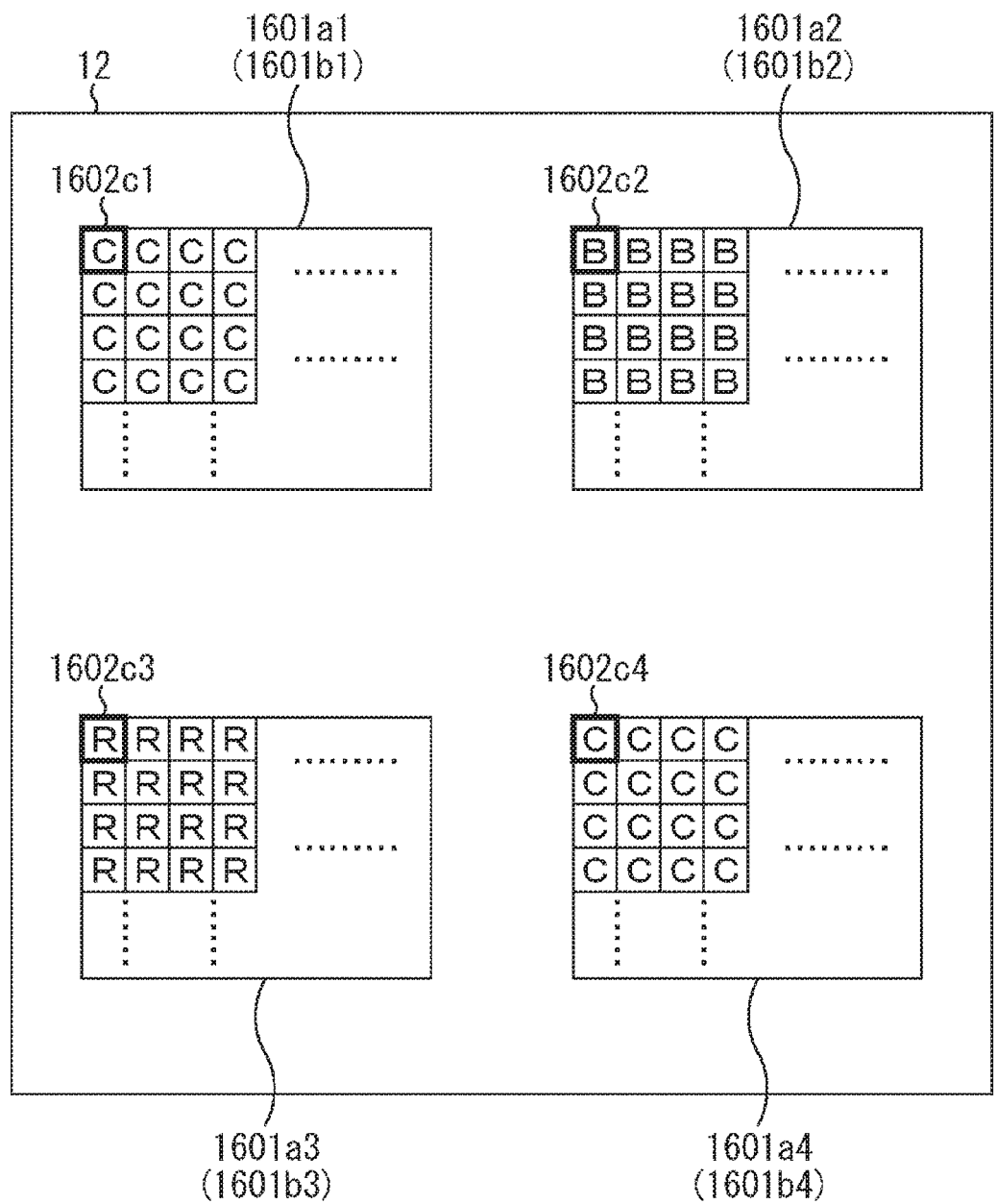
FIG. 77 is a view illustrating a ninth example of a pixel arrangement of the light receiving regions of the camera module.

FIG. 77 illustrates a ninth example of a pixel arrangement of the four pixel arrays 1601b1 to 1601b4 provided in the light receiving element 12 of the camera module 1.

In the light receiving element 12 illustrated in FIG. 77, all the pixels of the pixel array 1601b1 are pixels receiving light of a wavelength in the entire visible light region. All the pixels of the pixel array 1601b2 are pixels receiving light of a blue wavelength. All the pixels of the pixel array 1601b3 are pixels receiving light of a red wavelength. All the pixels of the pixel array 1601b4 are pixels receiving light of a wavelength in the entire visible light region.

Figure 78:
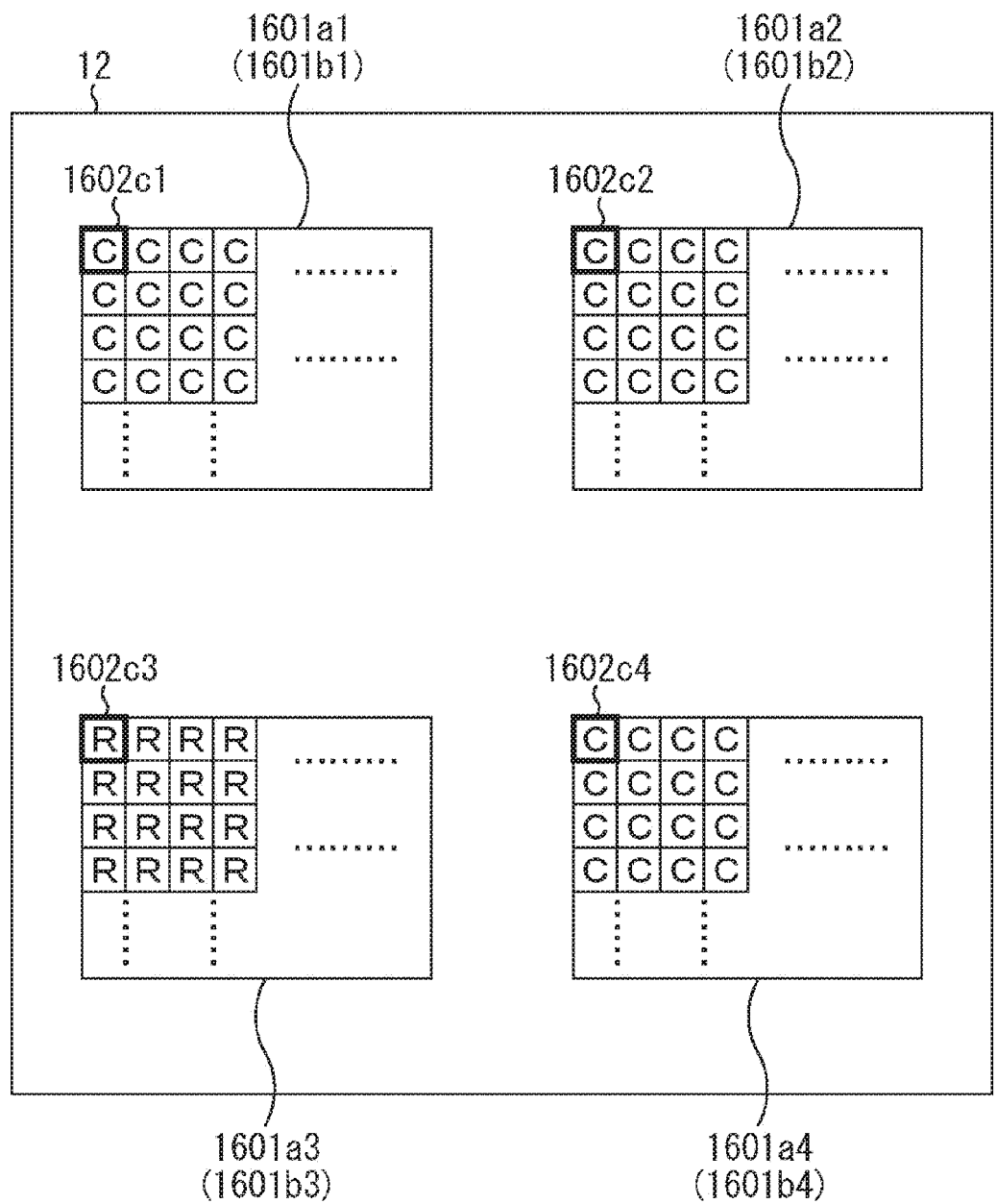
FIG. 78 is a view illustrating a tenth example of a pixel arrangement of the light receiving regions of the camera module.

FIG. 78 illustrates a tenth example of a pixel arrangement of the four pixel arrays 1601b1 to 1601b4 provided in the light receiving element 12 of the camera module 1.

In the light receiving element 12 illustrated in FIG. 78, all the pixels of the pixel array 1601b1 are pixels receiving light of a wavelength in the entire visible light region. All the pixels of the pixel array 1601b2 are pixels receiving light of a wavelength in the entire visible light region. All the pixels of the pixel array 1601b3 are pixels receiving light of a red wavelength. All the pixels of the pixel array 1601b4 are pixels receiving light of a wavelength in the entire visible light region.

As illustrated in FIGS. 75 to 78, the pixel arrays 1601b1 to 1601b4 of the light receiving element 12 can be configured to receive light of wavelengths of the same bands in pixel array units.

A conventionally known RGB 3-plate type solid-state imaging device has three light receiving elements, and the light receiving elements photograph only an R image, only a G image, or only a B image, respectively. The conventionally known RGB 3-plate type solid-state imaging device splits light incident on one optical unit into three directions by a prism and receives light using the three light receiving elements. Therefore, positions of subject images incident on the three light receiving elements are the same among the three light receiving elements. Therefore, it is difficult to obtain an image having a high sensitivity by applying the super-resolution technology to these three images.

On the other hand, in the camera modules 1 illustrated in FIGS. 10A, 10B, 10C, 10D, 10E, 10F, 11A, 11B, 11C, and 11D using any one of the light receiving elements 12 illustrated in FIGS. 75 to 78, the optical units 13 are arranged as two in each of the longitudinal direction and the transverse direction in the surface of the camera module 1 that becomes the incident surface of the light, and optical axes provided in the four optical units 13 extend in parallel in the same direction. With this arrangement, it is possible to obtain a plurality of images that is not necessarily the same as each other using the four different light receiving regions 1601a1 to 1601a4 provided in the light receiving element 12 while the optical axes facing the same direction.

The camera module 1 having such a structure brings about an action that it is possible to obtain an image having a resolution higher than that of one image obtained from one optical unit 13, by applying the super-resolution technology to the plurality of images obtained from the four optical units 13 having the above arrangement on the basis of the plurality of images.

Note that a configuration in which four images of G, R, G, and B are obtained by the light receiving element 12 illustrated in FIG. 75 brings about an action similar to that brought about by a configuration in which four pixels of G, R, G, and B are used as a repeating unit in the light receiving element 12 illustrated in FIG. 66.

A configuration in which four images of R, G, B, and C are obtained in the light receiving element 12 illustrated in FIG. 76 brings about an action similar to that brought about by a configuration in which four pixels of R, G, B, and C are used as a repeating unit in the light receiving element 12 illustrated in FIG. 67.

A configuration in where four images of R, C, B, and C are obtained in the light receiving element 12 illustrated in FIG. 77 brings about an action similar to that brought about by a configuration in which four pixels of R, C, B, and C are used as a repeating unit in the light receiving element 12 illustrated in FIG. 68.

A configuration in where four images of R, C, C, and C are obtained in the light receiving element 12 illustrated in FIG. 78 brings about an action similar to that brought about by a configuration in which four pixels of R, C, C, and C are used as a repeating unit in the light receiving element 12 illustrated in FIG. 69.

As a configuration of the diaphragm plate 51 of the camera module 1 including any one of the light receiving elements 12 illustrated in FIGS. 75 to 78, the configurations of various diaphragm plates 51 illustrated in FIGS. 64A, 64B, 64C, and 64D or modified examples thereof can be adopted.

FIG. 79A illustrates an eleventh example of a pixel arrangement of the four pixel arrays 1601b1 to 1601b4 provided in the light receiving element 12 of the camera module 1.

In the light receiving element 12 illustrated in FIG. 79A, a pixel size of one pixel or a wavelength of light received by each pixel is different in each of the pixel arrays 1601b1 to 1601b4.

A pixel size in the pixel array 1601b1 is configured to be smallest, pixel sizes in the pixel arrays 1601b2 and 1601b3 are configured to be the same as each other and be larger than that in the pixel array 1601b1, and a pixel size in the pixel array 1601b4 is configured to be larger than that in the pixel arrays 1601b2 and 1601b3. The pixel size is proportional to a size of the photoelectric conversion unit included in each pixel.

As for a wavelength of light received by each pixel, the pixel arrays 1601b1, 1601b2 and 1601b4 include pixels receiving light of a wavelength in the entire visible light region, and the pixel array 1601b3 includes pixels receiving light of a red wavelength.

The above configuration provided in the light receiving element 12 illustrated in FIG. 79A brings about an action that it is possible to obtain an image having a high resolution using the light receiving region 1601a1 in which a pixel size is small and a resolution is high, for example, in a case where illuminance of a subject is high and a large signal can thus be obtained in the light receiving element 12.

Furthermore, the above configuration brings about an action that it is possible to obtain an image having a high S/N ratio using the light receiving region 1601a2 in which an image having a high S/N ratio is obtained in a case where it is a possibility that an S/N ratio of an image will be reduced since illuminance of a subject is low and a large signal cannot thus be obtained in the light receiving element 12.

The above configuration brings about an action that it is possible to obtain an image having a higher S/N ratio using the light receiving region 1601a4 in which an image having a higher S/N ratio is obtained in a case where it is a possibility that illuminance of a subject is lower and an S/N ratio of an image is thus further reduced in the light receiving element 12.

Note that a configuration in which a diaphragm plate 51 of FIG. 79B among three shapes of diaphragm plates 51 illustrated in FIGS. 79B, 79C, and 79D is used in combination with the light receiving element 12 illustrated in FIG. 79A brings about an action similar to that brought about by the configuration in which the diaphragm plate 51 of FIG. 74B among the three shapes of the diaphragm plates 51 illustrated in FIGS. 74B, 74C, and 74D is used in combination with the light receiving element 12 illustrated in FIG. 74A.

Furthermore, a configuration in which a diaphragm plate 51 of FIG. 79C among three shapes of diaphragm plates 51 illustrated in FIGS. 79B 79C, and 79D is used in combination with the light receiving element 12 illustrated in FIG. 79A brings about an action similar to that brought about by the configuration in which the diaphragm plate 51 of FIG. 74C among the three shapes of the diaphragm plates 51 illustrated in FIGS. 74B, 74C, and 74D is used in combination with the light receiving element 12 illustrated in FIG. 74A.

Furthermore, a configuration in which a diaphragm plate 51 of FIG. 79D among three shapes of diaphragm plates 51 illustrated in FIGS. 79B 79C, and 79D is used in combination with the light receiving element 12 illustrated in FIG. 79A brings about an action similar to that brought about by using the diaphragm plate 51 of FIG. 74D among the three shapes of the diaphragm plates 51 illustrated in FIGS. 74B, 74C, and 74D in combination with the light receiving element 12 illustrated in FIG. 74A.

In the camera module 1 including the light receiving element 12 illustrated in FIG. 79A, the configuration of the diaphragm plate 51 illustrated in FIG. 64A or 64D, the configurations of the diaphragm plates 51 illustrated in FIGS. 79B, 79C, and 79D, or modified examples thereof can be adopted.

18. Configuration of Conventional Camera Module Having AF Function

By the way, in recent years, in accordance with miniaturization of a camera module, sensitivity improvement and resolution improvement have been achieved by decreasing an F number of the lens. However, a depth of field becomes narrow due to the decrease in the F number, that is, an increase in a diameter of the lens, which makes it difficult to focus the camera module. Therefore, the camera module needs to have an AF function.

Figure 80:
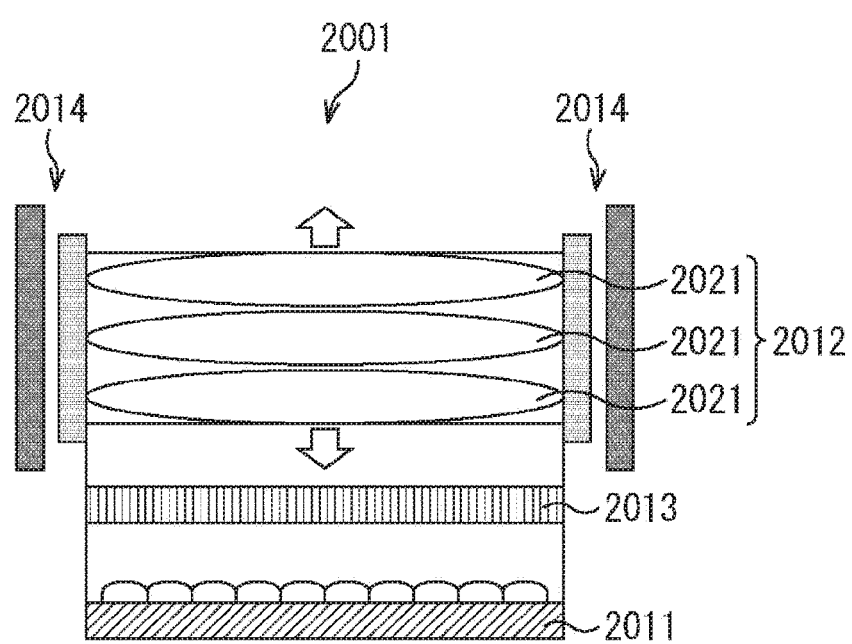
FIG. 80 is a view illustrating a configuration example of a conventional camera module having an auto-focus (AF) function.

FIG. 80 is a view illustrating a configuration example of a conventional camera module having an AF function.

A camera module 2001 illustrated in FIG. 80 includes an image sensor 2011, a lens unit 2012 in which lenses 2021 are stacked in three layers, an infrared light cut filter (IRCF) 2013, and a lens drive unit 2014.

The lens unit 2012 is configured by housing the lenses 2021 stacked in the three layers in a lens barrel (not illustrated). The lens drive unit 2014 moves the lens unit 2012 along an optical axis in, for example, a voice coil motor (VCM) manner.

Due to such a structure, an air layer is provided between the lens unit 2012 and the IRCF 2013 so that the lens unit 2012 and the IRCF 2013 are not in contact with each other. Moreover, in the example of FIG. 80, an air layer is also provided between the IRCF 2013 and the image sensor 2011.

Figure 81:
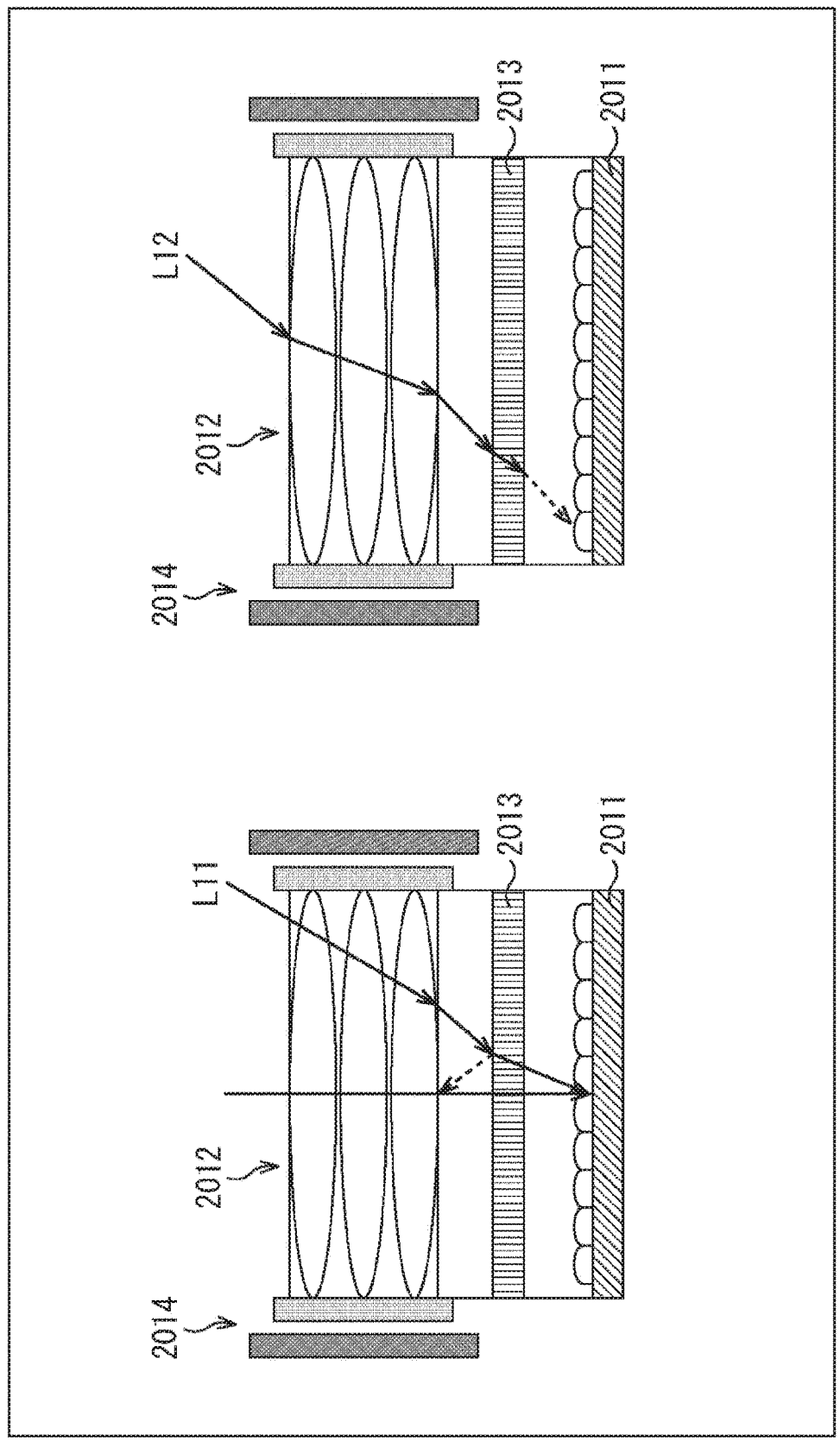
FIG. 81 is a view for describing a problem of the conventional camera module.

However, due to a difference in a refractive index between the air layer (refractive index n=1.0) and the IRCF (n=1.5), as illustrated on the left of FIG. 81, when light L11 passing through the lenses is incident on the IRCF 2013, the light L11 is largely reflected on a surface of the IRCF 2013, such that a ghost or a flare is generated.

Furthermore, due to the difference in the refractive index described above and an increase in a diameter of the lens in recent years, as illustrated on the right of FIG. 81, when oblique light L12 is incident on a light receiving surface of the image sensor 2011 at a high image height, an incident angle of the oblique light becomes large. Therefore, color mixing with adjacent pixels occurs, resulting in a decrease in sensitivity or deterioration in color reproducibility.

Therefore, a configuration of a camera module suppressing generation of the ghost or the flare and preventing the color mixing with the adjacent pixels will hereinafter be described.

19. First Configuration Example of Camera Module to which Present Technology is Applied FIG. 82 is a view illustrating a first configuration example of a camera module to which the present technology is applied.

Figure 82:
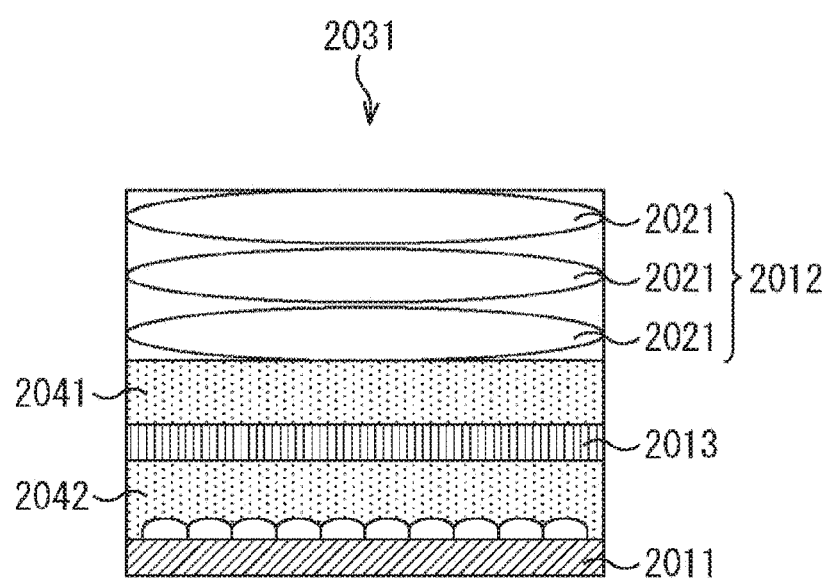
FIG. 82 is a view illustrating a first configuration example of a camera module to which the present technology is applied.

A camera module 2031 illustrated in FIG. 82 includes refractive index adjustment layers 2041 and 2042, in addition to an image sensor 2011, a lens unit 2012, and an IRCF 2013.

The camera module 2031 does not include a lens drive unit, and the lens unit 2012 is configured as a fixed focus lens. Note that the lens unit 2012 is configured as a stacked lens structure in which three lenses 2021 are stacked, but four or more lenses 2021 may be configured as a stacked lens structure in which four or more lenses 2021 are stacked. An F number of the lens unit 2012 is, for example, F2.0 or less.

The refractive index adjustment layer 2041 is formed without a gap between the lens unit 2012 and the IRCF 2013. Furthermore, the refractive index adjustment layer 2042 is formed without a gap between the IRCF 2013 and the image sensor 2011.

The refractive index adjustment layers 2041 and 2042 include a resin material, a liquid material, or a solid material having a refractive index of 1.2 to 1.7.

Transmittances of the refractive index adjustment layers 2041 and 2042 are 80% or more in a wavelength range of 400 to 700 nm, which is approximately a wavelength range of visible light.

Figure 83:
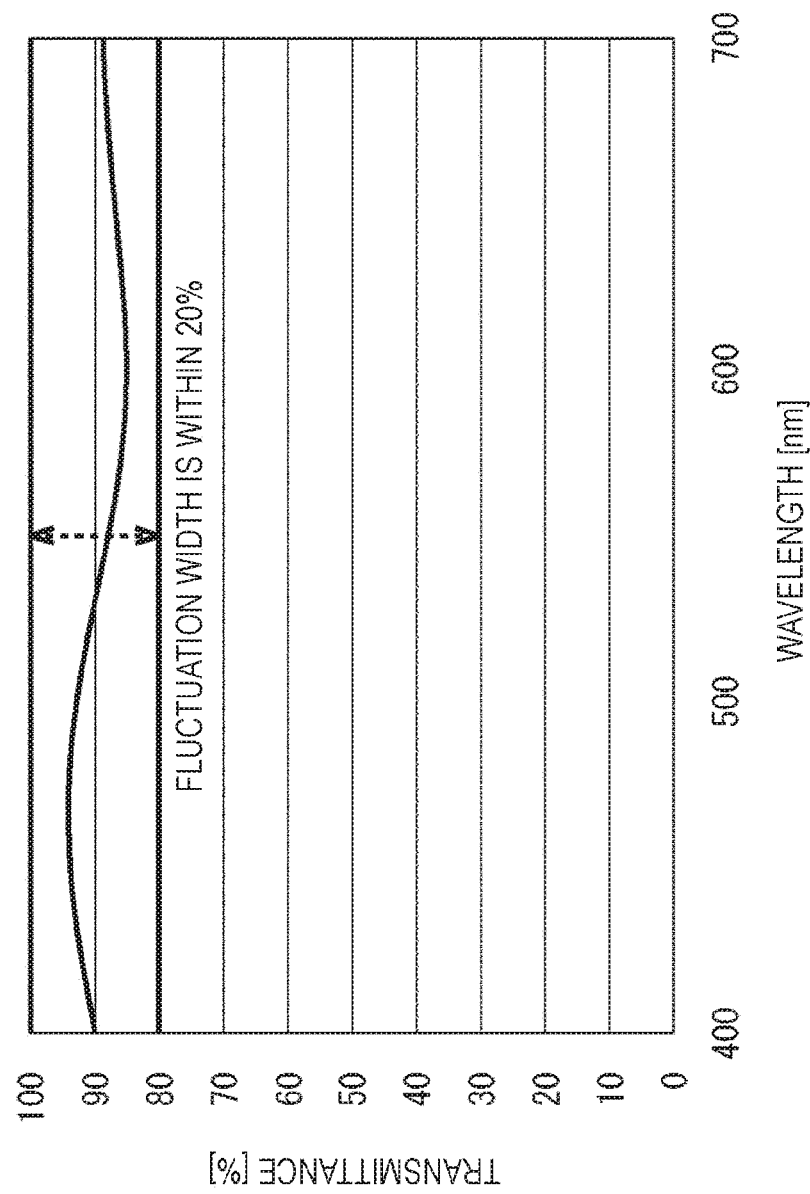
FIG. 83 is a view for describing transmittance characteristics of a refractive index adjustment layer.

Furthermore, the transmittances of the refractive index adjustment layers 2041 and 2042 show substantially flat characteristics without coloring in the wavelength range of 400 to 700 nm. Specifically, as illustrated in FIG. 83, the transmittances of the refractive index adjustment layers 2041 and 2042 show characteristics that a change point draws a gentle curve in the wavelength range of 400 to 700 nm and a fluctuation width of the transmittance is within 20%.

Figure 84:
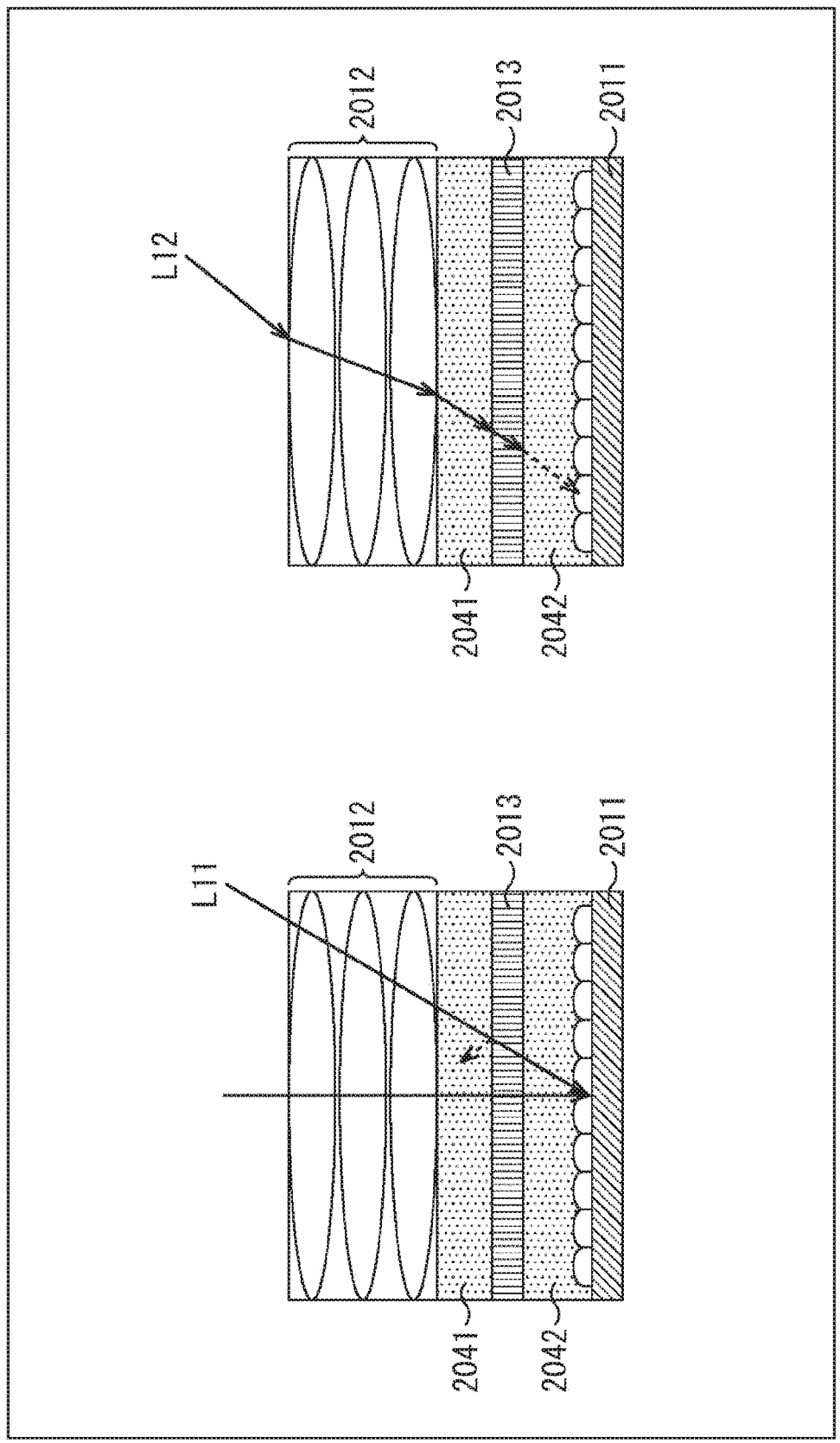
FIG. 84 is a view for describing an improvement by the camera module to which the present technology is applied.

With such a configuration, a difference in a refractive index between the refractive index adjustment layer 2041 and the IRCF 2013 is reduced. Therefore, as illustrated on the left of FIG. 84, when light L11 passing through the lenses is incident on the IRCF 2013, reflection of the light on a surface of the IRCF 2013 can be reduced, such that it is possible to suppress the generation of the ghost or the flare.

Furthermore, a difference in a refractive index between IRCF 2013 and refractive index adjustment layer 2042 is also reduced. Therefore, as illustrated on the right of FIG. 84, an incident angle of oblique light L12 when the oblique light L12 is incident on a light receiving surface of the image sensor 2011 at a high image height can be suppressed. As a result, it is possible to prevent color mixing with adjacent pixels to realize improvement in sensitivity and improvement in color reproducibility.

Figure 85:
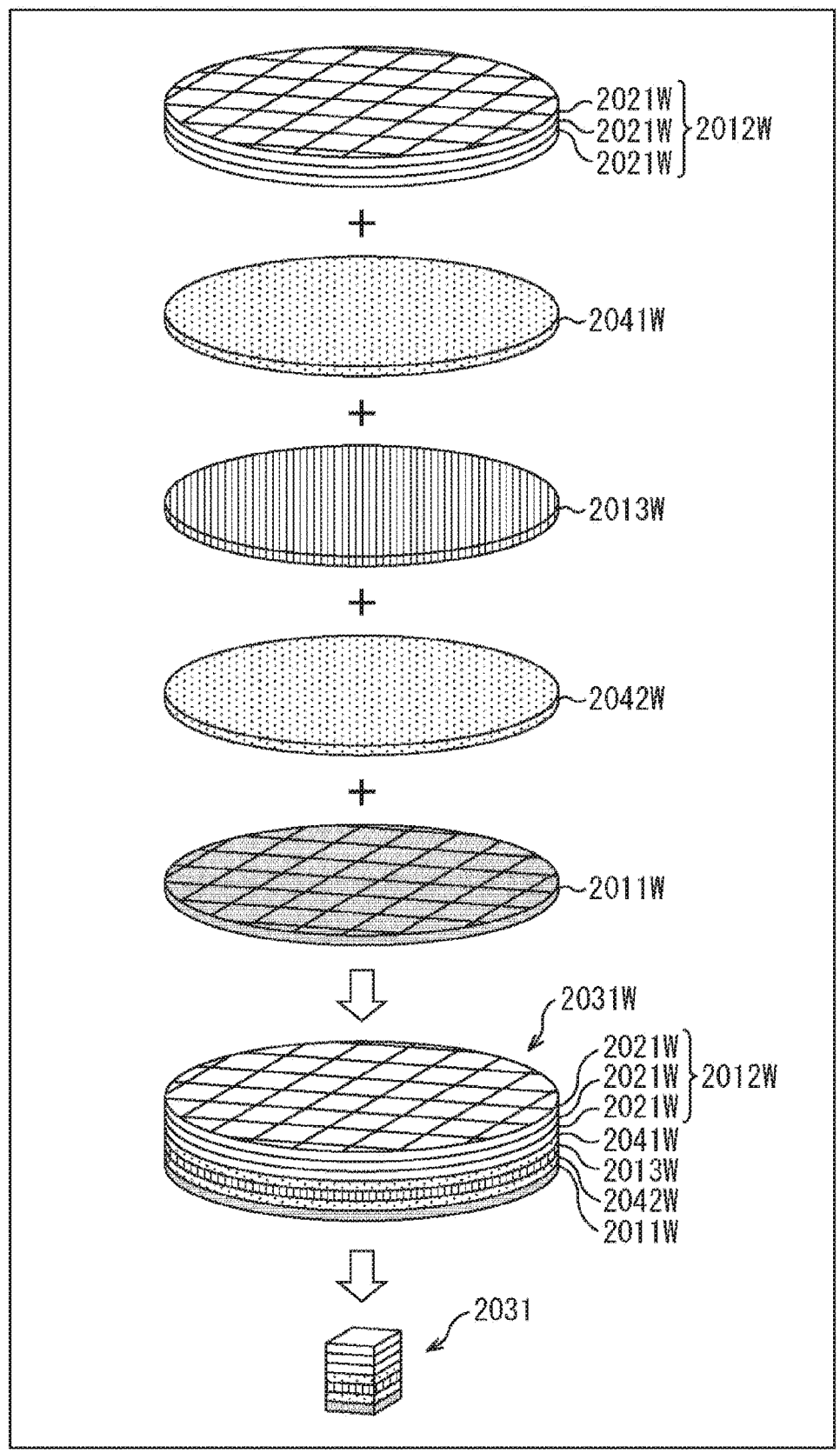
FIG. 85 is a view illustrating a process of forming the camera module of FIG. 82.

FIG. 85 is a view illustrating a process of forming the camera module 2031 of FIG. 82.

First, a plurality of substrates 2021W with lenses in which a plurality of lenses 2021 is formed in a plane direction is prepared, and is stacked, such that a stacked lens structure 2012W in a substrate state is obtained.

Next, a sensor substrate 2011W in a substrate state where a plurality of image sensors 2011 is formed in the plane direction is manufactured and prepared separately from the stacked lens structure 2012W in the substrate state.

Then, the sensor substrate 2011W, a refractive index adjustment layer 2042W, an IRCF 2013W, a refractive index adjustment layer 2041W, and the stacked lens structure 2012W in substrate states are stacked, and an external terminal is attached to each module of the substrates stuck to each other, such that a camera module 2031W in a substrate state is obtained.

Finally, the camera module 2031W in the substrate state is singulated in module units or chip units. Singulated camera modules 2031 are enclosed in separately prepared housings (not illustrated), such that final camera modules 2031 are obtained.

20. Second Configuration Example of Camera Module to which Present Technology is Applied FIG. 86 is a view illustrating a second configuration example of a camera module to which the present technology is applied.

Figure 86:
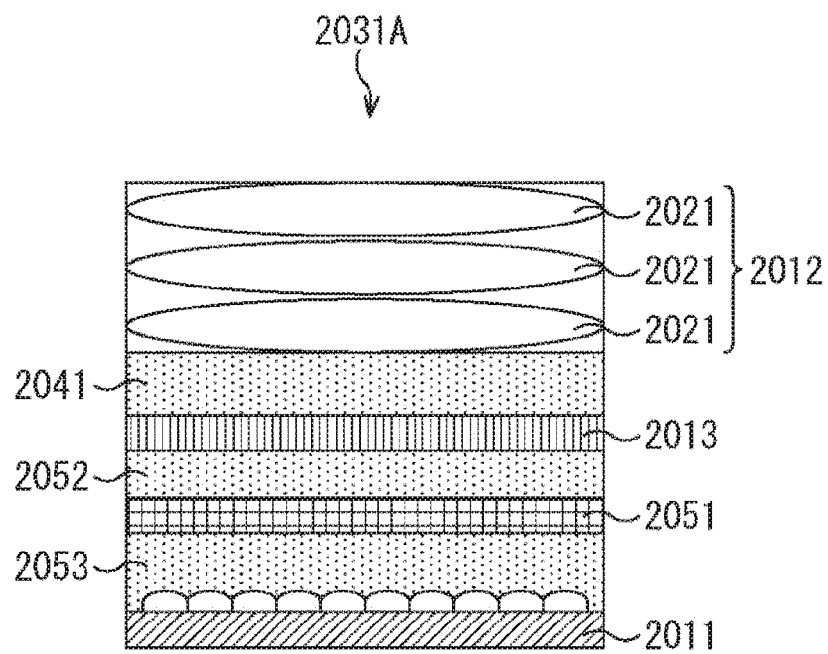
FIG. 86 is a view illustrating a second configuration example of a camera module to which the present technology is applied.

A camera module 2031A illustrated in FIG. 86 includes a cover glass 2051 and refractive index adjustment layers 2052 and 2053, in addition to an image sensor 2011, a lens unit 2012, an IRCF 2013, and a reflective index adjustment layer 2041.

The cover glass 2051 is provided between the image sensor 2011 and the IRCF 2013.

Then, the refractive index adjustment layer 2052 is formed without a gap between the IRCF 2013 and the cover glass 2051, and the refractive index adjustment layer 2052 is formed without a gap between the cover glass 2051 and the image sensor 2011.

Also in such a configuration, similar to the first configuration example, it is possible to suppress generation of a ghost or a flare and prevent color mixing with adjacent pixels to realize improvement in sensitivity and improvement in color reproducibility. Note that the refractive index adjustment layer 2052 is formed without the gap between the IRCF 2013 and the cover glass 2051 in the example of FIG. 86, the IRCF 2013 may be formed directly (without a gap) on the cover glass 2051.

21. Third Configuration Example of Camera Module to which Present Technology is Applied FIG. 87 is a view illustrating a third configuration example of a camera module to which the present technology is applied.

Figure 87:
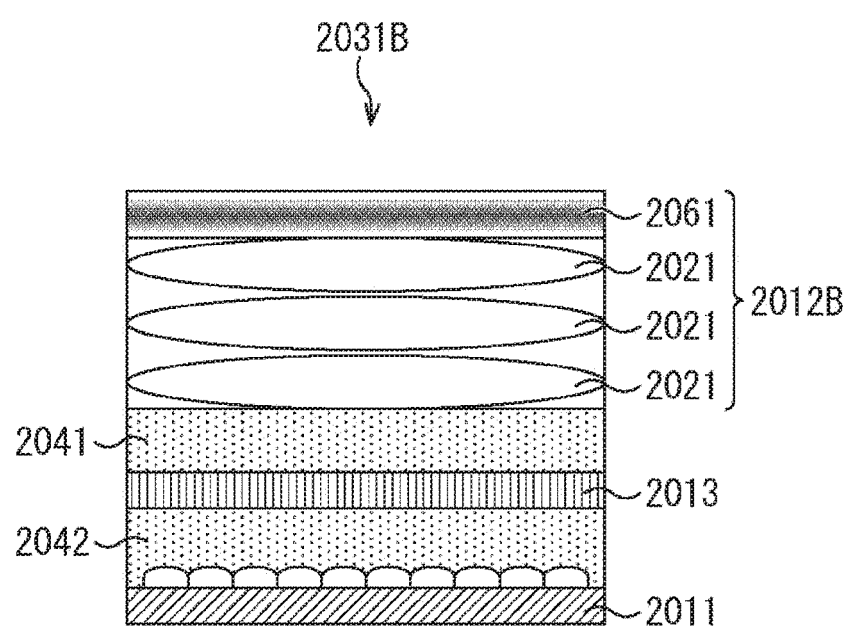
FIG. 87 is a view illustrating a third configuration example of a camera module to which the present technology is applied.

A camera module 2031B illustrated in FIG. 87 includes a lens unit 2012B instead of the lens unit 2012 of the camera module 2031 of FIG. 82.

The lens unit 2012B includes a variable focus lens 2061 arranged on lenses 2021 stacked in three layers.

The variable focus lens 2061 is a liquid crystal lens, a liquid lens, or a micro electro mechanical systems (MEMS) lens, and is configured so that a focal length thereof is electrically adjustable. For example, in a case where the variable focus lens 2061 is the liquid crystal lens, the focal length of the variable focus lens 2061 is adjusted by controlling alignment of liquid crystal molecules by an electrical signal to change a refractive index. Furthermore, in a case where the variable focus lens 2061 is the liquid lens, the focal length of the variable focus lens 2061 is adjusted by changing a shape of a liquid by an electrical signal to change a refractive index. Moreover, in a case where the variable focus lens 2061 is the MEMS lens, the focal length of the variable focus lens 2061 is adjusted by changing a shape of an object (gel) by a piezoelectric element to change a refractive index.

With the lens unit 2012B, it is possible to configure a camera module having an AF function without a lens drive unit.

Then, also in such a configuration, similar to the first configuration example, it is possible to suppress generation of a ghost or a flare and prevent color mixing with adjacent pixels to realize improvement in sensitivity and improvement in color reproducibility.

22. Fourth Configuration Example of Camera Module to which Present Technology is Applied FIG. 88 is a view illustrating a fourth configuration example of a camera module to which the present technology is applied.

Figure 88:
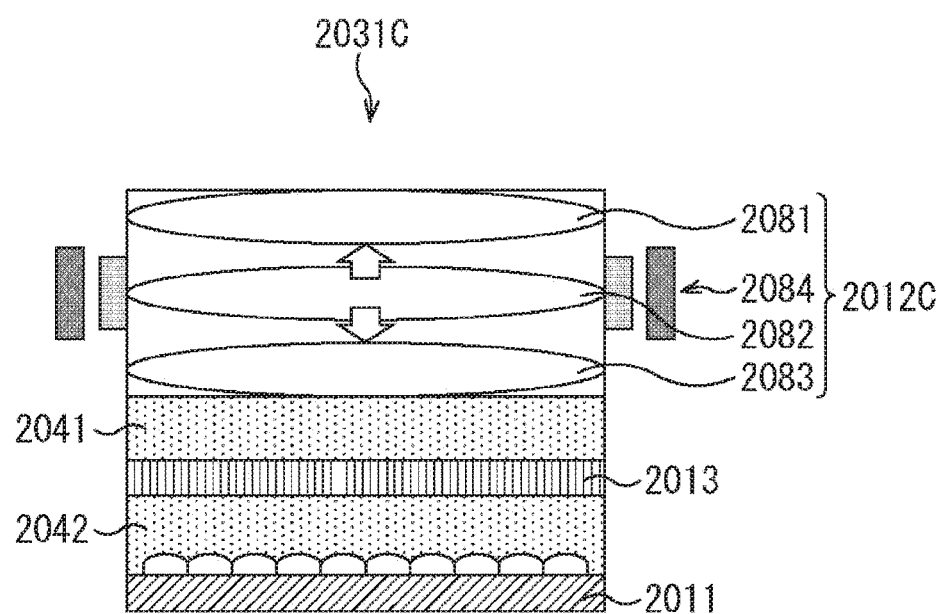
FIG. 88 is a view illustrating a fourth configuration example of a camera module to which the present technology is applied.

A camera module 2031C illustrated in FIG. 88 includes a lens unit 2012C instead of the lens unit 2012 of the camera module 2031 of FIG. 82.

The lens unit 2012C is configured as an inner focus type lens, and includes lenses 2081 to 2083 and a lens drive unit 2084.

In the lens unit 2012C, in a state where the lenses 2081 and 2083 are fixed, a focal length is adjusted by moving the lens 2082 by the lens drive unit 2084 in, for example, a VCM manner.

With the lens unit 2012C, it is possible to configure a camera module having an AF function.

Then, also in such a configuration, similar to the first configuration example, it is possible to suppress generation of a ghost or a flare and prevent color mixing with adjacent pixels to realize improvement in sensitivity and improvement in color reproducibility.

23. Fifth Configuration Example of Camera Module to which Present Technology is Applied FIG. 89 is a view illustrating a fifth configuration example of a camera module to which the present technology is applied.

Figure 89:
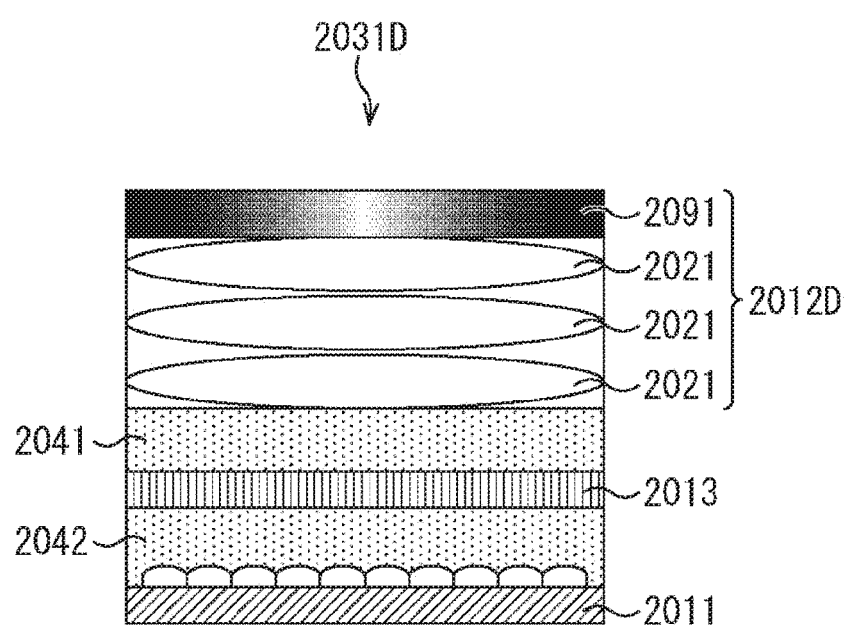
FIG. 89 is a view illustrating a fifth configuration example of a camera module to which the present technology is applied.

A camera module 2031D illustrated in FIG. 89 includes a lens unit 2012D instead of the lens unit 2012 of the camera module 2031 of FIG. 82.

The lens unit 2012D includes an apodized filter 2091 arranged on lenses 2021 stacked in three layers.

The apodized filter 2091 is one of optical diaphragms.

Figure 90:
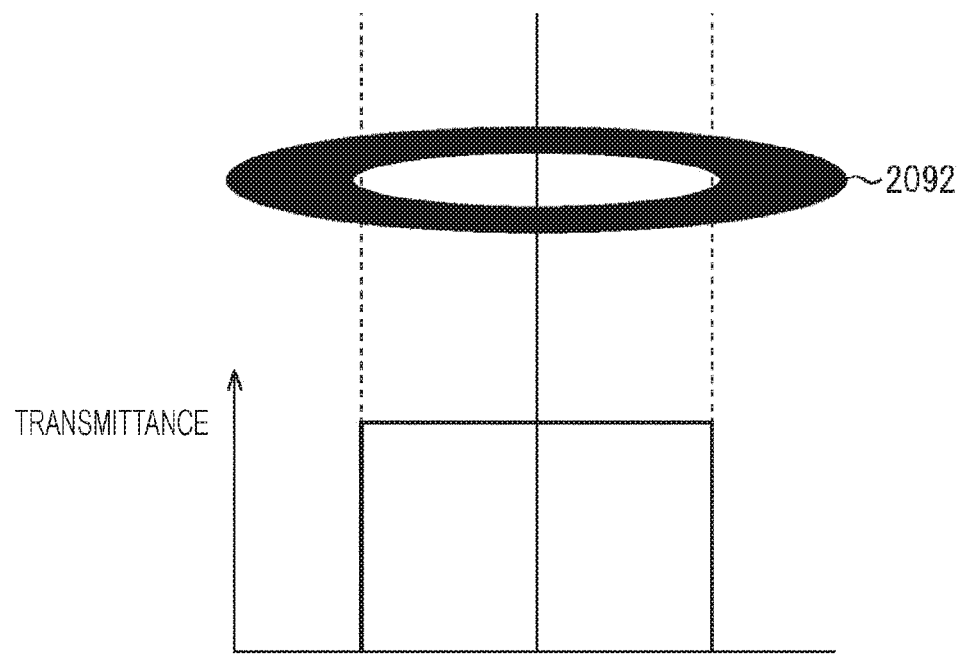
FIG. 90 is a view for describing a transmittance of a conventional optical diaphragm.

FIG. 90 is a view for describing a transmittance of a conventional optical diaphragm.

As illustrated in FIG. 90, a transmittance of a conventional optical diaphragm 2092 has a uniform value at an opening of the conventional optical diaphragm 2092 and is zero in the vicinity of the opening. However, in the optical diaphragm 2092 having such transmittance characteristics, there was a possibility that a resolution will be reduced due to diffraction of light generated in the vicinity of the opening.

Figure 91:
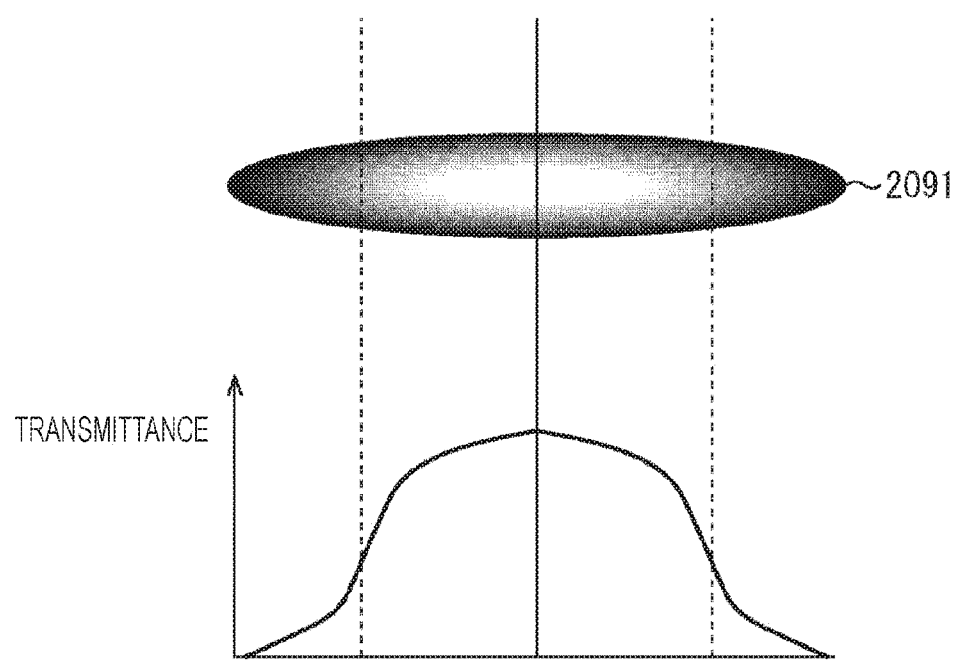
FIG. 91 is a view for describing a transmittance of an apodized filter.

On the other hand, as illustrated in FIG. 91, a transmittance of the apodized filter 2091 has such characteristics that it is gradually decreased from a central portion of the apodized filter 2091 toward a peripheral portion of the apodized filter 2091. Specifically, the transmittance of the apodized filter 2091 is, for example, 80% or more at an optical center and 0.01% at an end portion in a wavelength range of 400 to 700 nm. Furthermore, the transmittance of the apodized filter 2091 shows substantially flat characteristics without coloring in the wavelength range of 400 to 700 nm.

Particularly, when a depth of field becomes narrow due to an increase in a diameter of the lens, which makes it difficult to focus the camera module, but by providing the apodized filter 2091 in the lens unit 2012D, it is possible to suppress generation of the diffraction of the light and prevent the reduction in the resolution.

Then, also in such a configuration, similar to the first configuration example, it is possible to suppress generation of a ghost or a flare and prevent color mixing with adjacent pixels to realize improvement in sensitivity and improvement in color reproducibility.

24. Sixth Configuration Example of Camera Module to which Present Technology is Applied FIG. 92 is a view illustrating a sixth configuration example of a camera module to which the present technology is applied.

Figure 92:
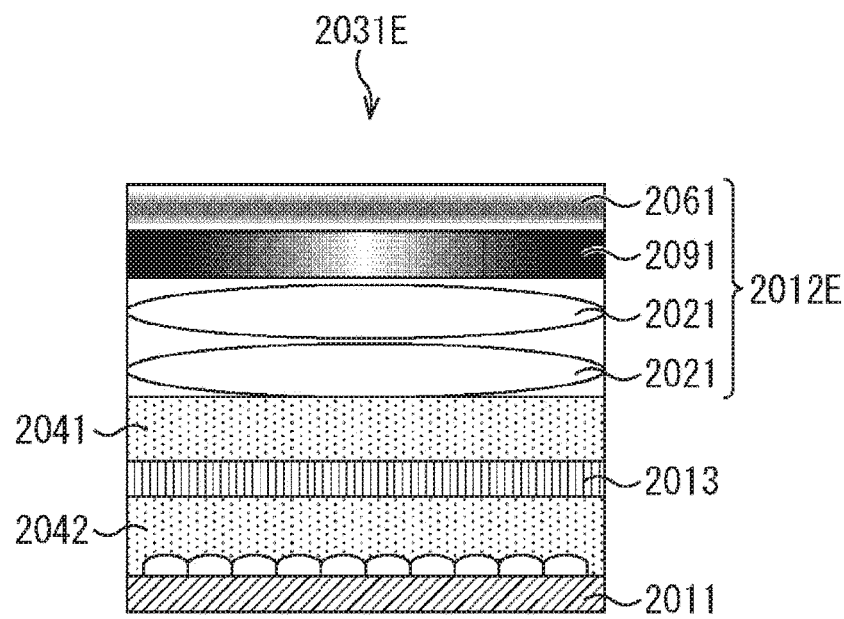
FIG. 92 is a view illustrating a sixth configuration example of a camera module to which the present technology is applied.

A camera module 2031E illustrated in FIG. 92 includes a lens unit 2012E instead of the lens unit 2012 of the camera module 2031 of FIG. 82.

The lens unit 2012E includes an apodized filter 2091 and a variable focus lens 2061 arranged on lenses 2021 stacked in two layers.

According to the lens unit 2012E, it is possible to configure a camera module that has an AF function and can prevent a reduction in resolution.

25. Seventh Configuration Example of Camera Module to which Present Technology is Applied FIG. 93 is a view illustrating a seventh configuration example of a camera module to which the present technology is applied.

Figure 93:
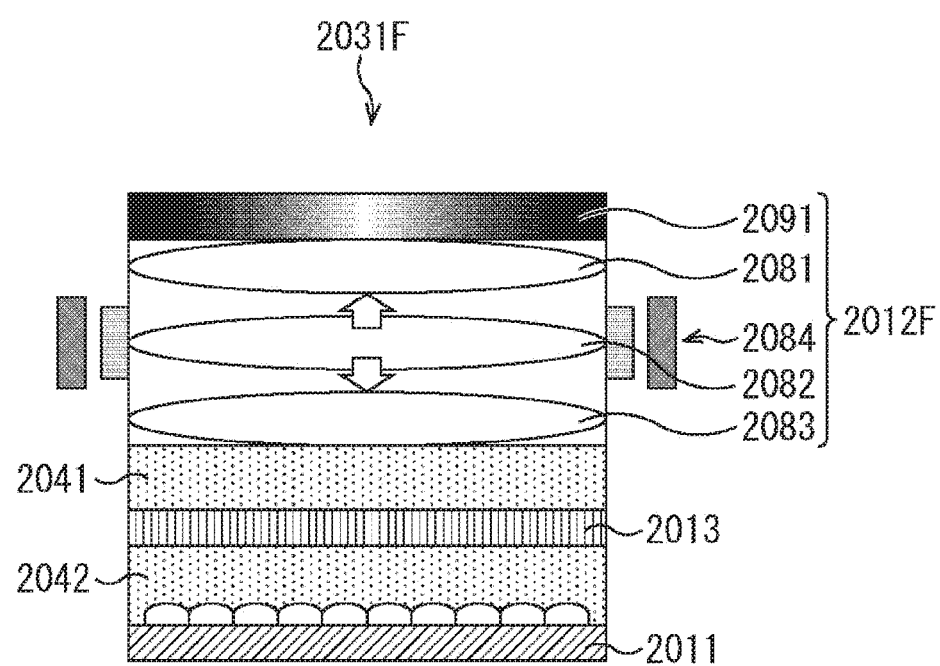
FIG. 93 is a view illustrating a seventh configuration example of a camera module to which the present technology is applied.
Figure 94A:
FIGS. 94A, 94B, 94C, and 94D are views illustrating a process of forming an apodized filter.
Figure 94B:
Figure 94C:
Figure 94D:
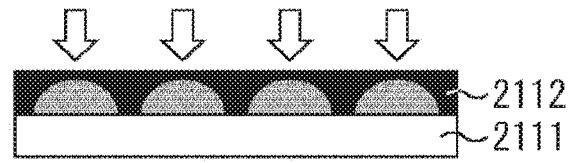

A camera module 2031F illustrated in FIG. 93 includes a lens unit 2012F instead of the lens unit 2012 of the camera module 2031 of FIG. 82.

The lens unit 2012F is configured as an inner focus type lens, and includes lenses 2081 to 2083, a lens drive unit 2084, and an apodized filter 2091.

According to the lens unit 2012F, it is possible to configure a camera module that has an AF function and can prevent a reduction in resolution.

Here, a nanoimprint process of forming the apodized filter 2091 adopted in the configuration example described above will be described with reference to FIGS. 94A, 94B, 94C, and 94D.

First, as illustrated in process A, a glass substrate 2111 and a mold 2112 are prepared.

Next, as illustrated in process B, a photocurable resin 2121 is formed on the glass substrate 2111. A black resin such as titanium black or titanium carbon is added to the photocurable resin 2121.

Then, as illustrated in process C, a pressure is applied by the mold 2112, and UV light is irradiated.

Thereafter, as illustrated in process D, an apodized filter 2091W in a substrate state is manufactured by releasing the mold 2112.

The apodized filter 2091 formed as described above can be bonded to the lens 2021 at the wafer level described above.

Note that in a configuration (a configuration of a so-called front diaphragm) in which the apodized filter 2091 is provided in front of the lens 2021 (provided adjacent to a subject) among the configuration examples described above, the apodized filter 2091 can also allow a diaphragm to be configured to be mechanically adjustable.

Specifically, a plurality of apodized filters having different F numbers is prepared, and the apodized filters are mechanically switched using a mechanical shutter mechanism. For example, the apodized filter is switched so that an F number is F1.4 when it is the dark, F1.8 when it is intermediate brightness, and F2.8 when it is light.

With such a configuration, it is possible to adjust aperture value.

Moreover, an apodized filter in which a diaphragm is electrically adjustable may be used.

26. Eighth Configuration Example of Camera Module to which Present Technology is Applied FIG. 95 is a view illustrating an eighth configuration example of a camera module to which the present technology is applied.

Figure 95:
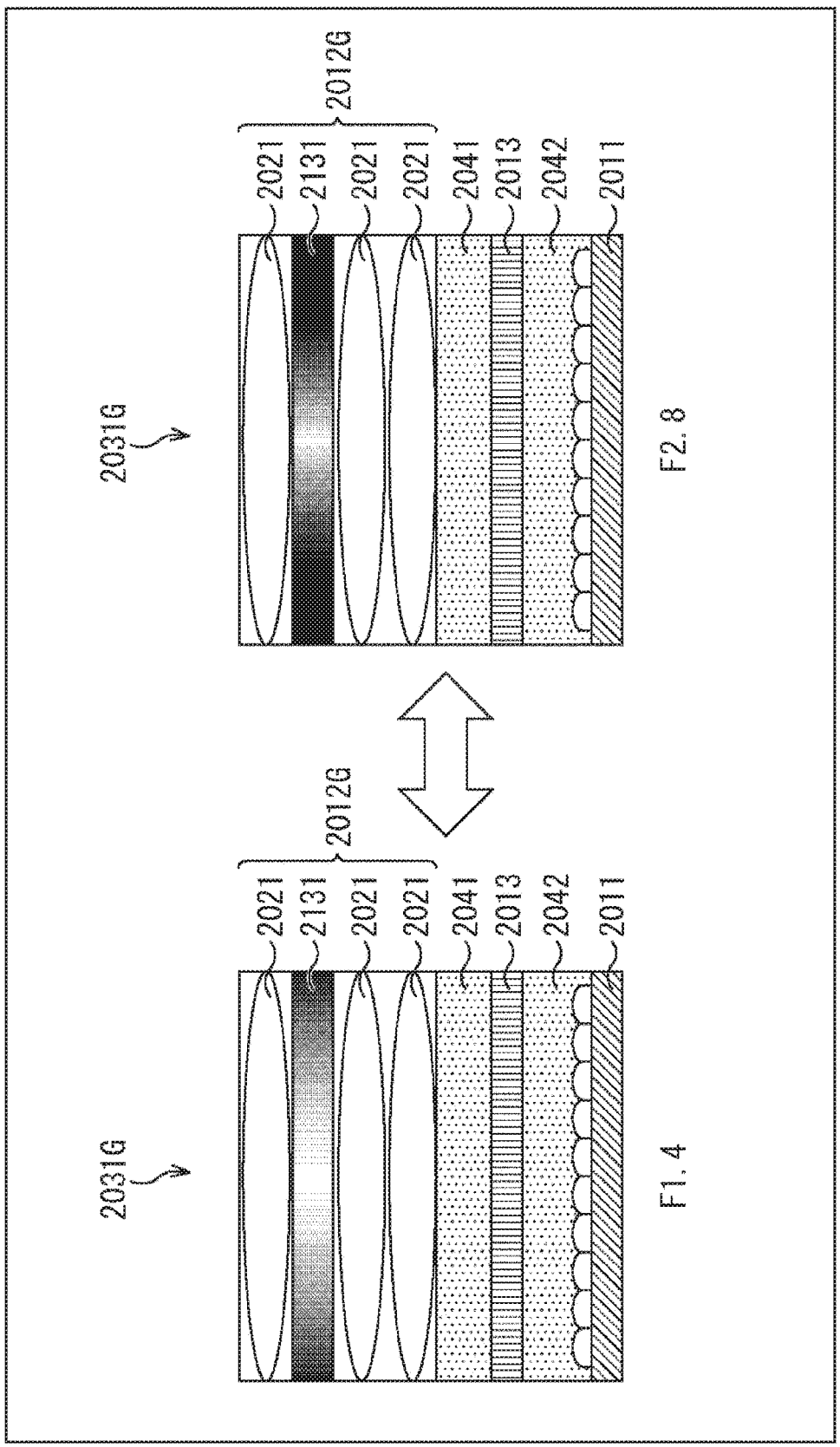
FIG. 95 is a view illustrating an eighth configuration example of a camera module to which the present technology is applied.

A camera module 2031G illustrated in FIG. 95 includes a lens unit 2012G instead of the lens unit 2012 of the camera module 2031 of FIG. 82.

The lens unit 2012G includes an apodized filter 2131 arranged on lenses 2021 stacked in two layers and beneath a lens 2021 of one layer.

The apodized filter 2131 is configured so that a diaphragm is electrically adjustable.

Specifically, the apodized filter 2131 includes a liquid crystal material or an electrochromic material of which a state can be electrically changed. In a case where the liquid crystal material is used, a diameter of the diaphragm is changed by controlling alignment of liquid crystal molecules by an electrical signal to change a transmittance. In a case where the electrochromic material is used, a diameter of the diaphragm is changed by controlling a colored state by an electrical signal to change a transmittance.

For example, when it is dark, a diameter of the diaphragm is changed to be F1.4, as illustrated on the left of FIG. 95, and when it is light, a diameter of the diaphragm is changed to be F2.8, as illustrated on the right of FIG. 95.

With such a configuration, it is possible to adjust aperture value.

Note that in the third to eighth configuration examples described above, the cover glass 2051 and the refractive index adjustment layers 2052 and 2053 provided in the second configuration example may be combined with each other.

27. Application Example to Electronic Apparatus

The camera module 2031 described above can be used in a form in which it incorporated in an electronic apparatus using a solid-state imaging device in an image capturing unit (photoelectric conversion unit), such as an imaging device such as a digital still camera, a video camera or the like, a portable terminal device having an imaging function, a copy machine using a solid-state imaging device in an image reading unit, or the like.

Figure 96:
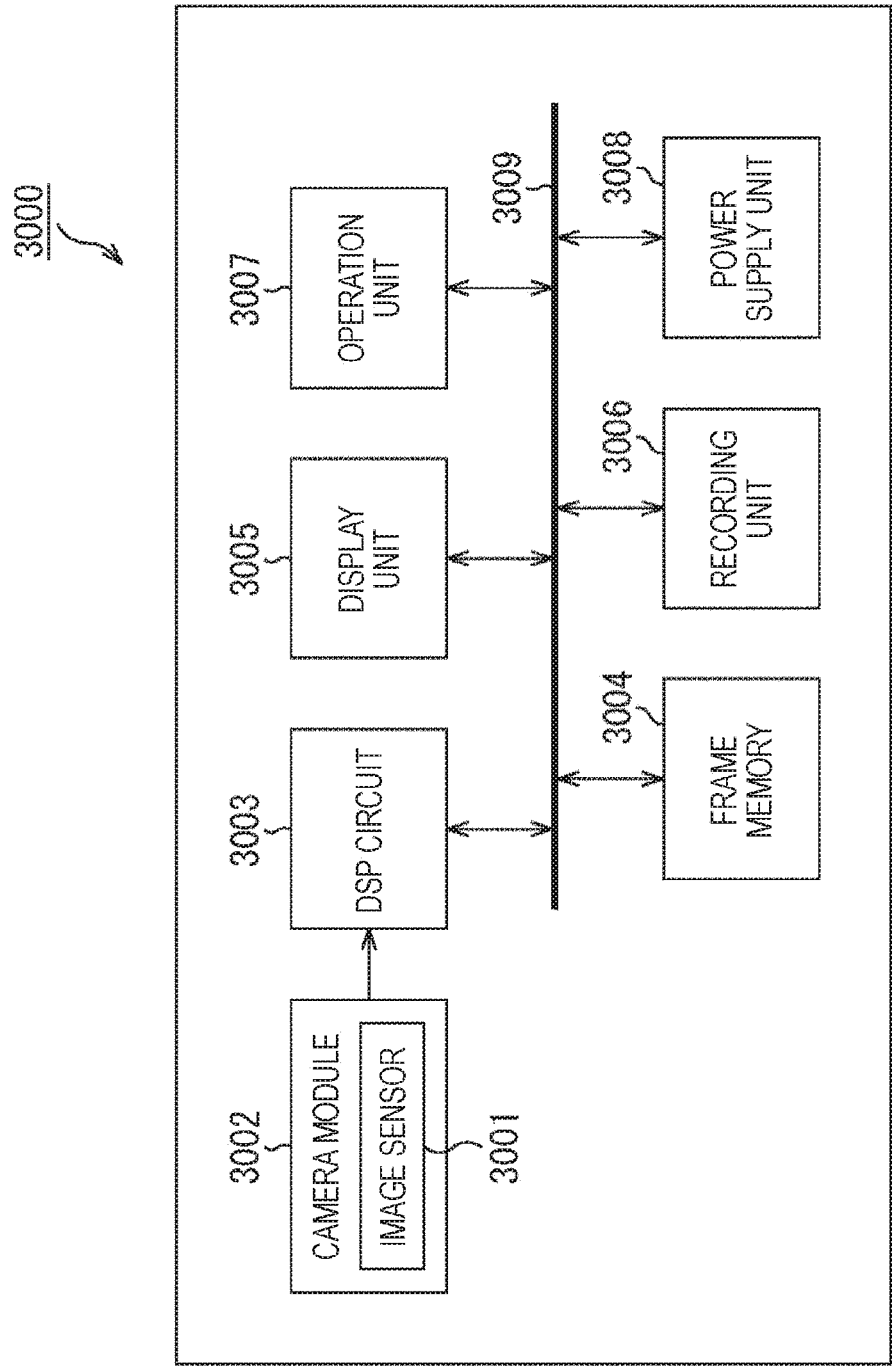
FIG. 96 is a block diagram illustrating a configuration example of an imaging device as an electronic apparatus to which the present technology is applied.

FIG. 96 is a block diagram illustrating a configuration example of an imaging device as an electronic apparatus to which the present technology is applied.

An imaging device 3000 of FIG. 96 includes a camera module 3002 and a digital signal processor (DSP) circuit 3003, which is a camera signal processing circuit. Furthermore, the imaging device 3000 also includes a frame memory 3004, a display unit 3005, a recording unit 3006, an operation unit 3007, and a power supply unit 3008. The DSP circuit 3003, the frame memory 3004, the display unit 3005, the recording unit 3006, the operation unit 3007, and the power supply unit 3008 are connected to each other through a bus line 3009.

An image sensor 3001 in the camera module 3002 takes in incident light (image light) from a subject, converts a light amount of the incident light formed on an imaging surface into an electrical signal in pixel units, and outputs the electrical signal as a pixel signal. The camera module 2031 described above is adopted as the camera module 3002, and the image sensor 3001 corresponds to the image sensor 2011 described above.

The display unit 3005 includes, for example, a panel-type display device such as a liquid crystal panel or an organic electro luminescence (EL) panel, and displays a moving image or a still image captured by the image sensor 3001. The recording unit 3006 records the moving image or the still image captured by the image sensor 3001 on a recording medium such as a hard disk or a semiconductor memory.

The operation unit 3007 issues operation commands for various functions of the imaging device 3000 under an operation of a user. The power supply unit 3008 appropriately supplies various types of power that becomes operation power of the DSP circuit 3003, the frame memory 3004, the display unit 3005, the recording unit 3006, and the operation unit 3007 to these supply targets.

As described above, by using the camera module 2031 provided with at least one refractive index adjustment layer formed between the image sensor 2011 and the lens unit 2012 as the camera module 3002, it is possible to suppress the generation of the ghost or the flare and prevent the color mixing with the adjacent pixels to realize the improvement in the sensitivity and the improvement in the color reproducibility. Therefore, also in the imaging device 3000 such as a video camera, a digital still camera, and a camera module for a mobile apparatus such as a portable phone or the like, it is possible to suppress the generation of the ghost or the flare and prevent the color mixing with the adjacent pixels to realize the improvement in the sensitivity and the improvement in the color reproducibility.

28. Use Example of Camera Module

Figure 97:
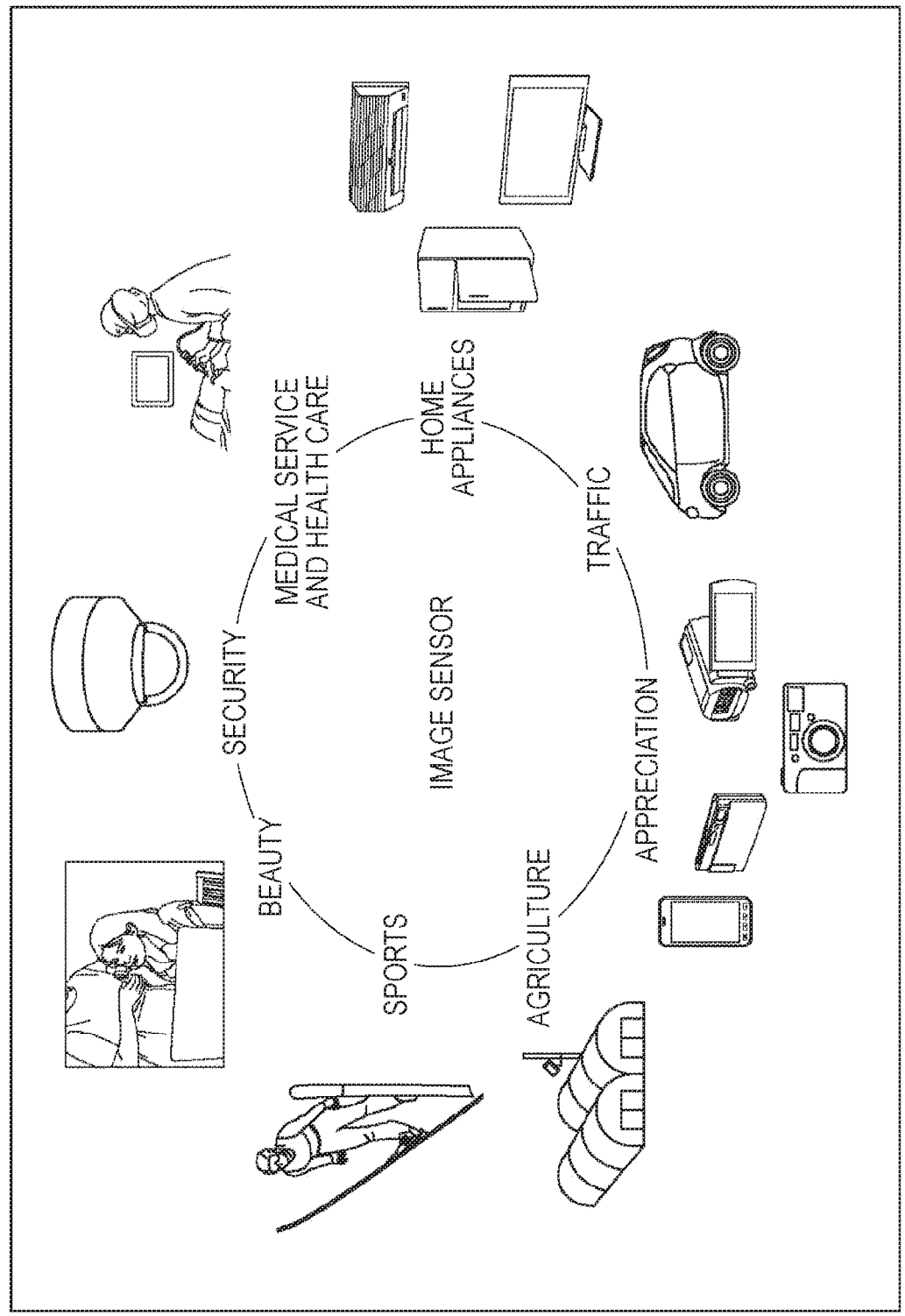
FIG. 97 is a view for describing a use example of an image sensor.

FIG. 97 is a view illustrating a use example in which the camera module 2031 is used.

The camera module 2031 can be used, for example, in various cases of sensing light such as visible light, infrared light, ultraviolet light, and X-rays, as follows.

- A device photographing an image provided for appreciation, such as a digital camera or a portable apparatus with a camera function
- A device provided for traffic, such as an in-vehicle sensor photographing the front or the rear, surroundings, the inside, and the like, of a vehicle, a monitoring camera monitoring a traveling vehicle and a road, a distance measurement sensor measuring a distance between vehicles, or the like, for safe driving such as automatic stop or the like, recognition of a driver state or the like
- A device provided for home appliances such as a television (TV), a refrigerator, and an air conditioner, in order to photograph a user's gesture and perform an apparatus operation depending on the gesture
- A device provided for medical service and healthcare, such as endoscopes or a device performing blood vessel photographing by receiving infrared light
- A device provided for security, such as a monitoring camera for crime prevention or a camera for person authentication
- A device provided for beauty, such as a skin measuring instrument photographing the skin, a microscope photographing the scalp, or the like
- A device provided for sports, such as an action camera or a wearable camera for sports
- A device provided for agriculture, such as a camera monitoring a condition of fields or crops

29. Application Example to In-Vivo Information Acquisition System

The technology according to the present disclosure (the present technology) can be applied to various products. For example, the technology according to the present disclosure may be applied to an endoscopic surgery system.

Figure 98:
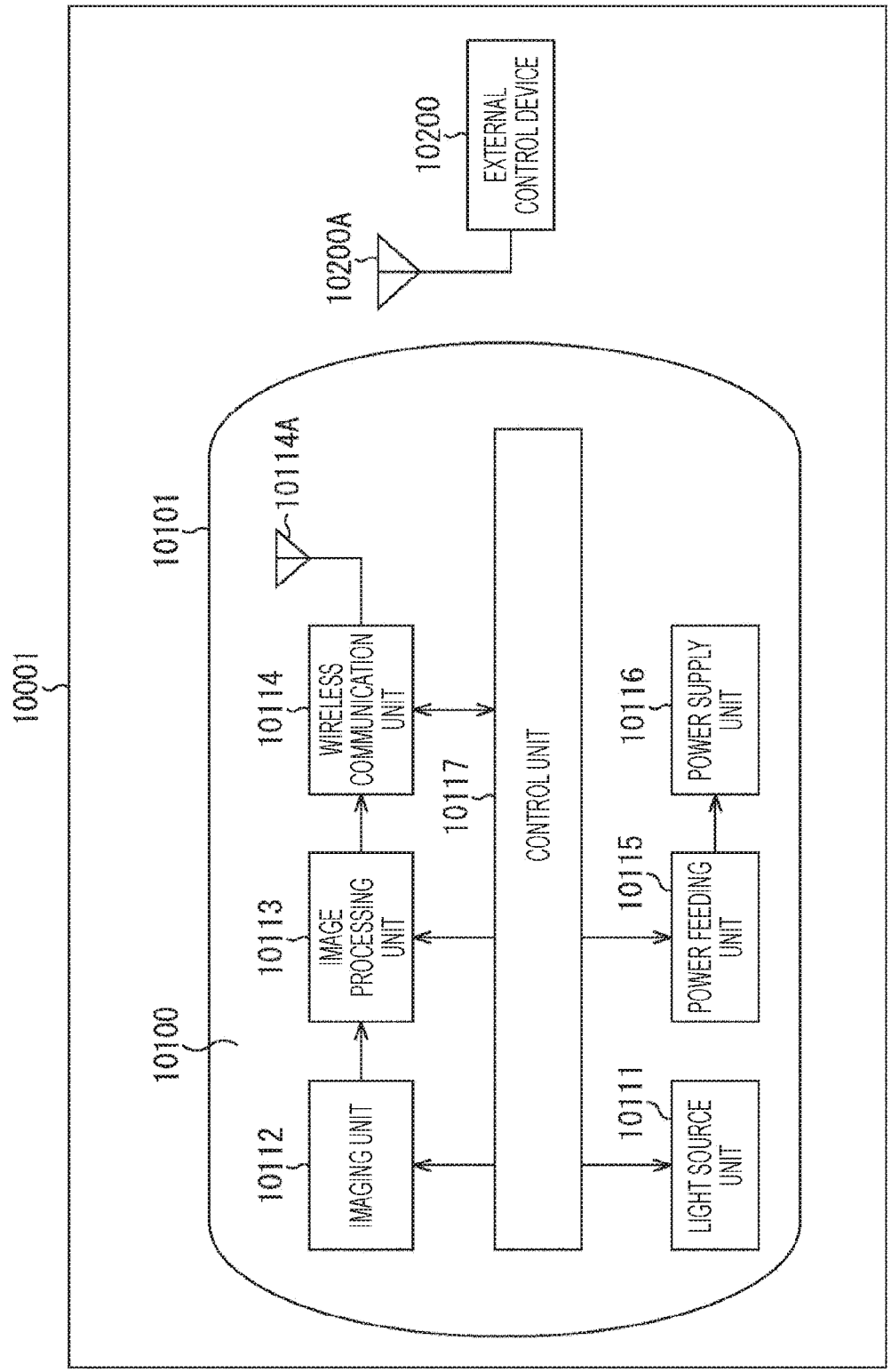
FIG. 98 is a block diagram illustrating an example of a schematic configuration of an in-vivo information acquisition system.

FIG. 98 is a block diagram illustrating an example of a schematic configuration of an in-vivo information acquisition system of a patient using a capsule type endoscope to which the technology according to the present disclosure (the present technology) can be applied.

The in-vivo information acquisition system 10001 includes a capsule type endoscope 10100 and an external control device 10200.

The capsule type endoscope 10100 is swallowed by the patient at the time of examination. The capsule type endoscope 10100 has an imaging function and a wireless communication function, and sequentially captures images of the inside of the organ (hereinafter, also referred to as in-vivo images) at predetermined intervals and sequentially wirelessly transmits information regarding the in-vivo images to the external control device 10200 outside the body, while moving inside the organ such as the stomach or intestine by peristaltic movement or the like during a period until it is naturally discharged from the patient.

The external control device 10200 generally controls an operation of the in-vivo information acquisition system 10001. Furthermore, the external control device 10200 receives the information regarding the in-vivo images transmitted from the capsule type endoscope 10100, and generates image data for displaying the in-vivo images on a display device (not illustrated) on the basis of the received information regarding the in-vivo images.

In this way, the in-vivo information acquisition system 10001 can obtain the in-vivo images at any time by capturing an image of a state in the patient's body during a period from when the capsule type endoscope 10100 is swallowed until the capsule type endoscope 10100 is discharged.

Configurations and functions of the capsule type endoscope 10100 and the external control device 10200 will be described in more detail.

The capsule type endoscope 10100 has a capsule type housing 10101, and a light source unit 10111, an imaging unit 10112, an image processing unit 10113, a wireless communication unit 10114, a power feeding unit 10115, a power supply unit 10116, and a control unit 10117 are housed in the housing 10101.

The light source unit 10111 includes, for example, a light source such as a light emitting diode (LED), and irradiates light to an imaging visual field of the imaging unit 10112.

The imaging unit 10112 includes an imaging element and an optical system including a plurality of lenses provided in front of the imaging element. Reflected light (hereinafter, referred to as observation light) of light irradiated to a body tissue, which is an observation target, is collected by the optical system and is incident on the imaging element. In the imaging unit 10112, in the imaging element, the observation light incident on the imaging element is photoelectrically converted, such that an image signal corresponding to the observation light is generated. The image signal generated by the imaging unit 10112 is provided to the image processing unit 10113.

The image processing unit 10113 includes a processor such as a central processing unit (CPU) or a graphics processing unit (GPU) and performs various signal processing on the image signal generated by the imaging unit 10112. The image processing unit 10113 provides the image signal on which the signal processing is performed, as RAW data to the wireless communication unit 10114.

The wireless communication unit 10114 performs predetermined processing such as modulation processing on the image signal on which the signal processing is performed by the image processing unit 10113, and transmits the image signal on which the predetermined processing is performed to the external control device 10200 through an antenna 10114A. Furthermore, the wireless communication unit 10114 receives a control signal related to drive control of the capsule type endoscope 10100 from the external control device 10200 through the antenna 10114A. The wireless communication unit 10114 provides the control signal received from the external control device 10200 to the control unit 10117.

The power feeding unit 10115 includes an antenna coil for receiving power, a power regeneration circuit regenerating power from a current generated in the antenna coil, a booster circuit, and the like. The power feeding unit 10115 generates power using the principle of so-called contactless charging.

The power supply unit 10116 includes a secondary battery, and stores the power generated by the power feeding unit 10115. Illustration of an arrow or the like indicating a supply destination of the power from the power supply unit 10116 is omitted in order to avoid complication of the drawing in FIG. 98, but the power stored in the power supply unit 10116 can be supplied to the light source unit 10111, the imaging unit 10112, the image processing unit 10113, the wireless communication unit 10114, and the control unit 10117 and be used to drive the light source unit 10111, the imaging unit 10112, the image processing unit 10113, the wireless communication unit 10114, and the control unit 10117.

The control unit 10117 includes a processor such as a CPU, and appropriately controls drive of the light source unit 10111, the imaging unit 10112, the image processing unit 10113, the wireless communication unit 10114, and the power feeding unit 10115 depending on a control signal transmitted from the external control device 10200.

The external control device 10200 includes a processor such as a CPU or a GPU, or a microcomputer, a control board or the like in which memory elements such as a processor and a memory are mixed with each other. The external control device 10200 controls an operation of the capsule type endoscope 10100 by transmitting the control signal to the control unit 10117 of the capsule type endoscope 10100 through an antenna 10200A. In the capsule type endoscope 10100, for example, an irradiation condition of the light to the observation target in the light source unit 10111 can be changed by the control signal from the external control device 10200. Furthermore, imaging conditions (for example, a frame rate, an exposure value or the like in the imaging unit 10112) can be changed by a control signal from the external control device 10200. Furthermore, contents of processing in the image processing unit 10113 and conditions (for example, transmission interval, number of transmission images and the like) under which the wireless communication unit 10114 transmits an image signal may be changed by a control signal from the external control device 10200.

Furthermore, the external control device 10200 performs various types of image processing on the image signal transmitted from the capsule type endoscope 10100, and generates image data for displaying the captured in-vivo image on the display device. As the image processing, for example, various signal processing such as development processing (demosaic processing), high image quality processing (band emphasis processing, super-resolution processing, noise reduction (NR) processing, and/or camera shake correction processing), and/or enlargement processing (electronic zoom processing), can be performed. The external control device 10200 controls drive of the display device to display the captured in-vivo image on the basis of the generated image data. Alternatively, the external control device 10200 may cause a recording device (not illustrated) to record the generated image data or cause a printing device (not illustrated) to print out the generated image data.

An example of the in-vivo information acquisition system to which the technology according to the present disclosure can be applied has been described hereinabove. The technology according to the present disclosure can be applied to the imaging unit 10112 among the configurations described above. Specifically, the camera module 2031 of FIG. 82 can be applied to the imaging unit 10112. By applying the technology according to the present disclosure to the imaging unit 10112, it is possible to obtain a clearer surgical site image, and it is thus possible to improve accuracy of the examination.

30. Application Example to Endoscopic Surgery System

Furthermore, the technology according to the present disclosure may be applied to an endoscopic surgery system.

Figure 99:
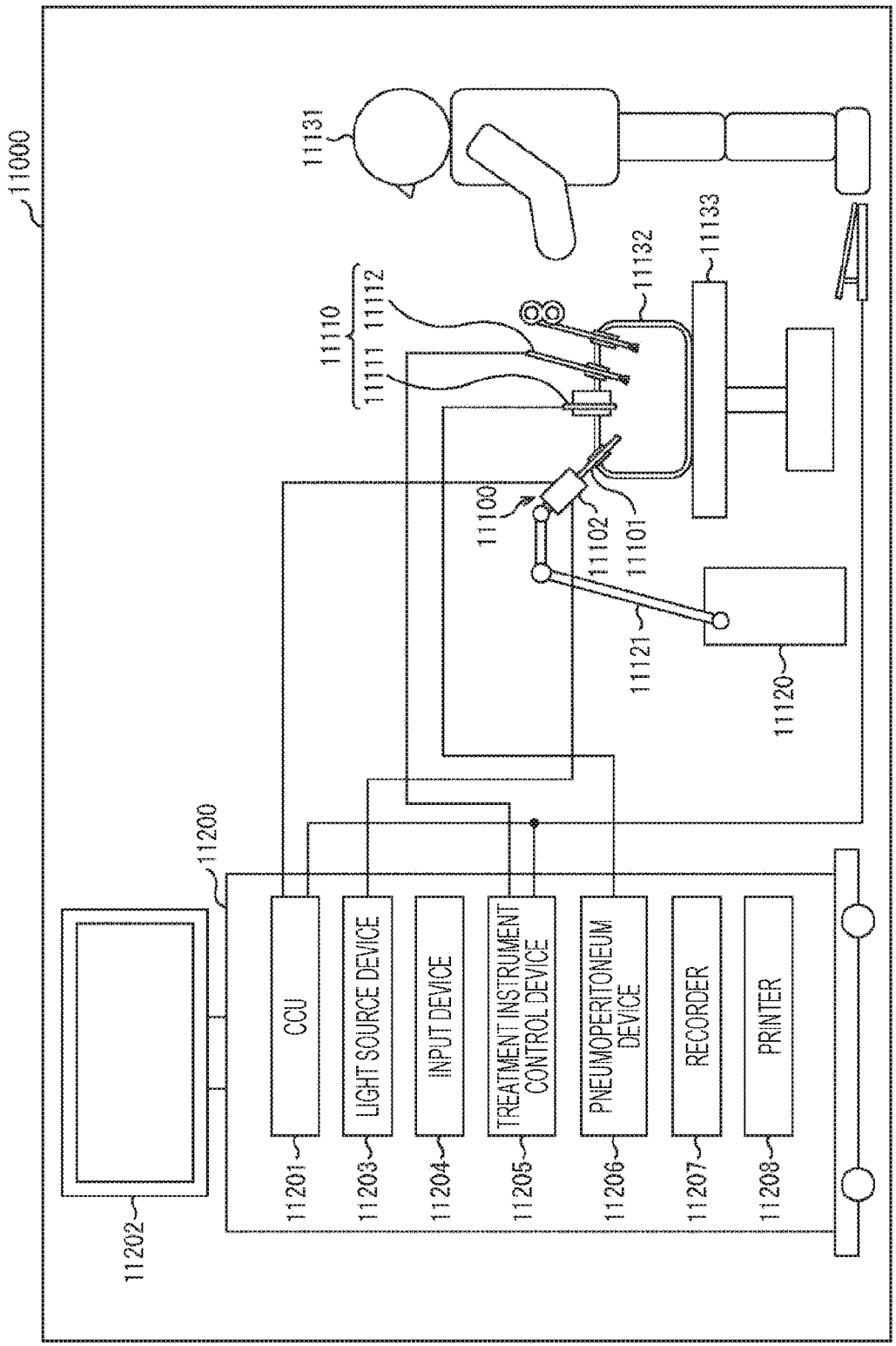
FIG. 99 is a view illustrating an example of a schematic configuration of an endoscopic surgery system.

FIG. 99 is a view illustrating an example of a schematic configuration of an endoscopic surgery system to which the technology according to the present disclosure (the present technology) can be applied.

In FIG. 99, an aspect in which an operator (surgeon) 11131 performs surgery on a patient 11132 on a patient bed 11133 using an endoscopic surgery system 11000 is illustrated. As illustrated in FIG. 99, the endoscopic surgery system 11000 includes an endoscope 11100, other surgical instruments 11110 such as a pneumoperitoneum tube 11111 or an energy treatment instrument 11112, a support arm device 11120 supporting the endoscope 11100, and a cart 11200 on which various devices for endoscopic surgery are mounted.

The endoscope 11100 includes a lens barrel 11101 of which a region of a predetermined length from the tip is inserted into a body cavity of the patient 11132, and a camera head 11102 connected to a base end of the lens barrel 11101. The endoscope 11100 configured as a so-called rigid scope having a rigid lens barrel 11101 is illustrated in the illustrated example, but the endoscope 11100 may be configured as a so-called flexible scope having a flexible lens barrel.

An opening into which an objective lens is fitted is provided at the tip of the lens barrel 11101. A light source device 11203 is connected to the endoscope 11100, such that light generated by the light source device 11203 is guided up to the tip of the lens barrel by a light guide extended inside the lens barrel 11101 and is irradiated toward an observation target in the body cavity of the patient 11132 through the objective lens. Note that the endoscope 11100 may be a straight viewing endoscope or may be an oblique viewing endoscope or a side viewing endoscope.

An optical system and an imaging element are provided inside the camera head 11102, and reflected light (observation light) from the observation target is collected on the imaging element by the optical system. The observation light is photoelectrically converted by the imaging element, such that an electrical signal corresponding to the observation light, that is, an image signal corresponding to the observation image is generated. The image signal is transmitted as RAW data to a camera control unit (CCU) 11201.

The CCU 11201 includes a central processing unit (CPU), a graphics processing unit (GPU), or the like, and generally controls operations of the endoscope 11100 and a display device 11202. Moreover, the CCU 11201 receives the image signal from the camera head 11102 and performs various image processing for displaying an image based on the image signal, such as development processing (demosaic processing), on the image signal.

The display device 11202 displays the image based on the image signal on which the image processing is performed by the CCU 11201, under control of the CCU 11201.

The light source device 11203 includes, for example, a light source such as a light emitting diode (LED), and supplies irradiated light to the endoscope 11100 at the time of photographing a surgical site or the like.

An input device 11204 is an input interface for the endoscopic surgery system 11000. A user can input various types of information and various instructions to the endoscopic surgery system 11000 through the input device 11204. For example, the user inputs an instruction to change imaging conditions (a type of irradiated light, a magnification, a focal length, and the like) by the endoscope 11100, and the like.

A treatment instrument control device 11205 controls drive of the energy treatment instrument 11112 for cautery and incision of tissue, sealing of a blood vessel, and the like. A pneumoperitoneum device 11206 sends a gas into the body cavity through the pneumoperitoneum tube 11111 in order to inflate the body cavity of the patient 11132 for the purpose of securing a visual field by the endoscope 11100 and securing a working space of the operator. A recorder 11207 is a device capable of recording various types of information regarding the surgery. A printer 11208 is a device capable of printing the various types of information regarding the surgery in various types such as a text, an image, or a graph.

Note that the light source device 11203 that supplies the irradiated light at the time of photographing the surgical site to the endoscope 11100 can include, for example, an LED, a laser light source, or a white light source including a combination of the LED and the laser light source. In a case where the white light source includes a combination of RGB laser light sources, it is possible to control an output intensity and an output timing of each color (each wavelength) with a high accuracy, and it is thus possible to adjust a white balance of a captured image in the light source device 11203. Furthermore, in this case, by irradiating laser light from each of the RGB laser light sources to an observation target in a time division manner and controlling the drive of the imaging element of the camera head 11102 in synchronization with an irradiation timing of the laser light, it is also possible to capture images corresponding to each of RGB in a time division manner. According to such a method, it is possible to obtain a color image without providing a color filter to the imaging element.

Furthermore, the drive of the light source device 11203 may be controlled so as to change an intensity of light output by the light source device 11203 every predetermined time. By controlling the drive of the imaging element of the camera head 11102 in synchronization with a timing of the change in the intensity of the light to acquire images in a time division manner and synthesizing the images with each other, it is possible to generate a high dynamic range image without a so-called black spot and white spot.

Furthermore, the light source device 11203 may be configured to be able to supply light of a predetermined wavelength band corresponding to special light observation. In the special light observation, for example, so-called narrow band imaging in which a predetermined tissue such as a blood vessel in a mucous membrane surface layer is photographed with high contrast by irradiating light of a narrow band as compared with irradiated light (that is, white light) at the time of normal observation using wavelength dependency of absorption of light in a body tissue is performed. Alternatively, in the special light observation, fluorescence observation in which an image is obtained by fluorescence generated by irradiating excitation light may be performed. In the fluorescence observation, it can be performed to irradiate excitation light to a body tissue and observe fluorescence from the body tissue (self-fluorescence observation) or locally inject a reagent such as indocyanine green (ICG) or the like to the body tissue and irradiate excitation light corresponding to a fluorescence wavelength of the reagent to the body tissue to obtain a fluorescence image. The light source device 11203 can be configured to be able to supply the light of the narrow band and/or the excitation light corresponding to such special light observation.

Figure 100:
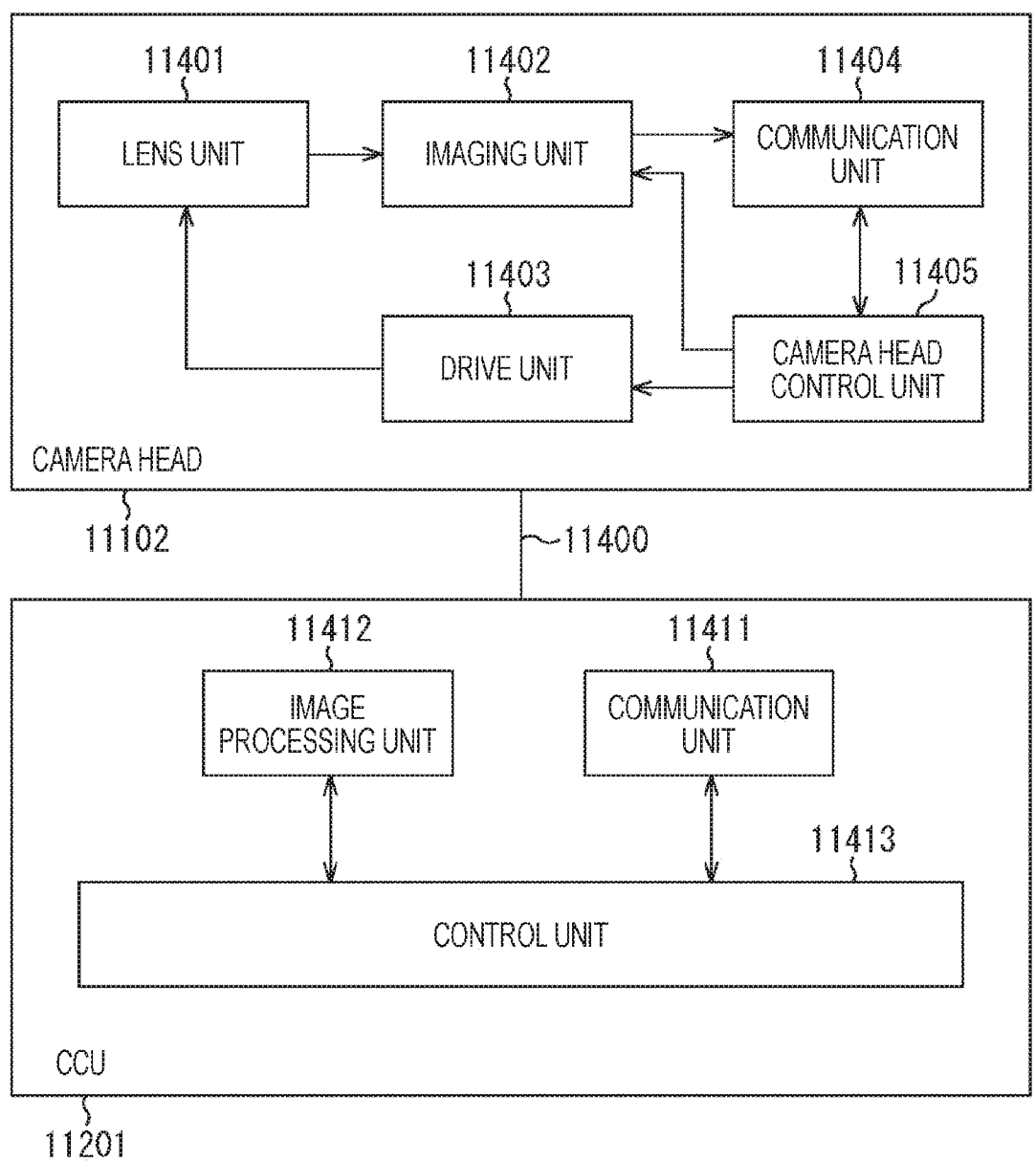
FIG. 100 is a block diagram illustrating an example of functional configurations of a camera head and a camera control unit (CCU).

FIG. 100 is a block diagram illustrating an example of functional configurations of the camera head 11102 and the CCU 11201 illustrated in FIG. 99.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connected portion with the lens barrel 11101. Observation light taken in from the tip of the lens barrel 11101 is guided to the camera head 11102 and is incident on the lens unit 11401. The lens unit 11401 is configured by combining a plurality of lenses including a zoom lens and a focus lens with each other.

The imaging unit 11402 includes an imaging element. The number of imaging elements constituting the imaging unit 11402 may be one (a so-called single-plate type) or may be plural (a so-called multi-plate type). In a case where the imaging unit 11402 is configured in the multi-plate type, for example, image signals corresponding to each of RGB may be generated by each imaging element, and may be synthesized with each other to obtain a color image. Alternatively, the imaging unit 11402 may be configured to include a pair of imaging elements for acquiring respectively image signals for a right eye and a left eye corresponding to a three-dimensional (3D) display. By performing the 3D display, the operator 11131 can more accurately grasp a depth of a biological tissue in the surgical site. Note that in a case where the imaging unit 11402 is configured in the multi-plate type, a plurality of lens units 11401 may be provided to correspond to the respective imaging elements.

Furthermore, the imaging unit 11402 may not necessarily be provided in the camera head 11102. For example, the imaging unit 11402 may be provided immediately after the objective lens, inside the lens barrel 11101.

The drive unit 11403 includes an actuator, and moves the zoom lens and the focus lens of the lens unit 11401 by a predetermined distance along an optical axis under control of the camera head control unit 11405. With this operation, a magnification and a focus of the captured image by the imaging unit 11402 can be appropriately adjusted.

The communication unit 11404 includes a communication device for transmitting and receiving various types of information to and from the CCU 11201. The communication unit 11404 transmits the image signal obtained from the imaging unit 11402 to the CCU 11201 as RAW data through the transmission cable 11400.

Furthermore, the communication unit 11404 also receives a control signal for controlling the drive of the camera head 11102 from the CCU 11201 and supplies the control signal to the camera head control unit 11405. The control signal includes, for example, information regarding imaging conditions such as information indicating that a frame rate of the captured image is designated, information indicating that an exposure value at the time of capturing the image is designated, and/or information indicating that a magnification and a focus of the captured image are designated.

Note that the imaging conditions such as the frame rate, the exposure value, the magnification, and the focus, described above may be appropriately designated by the user or may be automatically set by the control unit 11413 of the CCU 11201 on the basis of the acquired image signal. In the latter case, a so-called auto-exposure (AE) function, an auto-focus (AF) function, and an auto-white-balance (AWB) function are mounted in the endoscope 11100.

The camera head control unit 11405 controls the drive of the camera head 11102 on the basis of the control signal from the CCU 11201 received through the communication unit 11404.

The communication unit 11411 includes a communication device for transmitting and receiving various types of information to and from the camera head 11102. The communication unit 11411 receives the image signal transmitted from the camera head 11102 through the transmission cable 11400.

Furthermore, the communication unit 11411 transmits the control signal for controlling the drive of the camera head 11102 to the camera head 11102. The image signal and the control signal can be transmitted by telecommunication, optical communication or the like.

The image processing unit 11412 performs various types of image processing on the image signal, which is the RAW data transmitted from the camera head 11102.

The control unit 11413 performs various types of control related to image capturing of the surgical site or the like by the endoscope 11100 and display of the captured image obtained by the image capturing of the surgical site or the like. For example, the control unit 11413 generates the control signal for controlling the drive of the camera head 11102.

Furthermore, the control unit 11413 causes the display device 11202 to display the captured image in which the surgical site or the like is imaged, on the basis of the image signal on which the image processing is performed by the image processing unit 11412. In this case, the control unit 11413 may recognize various objects in the captured image using various image recognition technologies. For example, the control unit 11413 can recognize a surgical instrument such as forceps, a specific biological site, bleeding, and mist at the time of using the energy treatment instrument 11112, by detecting a shape, a color or the like of an edge of an object included in the captured image. The control unit 11413 may cause various types of surgical support information to be superimposed and displayed on an image of the surgical site using a result of the recognition, when it causes the display device 11202 to display the captured image. The operation support information is superimposed and disposed and is presented to the operator 11131, such that a burden on the operator 11131 can be reduced or the operator 11131 can certainly perform the surgery.

The transmission cable 11400 connecting the camera head 11102 and the CCU 11201 to each other is an electrical signal cable corresponding to communication of an electrical signal, an optical fiber corresponding to optical communication, or a composite cable of the electrical signal cable and the optical fiber.

Here, communication has been performed in a wired manner using the transmission cable 11400 in the illustrated example, but communication between the camera head 11102 and the CCU 11201 may be performed in a wireless manner.

An example of the endoscopic surgery system to which the technology according to the present disclosure can be applied has been described hereinabove. The technology according to the present disclosure can be applied to the lens unit 11401 and the imaging unit 11402 among the configurations described above. Specifically, the camera module 2031 of FIG. 82 can be applied to the lens unit 11401 and the imaging unit 11402. By applying the technology according to the present disclosure to the lens unit 11401 and the imaging unit 11402, it is possible to obtain a clearer surgical site image, and it is thus possible for the operator to certainly confirm the surgical site.

Note that the endoscopic surgery system has been described by way of example herein, but the technology according to the present disclosure may be applied to, for example, a microsurgery system or the like.

31. Application Example to Moving Body

Figure 101:
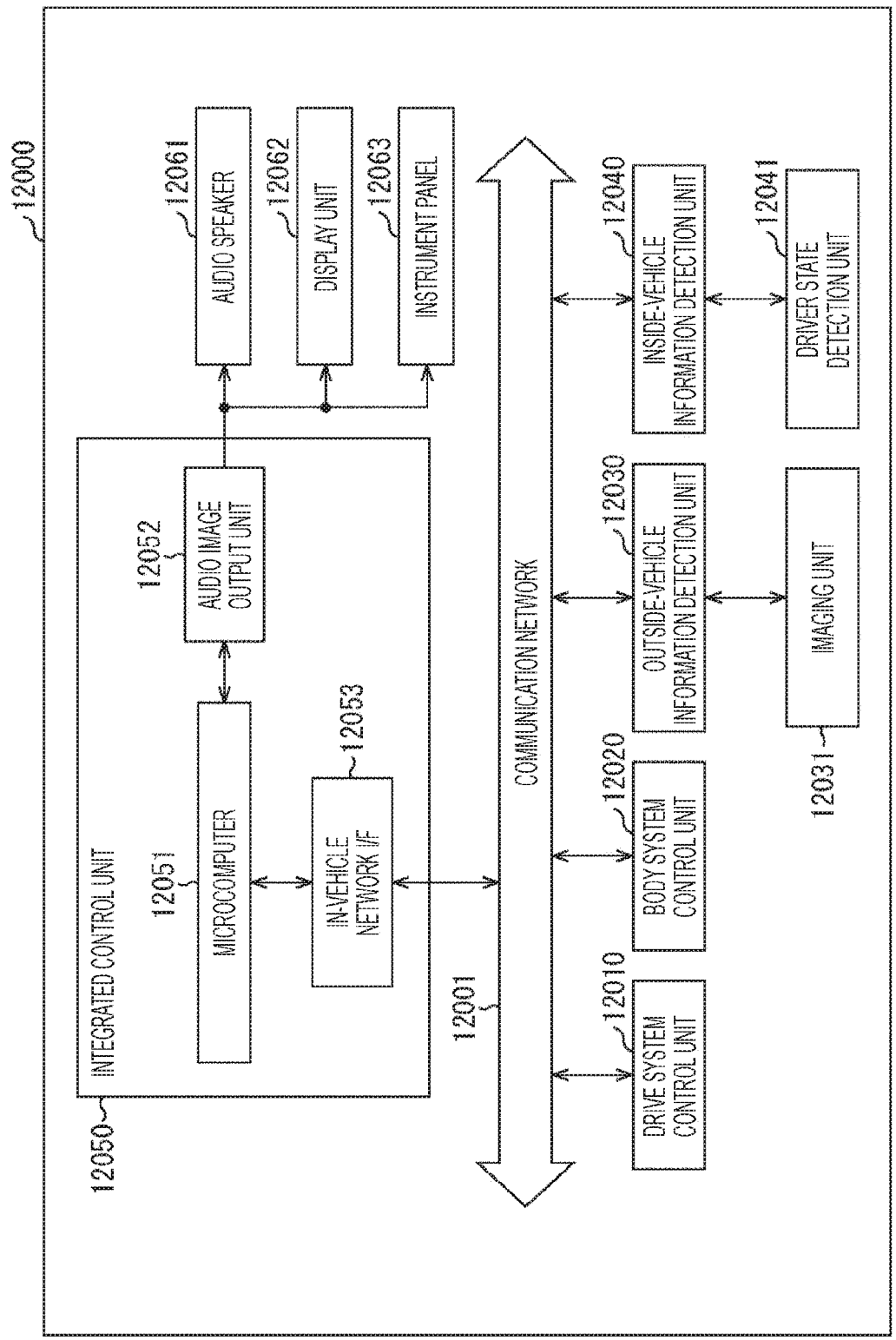
FIG. 101 is a block diagram illustrating an example of a schematic configuration of a vehicle control system.

Moreover, the technology according to the present disclosure may be realized as a device mounted in any one mobile object of a vehicle, an electric vehicle, a hybrid electric vehicle, a motorcycle, a bicycle, a personal mobility, an airplane, a drone, a ship, a robot, and the like FIG. 101 is a block diagram illustrating a schematic configuration example of a vehicle control system which is an example of a moving body control system to which the technology according to the present disclosure can be applied.

A vehicle control system 12000 includes a plurality of electronic control units connected to each other through a communication network 12001. In the example illustrated in FIG. 101, the vehicle control system 12000 includes a drive system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls an operation of a device related to a drive system of a vehicle according to various programs. For example, the drive system control unit 12010 functions as a control device such as a driving force generation device for generating a driving force of the vehicle, such as an internal combustion engine or a drive motor, a driving force transfer mechanism for transferring the driving force to wheels, a steering mechanism for adjusting a steering angle of the vehicle, and a braking device for generating a braking force of the vehicle.

The body system control unit 12020 controls operations of various devices mounted on a vehicle body according to the various programs. For example, the body system control unit 12020 functions as a keyless entry system, a smart key system, a power window device, or a control device of various lamps such as a headlamp, a back lamp, a brake lamp, a blinker, or a fog lamp. In this case, the body system control unit 12020 can receive electric waves or signals of various switches transmitted from a portable device substituting for a key. The body system control unit 12020 receives inputs of these electric waves or signals, and controls a door lock device, a power window device, a lamp, and the like of the vehicle.

The outside-vehicle information detection unit 12030 detects information regarding the outside of the vehicle in which the vehicle control system 12000 is mounted. For example, an imaging unit 12031 is connected to the outside-vehicle information detection unit 12030. The outside-vehicle information detection unit 12030 causes the imaging unit 12031 to capture a vehicle external image, and receives the captured image. The outside-vehicle information detection unit 12030 may perform object detection processing or distance detection processing of a person, a vehicle, an obstacle, a sign, characters on a road surface, or the like on the basis of the received image.

The imaging unit 12031 is an optical sensor receiving light and outputting an electrical signal depending on an amount of received light. The imaging unit 12031 can output the electrical signal as an image or can output the electrical signal as measured distance information. Furthermore, the light received by the imaging unit 12031 may be visible light or may be non-visible light such as infrared light.

The inside-vehicle information detection unit 12040 detects information regarding the inside of the vehicle. For example, a driver state detection unit 12041 detecting a state of a driver is connected to the inside-vehicle information detection unit 12040. The driver state detection unit 12041 includes, for example, a camera imaging the driver, and the inside-vehicle information detection unit 12040 may calculate a fatigue degree or a concentration degree of the driver on the basis of detected information input from the driver state detection unit 12041 or may be determine whether or not the driver is dozing.

The microcomputer 12051 can calculate a control target value of the driving force generation device, the steering mechanism, or the braking device on the basis of the information regarding the inside or the outside of the vehicle acquired by the outside-vehicle information detection unit 12030 or the inside-vehicle information detection unit 12040 and output a control command to the drive system control unit 12010. For example, the microcomputer 12051 can perform cooperation control for the purpose of realizing a function of an advanced driver assistance system (ADAS) including collision avoidance or shock mitigation of the vehicle, following traveling based on an inter-vehicle distance, vehicle speed maintenance traveling, collision warning of the vehicle, lane departure warning of the vehicle, and the like.

Furthermore, the microcomputer 12051 can perform cooperative control for the purpose of automatic driving or the like in which the vehicle autonomously travels without depending on a driver's operation by controlling the driving force generating device, the steering mechanism, the braking device, or the like, on the basis of the surrounding information of the vehicle acquired by the outside-vehicle information detection unit 12030 or the inside-vehicle information detection unit 12040.

Furthermore, the microcomputer 12051 can output a control command to the body system control unit 12020 on the basis of the information regarding the outside of the vehicle acquired by the outside-vehicle information detection unit 12030. For example, the microcomputer 12051 can perform cooperative control for the purpose of achieving antiglare such as switching a high beam into a low beam by controlling the headlamp depending on a position of the preceding vehicle or an oncoming vehicle detected by the outside-vehicle information detection unit 12030.

The audio image output unit 12052 transmits at least one of an audio output signal or an image output signal to an output device capable of visually or auditorily notifying a passenger or the outside of the vehicle of information. In the example of FIG. 101, an audio speaker 12061, a display unit 12062, and an instrument panel 12063 are illustrated as the output device. The display unit 12062 may include, for example, at least one of an on-board display or a head-up display.

Figure 102:
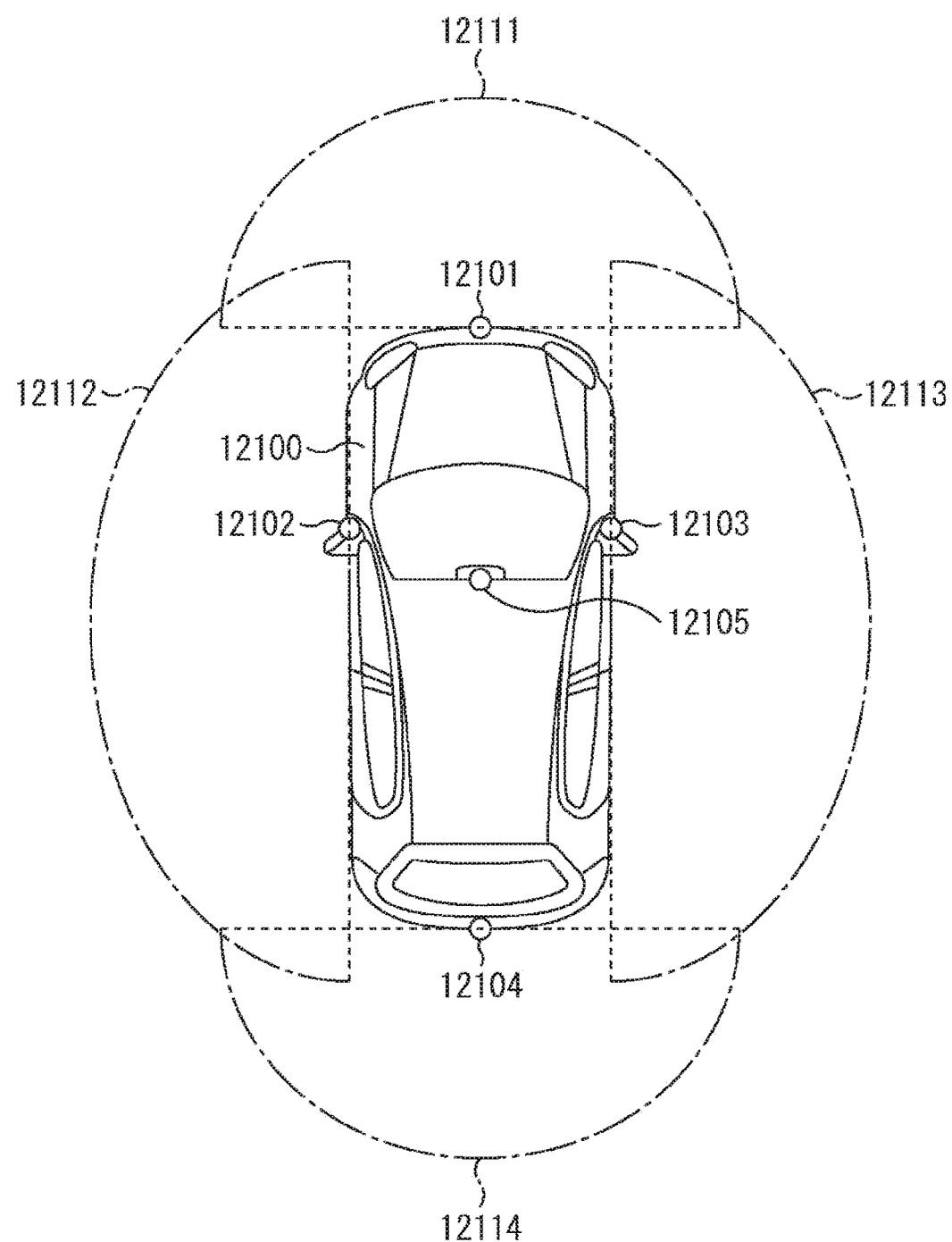
FIG. 102 is an explanatory view illustrating an example of installation positions of an outside-vehicle information detection unit and an imaging unit.

FIG. 102 is a view illustrating an example of an example of an installation position of the imaging unit 12031.

In FIG. 102, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, side mirrors, a rear bumper, a back door, and an upper portion of a windshield of a vehicle interior, of the vehicle 12100. The imaging unit 12101 included in the front nose and the imaging unit 12105 included in the upper portion of the windshield of the vehicle interior mainly acquire images of a region in front of the vehicle 12100. The imaging units 12102 and 12103 included in the side mirrors mainly acquire images side regions of the vehicle 12100. The imaging units 12104 included in the rear bumper or the back door mainly acquire an image of a region behind the vehicle 12100. The images of the region in front of the vehicle acquired by the imaging units 12101 and 12105 are mainly used to detect the preceding vehicle, a pedestrian, an obstacle, a traffic light, a traffic sign, a lane, or the like.

Note that FIG. 102 illustrates an example of imaging ranges of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided in the rear bumper or the back door. For example, by overlaying image data captured by the imaging units 12101 to 12104 with each other, a bird's eye view image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements or may be an imaging element having pixels for detecting a phase difference.

For example, the microcomputer 12051 can extract, in particular, a three-dimensional object that is the closest three-dimensional object on a traveling road of the vehicle 12100 and travels at a predetermined speed (for example, 0 km/h or more) in substantially the same direction that of the vehicle 12100 as the preceding vehicle by calculating a distance to each three-dimensional object in the imaging ranges 12111 to 12114 and a temporal change (a relative velocity to the vehicle 12100) in this distance on the basis of the distance information acquired from the imaging units 12101 to 12104. Moreover, the microcomputer 12051 can set an inter-vehicle distance to be secured in advance in front of the preceding vehicle and perform automatic brake control (including following stop control), automatic acceleration control (including following start control), and the like. As described above, it is possible to perform the cooperative control for the purpose of the automatic driving or the like in which the vehicle autonomously travels without depending on the driver's operation.

For example, the microcomputer 12051 can classify and extract three-dimensional object data related to the three-dimensional objects into other three-dimensional objects such as a two-wheeled vehicle, an ordinary vehicle, a large vehicle, a pedestrian, and a telephone pole, on the basis of the distance information acquired from the imaging units 12101 to 12104, and use the three-dimensional object data for automatic avoidance of an obstacle. For example, the microcomputer 12051 identifies obstacles around the vehicle 12100 as obstacles visible to the driver of the vehicle 12100 and obstacles invisible to the driver of the vehicle 12100. Then, the microcomputer 12051 can perform driving support for collision avoidance by determining a collision risk indicating a risk of collision with each obstacle and outputting a warning to the driver through the audio speaker 12061 or the display unit 12062 or performing forced deceleration or avoidance steering through the drive system control unit 12010 in a situation where the collision risk is a set value or more, so there is a possibility of collision.

At least one of the imaging units 12101 to 12104 may be an infrared camera detecting infrared light. For example, the microcomputer 12051 can recognize a pedestrian by determining whether or not the pedestrian is present in the images captured of the imaging units 12101 to 12104. Such recognition of the pedestrian is performed by, for example, a procedure for extracting feature points in images captured by the imaging units 12101 to 12104 as the infrared camera and a procedure of performing pattern matching processing on a series of feature points indicating an outline of an object to distinguish whether or not the object is the pedestrian. When the microcomputer 12051 determines that the pedestrian is present in the images captured by the imaging units 12101 to 12104 and recognizes the pedestrian, the audio image output unit 12052 controls the display unit 12062 to superimpose and display a rectangular outline for emphasizing the recognized pedestrian. Furthermore, the audio image output unit 12052 may control the display unit 12062 to display an icon or the like indicating the pedestrian on a desired position.

An example of the vehicle control system to which the technology according to the present disclosure can be applied has been described hereinabove. The technology according to the present disclosure can be applied to the imaging unit 12031 among the configurations described above. Specifically, the camera module 2031 of FIG. 82 can be applied to the imaging unit 12031. By applying the technology according to the present disclosure to the imaging unit 12031, it is possible to obtain a more easily viewable photographed image, and it is thus possible to reduce fatigue of the driver.

Note that the embodiments of the present technology are not limited to the embodiments described above, and various modifications can be made without departing from the scope of the present technology.

Moreover, the present technology can adopt the following configurations.

(1)

A camera module including:

an image sensor;

a lens unit that is provided on a light receiving surface of the image sensor; and at least one refractive index adjustment layer that is formed between the image sensor and the lens unit.

(2)

The camera module according to (1), in which the lens unit is a stacked lens structure in which a plurality of lenses is stacked.

(3)

The camera module according to (2), in which the stacked lens structure is formed by stacking three or more the lenses.

(4)
The camera module according to any one of (1) to (3), in which an infrared light cut filter (IRCF) is provided between the image sensor and the lens unit, and
the refractive index adjustment layer is formed without a gap between the IRCF and the lens unit.

(5)
The camera module according to (4), in which the refractive index adjustment layer is further formed without a gap between the image sensor and the IRCF.

(6)
The camera module according to (4), further including a cover glass provided between the image sensor and the IRCF unit,
in which the refractive index adjustment layers are further formed without gaps between the image sensor and the cover glass and between the cover glass and the IRCF.

(7)
The camera module according to any one of (4) to (6), in which the refractive index adjustment layer includes a resin material, a liquid material, or a solid material having a refractive index of 1.2 to 1.7.

(8)
The camera module according to any one of (4) to (7), in which a transmittance of the refractive index adjustment layer is 80% or more in a wavelength range of 400 to 700 nm.

(9)
The camera module according to (8), in which the transmittance of the refractive index adjustment layer shows substantially flat characteristics without coloring in the wavelength range of 400 to 700 nm.

(10)
The camera module according to any one of (4) to (9), in which the lens unit has a variable focus lens.

(11)
The camera module according to (10), in which the variable focus lens is a liquid crystal lens, a liquid lens, or a micro electro mechanical systems (MEMS) lens.

(12)
The camera module according to any one of (4) to (9), in which the lens unit is an inner focus type lens.

(13)
The camera module according to any one of (4) to (12), in which the lens unit has an apodized filter.

(14)
The camera module according to (13), in which the apodized filter is configured so that a diaphragm is mechanically adjustable.

(15)
The camera module according to (13), in which the apodized filter is configured so that a diaphragm is electrically adjustable.

(16)
The camera module according to any one of (13) to (15), in which a transmittance of the apodized filter is 80% or more at an optical center and 0.01% at an end portion in a wavelength range of 400 to 700 nm.

(17)
The camera module according to (16), in which the transmittance of the apodized filter shows substantially flat characteristics without coloring in the wavelength range of 400 to 700 nm.

(18)
The camera module according to any one of (1) to (17), in which an F number of the lens unit is set to F2.0 or less.

(19)
A method of manufacturing a camera module including:
forming at least one refractive index adjustment layer between an image sensor and a lens unit provided on a light receiving surface of the image sensor.

(20)
An electronic apparatus including a camera module,
in which the camera module includes:
an image sensor;
a lens unit that is provided on a light receiving surface of the image sensor; and
at least one refractive index adjustment layer that is formed between the image sensor and the lens unit.

REFERENCE SIGNS LIST

2011 Image sensor
2012 Lens unit
2013 IRCF
2021 Lens
2031 Camera module
2041, 2042 Refractive index adjustment layer
2051 Cover glass
2052, 2053 Refractive index adjustment layer
2061 Variable focus lens
2084 Lens drive unit
2091 Apodized filter
2131 Apodized filter
3000 Imaging device
3001 Image sensor
3002 Camera module

The invention claimed is:

1. A camera module, comprising:
an image sensor;
a lens unit on a side of a light receiving surface of the image sensor;
an infrared light cut filter (IRCF) between the image sensor and the lens unit;
a cover glass between the image sensor and the IRCF;
a first refractive index adjustment layer between the lens unit and the IRCF;
a second refractive index adjustment layer between the IRCF and the cover glass; and
a third refractive index adjustment layer between the cover glass and the image sensor, wherein
the third refractive index adjustment layer includes:
a first surface in contact with the cover glass; and
a second surface in contact with the image sensor, and
the first surface is opposite to the second surface.

2. The camera module according to claim 1, wherein the lens unit has a stacked lens structure that includes a plurality of lenses.

3. The camera module according to claim 2, wherein the plurality of lenses includes at least lenses.

4. The camera module according to claim 3, wherein the first refractive index adjustment layer is in contact with each of the IRCF and the lens unit.

5. The camera module according to claim 4, wherein the second refractive index adjustment layer is in contact with each of the IRCF and the cover glass.

6. The camera module according to claim 4, wherein the first refractive index adjustment layer includes at least one of a resin material, a liquid material, or a solid material having a refractive index between 1.2 to 1.7.

7. The camera module according to claim 4, wherein the first refractive index adjustment layer has a transmittance of at least 80% in a wavelength range of 400 to 700 nm.

8. The camera module according to claim 7, wherein the transmittance has substantially flat characteristics without color in the wavelength range of 400 to 700 nm.

9. The camera module according to claim 4, wherein the lens unit includes a variable focus lens.

10. The camera module according to claim 9, wherein the variable focus lens is one of a liquid crystal lens, a liquid lens, or a micro electro mechanical systems (MEMS) lens.

11. The camera module according to claim 4, wherein the lens unit is an inner focus type lens.

12. The camera module according to claim 4, wherein the lens unit includes an apodized filter.

13. The camera module according to claim 12, wherein
the lens unit includes a diaphragm, and
the apodized filter is configured to enable the diaphragm to be mechanically adjustable.

14. The camera module according to claim 12, wherein
the lens unit includes a diaphragm, and
the apodized filter is configured to enable the diaphragm to be electrically adjustable.

15. The camera module according to claim 12, wherein the apodized filter has a transmittance of at least 80% at an optical center of the apodized filter and 0.01% at an end portion of the apodized filter in a wavelength range of 400 to 700 nm.

16. The camera module according to claim 15, wherein the transmittance of the apodized filter has substantially flat characteristics without color in the wavelength range of 400 to 700 nm.

17. The camera module according to claim 1, wherein an F number of the lens unit is one of F2.0 or less.

18. The camera module according to claim 1, wherein the cover glass is spaced apart from the image sensor.

19. A method of manufacturing a camera module, comprising:
forming an infrared light cut filter (IRCF) between an image sensor and a lens unit, wherein the lens unit is on a side of a light receiving surface of the image sensor;
forming a cover glass between the image sensor and the IRCF;
forming a first refractive index adjustment layer between the lens unit and the IRCF;
forming a second refractive index adjustment layer between the IRCF and the cover glass; and
forming a third refractive index adjustment layer between the cover glass and the image sensor, wherein
the third refractive index adjustment layer includes:
a first surface in contact with the cover glass; and
a second surface in contact with the image sensor, and
the first surface is opposite to the second surface.

20. An electronic apparatus, comprising:
a camera module that includes:
an image sensor;
a lens unit on a side of a light receiving surface of the image sensor;
an infrared light cut filter (IRCF) between the image sensor and the lens unit;
a cover glass between the image sensor and the IRCF;
a first refractive index adjustment layer between the lens unit and the IRCF;
a second refractive index adjustment layer between the IRCF and the cover glass; and
a third refractive index adjustment layer between the cover glass and the image sensor, wherein
the third refractive index adjustment layer includes:
a first surface in contact with the cover glass; and
a second surface in contact with the image sensor, and
the first surface is opposite to the second surface.

* * * * *